(12) United States Patent
Scholand et al.

(10) Patent No.: US 11,451,260 B2
(45) Date of Patent: Sep. 20, 2022

(54) METHODS AND DEVICES FOR DEVICE-TO-DEVICE COMMUNICATIONS

(71) Applicant: Intel Corporation, Santa Clara, CA (US)

(72) Inventors: Tobias Scholand, Essen (DE); Jan Ellenbeck, Gruenwald (DE); Biljana Badic, Munich (DE); Oana-Elena Barbu, Aalborg (DK); Thomas Hans-Joerg Reichelmeir, Aschheim (DE); Norman Goris, Dortmund (DE); Lea Castel, Aalborg (DK); Nuno Manuel Kiilerich Pratas, Gistrup (DK); Christian Drewes, Germering (DE); Johannes Brendel, Erlangen (DE)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/912,722

(22) Filed: Jun. 26, 2020

(65) Prior Publication Data
US 2020/0328776 A1 Oct. 15, 2020

Related U.S. Application Data

(63) Continuation of application No. PCT/EP2018/053402, filed on Feb. 12, 2018.

(51) Int. Cl.
*H04B 1/715* (2011.01)

(52) U.S. Cl.
CPC ..... *H04B 1/715* (2013.01); *H04B 2001/7154* (2013.01)

(58) Field of Classification Search
CPC .......... H04B 1/715; H04B 2001/7154
USPC ........................................... 375/133
See application file for complete search history.

(56) References Cited

U.S. PATENT DOCUMENTS

| | | | |
|---|---|---|---|
| 5,121,408 A | 6/1992 | Cai et al. | |
| 6,031,864 A | 2/2000 | Bauchot et al. | |
| 2004/0170217 A1* | 9/2004 | Ho | H04B 1/715 375/134 |
| 2010/0202327 A1* | 8/2010 | Mushkin | H04B 1/713 370/280 |
| 2016/0050552 A1 | 2/2016 | Kim et al. | |

OTHER PUBLICATIONS

International Search Report issued for the corresponding PCT application No. PCT/EP2018/053402, dated Jan. 14, 2019, 21 pages (for informational purpose only).

* cited by examiner

*Primary Examiner* — Ted M Wang
(74) *Attorney, Agent, or Firm* — Viering, Jentschura & Partner mbB

(57) ABSTRACT

A terminal device includes a controller configured to identify a data hopping sequence for a first superframe including a plurality of frames, and a transceiver configured to switch hopping frequencies over the plurality of frames according to a data hopping sequence that excludes one or more hopping frequencies scheduled for use by a synchronization hopping sequence in one or more superframes immediately succeeding the first superframe.

16 Claims, 93 Drawing Sheets

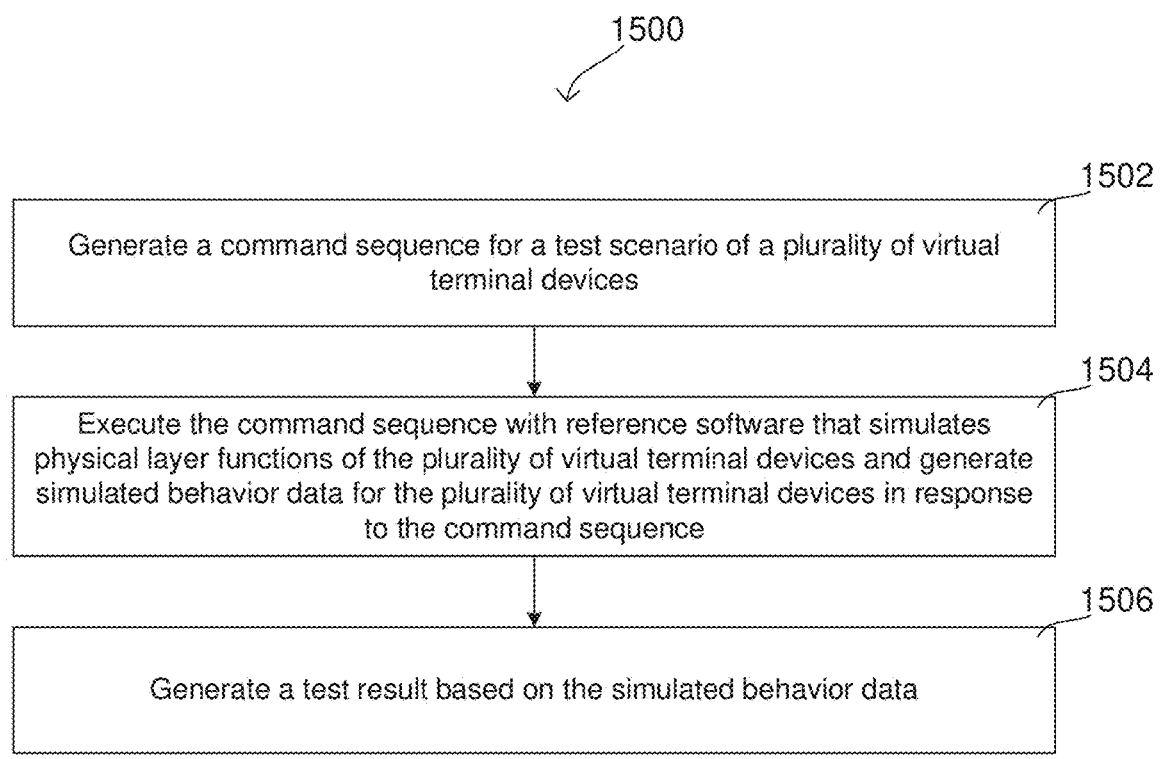

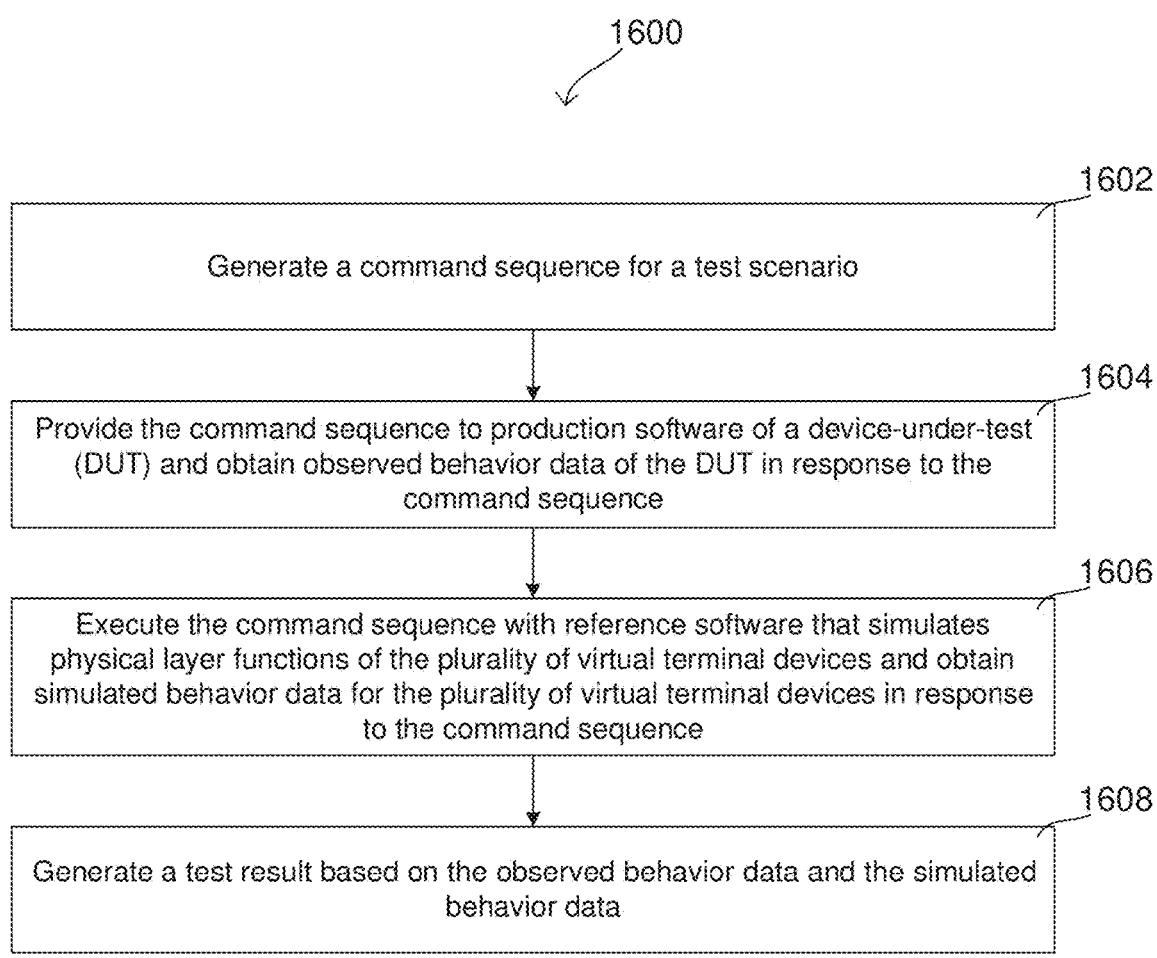

FIG 17

| Band | Type | Bandwidth | ERP | LBT requirements | ON time, dwell time | Other |
|---|---|---|---|---|---|---|
| 902-928 | Frequency Hopping (FH) | 26MHz to use if: 25KHz ≤ 20dB channel bandwidth* ≤250KHz | ≥ 50 hopping channels; +30dBm MOP (excluding max 6dBi antenna gain) | LBT permitted, no coordination possible | 400ms/20s | -Hopping has to appear as random in the short term and it has to use all the required hops in the long term. Short and long terms are not defined in FCC.<br><br>-Hopping channel carrier frequencies separated by N=max(25 kHz, 20 dB bandwidth*).<br><br>-In any 100 kHz bandwidth outside the frequency band attenuation at least 20dB below the max desired power in this band |

| | Superframe 1 | | | | | | | | | | | | | | | | | | | | |
|---|---|---|---|---|---|---|---|---|---|---|---|---|---|---|---|---|---|---|---|---|---|
| Frame number | 1 | 2 | 3 | 4 | 5 | 6 | 7 | 8 | 9 | 10 | 11 | 12 | 13 | 14 | 15 | 16 | 17 | 18 | 19 | 20 | 21 |
| Sync | 1 | 1 | 1 | 1 | 1 | 1 | 1 | 1 | 1 | 1 | 1 | 1 | 1 | 1 | 1 | 1 | 1 | 1 | 1 | 1 | 1 |
| Hopset 1 | 4 | 5 | 6 | 7 | 8 | 9 | 10 | 11 | 12 | 13 | 14 | 15 | 16 | 17 | 18 | 19 | 20 | 21 | 22 | 23 | 24 |
| | Superframe 2 | | | | | | | | | | | | | | | | | | | | |
| Frame number | 22 | 23 | 24 | 25 | 26 | 27 | 28 | 29 | 30 | 31 | 32 | 33 | 34 | 35 | 36 | 37 | 38 | 39 | 40 | 41 | 42 |
| Sync | 2 | 2 | 2 | 2 | 2 | 2 | 2 | 2 | 2 | 2 | 2 | 2 | 2 | 2 | 2 | 2 | 2 | 2 | 2 | 2 | 2 |
| Hopset 1 | 25 | 26 | 27 | 28 | 29 | 30 | 31 | 32 | 33 | 34 | 35 | 36 | 37 | 38 | 39 | 40 | 41 | 42 | 43 | 44 | 45 |
| | Superframe 3 | | | | | | | | | | | | | | | | | | | | |
| Frame number | 43 | 44 | 45 | 46 | 47 | 48 | 49 | 50 | 51 | 52 | 53 | 54 | 55 | 56 | 57 | 58 | 59 | 60 | 61 | 62 | 63 |
| Sync | 3 | 3 | 3 | 3 | 3 | 3 | 3 | 3 | 3 | 3 | 3 | 3 | 3 | 3 | 3 | 3 | 3 | 3 | 3 | 3 | 3 |
| Hopset 1 | 46 | 47 | 48 | 49 | 50 | 51 | 52 | 53 | 54 | 55 | 56 | 57 | 58 | 59 | 60 | 61 | 62 | 63 | 1 | 2 | 3 |

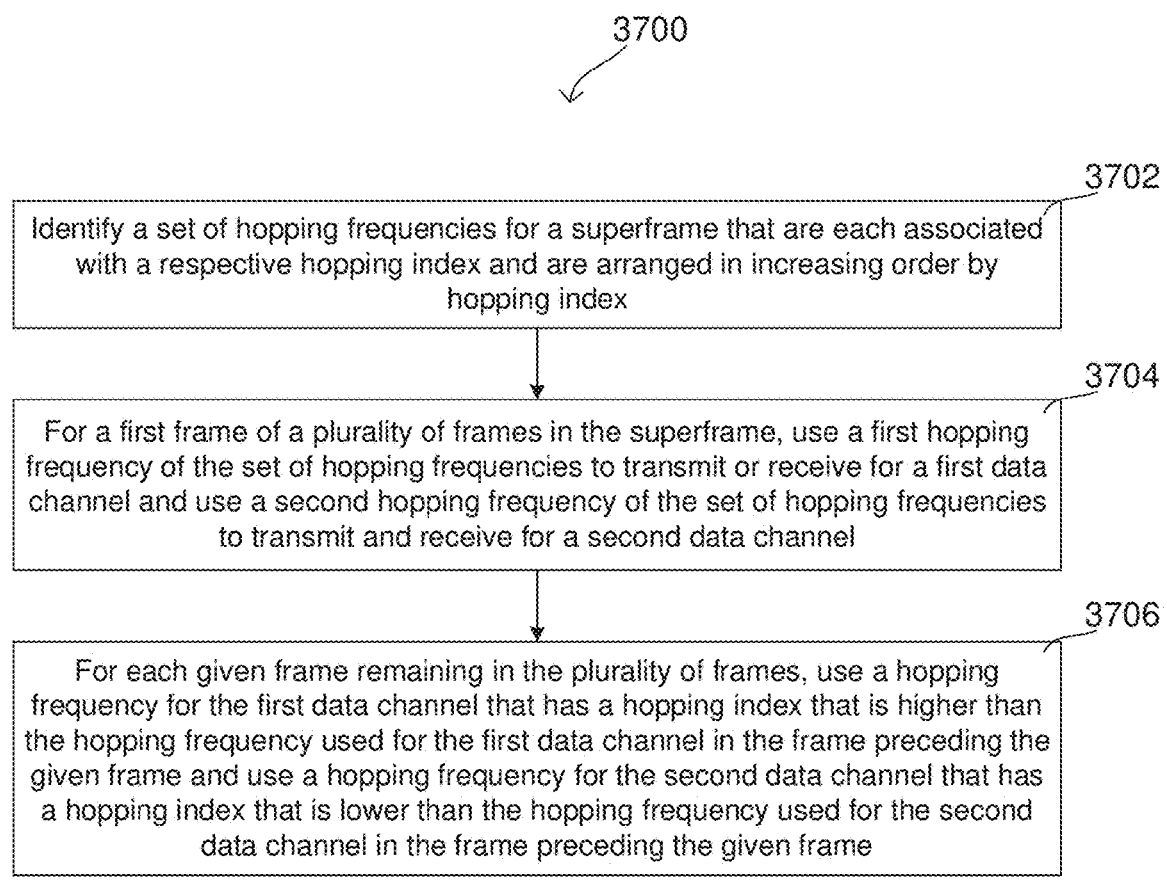

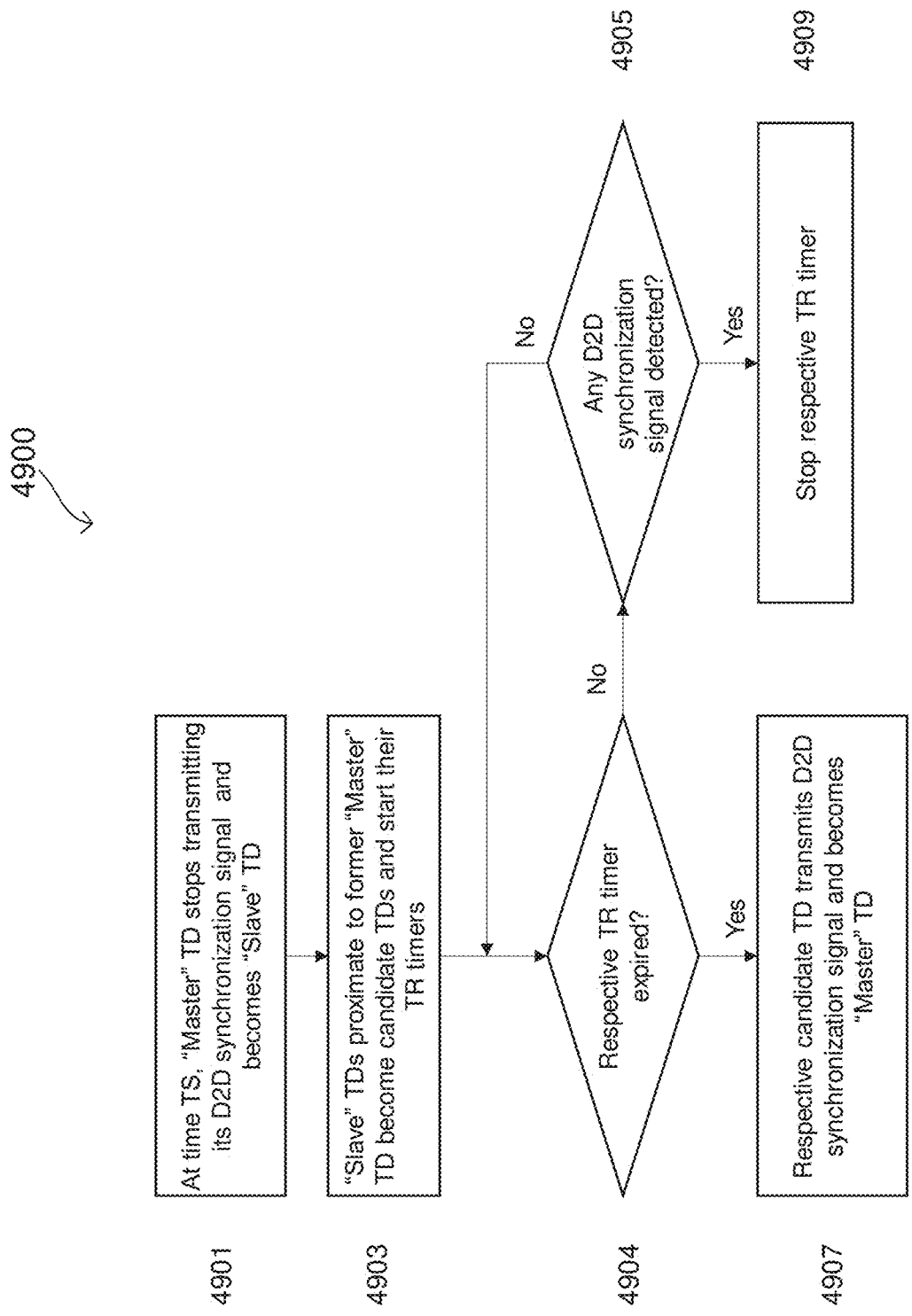

FIG 51B

| State | receive GNSS | search GNSS | send PSS = 0 | send PSS = 1 | send PSS = 2 | send PSS = 3 | receive PSS = 0 | receive PSS = 1 | receive PSS = 2 | receive PSS = 3 | search for PSS = 0 | search for PSS = 1 | search for PSS = 2 | search for PSS = 3 | listen to handover beacon | Description |
|---|---|---|---|---|---|---|---|---|---|---|---|---|---|---|---|---|
| Unsynced | x | x |  |  |  |  |  |  |  |  | x | x | x | x | x |  |
| GNSS MasterSync |  | x | x |  |  |  |  |  |  |  |  |  |  |  |  | UE is synced to GNSS and does send sync signals |
| GNSS MasterSync Slave (w/ GNSS coverage) |  | x |  |  |  |  | x |  |  |  |  |  |  |  |  | UE is synced to GNSS MasterSync, but does not sends sync signals (is in GNSS coverage) |
| GNSS MasterSync Slave (w/o GNSS coverage) |  |  |  |  |  |  | x | x |  |  |  |  |  |  |  | UE is synced to GNSS MasterSync, but does not sends sync signals (its not in GNSS coverage) |
| GNSS Relay MasterSync |  |  |  | x |  |  |  |  |  |  |  |  |  |  |  | UE is synced to GNSS MasterSync and does send sync signals |
| GNSS Relay Slave |  |  |  |  | x |  |  |  | x |  |  |  |  |  |  | UE is synced to GNSS Relay MasterSync, but does not send sync signals |
| Non-GNSS MasterSync |  |  |  |  |  | x |  |  |  |  |  |  |  |  |  | UE does send sync. signals |
| Non-GNSS Slave |  | x |  |  |  |  |  |  |  | x |  |  |  | x | x | UE is synced to Non-GNSS MasterSync |
| Non-GNSS Relay MasterSync |  |  |  |  |  |  |  |  |  |  |  |  |  | x | x | UE is synced to Non-GNSS MasterSync and sends sync signals |
| Non-GNSS Relay Slave |  |  |  |  |  |  |  |  |  |  |  |  |  | x | x | UE is synced to Non-GNSS Relay MasterSync. |

Duration: 8*36 ms = 288 ms
16.5 ms blocks: 16 ms data, 0.5 ms gap
33 ms blocks: 32 ms data, 1 ms gap Potential variation:
* multi-tone A/N at the end of the slot ("self-contained")
* single-tone A/N could be in the next MCS slot
* single-tone: four data-1 slots

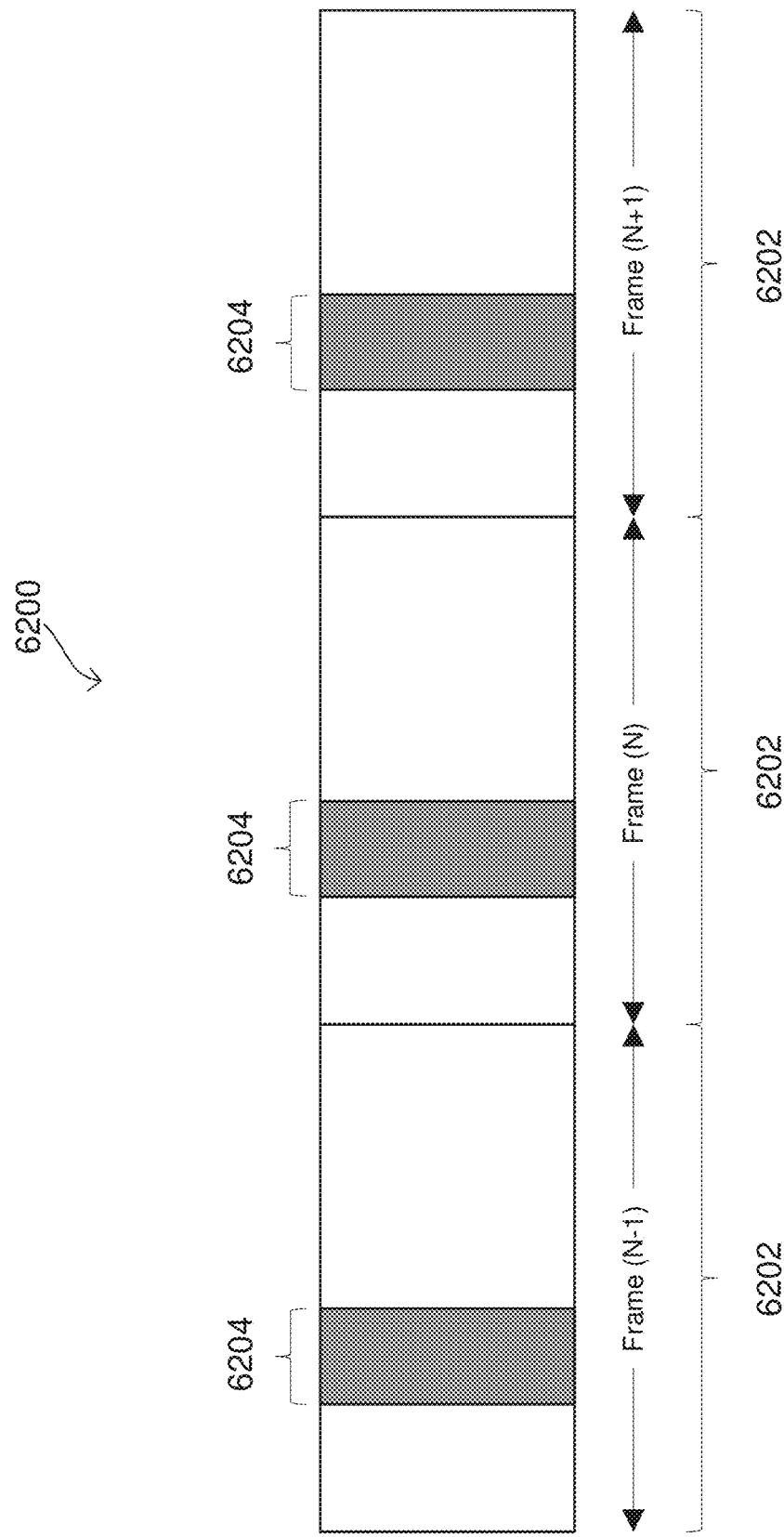

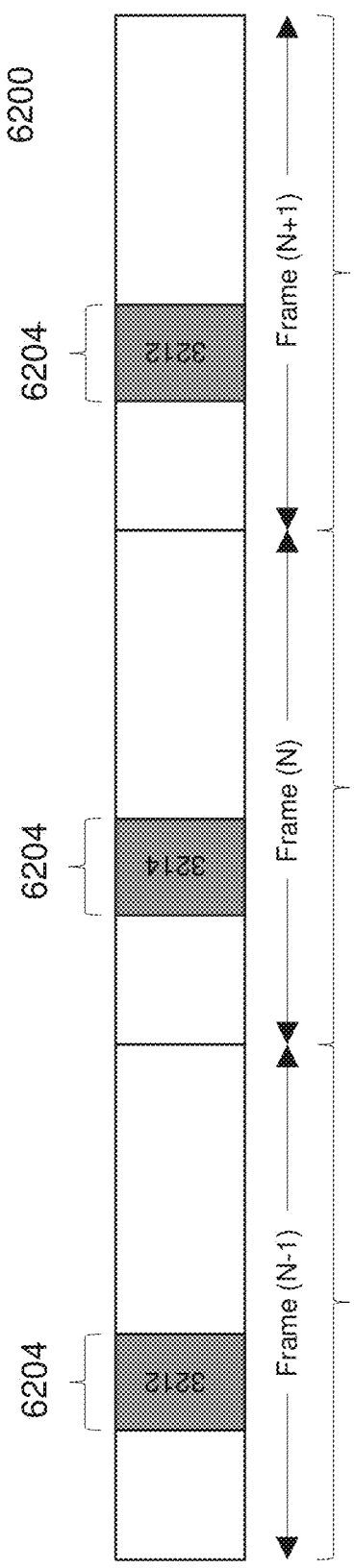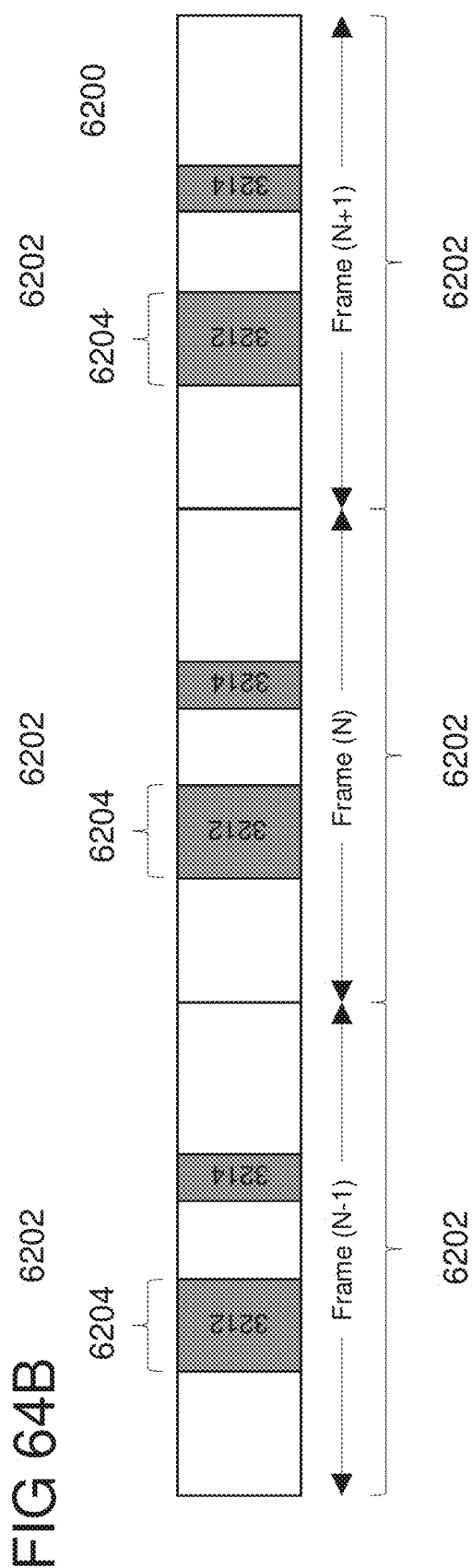

FIG 69

FIG 70
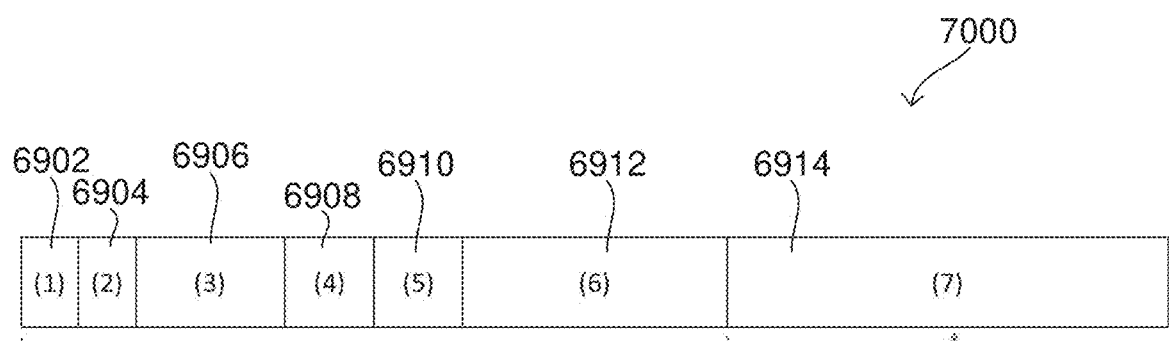
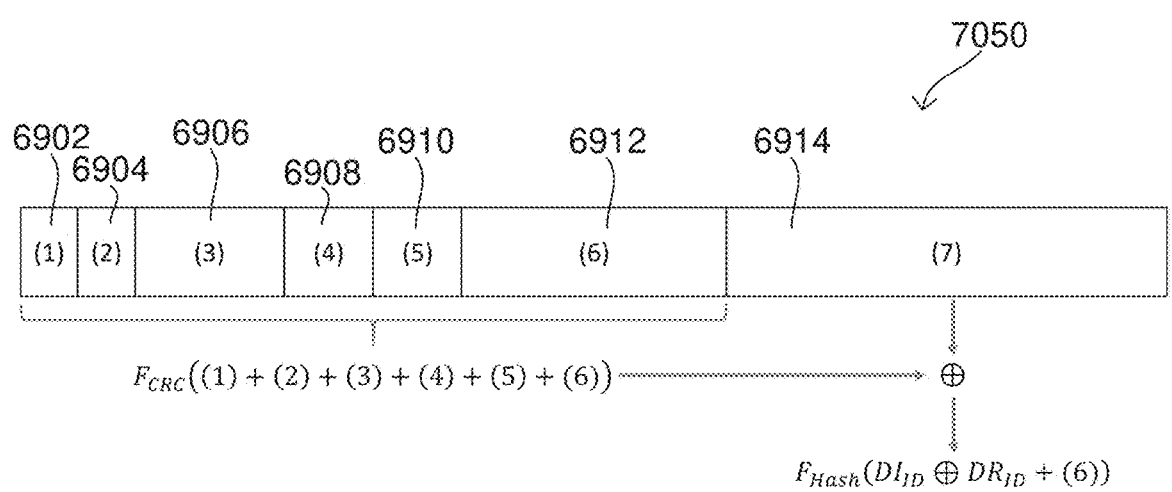

METHODS AND DEVICES FOR DEVICE-TO-DEVICE COMMUNICATIONS

CROSS-REFERENCE TO RELATED APPLICATIONS

This application is a continuation application which claims priority to PCT/EP2018/053402 filed on Feb. 12, 2018, which is herein incorporated by reference in its entirety.

TECHNICAL FIELD

Various embodiments relate generally to methods and devices for device-to-device communication.

BACKGROUND

Various communication networks use device-to-device (D2D) communications to enable devices to communicate directly with each other. The devices may therefore establish direct communication links with each other and use these links to transfer data between each other.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 15 shows a first exemplary method for testing terminal device functionality according to some aspects;

FIG. 16 shows a second exemplary method for testing terminal device functionality according to some aspects;

FIG. 17 shows an exemplary chart describing rules for frequency hopping usage of unlicensed spectrum according to some aspects;

FIG. 23 shows a first exemplary synchronization and data hopping sequence across multiple superframes according to some aspects;

FIG. 25 shows a second exemplary synchronization and data hopping sequence across multiple superframes according to some aspects;

FIGS. 30A and 30B show exemplary hopset charts according to some aspects;

FIG. 32 shows an exemplary hopset chart according to some aspects;

FIG. 37 shows a third exemplary method of operating a terminal device according to some aspects;

FIG. 49 shows an exemplary procedure for handover of a MasterSync role according to some aspects;

FIGS. 51A-51B show an exemplary state diagram and operational activities of terminal devices according to some aspects;

FIG. 62 shows an exemplary frame sequence according to some aspects;

FIGS. 64A and 64B show an exemplary allocation of discovery resources for discovery messages according to some aspects;

FIG. 69 shows a first exemplary discovery message according to some aspects;

FIG. 70 shows a first exemplary message generation and recovery example according to some aspects;

DESCRIPTION

Figure 1A:
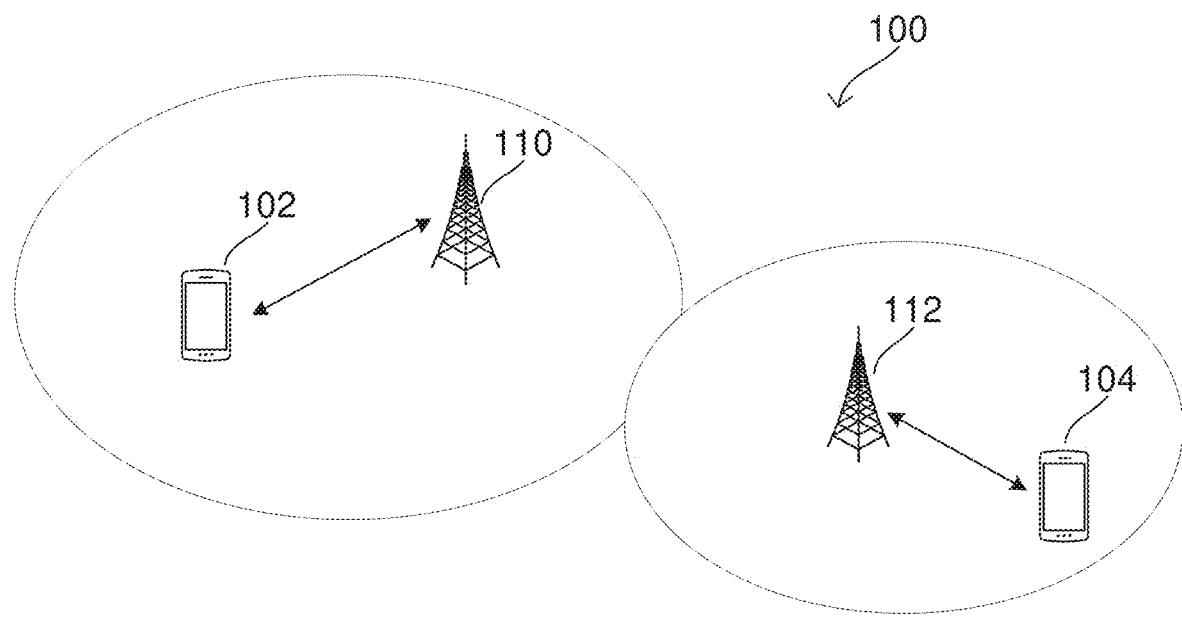
FIGS. 1A and 1B show exemplary centralized and decentralized communication networks according to some aspects.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one. The terms "proper subset", "reduced subset", and "lesser subset" refer to a subset of a set that is not equal to the set, i.e. a subset of a set that contains less elements than the set.

Any vector and/or matrix notation utilized herein is exemplary in nature and is employed solely for purposes of explanation. Accordingly, aspects of this disclosure accompanied by vector and/or matrix notation are not limited to being implemented solely using vectors and/or matrices, and that the associated processes and computations may be equivalently performed with respect to sets, sequences, groups, etc., of data, observations, information, signals, samples, symbols, elements, etc.

As used herein, "memory" are understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory, and thus may refer to a collective component comprising one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

The term "terminal device" utilized herein refers to user-side devices (both portable and fixed) that can connect to a core network and/or external data networks via a radio access network. "Terminal device" can include any mobile or immobile wireless communication device, including User Equipments (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications. Without loss of generality, in some cases terminal devices can also include application-layer components, such as application processors or other general processing components, that are directed to functionality other than wireless communications. Terminal devices can optionally support wired communications in addition to wireless communications. Furthermore, terminal devices can include vehicular communication devices that function as terminal devices.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, NodeBs, evolved NodeBs (eNBs), Home base stations, Remote Radio Heads (RRHs), relay points, Wi-Fi/WLAN Access Points (APs), Bluetooth master devices, DSRC RSUs, terminal devices acting as network access nodes, and any other electronic device capable of network-side wireless communications, including both immobile and mobile devices (e.g., vehicular network access nodes, mobile cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels. Furthermore, the term "cell" may be utilized to refer to any of a macrocell, microcell, femtocell, picocell, etc. Certain communication devices can act as both terminal devices and network access nodes, such as a terminal device that provides network connectivity for other terminal devices.

Various aspects of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. For purposes of this disclosure, radio communication technologies may be classified as one of a Short Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax) (e.g., according to an IEEE 802.16 radio communication standard, e.g., WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

The terms "radio communication network" and "wireless network" as utilized herein encompasses both an access section of a network (e.g., a radio access network (RAN) section) and a core section of a network (e.g., a core network section). The term "radio idle mode" or "radio idle state" used herein in reference to a terminal device refers to a radio control state in which the terminal device is not allocated at least one dedicated communication channel of a mobile communication network. The term "radio connected mode" or "radio connected state" used in reference to a terminal device refers to a radio control state in which the terminal device is allocated at least one dedicated uplink communication channel of a radio communication network.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup or hash tables and other array indexing or searching operations.

Channel Equalization with Mean-Field Estimation

Recent developments in wireless communications have shown increased focus on D2D communications. As the D2D terminal devices in these cases share a finite amount of frequency resources, they may experience interference caused by other in-band transmissions. The interference observed at a given D2D terminal device can be caused by discovery or data transmissions by other nearby D2D terminal devices, including in-band transmissions (e.g., co-channel and/or inter-carrier interference) and adjacent channel leakage. This can be particularly problematic for D2D communication systems that operate on unlicensed spectrum and lack central network control.

While approaches based on retransmission and interference cancelation may help to mitigate negative impacts of this interference, there may still be performance degradation. Accordingly, various aspects of this disclosure provide an equalizer that iteratively estimates soft values of data, interference, and noise signals in a received signal to obtain an accurate estimate of the data signal. As described herein, the equalizer may in some aspects iteratively subtract the soft interference estimates from the received signal to isolate the data and noise signals, and may also refine the residual noise power to account for remaining uncertainties in the estimation process (where the residual noise power sums up the residual error of the estimation error). In some aspects, the equalizer may use mean values across multiple antennas to obtain the soft value estimates, and may use information about the special correlation of the receive antennas and/or about the modulation alphabet used for the data signals as part of the estimation process.

In some cases, by using soft values as opposed to hard bit, this equalizer may be able to account for uncertainties in the estimation process and detect the symbols of the data signal by applying residual noise correction. Furthermore, in some aspects this equalizer may not use a priori information about the interference signal to detect the data signal. While this equalizer may be advantageous in D2D uses, its application is not limited to D2D and various aspects can be used in receiving devices of any wireless communication system.

Figure 1B:
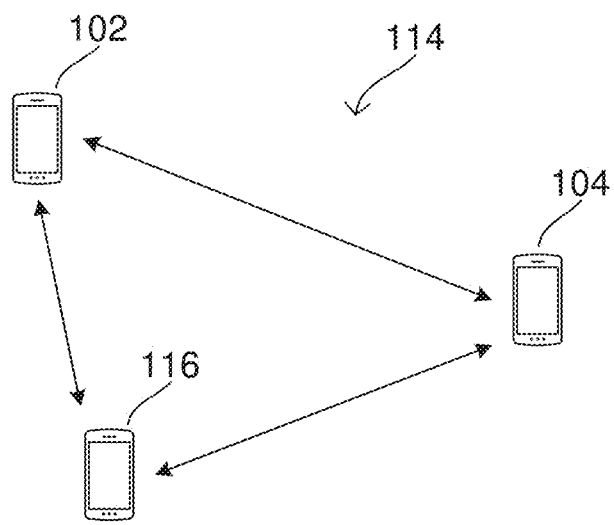
Figure 2:
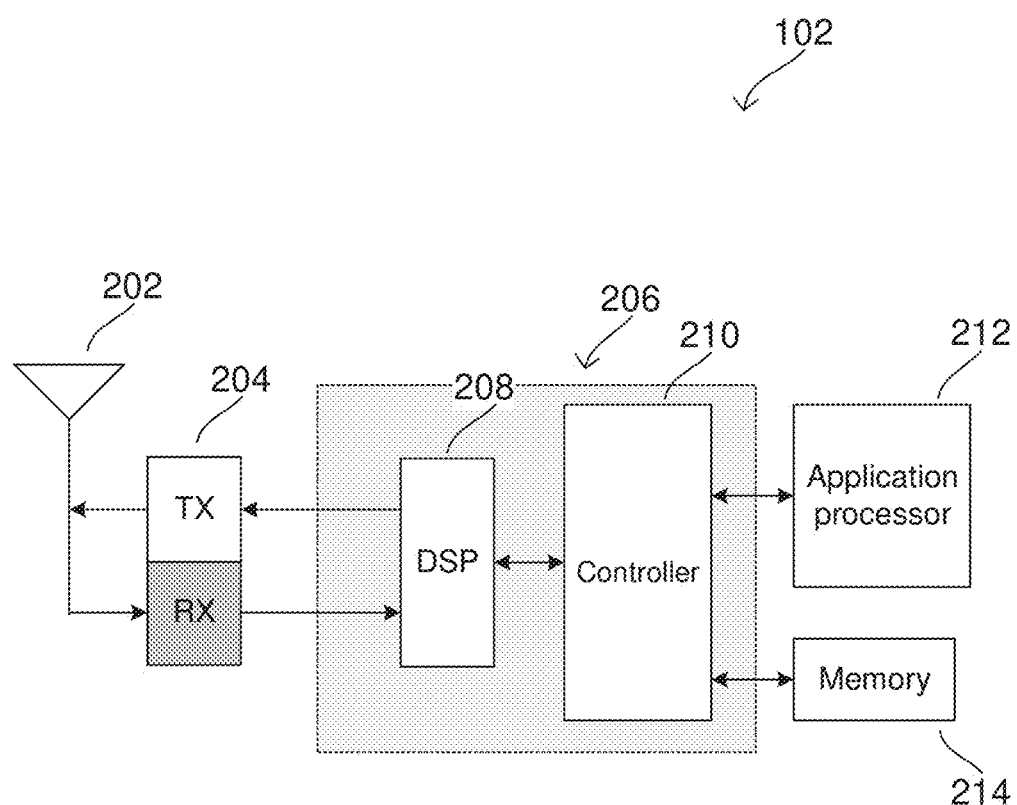
FIG. 2 shows an exemplary internal configuration of a terminal device according to some aspects.

The general architecture and configuration of wireless communication systems will be described first, followed by the detailed description of the equalizer. FIGS. 1A-1B and 2 depict a general network and device architecture for wireless communications. In particular, FIG. 1A shows exemplary radio communication network 100 according to some aspects, which may include terminal devices 102 and 104 and network access nodes 110 and 112. Radio communication network 100 may communicate with terminal devices 102 and 104 via network access nodes 110 and 112 over a radio access network. The number of network access nodes and terminal devices in radio communication network 100 is exemplary and is scalable to any amount.

In an exemplary cellular context, network access nodes 110 and 112 may be base stations (e.g., eNodeBs, NodeBs, Base Transceiver Stations (BTSs), or any other type of base station), while terminal devices 102 and 104 may be cellular terminal devices (e.g., Mobile Stations (MSs), User Equipments (UEs), or any type of cellular terminal device). Network access nodes 110 and 112 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 112 may be access points (APs, e.g., WLAN or WiFi APs), while terminal device 102 and 104 may be short range terminal devices (e.g., stations (STAs)). Network access nodes 110 and 112 may interface (e.g., via an internal or external router) with one or more external data networks.

Network access nodes 110 and 112 (and, optionally, other network access nodes of radio communication network 100 not explicitly shown in FIG. 1A) may accordingly provide a radio access network to terminal devices 102 and 104 (and, optionally, other terminal devices of radio communication network 100 not explicitly shown in FIG. 1B). In an exemplary cellular context, the radio access network provided by network access nodes 110 and 112 may enable terminal devices 102 and 104 to wirelessly access the core network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 112 may provide access to internal data networks (e.g., for transferring data between terminal devices connected to radio communication network 100) and external data networks (e.g., data networks providing voice, text, multimedia (audio, video, image), and other Internet and application data).

FIG. 1B shows an exemplary radio communication network 114 according to some aspects. In contrast the centralized architecture of radio communication network 100 of FIG. 1A (e.g., based around centralized control provided by network access nodes 110 and 112 and a supporting core network), radio communication network 114 may be a D2D communication network. Accordingly, as opposed to communicating with network access nodes 110 and 112, terminal devices 102 and 104 may directly communicate with each other. As shown in FIG. 1B, terminal devices 102 and 104 may also communicate with other terminal devices, such as terminal device 116.

FIG. 2 shows an internal configuration of terminal device 102 according to some aspects, which may include antenna system 202, radio frequency (RF) transceiver 204, baseband modem 206 (including digital signal processor 208 and controller 210), application processor 212, and memory 214. Although not explicitly shown in FIG. 2, in some aspects terminal device 102 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 102 may transmit and receive radio signals on one or more radio access networks. Baseband modem 206 may direct such communication functionality of terminal device 102 according to the communication protocols associated with each radio access network, and may execute control over antenna system 202 and RF transceiver 204 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 102 shown in FIG. 2 depicts only a single instance of such components.

Terminal device 102 may transmit and receive wireless signals with antenna system 202, which may be a single antenna or an antenna array that includes multiple antennas. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the radio transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by controller 210 for transmission via RF transceiver 204, and, in the receive path, prepare incoming received data provided by RF transceiver 204 for processing by controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/de-matching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Terminal device 102 may be configured to operate according to one or more radio communication technologies. Digital signal processor 208 may be responsible for lower-layer processing functions (e.g., Layer 1/PHY) of the radio communication technologies, while controller 210 may be responsible for upper-layer protocol stack functions (e.g., Data Link Layer/Layer 2 and/or Network Layer/Layer 3). Controller 210 may thus be responsible for controlling the radio communication components of terminal device 102 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Controller 210 may be structurally embodied as a protocol processor configured to execute protocol stack software (retrieved from a controller memory) and subsequently control the radio communication components of terminal device 102 to transmit and receive communication signals in accordance with the corresponding protocol stack control logic defined in the protocol software. Controller 210 may include one or more processors configured to retrieve and execute program code that defines the upper-layer protocol stack logic for one or more radio communication technologies, which can include Data Link Layer/Layer 2 and Network Layer/Layer 3 functions. Controller 210 may be configured to perform both user-plane and control-plane functions to facilitate the transfer of application layer data to and from radio terminal device 102 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by controller 210 may include executable instructions that define the logic of such functions.

In some aspects, terminal device 102 may be configured to transmit and receive data according to multiple radio communication technologies. Accordingly, in some aspects one or more of antenna system 202, RF transceiver 204, digital signal processor 208, and controller 210 may include separate components or instances dedicated to different radio communication technologies and/or unified components that are shared between different radio communication technologies. For example, in some aspects controller 210 may be configured to execute multiple protocol stacks, each dedicated to a different radio communication technology and either at the same processor or different processors. In some aspects, digital signal processor 208 may include separate processors and/or hardware accelerators that are dedicated to different respective radio communication technologies, and/or one or more processors and/or hardware accelerators that are shared between multiple radio communication technologies. In some aspects, RF transceiver 204 may include separate RF circuitry sections dedicated to different respective radio communication technologies, and/or RF circuitry sections shared between multiple radio communication technologies. In some aspects, antenna system 202 may include separate antennas dedicated to different respective radio communication technologies, and/or antennas shared between multiple radio communication technologies.

Accordingly, while antenna system 202, RF transceiver 204, digital signal processor 208, and controller 210 are shown as individual components in FI, in some aspects antenna system 202, RF transceiver 204, digital signal processor 208, and/or controller 210 can encompass separate components dedicated to different radio communication technologies.

Terminal device 102 may also include application processor 212 and memory 214. Application processor 212 may be a CPU, and may be configured to handle the layers above the protocol stack, including the transport and application layers. Application processor 212 may be configured to execute various applications and/or programs of terminal device 102 at an application layer of terminal device 102, such as an operating system (OS), a user interface (UI) for supporting user interaction with terminal device 102, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may embody a memory component of terminal device 102, such as a hard drive or another such permanent memory device. Although not explicitly depicted in FIG. 2, the various other components of terminal device 102 shown in FIG. 2 may additionally each include integrated permanent and non-permanent memory components, such as for storing software program code, buffering data, etc.

As previously introduced, various aspects of this disclosure provide an equalizer for detecting a data symbols within a received signal. In various aspects, this equalizer can be implemented in any receiving device, such as in a terminal device communicating with a network access node (e.g., terminal device 102 in FIG. 1A), a network access node communicating with a terminal device (e.g., network access node 110 in FIG. 1A), or a terminal device communicating with another terminal device (e.g., terminal device 102 in FIG. 1B). Accordingly, any example below describing the equalizer with a focus on any particular case is exemplary, and the equalizer can be equivalently implemented in any receiving device.

Figure 3:
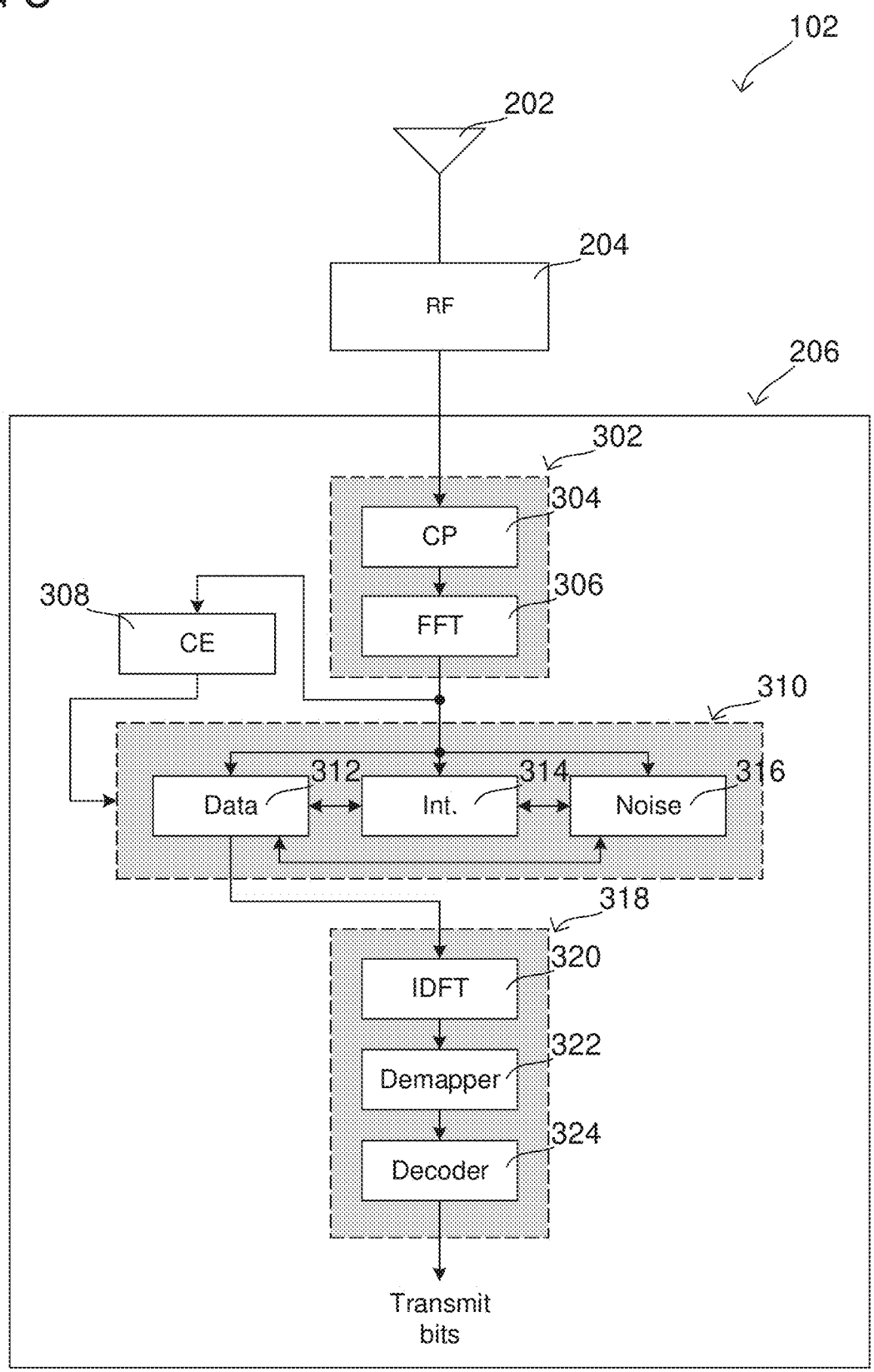
FIG. 3 shows an exemplary internal configuration of a terminal device for performing equalization with mean-field estimation according to some aspects.

In some aspects, the equalizer may be implemented in a baseband component of a communication device, such as a baseband modem of a terminal device or a baseband subsystem of a network access node. FIG. 3 shows an exemplary internal configuration of terminal device 102 according to some aspects, where equalizer 310 may be part of baseband modem 206 (e.g., part of digital signal processor 208). Equalizer 310 may be implemented in the same manner in any other communication device.

As shown in FIG. 3, baseband modem 206 may include receiver 302 (including cyclic prefix remover 304 and FFT engine 306), channel estimator 308, equalizer 310 (including data estimator 312, interference estimator 314, and noise estimator 316), and output processor 318 (including IDFT engine 320, demapper 322, and decoder 324). In some aspects, baseband modem 206 may be implemented as an integrated circuitry component, where the various processor and circuitry components are mounted on a single chip. In some aspects, cyclic prefix remover 304 may be a processor (or an instruction set configured for execution on a processor) configured to identify samples of a sequence of samples and remove samples that correspond to a cyclic prefix. In some aspects, FFT engine 306 may be digital hardware circuitry including digital logic (e.g., logic gates) arranged in a configuration to perform FFT operations. In some aspects, channel estimator 308 may be a processor (or an instruction set configured for execution on a processor) configured to perform channel estimation to obtain a channel estimate matrix H. In some aspects, data estimator 312, interference estimator 314, and noise estimator 316 may each be processors (or separate instruction sets configured to for execution on a same processor) or digital hardware circuitry configured to update estimates of data symbols, interference symbols, and noise symbols. In some aspects, IDFT engine 320 may be digital hardware circuitry including digital logic (e.g., logic gates) arranged in configuration to perform FFT operations. In some aspects, demapper 322 may be a processor (or instruction set configured for execution on a processor) configured to perform a demapping operation to demodulate symbols into corresponding digital bits. In some aspects, decoder 324 may be a processor (or instruction set configured for execution on a processor) or digital hardware circuitry configured to perform decoding on digital bits. The functionality of these structures of baseband modem 206 is described in detail in the following description.

A counterpart transmitting device (e.g., a terminal device or network access node) may generate and transmit signals to terminal device 102. For example, the counterpart transmitting device may encode a transmit bit vector u and map (or modulate) transmit bit vector u onto modulation symbol vector x using a particular modulation scheme with modulation alphabet $\mathcal{M}$ and $x_i \in \mathcal{M}$. In an exemplary case of Single Carrier Frequency Division Multiple Access (SC-FDMA) transmission, the counterpart transmitting device may DFT-precode modulation symbol vector x (thus spreading the symbols $x_i$ over multiple subcarriers) in the form s=Fx (with DFT matrix F). While transmit symbol vector s is referred to below, SC-FDMA is only an example, and various aspects may also use a transmission scheme that does not use precoding. The following description is therefore also applicable for cases where s=x (e.g., without precoding, such as where F=I (identify matrix)).

The counterpart transmitting device may then perform IFFT modulation on s to generate a time-domain signal and, if applicable, add a cyclic prefix (CP), e.g. for SC-FDMA cases. The counterpart transmitting device may then mix the resulting baseband samples onto a radio carrier and transmit this signal over a wireless channel.

As previously described regarding FIG. 2, terminal device 102 may receive the wireless signal via antenna system 202. Antenna system 202 may include R antennas, each of which may receive a separate wireless signal and transduce the respective wireless signal into a corresponding analog radio frequency signal. Antenna system 202 may then provide the R analog radio frequency signals to RF transceiver 204.

RF transceiver 204 may then perform radio processing on the R analog radio frequency signals to obtain corresponding baseband samples (separated per each of the R antennas, e.g., baseband samples for each of the R antennas), which RF transceiver 204 may then provide to baseband modem 206.

Figure 4:
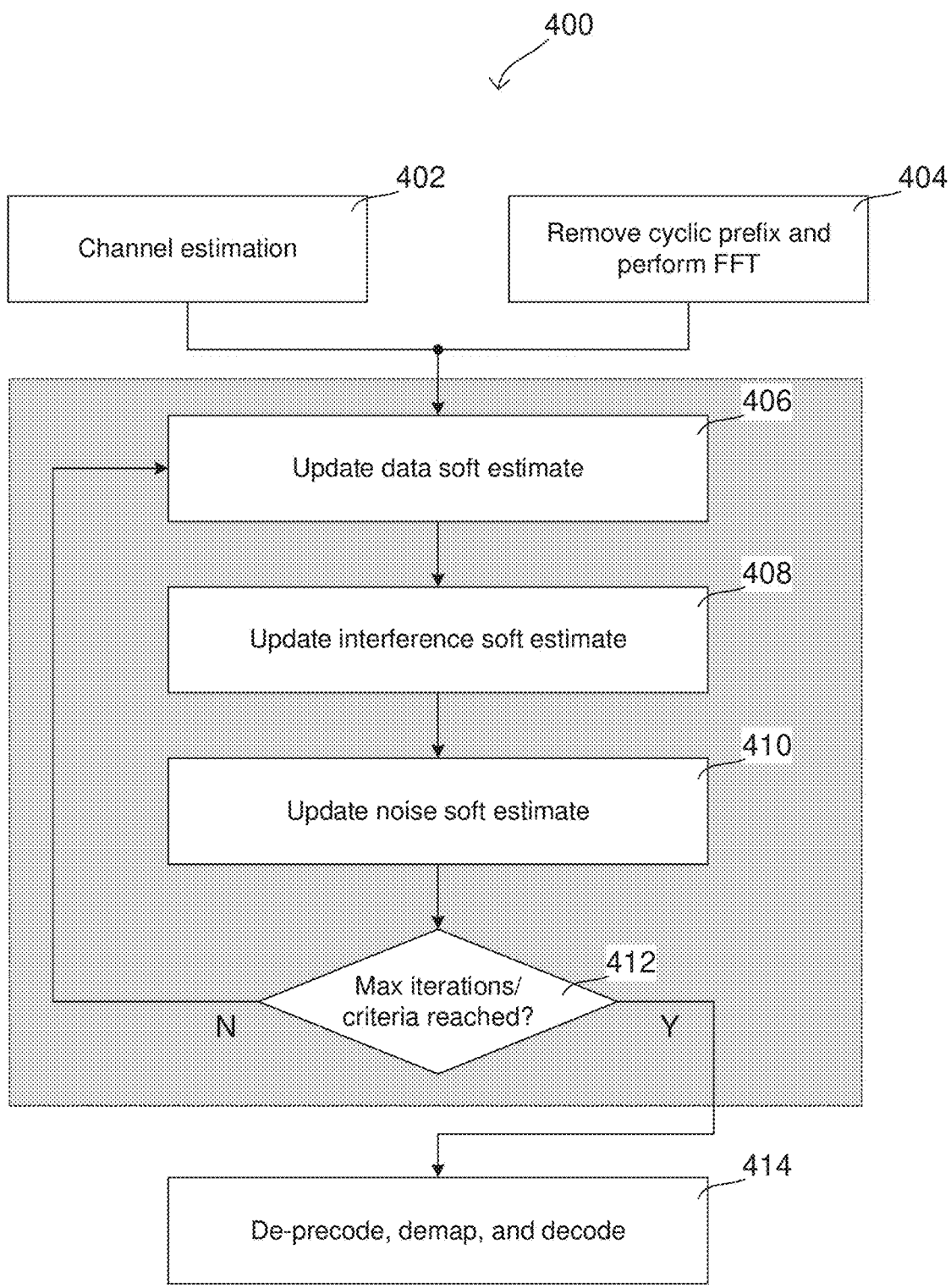
FIG. 4 shows an exemplary procedure for performing mean-field estimation according to some aspects.

Baseband modem 206 may then attempt to recover transmit bit vector u from the baseband samples. This can include compensating for wireless transmission effects (including interference and noise) as well as reverting the transmission procedure used by the counterpart transmitting device. FIG. 4 shows exemplary flow chart 400 according to some aspects, which describes the procedure used by baseband modem 206 to perform equalization and recover transmit bit vector u. As shown in FIG. 3, receiver 302 may first receive the baseband samples from RF transceiver 204, where the baseband samples from each receive antenna r, r∈[1:R], are separate. In stage 404 of flow chart 404, receiver 302 may then remove the cyclic prefix from the samples from each antenna r with cyclic prefix remover 302 and apply an FFT to the resulting samples with FFT engine 306.

Receiver 302 may therefore produce, for each symbol period, a received symbol vector $y_r$ for each receive antenna r, where $y_r$ is defined as $$y_r = H_r s + z_r + n_r \quad (1)$$

where $n_r$ is additive white Gaussian noise (AWGN) with variance $\lambda^{-1} I$ (or, alternatively, noise precision $\lambda$, which corresponds to SNR), $z_r$ is the received interference symbol, channel matrix $H_r$ is a diagonal matrix with the diagonal entries including the channel frequency response at a given subcarrier for the wireless channel between the transmitter and receive antenna r, and $y_r$ is the receive symbol vector for receive antenna r of length K.

The term $H_r s$ therefore represents the channel-adjusted version of transmit symbol vector s after propagation through the wireless channel between the counterpart transmitting device and receive antenna r, where the wireless channel is characterized by the channel matrix $H_r$ (which has diagonal entries that give the complex channel coefficient over the K subcarriers). Similarly, the received interference symbol $z_r$ is defined as $z_r = V_r F i$ (with F=I in non-DFT precoding cases), where $V_r$ is the channel matrix for the wireless channel between the interfering transmitters and receive antenna r and i is the interfering symbol vector.

Baseband modem 206 may therefore attempt to compute estimates of vector s, denoted as estimated transmit symbols ŝ, based on received symbols y, and to then de-precode the estimated transmit symbols ŝ with the form $\hat{x} = F^H \hat{s}$ to obtain estimated modulated symbols $\hat{x}$. Baseband modem 206 can then demodulate and decode $\hat{x}$ to recover the original transmit bit vector u. Accordingly, as shown in FIG. 3, after obtaining $y_r$ for each of the R antennas, receiver 302 may provide $y_r$ to channel estimator 308 and equalizer 310. Channel estimator 308 may then perform channel estimation to develop channel matrix $H_r$ for the R antennas. This may be a continuous process that channel estimator 308 performs over multiple symbol periods. For example, if received symbol vector $y_r$ is for a symbol period t, channel estimator 308 may perform the channel estimation in stage 402 over multiple symbol periods occurring before symbol period t. Accordingly, equalizer 310 may perform equalization on $y_r$ with a channel matrix $H_r$ that channel estimator 308 has developed over previous symbol periods. In particular, channel estimator 308 may perform the channel estimation of stage 402 by identifying samples of pilot signals (e.g., on certain subcarriers at certain symbols periods) transmitted by a counterpart transmitter, and comparing the pilot signal samples to local reference pilot signal samples to determine raw channel samples for wireless channel. Channel estimator 308 may then be configured to use interpolation to estimate the channel response over all subcarriers. Channel estimator 308 may perform this estimation using samples from all receive antennas, and may therefore generate channel matrices $H_r$. Channel estimator 308 may then provide $H_r$ to equalizer 310.

Equalizer 310 may therefore receive $y_r$ and $H_r$ as its input, and may apply equalization to $y_r$ to recover estimated transmit symbol vector ŝ. As further described below, equalizer 310 may be configured to iteratively compute soft estimates (e.g., mean and variance) of transmit symbols s, interference symbols $z_r$, and noise symbols n (represented by noise precision $\lambda$) across the R receive antennas. As there are multiple receive antennas, equalizer 301 may compute these soft estimates as the mean and variance of s, $z_r$, and n over the multiple receive antennas. As these soft values are therefore based on the reception of the same signals by multiple receive antennas, equalizer 310 may use the receive antenna correlation, denoted by the matrix $C \in \mathbb{R}^{R \times R}$, as part of the soft estimate computation. In some aspects, equalizer 310 may also use knowledge of the modulation alphabet $\mathcal{M}$ used for symbols x to compute the soft estimates.

Accordingly, after receiving $y_r$ and $H_r$ for each of the R antennas, equalizer 310 may execute the equalization procedure. This may include computing iterative updates of the soft estimates for s, $z_r$, and n on a per-subcarrier basis, or in other words, using each $y_r(k)$, k=1:K, r=1:R (e.g., by separating received symbol vector $y_r$ for a given r into the received symbols $y_r(k)$ for each subcarrier). For simplicity, the index k can be discarded, and Equation (1) can be re-written as $$y = \begin{bmatrix} y_1 \\ \vdots \\ y_R \end{bmatrix} = hs + z + n \quad (2)$$

where $h = [h_1 \ldots h_R]^T$, (e.g., the channel response coefficients for each receive antenna r), $z = [z_1 \ldots z_R]^T$ (e.g., the interference symbols received at each receive antenna r), $n = [n_1 \ldots n_R]^T$ (e.g., the noise symbols received at each receive antenna r).

Equalizer 310 may then apply a mean-field estimation approach based on the system of Equation (2). This mean-field estimation approach can also be referred to as Mean Field Interference Rejection Combining (MFIRC). In particular, as there are multiple receive antennas r that receive the same propagating wireless signals at different antenna positions, equalizer 310 may determine soft estimates for s, $z_r$, and $\lambda$ (representing the noise precision/inverse variance of the AWGN that produces n) by determining their mean and variance across the R receive antennas. Equalizer 310 may iteratively update the soft estimates for each of s, $z_r$, and $\lambda$ based on the soft estimates for the others of s, $z_r$, and $\lambda$, and may therefore iteratively refine the soft estimates. Accordingly, as shown in FIG. 4, equalizer 310 may update the soft data estimate ŝ with data estimator 312 in stage 406, update the soft interference estimate ẑ with interference estimator 314 in stage 408, and update the soft interference estimate $\hat{\lambda}$ with noise estimator 316 in stage 410. Equalizer 310 may repeat stages 406-410 until a maximum number of iterations (e.g., three, four, five, or another maximum number of iterations depending on a desired latency and accuracy) or a convergence criteria (e.g., until subsequent iterations produced changes to the soft estimates that are less than a predefined convergence threshold) has been reached in stage 412. While the order shown in FIG. 4 depicts updating the soft data estimate in stage 406, then updating the soft interference estimate in stage 408, and then updating the soft noise estimate in stage 410, this order is exemplary. Accordingly, in various aspects stages 406-410 can be rearranged in any order and/or can involve repeated updates (e.g., performing stage 406, then 408, then 406, then 408, then 410, or any similar order using repeated updates).

Equalizer 310 may perform these updates in each of stages 406-410 by holding two of the soft estimates constant and updating the third soft estimate based on the other two soft estimates. In particular, data estimator 312 may be configured to update the soft data estimate ŝ as $$\hat{s}=\hat{\lambda}v(y-\hat{z}) \quad (3)$$

where data estimator 312 determines data estimate variance v as $$v=(\hat{\lambda}\|h\|^2+1)^{-1} \quad (4)$$

The soft data estimate ŝ may therefore correspond to the mean of the data symbol s (continuing with the per-subcarrier model introduced in Equation (2)) across the R receive antennas while v may correspond to the variance of s across the R receive antennas. Expressed another way, data estimator 312 can execute Equation (3) by multiplying the noise estimate $\hat{\lambda}$ (i.e., the noise precision) by the variance v of the data symbol s (which represents the accuracy of the current estimate ŝ), and multiplying this term by the difference between the received symbol y and the interference estimate ẑ (which attempts to remove the interference z from the received symbol y, thus isolating the noise n and data s plus any residue). This therefore gives the mean of s, which is used as the soft data estimate ŝ (e.g., the posterior mean of s). As given by this description, data estimator 312 may hold constant the current soft interference and noise estimates ẑ and $\hat{\lambda}$, and use these soft estimates to update the soft data estimate ŝ.

While Equation (3) is applicable in all general cases, in some aspects data estimator 312 may use an alternate calculation to obtain soft data estimates when there is only one subcarrier (e.g., K=1). In these aspects, data estimator 312 may calculate soft data estimate as $$\hat{s}=\sum_{s\in M} s\exp(-\lambda(\|y\|^2-2Re\{y^H\hat{z}\}+\overline{|\hat{z}|}^2-2Re\{y-\hat{z}\}^Hhs+s^2\|h\|^2)) \quad (5)$$

This expression in Equation (5) is a closed-form expression that can be applied in the specialized case with one subcarrier, where data estimator 312 may sum over all of the modulation symbols in M to update the soft data estimate ŝ. In particular, the computation of Equation (5) calculates the discrete mean of s over the R receive antennas, thus yielding a soft data estimate ŝ. In cases where there is only one subcarrier, data estimator 312 can be configured to use either Equation (3) or (5) to determine soft data estimates ŝ.

Turning to interference estimator 314 and stage 408, interference estimator 314 may likewise hold constant the current data and soft noise estimates ŝ and $\hat{\lambda}$ and use these soft estimates to update soft interference estimate ẑ in stage 408. In particular, interference estimator 314 may update ẑ as $$\hat{z}=\hat{\lambda}\Sigma_Z(y-h\hat{s}) \quad (6)$$

with interference estimate variance $\Sigma_Z$ given as $$\Sigma_Z=(\hat{\lambda}I+C^{-1})^{-1} \quad (7)$$

where C is the antenna correlation matrix that characterizes the correlation between the R receive antennas. This matrix C may be precomputed and based on the spatial orientation of the R receive antennas, and may be a preprogrammed data on interference estimator 314.

Accordingly, similarly to calculation of soft data estimate ŝ per Equation (3), interference estimator 314 may multiply the soft noise estimate $\hat{\lambda}$ (the noise precision) by the interference estimate variance $\Sigma_Z$ (which indicates the accuracy of the current soft interference estimate ẑ), and then multiply this term by the difference between the received signal y minus the channel-adjusted version hŝ of the soft data estimate ŝ (thus attempting to isolate the interference term z and noise n from y).

Lastly, noise estimator 316 may determine soft noise estimate $\hat{\lambda}$ in stage 410 as $$\hat{\lambda}=\frac{1}{R}(\|y\|^2-2Re\{y^H\hat{z}\}+\overline{|\hat{z}|}^2-2Re\{(y-\hat{z})^Hh\hat{s}\}+\overline{s}|^2\|h\|^2) \quad (8)$$

where $\overline{\|z\|}^2=\Sigma_r\overline{|z_r|^2}$ (e.g., the power of z) and $\overline{|\hat{z}|}^2=|\hat{z}|^2+\text{diag}\{\Sigma_z\}$ (e.g., the second-order moment).

Per Equation (8), noise estimator 316 therefore takes the overall received signal power in y, subtracts the estimated power of the interference (corresponding to ẑ), and subtracts the estimated power of the data (corresponding to ŝ), and then takes the average over the R receive antennas (with the term 1\R). This residual therefore gives the average noise power, which noise estimator 316 can use as the soft noise estimate $\hat{\lambda}$.

Accordingly, data estimator 312, interference estimator 408, and noise estimator 410 may alternate between updating soft data estimate ŝ, soft interference estimate ẑ, and soft noise estimate $\hat{\lambda}$ in stages 406-410 (which can be performed in any order). As previously indicated, and as described above in Equations (3) to (8), equalizer 310 may hold two of the soft estimates constant while updating the third soft estimate (e.g., determining a new value based on the calculation in Equations (3) to (8) as appropriate).

Equalizer 310 may perform these updates to soft data estimate ẑ, soft interference estimate 2, and soft noise estimate $\hat{\lambda}$ over a plurality of iterations and, in stage 412, may determine that a maximum number of iterations has been reached (e.g., an iteration count has reached a predefined maximum iteration count) or that a convergence criteria has been reached (e.g., subsequent updates to one or more of soft data estimate ŝ, soft interference estimate ẑ, and soft noise estimate $\hat{\lambda}$ result in changes of less than a convergence threshold). Equalizer 310 may then exit the stage 406-412 loop and proceed to stage 414.

Accordingly, after completing the stage 406-412 loop, equalizer 310 may take the values of soft data estimate ŝ, soft interference estimate ẑ, and soft noise estimate λ̂ as the final values. As previously indicated, the procedure of stages 406-410 and Equations (3) to (8) described above refers to the per-subcarrier processing. Accordingly, equalizer 310 may be configured to perform this processing for each of the K subcarriers (and over a plurality of symbol periods, where each symbol period yields a new received symbol vector y) to obtain a soft data estimate ŝ for each subcarrier k.

Taking the soft data estimates ŝ for each of the K subcarriers, equalizer 310 may obtain estimated transmit symbol vector ŝ (length K where each entry gives an estimated transmit symbol for subcarrier k). Equalizer 310 may provide ŝ to output processor 318. As shown in FIG. 3, output processor 318 may include IDFT engine 320, demapper 322, and decoder 324. With reference to FIG. 4, output processor 318 may be configured to use IDFT engine 320, demapper 322, and decoder 324 to de-precode, demap, and decode ŝ in stage 414 to recover the original transmit bit vector u. In particular, IDFT engine 320 may perform an inverse DFT on ŝ using DFT matrix F, namely by calculating estimated modulation symbol vector $\hat{x}=F^H\hat{s}$ (with $F^H$ denoting the Hermitian/conjugate transpose of F). As previously indicated, this may apply for cases that use DFT precoding (e.g., for SC-FDMA), and in other cases (e.g., without DFT precoding) output processor 318 may omit IDFT engine 320 and take $\hat{x}=\hat{s}$.

IDFT engine 320 may therefore obtain estimated modulated symbols x̂, which IDFT engine 320 may provide to demapper 322. Demapper 322 may then perform the demapping phase of stage 414, namely by demapping the estimated modulated symbols of x̂ from its modulation symbols to the corresponding bits prescribed by modulation alphabet M (e.g., corresponding bits for each of the modulated symbols in x̂). Demapper 322 may provide the resulting encoded bits to decoder 324, which may revert the channel coding (including, for example, error correction and error checking) to recover original transmit bit vector u (e.g., assuming a successful error check).

Accordingly, output processor 318 may obtain the original transmit bit vector u at the output of stage 414. In some cases, the mean-field equalization technique used by equalizer 310 may improve performance. For example, compared to Linear Minimum Mean Square Error (LMMSE) equalizers, which treat the entire interference plus noise term $(z_r+n_r)$ as AWGN, the mean-field equalization technique described herein may treat the interference term as a separate entity that can be estimated using mean values across multiple receive antennas. This mean-field equalization technique similarly uses the presence of multiple antennas to develop soft estimates for noise and, ultimately, the data signal. The mean-field equalization technique also accounts for uncertainty by applying residual noise correction as part of computation of the soft estimates. After iteratively refining these soft estimates over a plurality of iterations, the mean-field equalization technique can take resulting soft data estimates and de-precode (if applicable), demap, and decode them to recover the originally transmitted bits.

Furthermore, some aspects of this disclosure may be used in a D2D communication setting. For example, as in the case of FIG. 1B terminal device 102 may use the mean-field equalization technique to receive a data signal from terminal device 104 while also mitigating interference caused by other terminal devices, such as terminal device 116. In other aspects, the mean-field equalization technique may be implemented in terminal devices communicating with network access nodes, in network access nodes communicating with terminal devices, or in any communication device receiving a data signal from another communication device.

Figure 5:
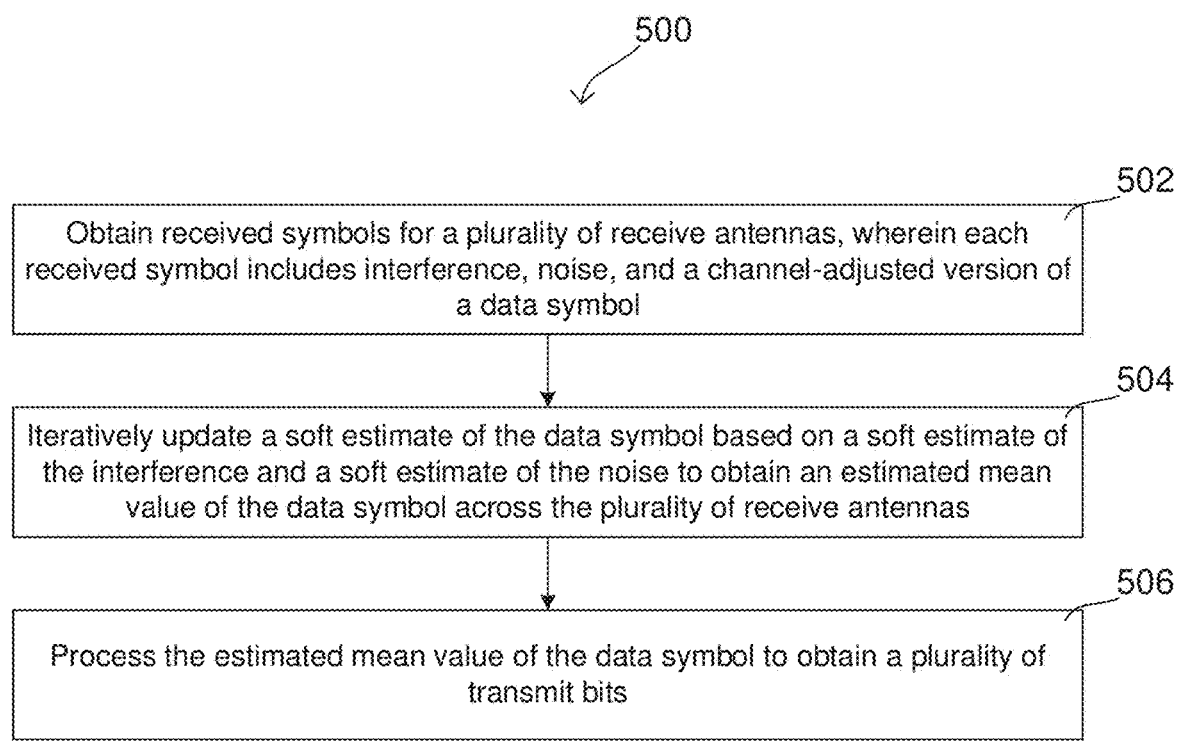
FIG. 5 shows an exemplary method of processing signals according to some aspects.

FIG. 5 shows exemplary method 500 of processing signals according to some aspects. As shown in FIG. 5, method 500 includes obtaining received symbols for a plurality of receive antennas (510), wherein each received symbol includes interference, noise, and a channel-adjusted version of a data symbol, iteratively updating a soft estimate of the data symbol based on a soft estimate of the interference and a soft estimate of the noise to obtain an estimated mean value of the data symbol across the plurality of receive antennas (520), and processing the estimated mean value of the data symbol to obtain a plurality of transmit bits (530).

References to device-to-device (D2D) communications refer to any configuration of direct communications between terminal devices and are not limited to any particular proprietary or standardized D2D protocol.

System and Verification Development Environment

Testing environments can be used during development of new wireless standards to test production devices to verify whether they are correctly operating according to the new wireless standard. Accordingly, various aspects of this disclosure provide a testing device that can be used to test a wireless standard during development, such as by using a reference software implementation (e.g., reference software) of the wireless standard to simulate terminal device behavior. The resulting simulated behavior data can then be used to check for errors or problems in the wireless standard. Additionally or alternatively, the testing device can be used to verify the terminal device behavior of an Device Under Test (DUT), such as by checking observed terminal device behavior of the DUT against simulated terminal device behavior to determine whether the DUT is operating correctly.

Figure 6:
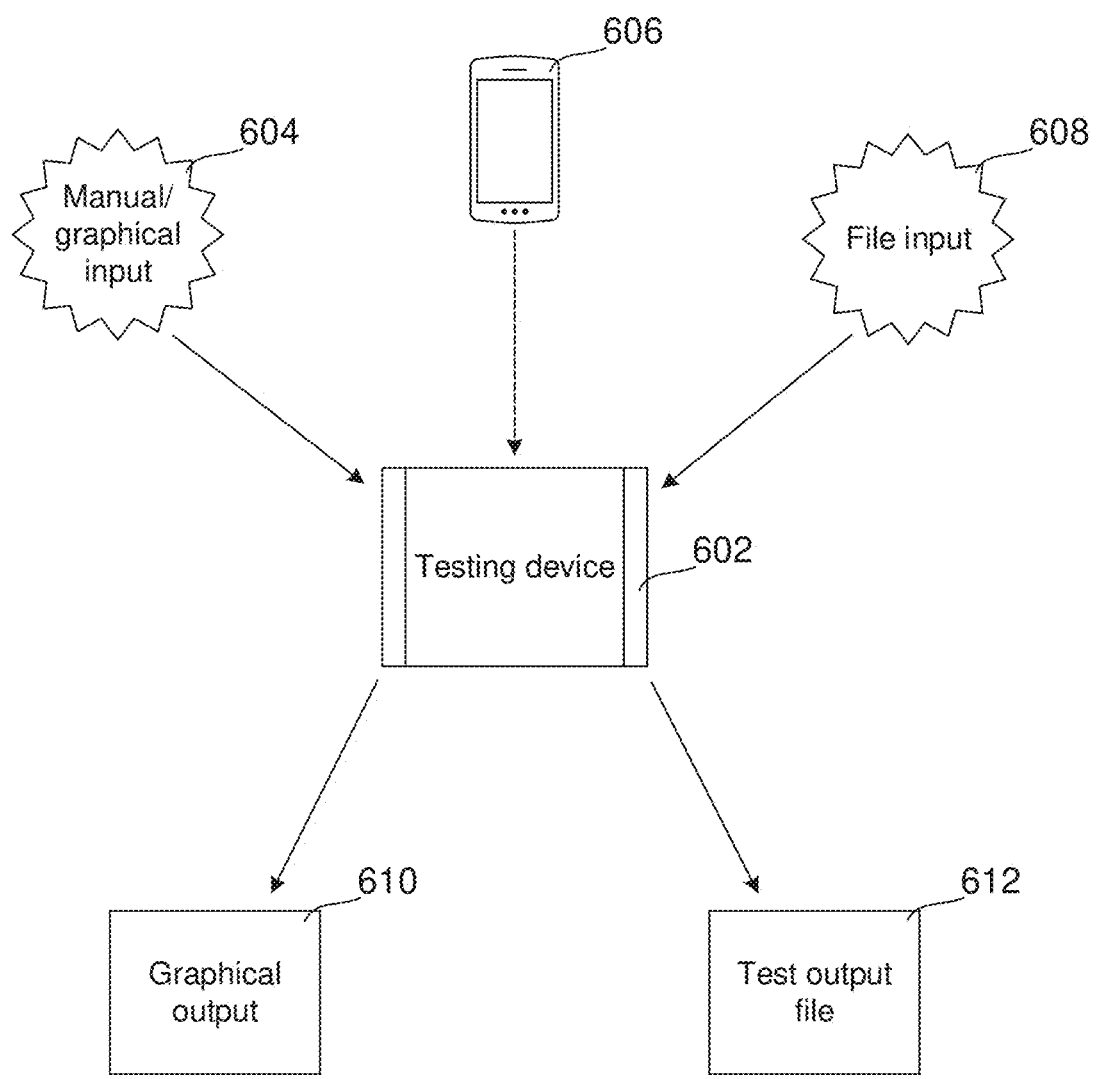
FIG. 6 shows an exemplary diagram for a testing device and its inputs and outputs according to some aspects.

FIG. 6 shows an exemplary diagram of the various inputs and outputs of a testing environment according to some aspects. As shown in FIG. 6, testing device 602 may receive various inputs, execute a test function with the inputs, and produce various outputs to the test function. For example, in some aspects testing device 604 may receive manual or graphical input 604 as input. This type of input can be input that a manual tester provides via a Graphical User Interface (GUI) or other user I/O system of testing device 602. As further described below, manual or graphical input 604 may define a test scenario for testing device 602 to execute the test function on, thus enabling a manual tester to specify various different test scenarios for testing device 602 to simulate.

Additionally or alternatively to manual or graphical input 604, testing device 602 may also be configured to receive file input 608 as input. For example, in contrast to test scenarios that a manual tester can specify via a GUI, the test scenarios can be used to generate input files (e.g., of a certain predefined format that is readable by testing device 602) that can be provided to testing device 602 in the form of file input 608. File input 608 may similarly define a test scenario for testing device 602 to evaluate.

In some aspects, testing device 602 may also be configured to interface with a Device Under Test (DUT), such as DUT 606. DUT 606 may also provide input to testing device 602 that testing device 602 uses as part of the test function. In some aspects, DUT 606 may be a production device (e.g., an actual device that is available for sale to consumers) or a functioning prototype device (e.g., a fully functional terminal device capable of radio activity). In some aspects, DUT 606 may only be part of a production or functioning prototype device, such as a baseband modem. In some aspects, DUT 606 may be the software (e.g., firmware) for a production or functioning prototype device that is executed separately from the device for testing purposes.

As described below in detail, testing device 602 may execute a test function using one or more of inputs 604, 606, or 608. In some aspects, this test function can include obtaining scenario data that specifies device configurations, simulation parameters, and transmission/reception schedule of virtual terminal devices for a test scenario. Then, testing device 602 may be configured to execute a command sequence with the virtual terminal devices to simulate their physical layer behavior as they follow the transmission/reception schedule. Testing device may then obtain simulated behavior data from the virtual terminal devices as they execute the command sequence, where the simulated behavior data can include control response, channel usage, and internal performance data from the virtual terminal devices. Additionally or alternatively, in some aspects, the testing device 602 may also run a device test on DUT 606 as part of the test function. For example, as further described below, testing device 602 may interface with DUT 606, configure DUT 606 according to the device configuration of the test scenario, and execute the command sequence with DUT 606. Testing device 602 may similarly observe the control response, channel usage, and internal performance of DUT 606 to obtain observed behavior data for DUT 606. This functionality is described in detail below.

Testing device 602 may therefore be configured to generate simulated behavior data and/or observed behavior data as output of the test function using the test scenario. As shown in FIG. 6, testing device 602 may be configured to produce graphical test result 610 and/or test output file 612 as output of the test function. For example, in some aspects testing device 602 may use a GUI to display the simulated and/or observed behavior data for a manual tester to view and evaluate (thus producing graphical test result 610). In some aspects, testing device 602 may additionally or alternatively produce test output file 612 that includes the simulated behavior and/or observed behavior data.

Figure 7:
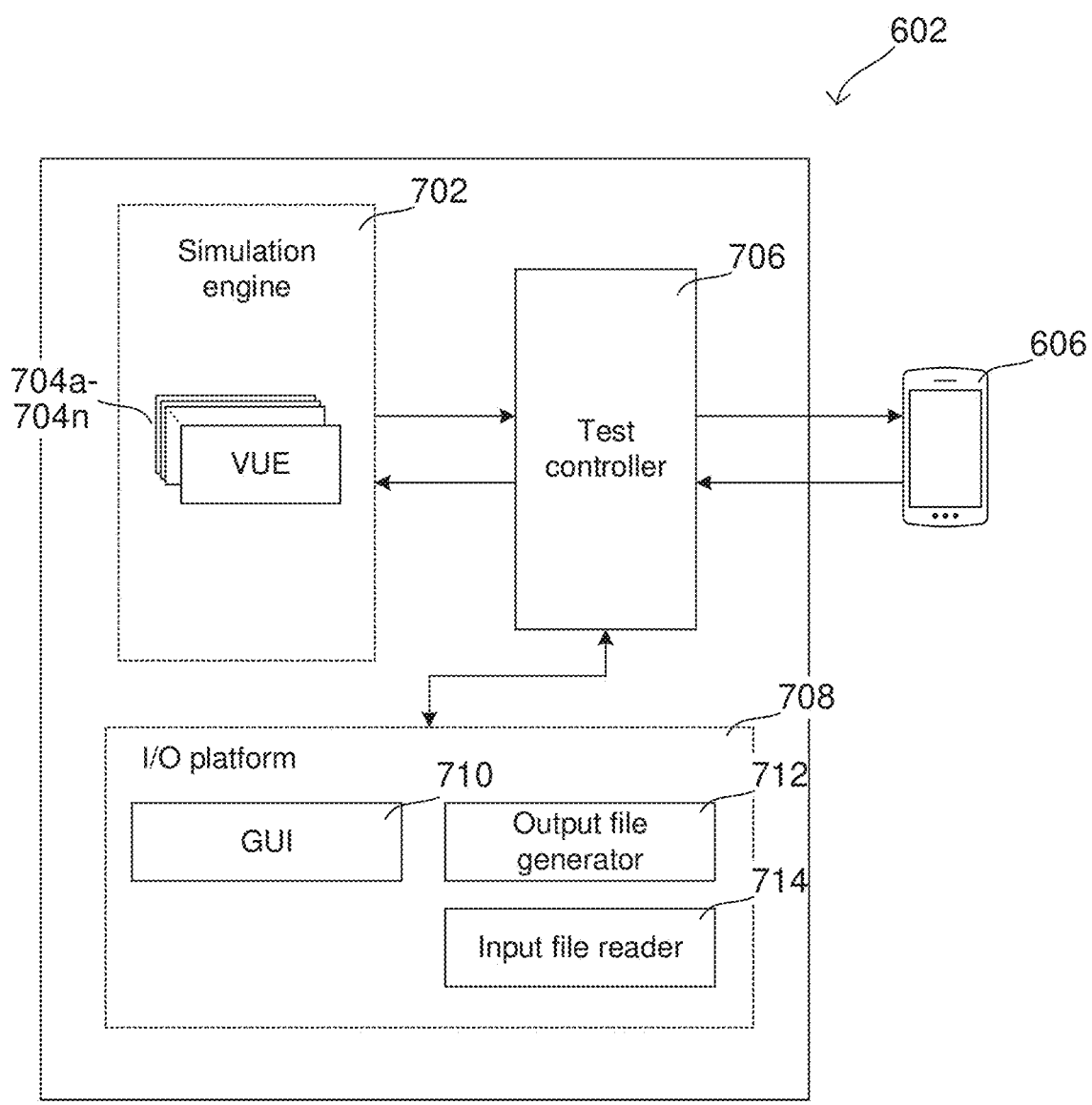
FIG. 7 shows an exemplary internal configuration of a testing device according to some aspects.

FIG. 7 shows an exemplary internal configuration of testing device 602 according to some aspects. In some aspects, testing device 602 may be a hardware device including various processors, circuitry, and I/O components. As shown in FIG. 7, testing device 602 may include simulation engine 702 (including virtual terminal devices 704a-704n), test controller 706, and I/O platform 708 (including GUI 710, output file generator 712, and input file reader 714.

In some aspects, simulation engine 702 may be structurally realized as one or more processors configured to execute program code for virtual terminal devices 704a-704n. Virtual terminal devices 704a-704n may be software-based components simulation engine 702 uses to simulate physical layer behavior of terminal devices (e.g., physical layer processing and transmission/reception functions). Simulation engine 702 may use a reference software implementation that is developed based on a wireless standard to simulate the physical layer behavior, where the reference software implementation mimics actual physical layer behavior in a virtual manner (e.g., contains executable instructions that define equivalent functionality to as specified in the wireless standard). Accordingly, by executing an instance of the reference software implementation for each of virtual terminal devices 704a-704n and inputting protocol stack commands into the instances, simulation engine 702 may simulate the physical layer behavior of an actual terminal device in response to the protocol stack commands. This is described below in detail.

Test controller 706 may include one more processors (e.g., special-purpose processors) configured with software for managing the test function. For example, test controller 706 may be configured to use scenario data received from I/O platform 710 and to set up a test function based on the scenario data. Setting up the test function can include configuring virtual terminal devices 704a-704n and/or DUT 606 according to a device configuration for the test scenario. Test controller 706 may also generate a command sequence based on the test scenario, which test controller 706 may send to simulation engine 702 and DUT 606 for execution. Test controller 706 may then record the physical layer behavior of virtual terminal devices 704a-704n and/or DUT 606 as they execute the command sequence. These functionalities of test controller 706 are described below in detail.

As shown in FIG. 7, I/O platform 708 may include GUI 710, output file generator 712, and input file reader 714. GUI 710 may include a visual display (e.g. any type of display or monitor that presents virtually generated images to a user) and underlying GUI software for generating virtual images to display on the visual display. GUI 710 may therefore be configured to graphically generate a GUI on the visual display and to accept user-generated input via the GUI (e.g., by a manual tester). This input can include data that specifies a test scenario. GUI 710 may provide this data to test controller 706. Test controller 706 may also provide output data (based on observed and/or simulated behavior data) to GUI 710, which GUI 710 may present on the virtual display.

Output file generator 712 may be a processor configured to receive output data (based on observed and/or simulated behavior data) from test controller 706, and to generate a test output file with the output data. This can include generating the test output file in a predefined format, which can be defined according to any format type.

Input file reader 714 may be a processor configured to load and read an input file (e.g., provided by a manual tester) of a predefined format. Input file reader 714 may provide the resulting input data to test controller 706, where the input file may specify a particular test scenario.

Figure 8:
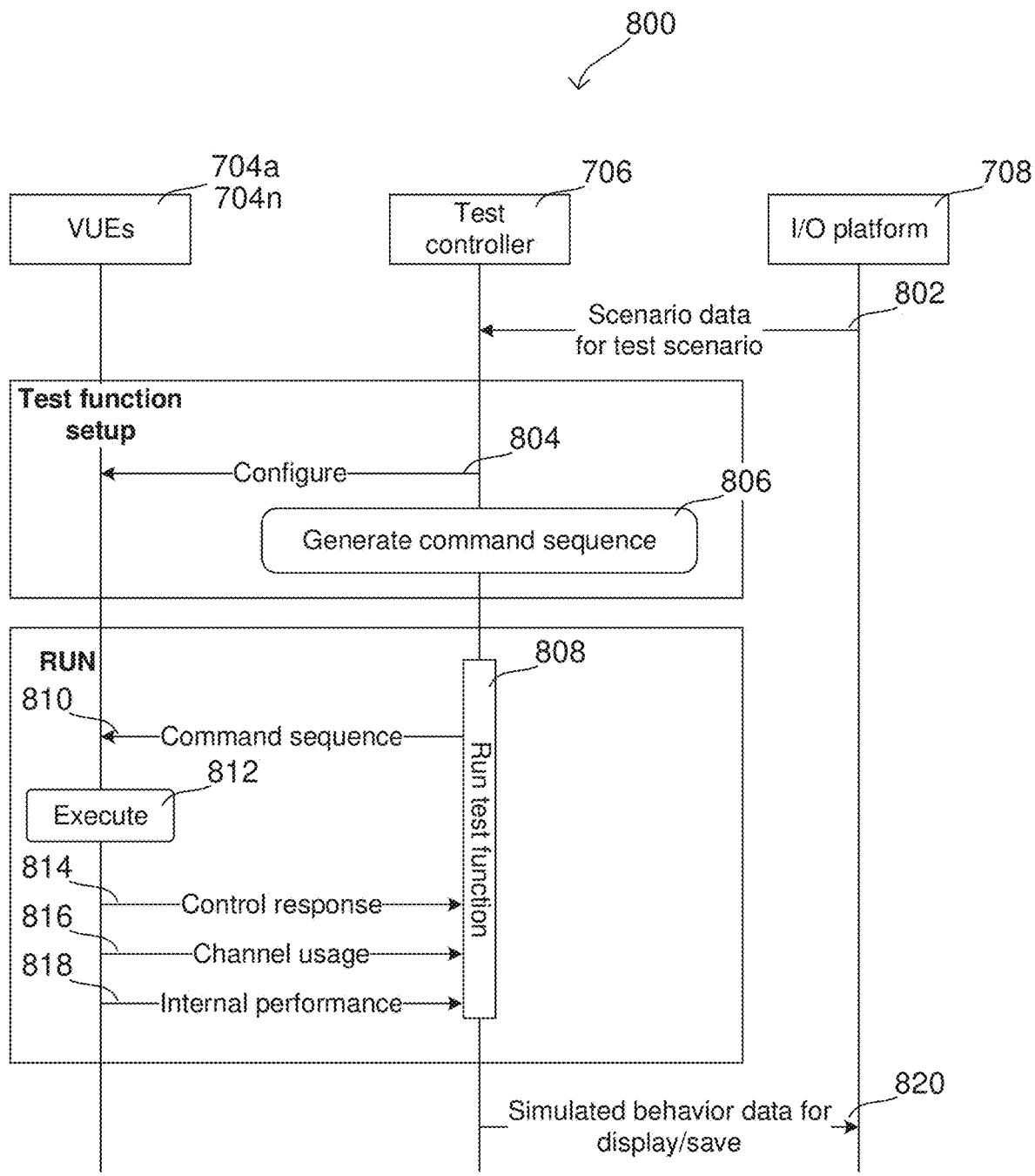
FIG. 8 shows a first exemplary message sequence chart describing operation of a testing device according to some aspects.
Figure 9:
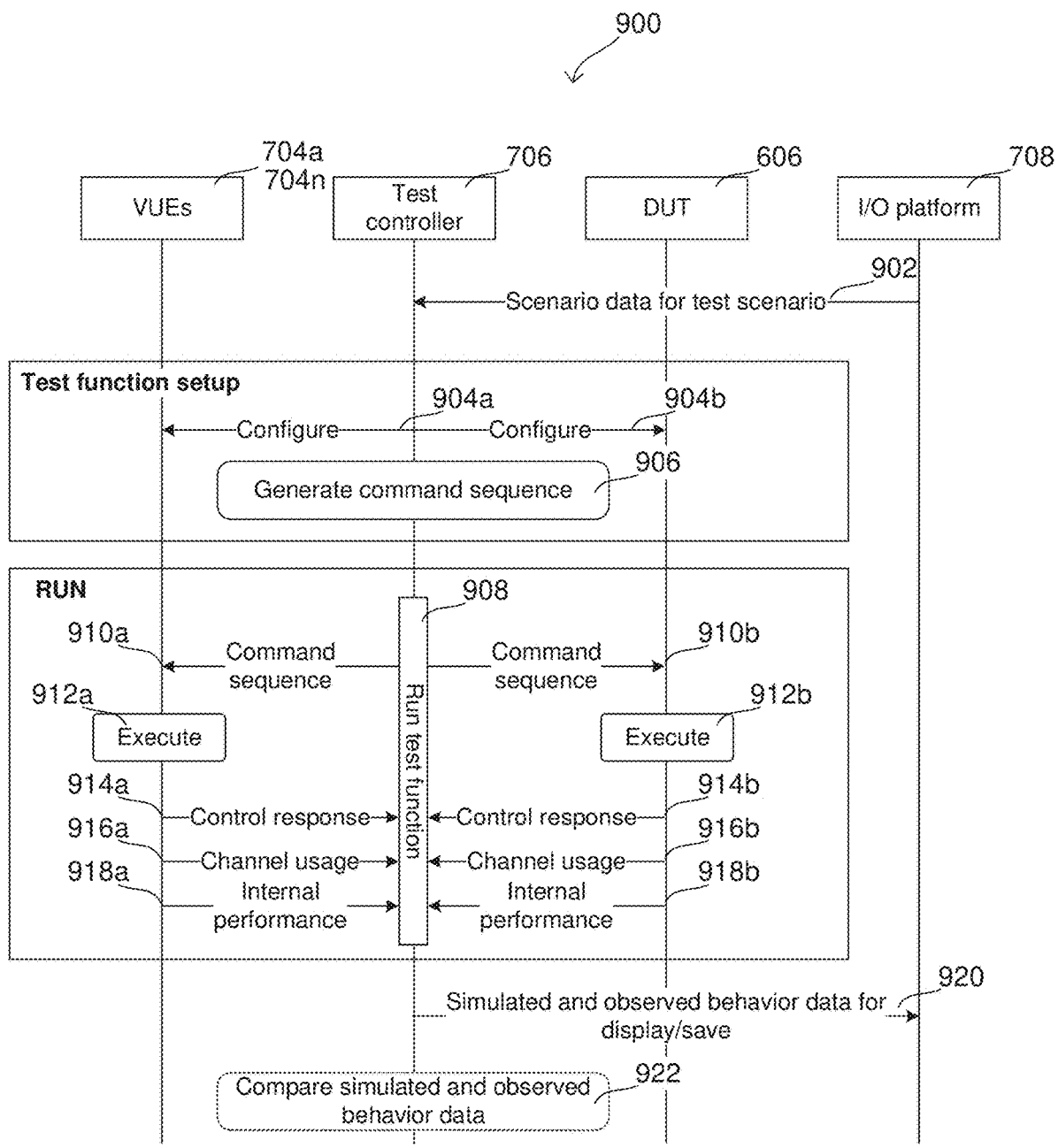
FIG. 9 shows a second exemplary message sequence chart describing operation of a testing device according to some aspects.

FIGS. 8 and 9 show message sequence charts 800 and 900, which describe execution of test functions by testing device 602 according to some aspects. In particular, message sequence chart 800 describes a case where testing device 602 runs a test function that includes a simulation of virtual terminal devices 704a-704n (e.g., for testing a wireless standard during development). Message sequence chart 800 describes a case where testing device 602 may run a test function with a simulation of virtual terminal devices 704a-704n and a device test of DUT 606 (e.g., for testing the operation of DUT 606).

Starting with message sequence chart 800, I/O platform 706 may first obtain scenario data for a test scenario and provide the scenario data to test controller 706 in stage 802. For example, in some cases a manual tester may load an input file into testing device 702. The input file may include scenario data that specifies a particular test scenario that the manual tester intends to run with testing device 702. Input file reader 714 of I/O platform 708 may then read the scenario data from the input file (e.g., according to a predefined file format) and provide the scenario data to test controller 706. The scenario data can include, for example, device configurations, simulation parameters, and transmission/reception schedules of the virtual terminal devices. The device configurations can specify, for example, the physical channel configurations, frame structure information, device performance information, and any other physical layer parameters (e.g., that can be used to adjust physical layer behavior) for the virtual terminal devices that will be simulated in the test scenario. The simulation parameters can specify the length of the test scenario, the starting point of the test scenario, and other information that impacts how the test scenario is run. The transmission/reception schedules of the virtual terminal devices can be a time sequence of transmit and receive actions over the testing interval (e.g., what each device transmits or receives at certain times within the testing interval). The manual tester can therefore generate their own test scenarios by generating such data in an input file and loading it into testing device 702, or can download test files for certain test scenarios from an external location.

Figure 10:
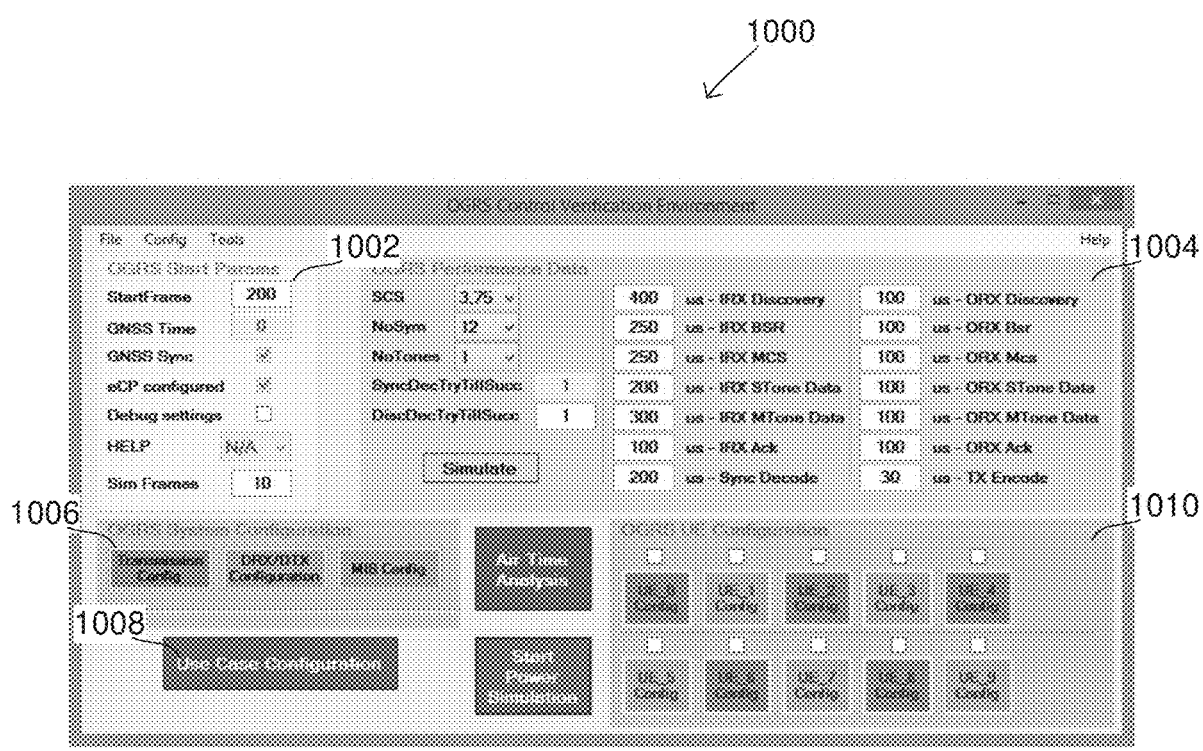
FIG. 10 shows a first exemplary GUI for a testing device according to some aspects.
Figure 11:
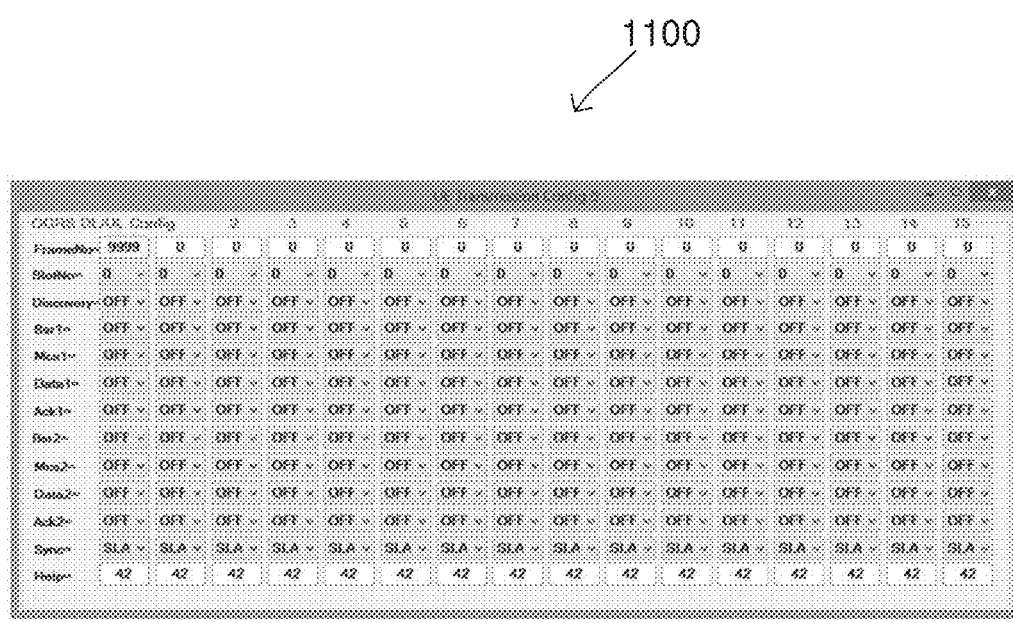
FIG. 11 shows a second exemplary GUI for a testing device according to some aspects.

In some cases, the manual tester may use GUI 710 to input the scenario data for the test scenario. For example, GUI 710 may present an input screen on the visual display that allows the manual tester to input the scenario data for a desired test scenario (e.g., with a touch screen or physically-actuated input mechanisms). FIGS. 10 and 11 show exemplary GUI displays 1000 and 1100 according to some aspects, which show examples of GUI displays that GUI 710 may use to obtain scenario data from a manual tester. For example, with reference to FIG. 10, GUI inputs 1002 may enable input of information about the testing interval (e.g., the starting time and duration of the testing interval over which the test scenario is simulated), GUI inputs 1004 may enable input of information about device performance (e.g., the amount of time it takes for the virtual terminal devices to perform certain functions), GUI inputs 1006 may enable input of information about the frame structure and physical channel configuration of the wireless standard that the virtual terminal devices are following. GUI inputs 1008 may enable input of information about use case scenarios, such as to test the network and terminal devices in different situations. For example, GU inputs 1008 may be used to define a test scenario with two or more networks to verify the behavior of a terminal device moving from one network to the other, to simulate timings in terms of how long it takes for a terminal device from one network to sync with the other network, to simulate data communication between different terminal devices simultaneously, to test power efficiency of individual terminal devices (e.g., for regression or improvement capabilities), and/or to test different use case scenarios/behavior recorded in the field (e.g., to derive the use case configuration and subsequently correct or verify the behavior). GUI inputs 1010 may enable input of configuration information about the virtual terminal devices.

With reference to FIG. 11, GUI display 1100 may include multiple input fields distributed over time. Accordingly, a manual tester may be able to specify a transmission/reception schedule of individual virtual terminal devices during certain points in the testing interval. For example, the manual tester may specify that a first virtual terminal transmits payload data to a second virtual terminal device on certain slots within the testing interval, the second virtual terminal device receives the payload data from the first terminal device on the slots and transmits acknowledgements on other slots, a third virtual terminal device performs discovery on certain slots, a fourth terminal device broadcasts synchronization signals on certain slots, and so forth. Accordingly, the manual tester may be able to specify a complete transmission and/or reception schedule for each of the virtual terminal devices that specifies their transmission/reception activity over the entire duration of the testing scenario. GUI displays 1000 and 1100 are exemplary, and therefore merely represent two exemplary possibilities for GUI displays that GUI 710 can use to obtain scenario data for the test scenario in stage 802.

In some aspects, I/O platform 708 may obtain the scenario data in stage 802 with both GUI 710 and input file reader 714, while in other aspects I/O platform 708 may obtain the scenario data in stage 802 with just one of GUI 710 and input file reader 714. I/O platform 708 may then send the scenario data to test controller 706.

Test controller 706 may then set up the test function for the specified test scenario in stages 804 and 806. In the case of message sequence chart 800, the test function may include a simulation of the physical layer behavior of virtual terminal devices. As shown in FIG. 8, test controller 804 may configure virtual terminal devices 704*a*-704*n* with the device configuration in stage 804 and generate a command sequence for the test scenario in stage 806.

For example, as previously indicated the scenario data may include a device configuration that specifies a number of virtual terminal devices for the test scenario, physical channel configurations, frame structure information, device performance information, and any other parameters that impact physical layer behavior. Test controller 804 may provide this device configuration to simulation engine 702 in stage 804, which may instantiate the corresponding virtual terminal devices according to the device configuration. As previously introduced simulation engine 702 may simulate each of virtual terminal devices 704*a*-704*n* using a reference software implementation that simulates the physical layer behavior (e.g., physical layer processing and transmission/reception functions) of a terminal device. This reference software implementation may be designed offline, such as by developing software for a physical layer based a particular wireless standard. This software can therefore form the reference software implementation and can simulate the physical layer behavior a terminal device operating according to the wireless standard. Accordingly, when simulation engine 702 runs the reference software implementation for a virtual terminal device, the reference software implementation will mimic the physical layer behavior of an actual terminal device configured according to the wireless standard. For example, the reference software implementation may simulate the physical layer processing done at various physical layer entities (e.g., any of error detection, forward error correction encoding/decoding, channel coding and interleaving, channel modulation/demodulation, physical channel mapping, radio measurement and search, frequency and time synchronization, antenna diversity processing, power control and weighting, rate matching/de-matching, retransmission processing, interference cancelation, and any other physical layer processing functions), namely by realizing these functions as executable instructions. The reference software implementation may also simulate the physical layer transmission and reception by simulating the IQ samples transmitted and received on the physical channels. The reference software implementation can be stored on a local memory of simulation engine 702, which may retrieve and execute the reference software implementation to realize virtual terminal devices 704*a*-704*n*. In some aspects, simulation engine 702 may store a single copy of the reference software implementation, which simulation engine 702 may execute multiple times (e.g., may execute multiple instances of) to realize each of virtual terminal devices 704*a*-704*n*, e.g., in parallel.

The reference software implementation may include various parameters that control virtual terminal device behavior, including parameters related to the frame structure, physical channel configurations, and device performance of the virtual terminal devices. These can include, for example, retransmission counters, discovery timers, data counters, power values (e.g., transmit power), power headroom, reception gain settings (e.g., for Automatic Gain Control (AGC)), frame length and contents, and any parameter related to a physical layer processing algorithm. Accordingly, test controller 706 may provide a device configuration that specifies updated values for these parameters to simulation engine 702 in stage 804. Simulation engine 702 may then update the parameters of the reference software implementation to the values specified in the device configuration, and may therefore configure virtual terminal devices 704a-704n according to the device configuration that was originally specified in the scenario data.

With reference to stage 806, test controller 706 may also generate a command sequence as part of the test function setup. As previously introduced, the scenario data may include simulation parameters and a transmission/reception schedule for virtual terminal devices 704a-704n. Test controller 706 may therefore use the transmission/reception schedule to generate a corresponding command sequence that can be used to drive virtual terminal devices 704a-704n during the testing interval. In some aspects, the command sequence can include a protocol stack command string for each of virtual terminal devices 704a-704n, where the protocol stack commands in each string are instructions that cause a respective one of virtual terminal devices 704a-704n to perform the radio operations specified in the transmission/reception schedule. For instance, if the transmission/reception schedule specifies that virtual terminal device 704a should transmit to virtual terminal device 704b in a first time slot, the protocol stack command string for virtual terminal device 704a may include a protocol stack command that instructs virtual terminal device to transmit to virtual terminal device 704b during the first time slot. The protocol stack command string for virtual terminal device 704b may similarly include a protocol stack command that instructs virtual terminal device 704b to receive from virtual terminal device 704b in the time slot. The protocol stack command string for each of virtual terminal devices 704a-704n may similarly specify radio operations for virtual terminal devices 704a-704n over the course of the testing interval (e.g., for each time slot, whether the radio operation is an active radio operation or no radio operation). The protocol stack strings may also include more detailed instructions, such as instructions that specify the particular information to be transmitted or received in a given time slot (e.g., payload data, control signaling, system information, synchronization signals, and/or discovery signals).

In some aspects, the interface between test controller 706 and virtual terminal devices 704a-704n may function in the same manner as an actual physical layer-protocol stack interface. For example, in production devices the protocol stack may send protocol stack commands (e.g., service requests) to the physical layer that request for the physical layer to perform a specific service for the protocol stack. This can include, for example, performing a transmission to a certain target. The protocol stack may therefore be aware of the various potential targets that it is connected to, and may send a service request to the physical layer to perform a transmission to the target (e.g., that further specified to transmit certain data to the target). Similar service requests can include receiving data, performing frequency scans or cell searches, performing discovery, etc. Once it receives a service request, the physical layer may attempt to perform the service (e.g., perform the transmission to the target as instructed), and report back to the protocol stack whether it was successful or not.

Accordingly, in some aspects test controller 706 and virtual terminal devices 704a-704n may realize a similar architecture. Test controller 706 may therefore simulate the protocol stack for each of virtual terminal devices 704a-704n, which in turn simulate the physical layer. Test controller 706 may therefore generate a protocol stack command string for each of virtual terminal devices 704a-704n that instruct virtual terminal devices 704a-704n to perform their respective transmit and receive operations according to the transmission/reception schedule. As virtual terminal devices 704a-704n simulate the physical layer, they may receive their respective protocol stack command string and execute it in the manner of an actual physical layer (e.g., by attempting to perform the service requested by the protocol stack, such as to transmit or receive to a specific device). In some aspects, test controller 706 may run a full virtualized protocol stack for each of virtual terminal devices 704a-704n, e.g., a protocol stack that performs the same protocol stack processing functions as a protocol stack running on a production device. In other aspects, test controller 706 may run a simplified protocol stack for each of virtual terminal devices 704a-704n, such as a simulated protocol stack that generates protocol stack command strings for virtual terminal devices 704a-704n but does not perform the full set of protocol stack processing functions.

Once test function setup is completed in stages 804 and 806, the reference software implementation of virtual terminal devices 704a-704n may be configured according to the device configuration in the scenario data and test controller 706 may have a command sequence for driving virtual terminal devices 704a-704n during the testing interval.

Test controller 808 may then run the test function in stage 808. As shown in FIG. 8, test controller 808 may send the command sequence to simulation engine 702 in stage 810, which may then execute the command sequence with virtual terminal devices 704a-704n in stage 812. For example, simulation engine 702 may load an instance of the software reference implementation (configured according to the device configuration) for each of virtual terminal devices 704a-704n onto a processor, and may then execute the software reference implementation while using the command sequence to drive the software reference implementation (e.g., to instruct the software reference implementation for each of virtual terminal devices 704a-704n to perform certain actions at certain times).

Simulation engine 702 may therefore in stage 812 simulate the physical layer behavior of each of virtual terminal devices 704a-704n as they perform the transmission/reception schedule of the test scenario. For example, simulation engine 702 may simulate the physical layer behavior of virtual terminal device 704a by identifying a first protocol stack command string (sequence of protocol stack commands) from the command sequence that is designated for virtual terminal device 704a. Simulation engine 702 may then input the first protocol stack command string to the instance of the software reference implementation that is simulating virtual terminal device 704a. As the software reference implementation simulates the physical layer behavior of virtual terminal device 704a, the software reference implementation for virtual terminal device 704a will treat the protocol stack command string as actual protocol stack commands, and may attempt to perform the physical layer services requested by the protocol stack commands (e.g., to transmit and receive certain information to certain terminal devices at certain times in the testing interval). Accordingly, the software reference implementation for virtual terminal device 704a will perform physical layer processing to send and receive data (e.g., IQ samples) on physical channels.

In some aspects, virtual terminal devices 704a-704n may interact directly with each other as they run on simulation engine 702. For example, simulation engine 702 may execute virtual terminal devices 704a-704n in parallel (e.g., as separate instances of the reference software implementation running simultaneously), where virtual terminal devices 704a-704n may transmit and receive data (in the form of IQ samples) with each other. In some aspects, simulation engine 702 may feed the IQ samples transmitted by one of virtual terminal devices 704a-704n directly to another one of virtual terminal devices 704a-704n that it is transmitting to. For example, the transmission/reception schedule may specify that virtual terminal device 704a transmit a first message to virtual terminal device 704b. Accordingly, the protocol stack command string will instruct virtual terminal device 704a to transmit the first message to virtual terminal device 704b, and virtual terminal device 704a will generate IQ samples at its output for transition to virtual terminal device 704b (e.g., when the instance of the reference software implementation generates IQ samples). Simulation engine 702 may route these IQ samples to the input of virtual terminal device 704b (e.g., may take the IQ samples as output from one instance of the reference software implementation and provide then as input to another). The protocol stack command string for virtual terminal device 704b may instruct virtual terminal device 704b to listen for the first message from virtual terminal device 704a, and virtual terminal device 704b will therefore receive and process the IQ samples. Alternatively, in some aspects, simulation engine 702 may implement a glue layer between virtual terminal devices 704a-704n, which routes the transmitted messages between the virtual terminal devices without directly transferring the IQ samples between them. For example, instead of providing the transmitted IQ samples from virtual terminal device 704a as received IQ samples to virtual terminal device 704b, the glue layer may provide the desired message (e.g., specified in the transmission/reception schedule, or in other words, the actual message that virtual terminal device 704a was scheduled to transmit to virtual terminal device 704b) to virtual terminal device 704b.

As they are simulated, these protocol stack and physical layer functions for virtual terminal device 704a may take place as software execution on simulation engine 702. While the software reference implementation for virtual terminal device 704a is running, simulation engine 702 may capture control response data (e.g., the signaling which the physical layer sends back to the protocol stack after attempting to execute a protocol stack command as well as internal physical layer signaling), channel usage data (e.g., IQ samples sent and received on physical channels by the simulated physical layer), and internal performance data (e.g., algorithm execution time and power usage of the simulated protocol stack and physical layer). As shown in FIG. 8, simulation engine 702 may then send the control response, channel usage, and internal performance data to test controller 706 in stages 814, 816, and 818. Simulation engine 702 may similarly execute the instances of the software reference implementation for virtual terminal devices 704b-704n and report the resulting control response and channel usage data for virtual terminal devices 704b-704n to test controller 706 in stages 814 and 816.

The control response and channel usage data may therefore detail the actions of the simulated physical layers of virtual terminal devices 704a-704n as they follow the transmission/reception schedule of the test scenario. For example, the transmission/reception schedule may specify that virtual terminal device 704a performs specific transmission activity in first time slots of the testing interval and specific reception activity in second time slots of the testing interval. The specific transmission and reception activity may be defined as specific data (e.g., payload data, control signaling, system information, synchronization signals, discovery signals) to be transmitted or received on certain frequencies (e.g., subcarriers or frequency channels). Accordingly, when simulation engine 702 simulates virtual terminal device 704a (e.g., by feeding the protocol stack command string for the transmission/reception schedule into the instance of the reference software implementation for terminal device 704a), virtual terminal device 704a may perform physical layer functions involved in following the transmission/reception schedule. The control response data may be the signaling that a physical layer provides back to a protocol stack on the physical layer-protocol stack interface in response to a particular protocol stack command (e.g., service request). Accordingly, when test controller 706 instructs virtual terminal device 704a to perform a transmission to virtual terminal device 704n, virtual terminal device 704a may attempt the transmission and report signaling back to test controller 706 (e.g., in the manner of an actual physical layer-protocol stack interface). This signaling may form part of the control responses data. The control response data may also include internal physical layer signaling (e.g., that normally remains within the physical layer), which simulation engine 702 may capture for virtual terminal devices 704a-704n as they perform physical layer functions. The channel usage data may include the IQ samples sent and received on physical channels by virtual terminal devices 704a-704n. The control response and channel usage data for each of virtual terminal devices 704a-704n may therefore characterize the physical layer behavior of virtual terminal devices 704a-704n as they execute the transmission/reception schedule of the test scenario.

This control response, channel usage, and internal performance data may form the simulated behavior data for virtual terminal devices 704a-704n. Test controller 706 may thus receive this simulated behavior data while it is running the test function in stage 808. Once simulation engine 702 has run the entire command sequence (e.g., finished inputting the respective protocol stack command string into the instances of the reference software implementation for virtual terminal devices 704a-704n) and provided the resulting simulated behavior data to test controller 706, the test function may end.

Figure 12:
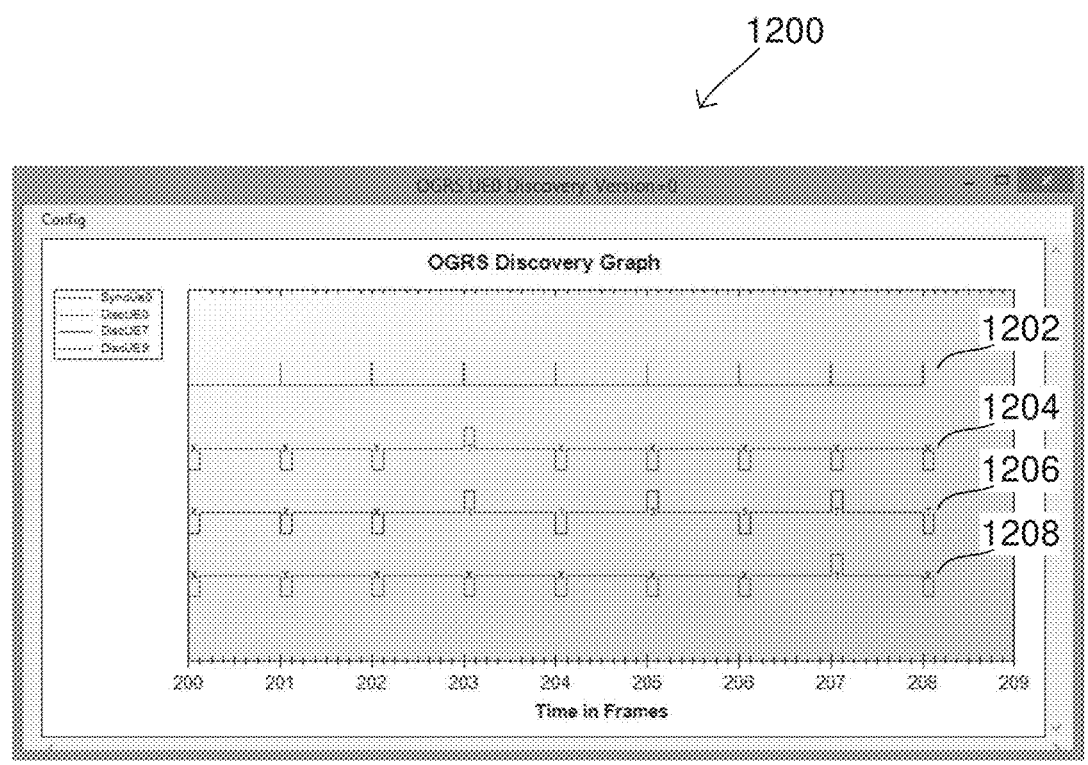
FIG. 12 shows a third exemplary GUI for a testing device according to some aspects.

Accordingly, test controller 706 may obtain simulated behavior data (e.g., control response, channel usage, and internal performance data) for each of virtual terminal devices 704a-704f during the test scenario. Test controller 706 may then provide the simulated behavior data to I/O platform in stage 820, which may then generate a test result with the simulated behavior data. For example, in some aspects GUI 710 may generate graphical test result by displaying the simulated behavior data on the visual display. FIG. 12 shows exemplary graphical test result 1200 according to some aspects, which is one example of a graphical test result that GUI 710 can generate. In the example of FIG. 12, graphical test result 1200 may plot channel usage of four virtual terminal devices with channel usage plots 1202-1208. Accordingly, channel usage plots 1202-1208 may display the specific channel usage by the four virtual terminal devices over time during the testing interval. Various other aspects may provide other types of graphical test results, such as graphical test results that visualize the control response and channel usage data of one or more of virtual terminal devices 704a-704f over the course of the test scenario.

Figure 13:
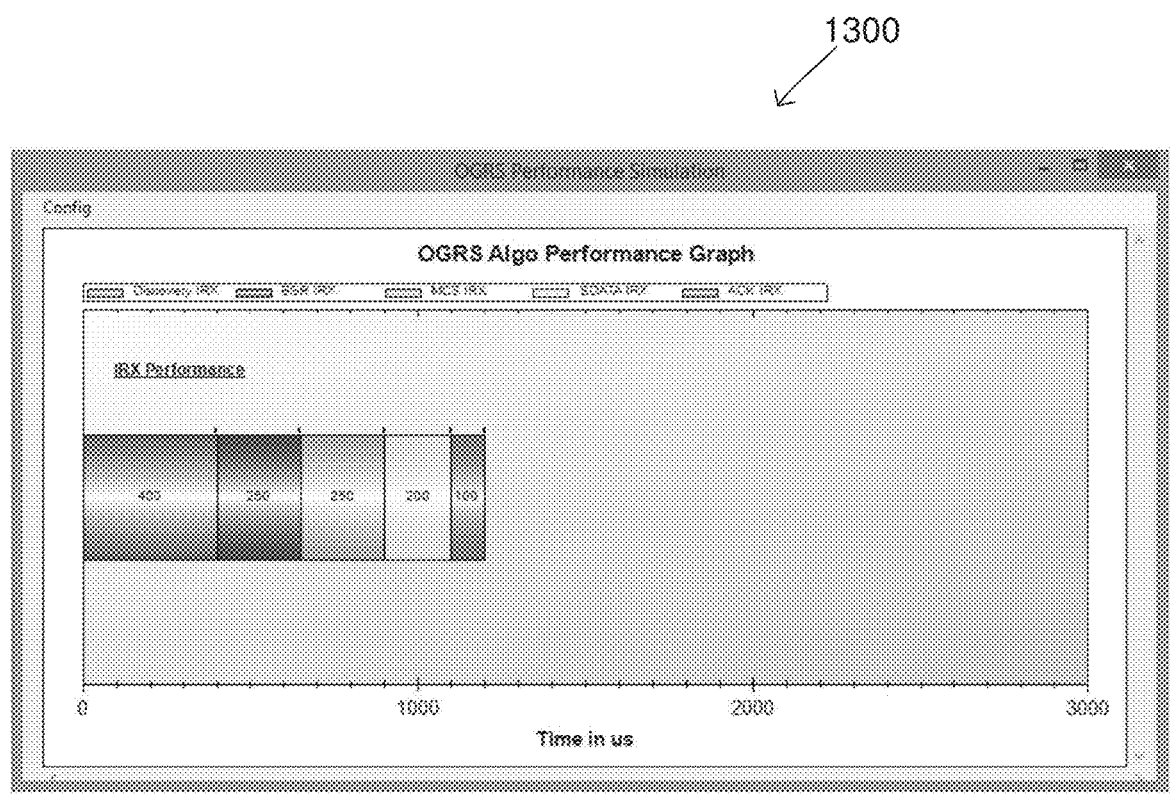
FIG. 13 shows a fourth exemplary GUI for a testing device according to some aspects.

FIG. 13 shows exemplary graphical test result 1300 according to some aspects. As shown in FIG. 13, graphical test result 1300 may visually depict the internal performance of a virtual terminal device, e.g., virtual terminal device 704a. For example, graphical test result 1300 may depict the physical layer algorithm performance (e.g., of an Inner Receiver (IRX) of the simulated protocol stack of virtual terminal device 704a) of virtual terminal device 704a over the course of the test scenario. In a related example to that shown in FIG. 13, the simulated behavior data may include power usage data (e.g., as part of the internal performance data). I/O platform 708 may be configured to generate a test result with the power usage data, which can then be evaluated to check power usage of the reference software implementation.

These types of graphical test results may therefore enable a manual tester to visually evaluate the physical layer behavior of virtual terminal devices 704a-704n. This can be advantageous, for example, when the manual tester is developing the wireless standard on which the reference software implementation is based. By running and visually evaluating the simulated behavior data, the manual tester can identify problems and/or bugs in the wireless standard, and can re-program the reference software implementation to test various modifications to the wireless standard.

Additionally or alternatively to graphical test results, in some aspects I/O platform may generate a test result in the form of a test output file. For example, output file generator 708 may use the simulated behavior data to generate a test output file, such as by inserting the simulated behavior data into a file in a predefined format. This test output file can then be saved for later reference by a manual tester, such as to compare the simulated behavior data from the test scenario with simulated behavior data from another test scenario that is simulated at a later time.

Aspects described above for message sequence chart 800 in FIG. 8 involve simulation of the test scenario at virtual terminal devices 704a-704n (e.g., where the test function executed by test controller 706 involves only a simulation). As previously introduced, the test function may also include a device test for DUT 606. Message sequence chart 900 in FIG. 9 shows an example of this according to some aspects. As further described below, testing device 602 may use the procedure of message sequence chart 900 to obtain simulated behavior data from a simulation of virtual terminal devices 704a-704n, and may obtain observed behavior data from a device test of DUT 606.

This simulated and observed baseband data can then be compared (e.g., manually by a manual tester or automatically by test controller 706), which can help identify issues with DUT 606. For example, as previously described simulation engine 702 may simulate virtual terminal devices 704a-704n by executing a reference software implementation that mimics the physical layer functions of an actual terminal device. The reference software implementation can be developed offline based on a wireless standard. DUT 606 may include similar software that controls its physical layer functions (e.g., can run a software-based physical layer).

This software of DUT 606 can be termed a production software implementation (e.g., production software), as it is the actual production software that is installed onto DUT 606. While the reference software implementation and the production software implementation may be developed from the same wireless standard (e.g., to control virtual and actual terminal devices to function according to the physical layer of a given wireless standard), the reference software implementation and the production software implementation may be developed separately (e.g., with different program code). Accordingly, the production software implementation in DUT 606 can be tested by executing the same command sequence on both a virtual terminal device (e.g., with its reference software implementation) and on DUT 606 (e.g., with the production software implementation). Differences in the resulting simulated and observed behavior data can be evaluated to determine whether DUT 606 is exhibiting any errors (e.g., whether its production software implementation has any bugs).

In addition to direct comparison with virtual terminal devices 704a-704n, DUT 606 can also be tested as part of the simulation of virtual terminal devices 704a-704n. In the examples described above, virtual terminal devices 704a-704n may interact with each other during the simulation by transmitting and receiving data to each other. DUT 606 may therefore act in the same type of role as one of virtual terminal devices 704a-704n, and may therefore transmit and receive data with virtual terminal devices 704a-704n as they run the simulation. The behavior of DUT 606 can therefore be tested in a simulated device network where DUT 606 transmit and receives with various virtual terminal devices.

Returning to FIG. 9, message sequence chart 900 defines an exemplary procedure that testing device 602 can use to test the production software implementation on DUT 606. As shown in FIG. 9, test controller 706 may first receive scenario data for a test scenario from I/O platform 708 in stage 902 (e.g., in the same manner as stage 802 in FIG. 8). The scenario data may specify that the test scenario includes a simulation with virtual terminal devices 704a-704n (e.g., either with only one of virtual terminal devices 704a-704n, or with multiple or all of virtual terminal devices 704a-704n) along with a device test of DUT 606. This information can be specified in the simulation parameters of the scenario data. The scenario data may also specify device configurations for one or more of virtual terminal devices 704a-704n (e.g., may specify the number of virtual terminal devices for the test scenario as well as their device configurations) and for DUT 606 (e.g., the same or different device configurations). As the test scenario also involves DUT 606, the transmission/reception schedule may specify a transmission reception schedule (e.g., a time sequence of transmit and receive operations over the testing interval) for virtual terminal devices 704a-704n and DUT 606.

Test controller 706 may then configure virtual terminal devices 704a-704n and DUT 606 according to the appropriate device configurations (specified in the scenario data) in stages 904a and 904b. For example, test controller 706 may provide the device configurations for virtual terminal devices 704a-704n to simulation engine 702 in stage 904a, which may then instantiate instances of the reference software implementation (e.g., for each virtual terminal device involved in the test scenario) and update parameters of the reference software implementation to match the device configuration.

Test controller 706 may also configure DUT 606 according to the device configuration in stage 904b. For example, testing device 602 may connect to DUT 606, such as over a wired or wireless interface. This interface may enable test controller 706 to send and receive data from DUT 606, including sending and receiving data with the production software implementation of DUT 606. Accordingly, in stage 904*b*, test controller 706 may use the interface to configure the production software implementation of DUT 606 according to the device configuration (e.g., by adjusting parameters in the production software implementation according to the device configuration).

Test controller 706 may then generate a command sequence based on the transmission/reception schedule in stage 906. In some cases, depending on the test scenario specified in the scenario data, test controller 706 may generate a command sequence that includes a single protocol stack command string (e.g., based on a transmission/reception schedule for a single terminal device). This protocol stack command string can then be used to compare DUT 602 to a virtual terminal device in a one-to-one manner, such as by only examining the behavior of a single terminal device compared to a network of terminal devices. In other cases, such as where the test scenario involves multiple terminal devices, test controller 706 may generate a command sequence that includes a plurality of protocol stack command strings (e.g., based on a transmission/reception scheduled for a plurality of terminal devices). This is similar to the case described above for message sequence chart 800 of FIG. 8, in which the command sequence included a protocol stack command string for each of virtual terminal devices 704*a*-704*n*. The different protocol stack command strings in the command sequence can then be used to drive virtual terminal devices 704*a*-704*n* as well as to drive DUT 606 (e.g., by inputting each protocol stack command string into DUT 606 in series), which can then enable evaluation of the physical layer behavior of multiple terminal devices.

In other cases, DUT 606 can be simulated in the same device network as virtual terminal devices 704*a*-704*n* (e.g., can transmit and receive with virtual terminal devices 704*a*-704*n*). Accordingly, in the same manner that virtual terminal devices 704*a*-704*n* interacted with each other in the simulation cases by transmitting and receiving, DUT 606 may transmit and receive with virtual terminal devices 704*a*-704*n* when the test function includes a simulation and a device test. The resulting simulated and observed behavior data can therefore be evaluated to verify whether virtual terminal devices 704*a*-704*n* and DUT 606 were behaving correctly.

After generating the command sequence, test controller 706 may run the test function in stage 908. As shown in FIG. 9, test controller 706 may send the command sequence to simulation engine 702 in stage 910*a* and to DUT 606 in stage 910*b*. As indicated above, in some cases the command sequence may include a single protocol stack command string (e.g., for a test scenario involving a single terminal device) while in other cases the command sequence may include a plurality of protocol stack command strings (e.g., for a test scenario involving a plurality of terminal devices). In cases where the test scenario involves a single virtual terminal device and the command sequence includes a single protocol stack command string, simulation engine 702 may execute one instance of the reference software implementation, e.g., for virtual terminal device 704*a*. Simulation engine 702 may therefore input the protocol stack command string into the instance of the reference software implementation for virtual terminal device 704*a* in stage 910*a*. The instance of the reference software implementation for virtual terminal device 704*a* may then execute the protocol stack command string in stage 912*a*. As previously described for stage 812 in FIG. 8, this may therefore simulate the physical layer behavior of virtual terminal device 704*a*, including its physical layer processing and transmission/reception functions. Simulation engine 702 may capture the resulting control response, channel usage, and internal performance data (from the instance of the reference software implementation of virtual terminal device 704*a*) in stages 914*a*, 916*a*, and 918*a*, and may send this simulated behavior data to test controller 706. Test controller 706 may therefore obtain the simulated behavior data of virtual terminal device 704*a*-704*n* as they perform the transmission/reception schedule as instructed by the command sequence.

In cases where the test scenario includes multiple terminal devices and the command sequence includes respective command strings for multiple terminal devices, simulation engine 702 may run separate instances of the reference software implementation for each of virtual terminal devices 704*a*-704*n* for the test function. Simulation engine 702 may then identify the protocol stack command string (in the command sequence) for each of virtual terminal devices 704*a*-704*n*, and may then input the protocol stack command string into the corresponding instance of the reference software implementation. The instances of the reference software implementation for virtual terminal devices 704*a*-704*n* may then execute their respective protocol stack command strings of the command sequence in stage 912*a*. As previously described for stage 812 in FIG. 8, this may therefore simulate the physical layer behavior of virtual terminal devices 704*a*-704*n*, including their protocol stack and physical layer functions. Simulation engine 702 may capture the control response, channel usage, and internal performance data (from the instances of the reference software implementation of virtual terminal devices 704*a*-704*n*) in stages 914*a*, 916*a*, and 918*a*, and may send this simulated behavior data to test controller 706. Test controller 706 may therefore obtain the simulated behavior data of virtual terminal devices 704*a*-704*n* as they perform the transmission/reception schedule as instructed by the command sequence.

Test controller 706 may likewise send the command sequence to DUT 606 in stage 910*b*. In cases where the test scenario includes a single terminal device and the command sequence includes a single protocol stack command string, test controller 706 may direct DUT 606 to execute the protocol stack command string. The production software implementation (controlling the protocol stack and physical layer function) of DUT 606 may then execute the protocol stack command string in 912*b*, and may capture the control response, channel usage, and internal performance data of the protocol stack and physical layer as it runs on DUT 606. DUT 606 may then send back the control response, channel usage, and internal performance data to test controller in stages 914*b*, 916*b*, and 918*b*. This control response, channel usage, and internal performance data may therefore form the observed behavior data.

In cases where the test scenario includes multiple terminal devices and the command sequence includes respective command strings for multiple terminal devices, DUT 606 may execute (e.g., in series) each of the respective protocol stack command strings. Accordingly, test controller 706 may provide the protocol stack command strings to DUT 606 in series (e.g., one at a time). The production software implementation (controlling the physical layer function) of DUT 606 may then execute each protocol stack command string in 912*b*, and may capture the control response, channel usage, and internal performance data of the physical layer as each protocol stack command string runs on DUT 606. DUT 606 may then send back the control response, channel usage, and internal performance data to test controller 706 in stages 914*b*, 916*b*, and 918*b*. Test controller 706 may therefore obtain control response, channel usage, and internal performance data from DUT 606 for each of the protocol stack command strings. As simulation engine 702 ran the same protocol stack command strings on virtual terminal devices 704*a*-704*n*, test controller 706 may therefore obtain simulated behavior data for each protocol stack command string (when virtual terminal devices 704*a*-704*n* execute the protocol stack command strings) and observed behavior data for each protocol stack command string (when DUT 606 executes each protocol stack command string).

Furthermore, in cases where DUT 606 is simulated in the test scenario concurrently with virtual terminal devices 704*a*-704*n*, test controller 706 may feed the protocol stack command strings for virtual terminal devices 704*a*-704*n* to virtual terminal devices 704*a*-704*n* while also feeding the protocol stack command sting for DUT 606 to DUT 606. Accordingly, DUT 606 and virtual terminal devices 704*a*-704*n* may execute as if they were part of the same device network, and may interact by performing various transmission and reception operations between each other per the transmission/reception schedule of the test scenario. This can include transmission and reception between virtual terminal devices 704*a*-704*n*, and between virtual terminal devices 704*a*-704*n* and DUT 606. DUT 606 may therefore act as part of the same device network as virtual terminal devices 704*a*-704*n*, and may send back the resulting control response, channel usage, and internal performance data to test controller 706 in stages 914*b*, 916*b*, and 918*b*

Test controller 706 may then send the simulated and observed behavior data to I/O platform 708 in stage 920, which may then generate a test result based on the simulated and observed behavior data. The test result can be, for example, a graphical test result that GUI 710 generates and displays on a visual display, or can be a test result that output file generator 712 generates in the form of a test output file.

Figure 14:
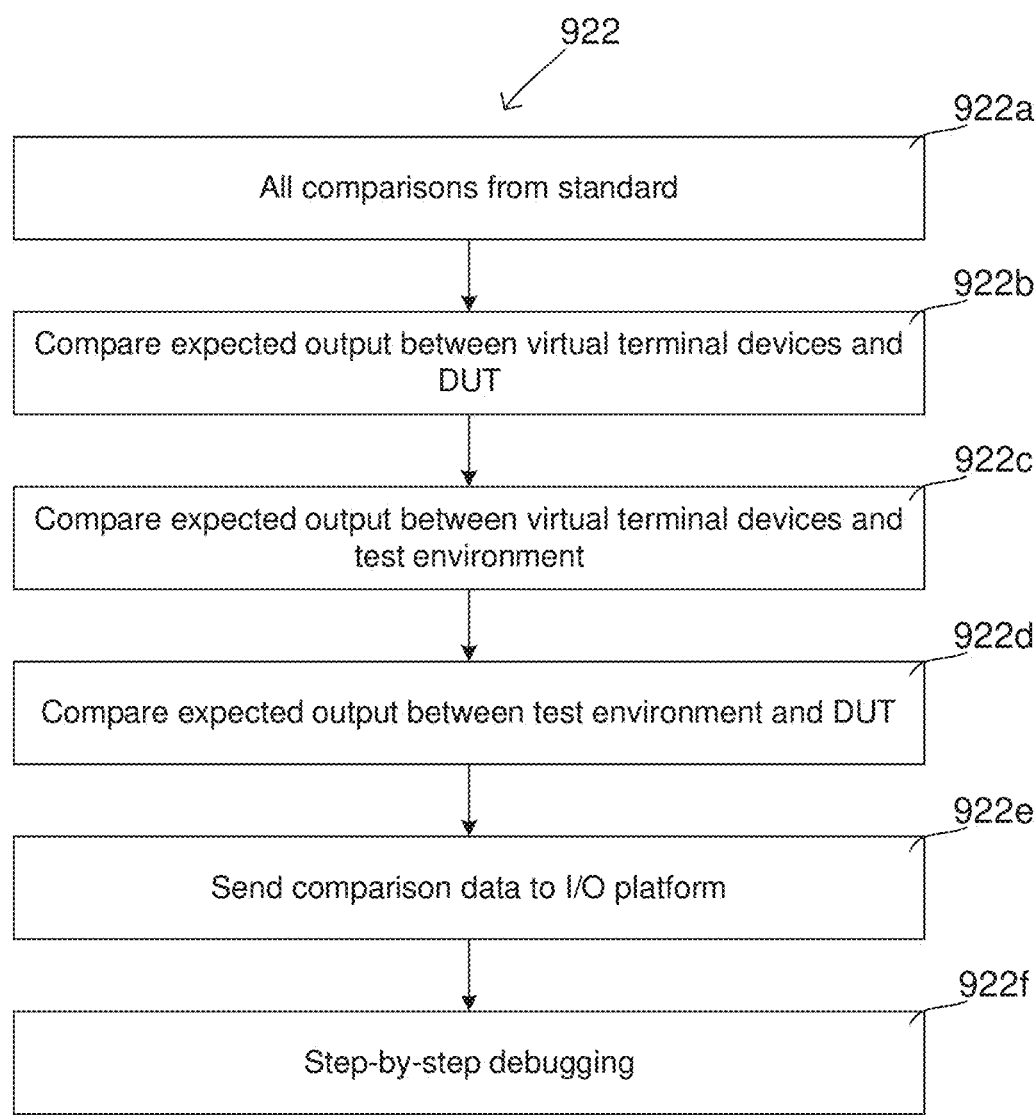
FIG. 14 shows an exemplary procedure for comparing behavior data from a simulation and device test according to some aspects.

In optional stage 922, test controller 706 may compare the simulated and observed behavior data to obtain a comparison result. FIG. 14 shows an exemplary flow chart illustrating stages 922*a*-922*f* of stage 922 according to some aspects. As shown in stage 922*a* of FIG. 14, the comparisons may originate from the wireless standard on which virtual terminal devices 704*a*-704*n* are based. This wireless standard defines the rules which terminal devices are expected to follow, and test controller 706 may be configured according to these rules and to check the simulated and observed behavior data to check whether virtual terminal devices 704*a*-704*n* and DUT 606 are configured correctly. Each of virtual terminal devices 704*a*-704*n*, DUT 606, and test controller 706 treat the other entities as 'black boxes,' where the input, outputs, and times thereof are known but not the implementation itself.

Test controller 706 may compare the expected output between virtual terminal devices 704*a*-704*n* and DUT 606 in stage 922*b*. Different outputs can be compared depending on the chosen abstraction level, such as where the channel usage is compared or where the control response is compared. Test controller 706 may therefore evaluate the simulated and/or observed behavior data to verify the protocols from end-to-end for all layers, such as, for virtual terminal devices 704*a*-704*n*: RRC (radio resource control), DL (data link layer), PHY (physical layer), air interface, and for DUT 606: (RRC (radio resource control), DL (data link layer), PHY (physical layer), air interface. Various aspects may provide different levels of detail for this comparison, and testing capabilities of test controller 706 can be designed as needed.

In stage 922*c*, test controller 706 may compare the expected output of virtual terminal devices 704*a*-704*n* and the test environment. For example, test controller 706 may examine the simulated behavior data to test the message and control information exchange inside the physical layer, such as the interface (PS<->PHY, PHY<->Air Interface and interfacing inside the PHY) behavior of the reference software implementation, based on the simulated behavior data.

In stage 922*d*, test controller 706 may similarly compare the expected output of DUT 606 and the test environment. For example, test controller 706 may examine the observed behavior data to test the message and control information exchange inside the physical layer, such as the interface (PS<->PHY, PHY<->Air Interface and interfacing inside the PHY) behavior of the production software implementation, based on the observed behavior data.

Test controller 706 may then send the comparison data to I/O platform 708 in stage 922*e*. I/O platform 708 may then generate a test result, such as by generating a graphical test result with GUI 710 or by generating an output test file with output file generator 712. A manual tester may therefore be able to evaluate the test result to identify potential errors in the reference or production software implementation.

In some aspects, test controller 706 may also offer step-by-step debugging in stage 922*f*. For example, test controller 706 may use GUI 710 to present a debugging interface that can enable a manual tester to modify the reference or production software implementation (e.g., by changing the program code), such as to correct bugs or fix errors that are identified in the simulated or observed behavior data. For example, DUT 606 may be connected to test device 602, and may be set in a debugging mode that enables test device 602 to manipulate the program code of the production software implementation. Test controller 706 may then provide step-by-step debugging to DUT 606, such as where protocol stack command can be sent to DUT 606 step-by-step (e.g., with breakpoints) and the resulting observed behavior from DUT 606 can be examined at each step.

In aspects where the test function includes a simulation and device test, testing device 602 may be able to use the reference software implementation to verify the physical layer behavior of DUT 606. For example, different test scenarios (e.g., test cases) can be translated into command sequences for driving the reference and production software implementations, and the resulting simulated and observed behavior data can be used to verify whether DUT 606 (e.g., the production software implementation) behaves according to the specification. Furthermore, the implementation of DUT 606 can be developed and tested step-by-step, such as by running repeated test scenarios at both DUT 606 and virtual terminal devices 704*a*-704*n* (e.g., with at least one virtual terminal device running the same protocol stack command string to use for comparison) and comparing the resulting simulated and observed baseband data.

Furthermore, in addition to checking physical layer behavior related to signaling and channel usage, testing device 602 can also be used to evaluate power impact. As previously indicated, the internal performance data provided by simulation engine 702 and/or DUT 606 may include information about power usage. Accordingly, I/O platform 708 may be configured to generate test results (e.g., graphical test results or test output files) that describe power consumption in the reference and/or production software implementation. A manual tester can then use these test results to identify flaws in the design of the reference and/or production software implementations related to power consumption.

In some aspects, testing device 602 can be used to simulate device networks composed of terminal devices performing D2D communications with each other, such as a device network that operates in a decentralized manner (e.g., without a central network).

FIG. 15 shows exemplary method 1500 of testing terminal device functionality according to some aspects. As shown in FIG. 15, method 1500 includes generating a command sequence for a test scenario of a plurality of virtual terminal devices (1502), executing the command sequence with reference software that simulates physical layer functions of the plurality of virtual terminal devices and generating simulated behavior data for the plurality of virtual terminal devices in response to the command sequence (1504), and generating a test result based on the simulated behavior data (1506).

FIG. 16 shows exemplary method 1600 of testing terminal device functionality according to some aspects. As shown in FIG. 16, method 1600 includes generating a command sequence for a test scenario (1602), providing the command sequence to production software of a device-under-test (DUT) and obtaining observed behavior data of the DUT in response to the command sequence (1604), executing the command sequence with reference software that simulates physical layer functions of the plurality of virtual terminal devices and obtaining simulated behavior data for the plurality of virtual terminal devices in response to the command sequence (1606), and generating a test result based on the observed behavior data and the simulated behavior data (1608).

Frequency Hopping Schemes for Device Networks

Many radio access technologies are configured to use unlicensed spectrum, such as spectrum in the Industry, Scientific, and Medical (ISM) bands. While licenses and fees are generally not mandated for use of unlicensed spectrum, certain national and international organizations impose various regulations on use of unlicensed spectrum, such as regulations intended to reduce interference and promote fair spectrum use. For example, in the United States the Federal Communications Commission (FCC) is tasked with communication-related regulatory functions including the regulation of wireless communications. Accordingly, the FCC issues specific regulations regarding operation of radio frequency devices on unlicensed spectrum.

These FCC regulations specify different parameters that govern permissible and prohibited use of unlicensed spectrum. Among these, the FCC issues a specific set of rules for frequency hopping devices (Title 47 of the Code of Federal Regulations (CFR), Part 15). FIG. 17 shows exemplary table 1700, which summarizes these FCC rules. As described in table 1700, the FCC rules pertain to regulations about the bandwidth, transmit power (effective radiated power (ERP)), listen-before-talk (LBT), dwell time, and frequency hopping pattern. Per these FCC rules, an application qualifies as a frequency hopping system (e.g., under Section 15.247) if:

a. The transmitter pseudo-randomly hops between frequencies that are separated from each other by at least the 20-dB bandwidth of the data channel, but not by less than 25 kHz b. The 20-dB bandwidth of the hopping channel is not larger than 500 kHz c. If the 20-dB bandwidth of the hopping channel is less than 250 kHz, the system must use at least 50 hopping frequencies. The average time of occupancy at any frequency (dwell time) must not be larger than 0.4 seconds/400 ms within any 20 second period d. If the bandwidth of the hopping channel is larger than 250 kHz, the system must use at least 25 hopping frequencies. The average time of occupancy at any frequency must not be larger than 0.5 seconds within any 10 second period These FCC-specific regulations are merely one example of frequency hopping rules, and various other regulatory bodies (e.g., with jurisdiction in other countries) may similarly issue their own rules regarding approved behavior for frequency hopping devices. Frequency hopping devices may therefore be subject to certain rules that define permissible usage of unlicensed spectrum for frequency hopping.

As indicated in FIG. 17 for the FCC case, one of the frequency hopping rules may relate to dwell time. In the case of the FCC, the dwell time rule is a 400 ms/20 s dwell time rule, meaning that a single transmitter is not permitted to transmit on a given frequency for more than 400 ms in any given 20 period. Other regulatory bodies may issue similar dwell time rules, which generally specify an average amount of time that a transmitter is allowed to use any single frequency within any set interval of time. These dwell time rules are therefore intended to prevent any single device from overusing certain spectral resources, as they may prohibit a single device from using any given frequency for more than a specified interval in any given period.

Other frequency hopping rules may similarly attempt to manage the distribution of spectrum usage by a given frequency hopping device. For example, as described in the "Other" column of table 1700, there may rules that stipulate that the frequency hopping should appear random in the short-term and to use all hopping frequencies in the long term. Such rules may therefore attempt to achieve a pseudorandom and equal distribution of spectrum usage by frequency hopping devices.

Regardless of the specific regulatory body (e.g., FCC or other), many frequency hopping devices may therefore be expected to follow certain frequency hopping rules when using unlicensed spectrum. To summarize the above description, these frequency hopping rules may include dwell time rules as well as pseudorandom and equal usage rules.

Accordingly, various aspects of this disclosure provide a frequency hopping scheme that can be used by terminal devices to achieve a target spectrum usage distribution. In some aspects, this spectrum usage can be used to comply with various frequency hopping rules, such as those issued by the FCC or any other regulatory body. As further described below, this frequency hopping scheme include a data hopping sequence that uses certain hopping frequencies based on whether these hopping frequencies were recently used or are scheduled for upcoming usage. In some aspects, terminal devices can use this frequency hopping scheme when operating in a decentralized and D2D framework, such as where the devices use both a data hopping sequence and a synchronization hopping sequence.

Figure 18:
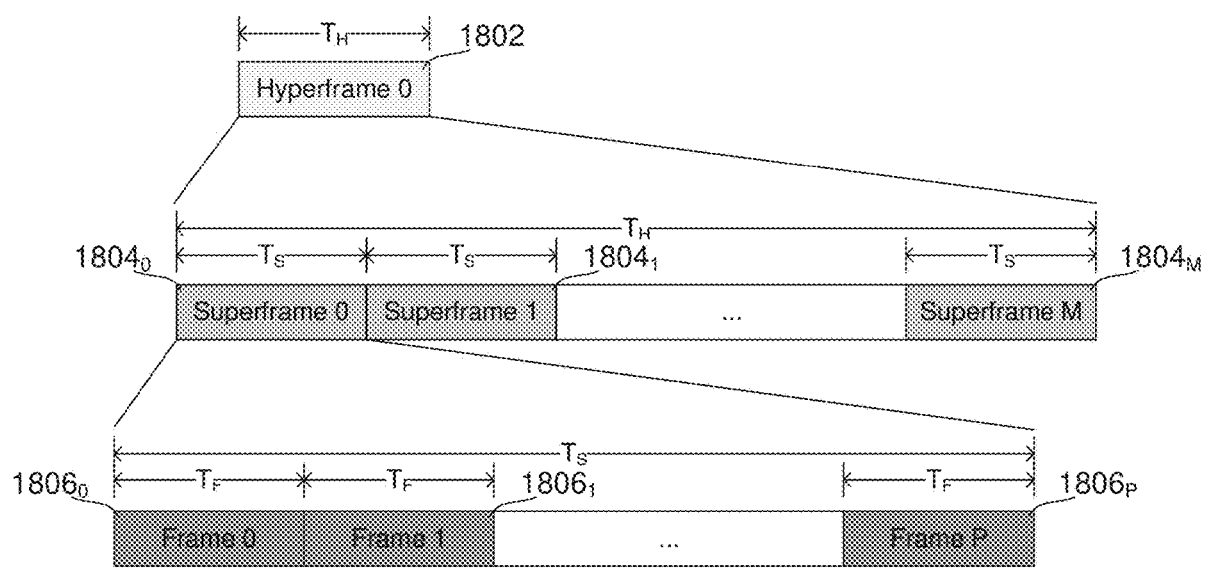
FIG. 18 shows an exemplary frame structure according to some aspects.

Various frequency hopping schemes may be organized around a particular discretized timing schedule, where the discrete intervals of the discretized timing schedule are used to control when frequency hops occur. FIG. 18 shows an exemplary frame structure according to some aspects, which various aspects of this disclosure can use as the discretized timing schedule. The exemplary frame structure of FIG. 18 is divided into three tiers: frames, superframes including multiple frames (e.g., P frames), and hyperframes including multiple superframes (e.g., M superframes). Accordingly, hyperframe 1802 ("Hyperframe 0") may include M superframes 1804₀-1804ₘ ("Superframe 0" through "Superframe M"), while superframe 1804₀ includes N frames 1806₀-1806ₘ ("Frame 0" through "Frame P"). As denoted in FIG. 18, each hyperframe may have length $T_H$, each superframe may have length $T_S$, and each frame may have length $T_F$. In one example based on the FCC dwell time rules (namely, 400 ms per 20 ms interval), the number of frames P in each superframe may be P=21 and the number of superframes in a hyperframe may be M=63, while frame length $T_F$ may be 333 ms, superframe length $T_S$ may be 6993 ms (21 frames per superframe), and hyperframe length $T_H$ may be 440559 ms (63 superframes per hyperframe). These values are provided merely for purposes of explanation, and various other aspects of this disclosure can scale these values to other quantities (e.g., based on other dwell time rules, such as those specified by another regulatory body).

Figure 19:
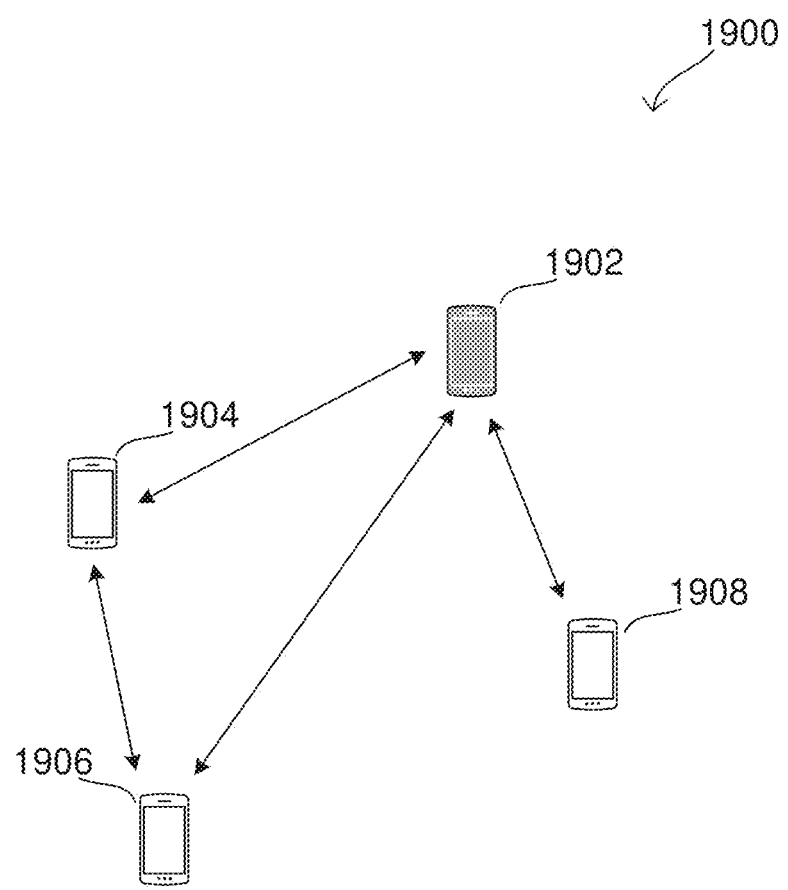
FIG. 19 shows an exemplary device network according to some aspects.

In various aspects of this disclosure, a device network can use this frame structure to organize a frequency hopping scheme. Accordingly, terminal devices of the device network can use the various intervals of the frame structure in FIG. 18 (e.g., frames, superframes, and hyperframes) to govern when frequency hopping occurs. FIG. 19 shows exemplary device network 1900 according to some aspects. In the example of FIG. 19, device network 1900 may include terminal devices 1902-1908, which may communicate with each other using D2D (e.g., any type of direct communications between each other). In some aspects, device network 1900 may be decentralized (e.g., there may be not be a central network and/or network access nodes offering control and management functions to terminal devices 1902-1908). In some aspects, terminal devices 1902-1908 may communicate using device pairings. For example, as shown in FIG. 19 by the arrowed lines, each terminal device may have one or more pairings with other respective terminal devices. Terminal devices 1902-1908 may communicate with each other using these pairings.

Terminal devices 1902-1908 may communicate (transmit and/or receive) according to a frequency hopping scheme. For example, when transmitting and receiving data to each other, terminal devices 1902-1908 may hop to various hopping frequencies according to predefined hopping sequences. In some aspects, terminal devices 1902-1908 may transmit multiple types of data to each other, such as discovery signals, synchronization signals, and data (e.g., payload and control). The frequency hopping scheme may specifically allocate certain hopping resources (e.g., particular hopping frequencies at certain times) to use for discovery, synchronization, and data transfer.

In one example, the frequency hopping scheme may include a synchronization hopping sequence and a data hopping sequence. The synchronization hopping sequence may be used to transmit synchronization signals, where certain synchronization masters (e.g., terminal device 1902, as further described below) may follow the hopping of the synchronization hopping sequence to transmit synchronization signals on various hopping frequencies over time. Synchronization slaves (e.g., terminal devices 1904-1908) may then also follow the hopping of the synchronization hopping sequence to receive these synchronization signals. The synchronization slaves may then use the synchronization signals (e.g., their timing) to maintain synchronization with the synchronization master, thus enabling the entire device network to stay in sync with each other (e.g., by virtue of all being synchronized with the synchronization master). Terminal devices may therefore use the synchronization hopping sequence to obtain initial synchronization (e.g., for initial access) and to continuously maintain synchronization with the device network over time.

As many terminal devices (e.g., synchronization masters and synchronization slaves) may follow the synchronization hopping sequence, the synchronization hopping sequence may be considered a common hopping sequence. In contrast, the data hopping sequence may be considered a transmitter-specific hopping sequence. Accordingly, a given terminal device may identify a data hopping sequence to use with another terminal device, such as another terminal device to which it is paired. The paired terminal devices may then follow the hopping of the data hopping sequence as they transmit and receive data with each other, thus transmitting and receiving data on various different hopping frequencies over time. These synchronization and data hopping sequences may be orthogonal to each other (including the data hopping sequences used by different pairings), which may enable the terminal devices in a device network to transmit and receive various types of data without collisions.

As described above, the synchronization and data hopping sequences may be used for different purposes, namely for network-wide synchronization versus pairing-specific data transfer. In various aspects, the synchronization and data hopping sequences may be configured differently (e.g., use a different hopping configuration) in light of their differences in usage. For example, in various aspects the synchronization hopping may use hopping that is less frequent than the data hopping sequence. In other words, synchronization masters may use a single hopping frequency to transmit synchronization signals for an extended duration of time, and may therefore slowly hop to different hopping frequencies. This slower hopping can make it easier for terminal devices to use the synchronization hopping sequence, in particular when attempting to obtain initial synchronization (e.g., as the synchronization hopping sequence may remain on a single hopping frequency for a longer period of time instead of hopping in a rapid manner). The data hopping sequence may be able to use faster hopping as these same considerations may not apply.

Accordingly, with reference to the frame structure introduced in FIG. 18, various aspects of this disclosure may use a data hopping sequence that hops every frame (e.g., switches to a different hopping frequency per frame, thus using P hopping frequencies per superframe) and a synchronization hopping sequence that hops every superframe (e.g., switches a different hopping frequency per superframe, thus using M hopping frequencies per hyperframe). Accordingly, synchronization masters such as synchronization master 1902 may use a particular hopping frequency for the synchronization hopping sequence for the duration of an entire superframe, and may switch to a next hopping frequency of the synchronization hopping sequence in the next superframe (e.g., the immediately following superframe). Terminal devices that are performing data transfer, such as terminal devices 1902-1908 (where terminal device 1902 may be a synchronization master as well as transmit and receive data), may therefore use a data hopping sequence that hops to a next hopping frequency every frame.

Furthermore, in various aspects terminal devices 1902-1908 may use a data hopping sequence that, for each superframe, excludes certain hopping frequencies that are used by the synchronization hopping sequence or data hopping sequence in neighboring superframes. As further described below, this frequency hopping scheme may enable terminal devices 1902-1908 to perform both synchronization and data transfer while abiding by dwell time rules as well as pseudorandom and equal distribution rules.

The following description first focuses on the specifics of the data and synchronization hopping sequences before subsequently describing use of the data and synchronization hopping sequences at a terminal device. Various aspects of this frequency hopping scheme refer to examples with specific values; however, the aspects of this disclosure are not limited to any particular configuration. For instance, some examples may refer to specific durations of intervals (e.g., frame, superframe, and hyperframe lengths), where these specific durations of intervals may be selected based on a particular dwell time rule (e.g., the FCC-specified dwell time rule for frequency hopping devices in unlicensed spectrum). However, these intervals can be modified in various other aspects of this disclosure, such as to satisfy another dwell time rule that is defined differently.

Figure 20:
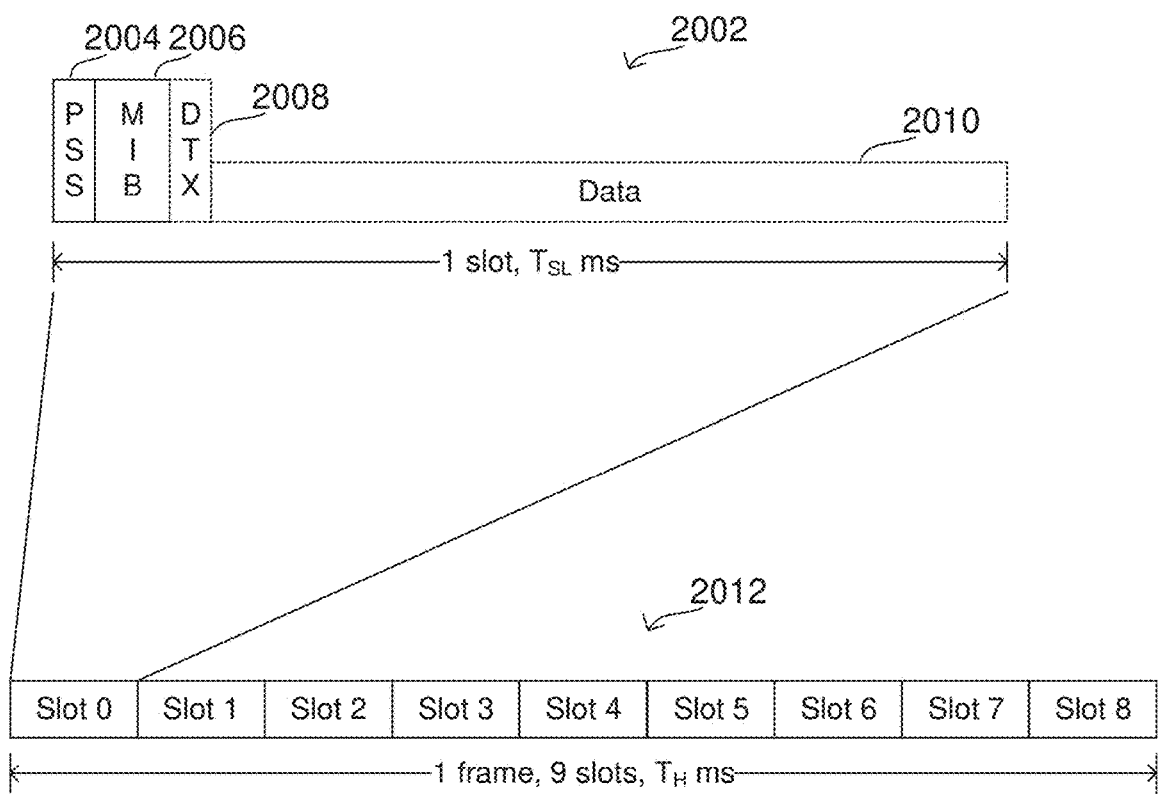
FIG. 20 shows an example of synchronization signal transmission in a frame according to some aspects.

Turning to a description of the synchronization hopping scheme, synchronization masters may transmit synchronization signals according a synchronization hopping sequence of the frequency hopping scheme. In the example of FIG. 19, terminal device 1902 may be a synchronization master (e.g., synchronization master 1902). In some aspects, synchronization master 1902 may transmit the synchronization signal as a series of synchronization bursts, where the synchronization hopping sequence uses a single hopping frequency to transmit the synchronization signal for the duration of each superframe (e.g., including P frames). FIG. 20 shows an exemplary depiction of synchronization signal transmission in a frame according to some aspects. As shown in FIG. 20, each frame 2012 can be divided into S slots, where S=9 in the example of FIG. 20. These slots can be used differently depending on the contents (e.g., data, synchronization, and discovery). In the case of FIG. 20, slot 2002 may be a synchronization slot of slot length $T_{SL}$, and may include synchronization signal 2004 (e.g., a Primary Synchronization Signal (PSS)), system information 2006 (e.g. Master Information Block (MIB) 2006, discontinuous transmission period 2008 (e.g., DTX period), and data period 2010. In one example, slot length $T_{SL}$ synchronization sequence 2004 may be set to $T_{SL}$=37 ms, synchronization sequence 2004 may be 1 ms, system information 2006 may be 2 ms, discontinuous transmission period 2008 may be 1 ms, and data transmission period 2008 may be 33 ms.

Figure 21:
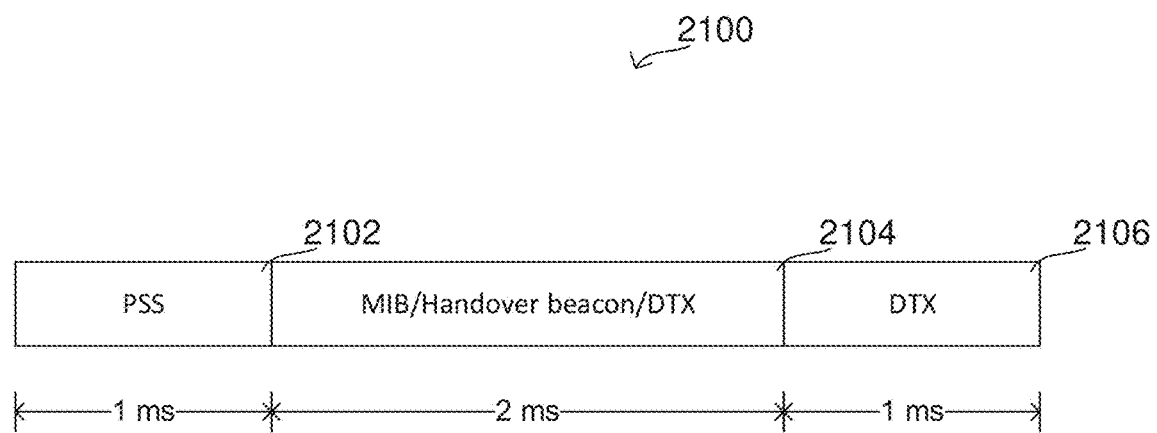
FIG. 21 shows an example of a synchronization burst according to some aspects.

The combination of synchronization signal 2004, system information 2006, and discontinuous transmission period 2008 can be referred to as a synchronization burst, which is shown in detail in FIG. 21. As shown in FIG. 21, synchronization burst 2100 may include first burst period 2102 (e.g., containing a PSS), second burst period 2104 (e.g., containing an MIB, handover beacon, or DTX), and third burst period 2106 (e.g., including DTX). In one example, first burst period 2102 may be 1 ms in duration, second burst period 2104 may be 2 ms in duration, and third burst period 2106 may be 1 ms in duration. In some aspects, the specific contents of each synchronization burst (e.g., the contents of first burst period 2102, second burst period 2104, and third burst period 2106) can change, such as depending on which slot the synchronization burst is in. For example, in some aspects, synchronization master 1902 may be configured to transmit a first synchronization signal (e.g., a PSS) during first burst period 2102 the synchronization burst in every slot (e.g., the first 1 ms of the slot). Synchronization master 1902 may then send out a second synchronization signal (e.g., a Secondary Synchronization Signal (SSS)) or system information (e.g., an MIB) in second burst period 2104 of the synchronization burst of the slot (e.g., the next 2 ms of the slot). In some aspects, synchronization master 1902 may be configured to send out system information in second burst periods 2104 of the synchronization bursts of slots 0-3 in each frame and/or to send a handover beacon in second burst period 2104 of slot 4 (e.g., to indicate that the synchronization master will be handed over to another device in the next superframe). In some aspects, synchronization master 1902 may be configured to leave some slots empty and/or periods of synchronization bursts empty, such as for discontinuous transmission. For example, synchronization master 1902 may be configured to leave slots 5-8 empty and/or to leave third burst period 2106 of each synchronization burst empty.

Synchronization master 1902 may therefore be configured to transmit synchronization signals in the form of synchronization bursts. In the examples described above for FIGS. 20 and 21, synchronization master 1902 may be configured to transmit multiple synchronization bursts (each containing a first synchronization signal, such as a PSS, and optionally a second synchronization signal, such as an SSS) during each frame (e.g., during each slot, or during multiple slots of each frame). This may enable other terminal devices in the device network to maintain synchronization with each other (e.g., as each will be synchronized with synchronization master 1902). For example, with reference to FIG. 19, terminal devices 1904-1908 may be synchronization slaves (e.g., synchronization slaves 1904-1908). Synchronization slaves 1904-1908 may therefore receive synchronization bursts transmitted by synchronization master 1902 (e.g., during initial access to establish initial synchronization and/or periodically to maintain synchronization). Furthermore, as introduced above synchronization master 1902 may also include system information, such as an MIB, in the synchronization bursts (e.g., in second burst period 2102). This system information may contain a system frame number that tracks the current frame of the device network, which acts as a time reference point.

As previously introduced, synchronization masters such as synchronization master 1902 may use a synchronization hopping sequence to transmit the synchronization signal, where the synchronization hopping sequence hops to a new hopping frequency each superframe. Accordingly, synchronization master 1902 may use the same hopping frequency of the synchronization hopping sequence to transmit the synchronization signal (e.g., synchronization bursts, such as a synchronization burst in each slot of each frame of the superframe) throughout the duration of a superframe. Synchronization master 1902 may then switch to the next hopping frequency in the synchronization hopping sequence for the next superframe, during the duration of which synchronization master 1902 may transmit the synchronization signal on this next hopping frequency. The synchronization hopping sequence (e.g., the order in which the synchronization hopping frequency switches) can be scheduled and dependent on the system frame number.

As previously introduced, dwell time rules can govern how long a particular frequency hopping device is allowed to use a given frequency within a certain period of time. Using the exemplary values provided above (e.g., based on the FCC-specified dwell time rules for frequency hopping devices in unlicensed spectrum), the overall dwell time of synchronization master 1902 to transmit synchronization bursts in each frame is at most 333 ms (e.g., 9*1 ms+5*2 ms, for 9 PSSs and 5 MIBs per frame). Accordingly, using the 400 ms per 20 second FCC dwell time rule, it follows that, at the latest, synchronization master 1902 needs to hop to another hopping frequency every [400/19]=21 frames. As each superframe can be defined as having N=21 frames in this example, synchronization master 1902 can continue using the same hopping frequency for the synchronization signal for an entire superframe and still meet the dwell time rule (e.g., having a dwell time of 21*19=399 ms<400 ms, thus satisfying the dwell time rule).

According to various aspects, synchronization master 1902 may therefore use a synchronization hopping sequence that occupies a single hopping frequency throughout the duration of a superframe (e.g., that transmits multiple synchronization bursts spaced throughout the superframe). Synchronization master 1902 may then hop to the next hopping frequency of the synchronization hopping sequence for each superframe, continuing to occupy each hopping frequency of the synchronization hopping sequence for the duration of each superframe. Using the frame structure described above for FIG. 18 where each hyperframe contains M=63 superframes, synchronization master 1902 may reuse each hopping frequency for the synchronization hopping sequence in the next hyperframe (e.g., 63 superframes later, which is greater than the 20 second period specified in the FCC dwell time rule). This yields that the maximum dwell time of each frequency used for synchronization within each hyperframe is 399 ms.

Figure 22:
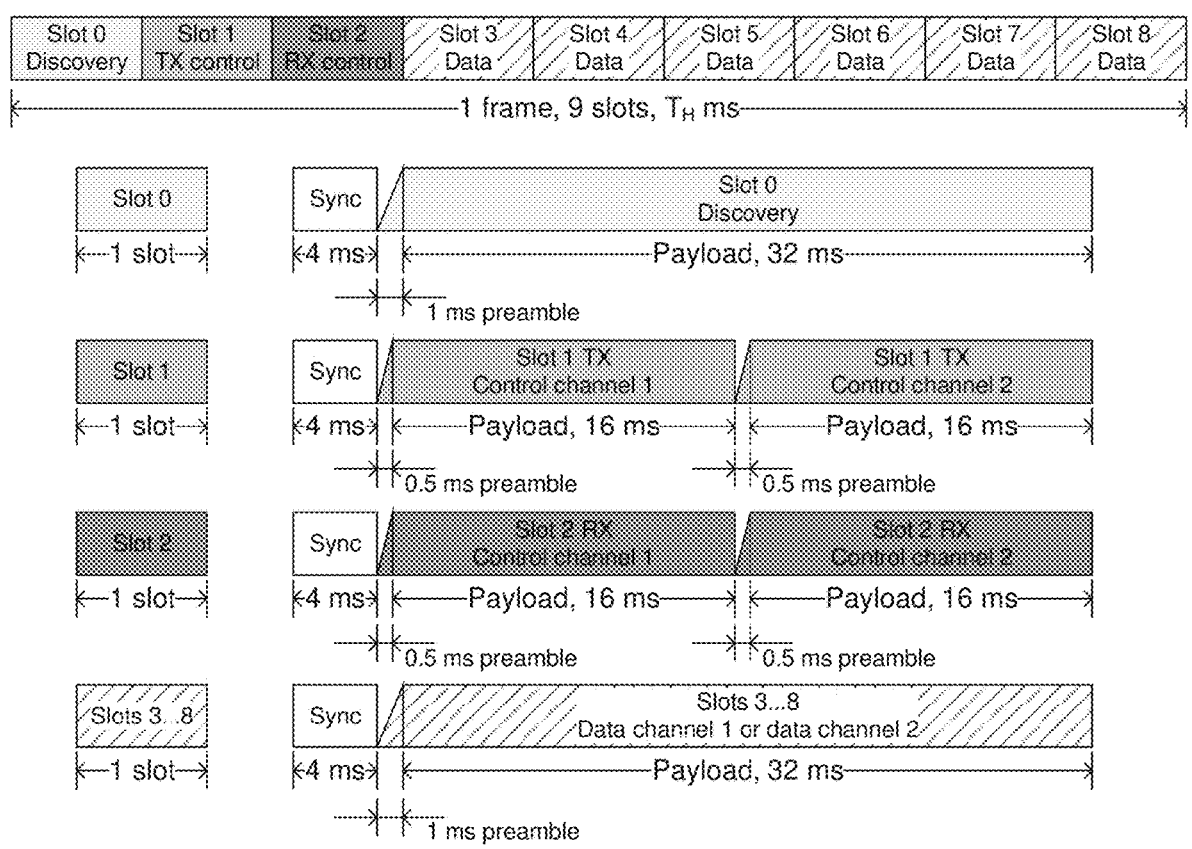
FIG. 22 shows an exemplary slot organization of a frame according to some aspects.

Turning next to the data hopping sequences, terminal devices 1902-1908 may use data hopping sequences to control which hopping frequencies are used for data transfer (e.g., for control, discovery, and communication data) at each given time. FIG. 22 shows an exemplary frame structure used for data according to some aspects, where the frame structure follows the same 9-slot frames introduced in FIG. 20. As shown in FIG. 22, each frame may include 9 slots, each of which can be structured in a different format and have different contents depending on it slot number. The first 4 ms of each slot may be left blank for data transfer purposes, as this 4 ms window is used for synchronization masters to transmit synchronization bursts. The remaining 33 ms of each slot is allocated for discovery, data, or control purposes. For example, slot 0 may be a discovery slot that, after the initial 4 ms interval left open for sync bursts, includes a 1 ms preamble and a subsequent 32 ms payload interval containing a discovery signal. Accordingly, terminal devices performing discovery may use slot 0 (e.g., during each frame) for discovery. For instance, once two terminal devices, e.g., terminal devices 1904 and 1906, establish synchronization (e.g., using synchronization bursts received from synchronization master 1902), terminal devices 1904 and 1906 can establish a direct communication link using the discovery channel in slot 0. In a case where terminal device 1904 wants to send a message to terminal device 1906, terminal device 1904 may assume a communication initiator role, and may thus send a discovery initiation message to terminal device 1906 in slot 0 of a first frame. Terminal device 1904 may then wait for a discovery response message from terminal device 1906 in slot 0 of a subsequent frame (e.g., the immediately succeeding frame).

Terminal devices may therefore form pairings using discovery, and may use these pairings for subsequent data transfer. For example, after establishing a pairing (e.g., a communication session), terminal devices 1904 and 1906 can use slots 1-8 of each frame to exchange control and data. For example, terminal devices 1904 and 1906 can exchange control messages on slots 1 and 2. Then, terminal devices 1904 and 1906 can exchange data using slots 3-8. In one example, pairings such as that between terminal devices 1904 and 1906 may use time division duplexing to realize two channels. For example, the first half-slots in slots 1 and 2 (control slots) and slots 3, 5, and 7 (data slots) may form a first communication channel, while the second half-slots in slots 1 and 2 and slots 4, 6, and 8 may form the second communication channel (where, for example, a single terminal device never transmits in the same half-slot of slot 1 and 2).

As previously introduced, pairings of terminal devices may use a data hopping sequence to exchange data with each other. Accordingly, the payload of slots 0 to 8 (e.g., the last 33 ms of each slot) may be transmitted according to a pseudorandom frequency hopping pattern, i.e. the data hopping sequence. Terminal devices 1904 and 1906 may therefore both follow a particular data hopping sequence as they transmit and receive data with each other, where the data hopping sequence hops to the next hopping frequency every frame (e.g., the data hopping sequence uses one hopping frequency per frame). As each pairing therefore can transmit at a maximum for 8*33 ms=264 ms per 333 ms, frame, the maximum dwell time of each terminal device per frame is less than the 400 ms FCC dwell time limit.

In one example, there may be a predefined set of data hopping sequences, each of which can be used by a different pairing. Accordingly, terminal devices 1904 and 1906 may identify a data hopping sequence from this predefined set of data hopping sequences, and follow this data hopping sequence as they transmit and receive. In some aspects, the synchronization and data hopping sequences available to each pairing may draw from the same predefined set of hopping frequencies. As the hopping sequences are orthogonal, each of the predefined data hopping sequences may use a different one of the predefined set of hopping frequencies at each point in time (e.g., a different hopping frequency during each frame) that is also different from the hopping frequency used by the synchronization hopping sequence.

In one example, the device network may use an overall set of 63 hopping frequencies, where each of the data and synchronization hopping sequences therefore draw from this set of 63 hopping frequencies. Each superframe may renew the data and synchronization hopping sequences, and may use a specific selection of hopping frequencies from the overall set that is designed to meet the FCC dwell time rules.

In particular, as previously indicated, various aspects of this disclosure may use synchronization hopping sequences that hop each superframe while reusing hopping frequencies every hyperframe. Accordingly, the synchronization hopping sequence may use each of the 63 hopping frequencies once per hyperframe while still meeting the FCC dwell time rules regarding the total amount of dwell time in any 20 second period.

In the example where a superframe contains 12 frames, the data hopping sequence in each superframe uses 21 hopping frequencies (e.g., for hopping once per frame). These 21 hopping frequencies are from the overall set of 63 hopping frequencies. However, it may not be permissible to select any of the 63 hopping frequencies for the data hopping sequence in each superframe, as doing so may violate dwell time rules. Accordingly, various aspects of this disclosure may use data hopping sequences for each superframe that specifically exclude certain hopping frequencies based on 1) scheduled usage of the hopping frequencies for the synchronization hopping sequence in upcoming superframes, and 2) past usage of the hopping frequencies in the data hopping sequence of previous superframes.

For example, given a current superframe N, the data hopping sequence may exclude the hopping frequencies scheduled for use in the synchronization hopping sequence in superframes N, N+1 and N+2 (in other words, the current superframe as well as the two immediately succeeding superframes). By excluding these hopping frequencies (which will each respectively be used for an entire superframe in superframes N, N+1, and N+2), the data hopping sequence can avoid violating the dwell time rules. As there is one hopping frequency used by the synchronization hopping sequence per superframe, this reduces the overall set of hopping frequencies down to 60 hopping frequencies available for the data hopping sequence in superframe N.

Furthermore, given the current superframe N, the data hopping sequence may also exclude the hopping frequencies used for the data hopping sequence in superframe N−1 (in other words, the immediately prior superframe). As there are 21 hopping frequencies used by the data hopping sequence in each superframe, this reduces the available hopping frequencies to 39. Similarly to as described above, exclusion of these frequencies form the data hopping sequence can avoid violating dwell time rules.

Accordingly, the data hopping sequence for superframe N will use 21 of these 39 remaining available hopping frequencies. In particular, the data hopping sequence will also exclude the hopping frequencies used for the data hopping sequence in superframe N−2 except for three hopping frequencies (as further described below). Accordingly, the data hopping sequence will include 18 hopping frequencies that were not used for the data hopping sequences in either of superframes N−1 or N−2, and 3 hopping frequencies that were used in the data hopping sequence of superframe N−2. The data hopping sequence for superframe N will then use the 18 frequencies that were not used in either of superframes N−1 or N−2 for the hopping frequencies in the first 18 frames of superframe N, and then use 3 hopping frequencies from superframe N−2 for the hopping frequencies in the last 3 frames of superframe N. As described below, these three hopping frequencies can be selected such that they were used at the beginning of the data hopping sequence of superframe N−2, and the data hopping sequence in superframe N may still be able to use them without violating the dwell time rules.

Expressed fully, a current superframe (e.g., superframe N) will use a data hopping sequence that excludes a) hopping frequencies scheduled for use in the synchronization hopping sequence in the current superframe and the two immediately succeeding superframes (e.g., superframes N, N+1, and N+2), and b) hopping frequencies previously used in the two immediately prior superframes (e.g., superframes N−1 and N−2) except for the first 3 hopping frequencies used in the data hopping sequence of the second immediately prior superframe (e.g., superframe N−2).

This frequency hopping scheme can be used by any synchronization slave, as these synchronization slaves only send data and do not send out synchronization signals (thus reducing their frequency usage towards the dwell time limit). Accordingly, with reference to FIG. 19, synchronization slaves 1904-1908 may be configured to use this synchronization hopping sequence (hopping every superframe, e.g., when receiving sync bursts from synchronization master 1902) and this data hopping sequence (hopping every superframe, with hopping frequencies in the data hopping sequence for each superframe following the above usage constraints). As previously indicated, terminal devices may communicate in pairings, such as in the case introduced above for terminal devices 1904 and 1906. For each superframe, terminal devices 1904 and 1906 may transmit and receive while following a data hopping sequence that uses hopping frequencies according to the above usage constraints.

Synchronization masters, such as synchronization master 1902, may transmit both data and synchronization signals, and accordingly may have higher frequency usages towards the dwell time limit of 400 ms per 20 seconds. In particular, as synchronization master 1902 uses certain hopping frequencies for the synchronization hopping sequence in an entire superframe, synchronization master 1902 may avoid data transmission on these hopping frequencies within a ±20 second window. For example, synchronization master 1902 may "blank" data transmission on any hopping frequency that was used in the synchronization hopping sequence in any of superframes N−3, N−2, N−1, and N+3 (where the data hopping sequence in frame N already excludes the hopping frequencies by the synchronization hopping sequence in N, N+1, and N+2, and thus there are no hopping frequencies in the data hopping sequence to blank).

Figure 24:
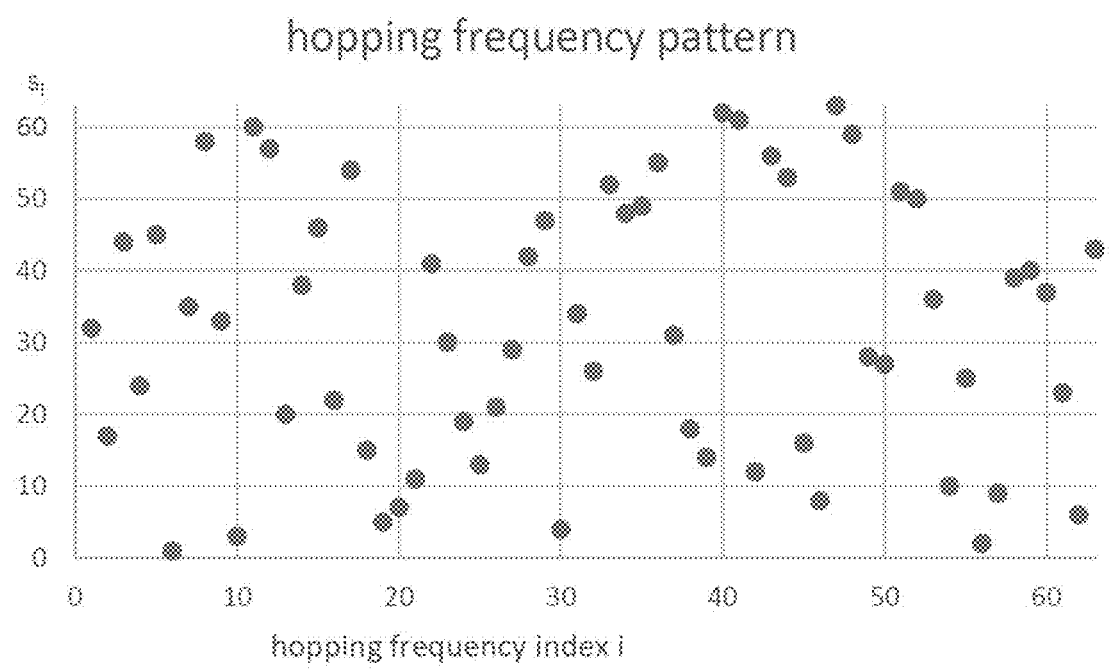
FIG. 24 shows an exemplary distribution of a frequency hopping pattern according to some aspects.

FIG. 23 shows exemplary chart 2300 that illustrates this frequency hopping scheme for both synchronization and data hopping sequences according to some aspects. As shown in FIG. 23, chart 2300 indicates the hopping frequencies used in each frame of three superframes. The numbers shown in the rows "Sync" and "Hopset 1" are hopping frequency indices that identify a particular hopping frequency within a certain hopset. Each hopset is a different ordering of the overall set of hopping frequencies (e.g., a different ordering of the overall set of 63 hopping frequencies). In one example, each pairing of terminal devices could use a different hopset out of a predefined plurality of hopsets. One exemplary hopset s can be defined as $s=\{$32 17 44 24 45 1 35 58 33 3 60 57 20 38 46 22
54 15 5 7 11 41 30 19 13 21 29 42 47 4 34 26
52 48 49 55 31 18 14 62 61 12 56 53 16 8 63
59 28 27 51 50 36 10 25 2 9 39 40 37 23 6
43$\}$ where each element $s_i$ of hopset s identifies a particular hopping frequency, such as with the mapping function $f_i = f_0 + s_i * \Delta f$ with frequency spacing $\Delta f$ (e.g., $\Delta f = 400$ kHz) and base frequency $f_0$ (e.g., $f_0 = 902$ MHz). FIG. 24 shows the distribution of the hopping frequencies of s, where it can be seen that the distribution of s for with increasing index is pseudorandom.

The frequency indices i in chart 2300 therefore correspond to element $s_i$ of a particular hopset s. As shown by these indices, the data hopping sequences in each superframe follow the usage constraints introduced above. For example, the synchronization hopping sequence may use the same hopping frequency as hopping frequency 1 (e.g., element $s_i$ of an exemplary hopset s) for Superframe 1, may use hopping frequency 2 in Superframe 2, and may use hopping frequency 3 in Superframe 3. Looking first at Superframe 1 (e.g., superframe N), the data hopping sequence (shown by the frequency indices in the "Hopset 1" row) may exclude the hopping frequencies (e.g., hopping frequencies 1, 2, and 3) scheduled for use by the synchronization hopping sequence in Superframe 1 (taking the role of superframe N), Superframe 2 (e.g., superframe N+1) and Superframe 3 (e.g., superframe N+2). This usage constraint similarly holds for Superframe 2 (taking the role of superframe N), which excludes the hopping frequencies (e.g., hopping frequencies 2, 3, and 4) scheduled for use by the synchronization hopping sequence in Superframe 2 (e.g., superframe N), Superframe 3 (e.g., superframe N+1) and Superframe 4 (e.g., superframe N+2, not explicitly shown in FIG. 23). Likewise, the data hopping sequence in Superframe 3 excludes hopping frequencies 3, 4, and 5, which are scheduled for use by the synchronization hopping sequence in Superframes 3, 4, and 5.

Furthermore, the data hopping sequences shown in FIG. 23 likewise follow the usage constraint regarding hopping frequencies used by the data hopping sequence in previous superframes. Looking at Superframe 3 (taking the role of superframe N), the data hopping sequence also (in addition to excluding hopping frequencies scheduled for use by the synchronization hopping sequence in subsequent superframes) excludes the hopping frequencies (e.g., hopping frequencies 25-45) used by the data hopping sequence in Superframe 2 (e.g., superframe N−1). Furthermore, the data hopping sequence for Superframe 3 excludes the hopping frequencies used by the data hopping sequence in Superframe 1 (e.g., superframe N−2) except for three hopping frequencies: namely, hopping frequencies 1, 2, and 6. Hopping frequencies 1 and 2 can be used in frames 61 and 62 as they were not used by the data hopping sequence in Superframe 1 (e.g., as they were excluded due to their use by the synchronization hopping sequence in Superframes 1 and 2). The next hopping frequencies, namely hopping frequencies 3, 4, and 5, cannot be used by the data hopping sequence as they are used by the synchronization hopping sequence in Superframes 3 (e.g., superframe N), 4 (e.g., superframe N+1), and 5 (e.g., superframe N+2). While hopping frequency 6 was used by the data hopping sequence in Superframe 1, this was 60 frames=19980 ms in the past, which is more than the dwell time limit. Accordingly, the data hopping sequence can use hopping frequency 6 in frame 63 of Superframe 3. The data hopping sequence can therefore use hopping frequencies 1, 2, and 6 in Superframe 3 while still complying with dwell-time rules.

Figure 25:
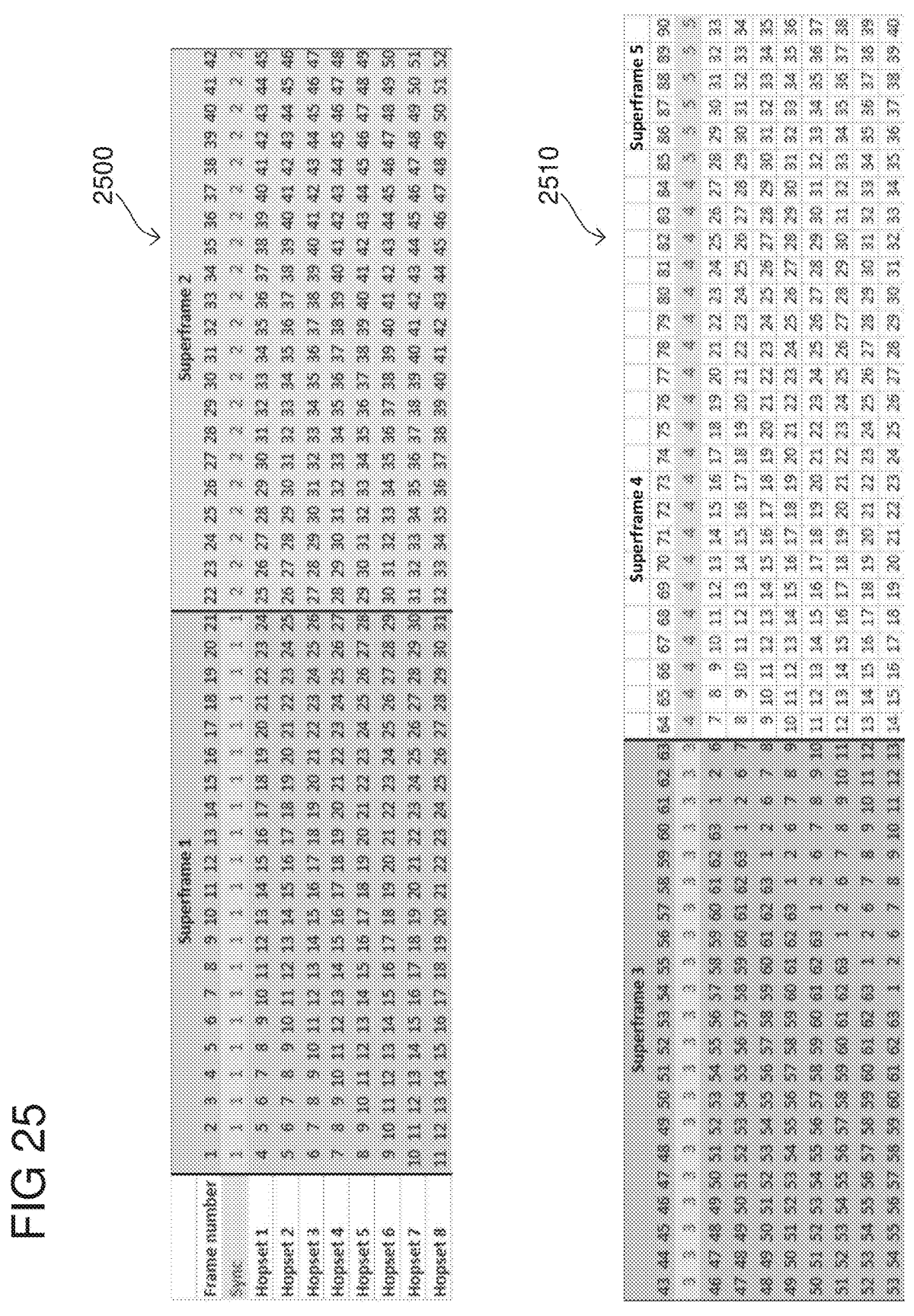

FIG. 25 shows exemplary charts 2500 and 2510 according to some aspects, which expand this concept to show the data hopping sequence used in Superframes 4 and 5. As shown for Superframe 4 (e.g., superframe N), the data hopping sequence may exclude hopping frequencies used by the data hopping sequence in Superframe 3 (e.g., superframe N−1). The data hopping sequence may also exclude all but three hopping frequencies used by the data hopping sequence in Superframe 2 (e.g., superframe N−2), namely hopping frequencies 25, 26, and 27. As shown by chart 2510, hopping frequencies 25, 26, and 27 were used by the data hopping sequence in the first three frames of Superframe 2 (e.g., superframe N−2). The example shown and described for FIG. 23 and Superframe 3 therefore relates to the case where the hopset "wraps around," (e.g., where the hopping frequencies with lowest logical indices are re-used). In this wrap-around case, the data hopping sequence used the hopping frequencies from the synchronization hopping sequence in frames N−1 and N−2 (e.g., hopping frequencies 1 and 2) as well as the first hopping frequency used by the data sequence in superframe N−2 is not excluded based on scheduled usage by the synchronization hopping sequence (e.g., hopping frequency 6, because hopping frequencies 3, 4, and 5 are excluded due to their scheduled use by the synchronization hopping sequence). In the non-wrap-around case of Superframe 4, the data hopping sequence in superframe N may exclude the hopping frequencies used by the data hopping sequence in superframe N−1 and the hopping frequencies used by the data hopping sequence in superframe N−2 except for the first three hopping frequencies (e.g., hopping frequencies 25, 26, and 27, which were used in the first three frames of Superframe 2 and are thus used in the last three frames of Superframe 4). As can be seen from charts 2500 and 2510, all 63 hopping frequencies are used evenly. This hopping frequency usage by the data hopping sequence thus can both satisfy dwell time rules and yield an equal usage of all of the overall set of hopping frequencies per hyperframe.

Synchronization slaves may be able to use this data hopping sequence in Superframe 3 without modification; however, synchronization masters may blank transmission (e.g., not transmit data) in frames 61-63 as frequencies 1, 2, and 6 are used by the synchronization hopping sequence within a ±20 second window (e.g., in Superframes 1, 2, and 6).

Figure 26:
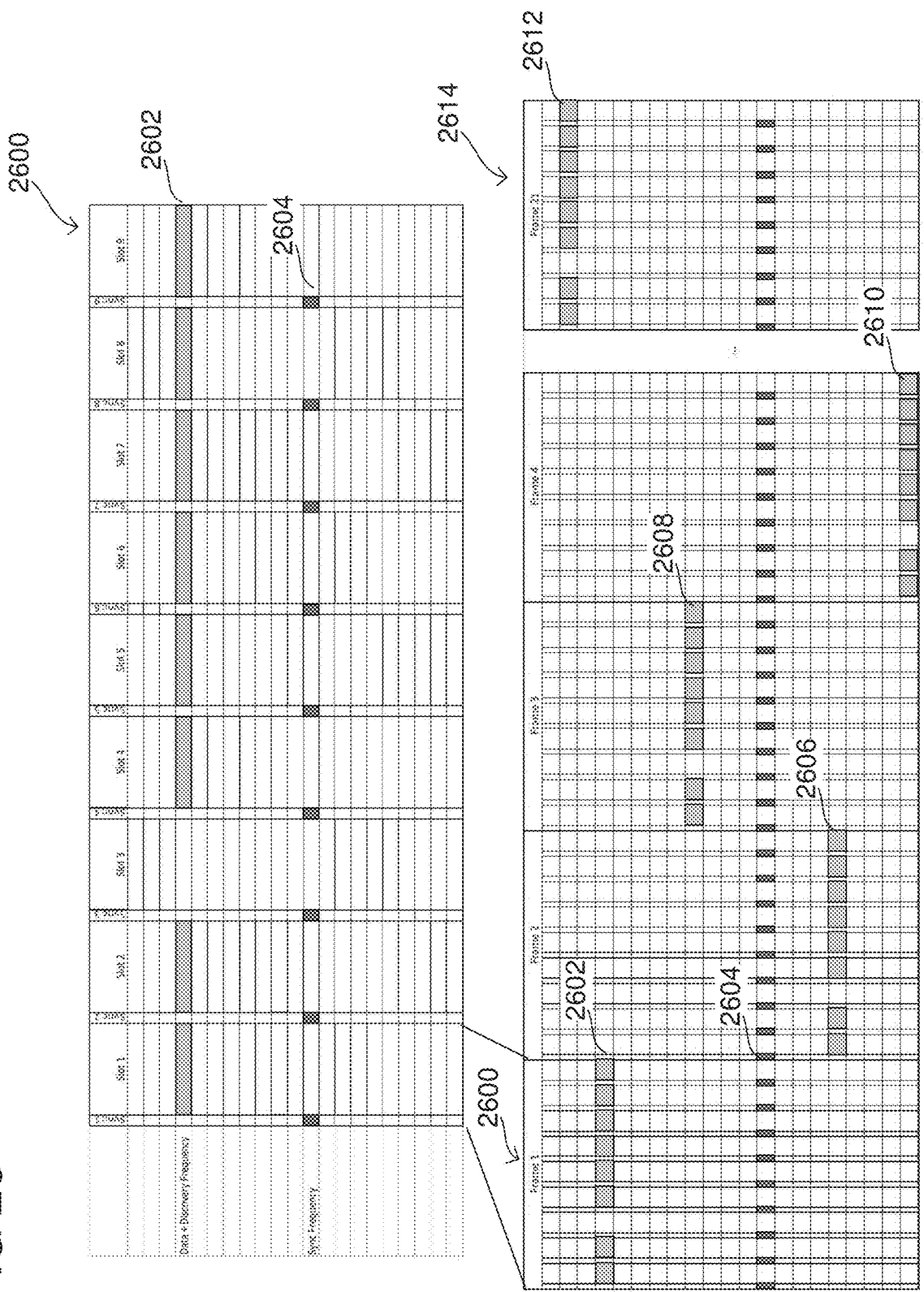
FIG. 26 shows an exemplary diagram of transmissions in various slots and frames of a superframe according to some aspects.

FIG. 26 shows exemplary frame 2600 and superframe 2614 according to some aspects, which illustrate concurrent transmission of synchronization signals and data at synchronization master 1902. Frame 2600 shows synchronization signal and data transmission within a frame (e.g., over 9 slots of the subframe), while superframe 2614 shows synchronization signal and data transmission over a superframe (e.g., over 21 frames of a superframe, including frame 2600 as Frame 1 of superframe 2614). As described above, the data hopping sequence may hop every frame, while the synchronization hopping sequence may hop every superframe. Accordingly, both the data hopping sequence and the synchronization hopping sequence remain fixed during each frame. This is illustrated by frame 2600, which depicts usage of hopping frequency 2602 by synchronization master 1902 to transmit and/or receive data and discovery signals during frame 2600 and usage of hopping frequency 2604 to transmit synchronization bursts. Accordingly, in the example of FIG. 26, hopping frequency 2604 may be the current hopping frequency of the synchronization hopping sequence, and may be used by the synchronization hopping sequence to transmit synchronization bursts for the entirety of superframe 2614. Hopping frequency 2602 may be the hopping frequency used by the data hopping sequence in frame 2602, where the data hopping sequence may hop frequencies every frame. Accordingly, as shown in superframe 2614, the data hopping sequence may switch to hopping frequency 2606 in Frame 2 of superframe 2614, to hopping frequency 2608 in Frame 3 of superframe 2614, to hopping frequency 2610 in Frame 4 of superframe 2614, and so forth until eventually switching to hopping frequency 2612 in Frame 21 of superframe 2614.

Synchronization master 1902 may therefore use a data hopping sequence that switches hopping frequencies each frame while using a synchronization hopping sequence that uses a same hopping frequency throughout each superframe. Synchronization slaves 1904-1908 may use a similar data hopping sequence (but may not transmit synchronization bursts).

Accordingly, as described above this frequency hopping scheme may apply certain usage constraints to the data hopping sequences based on hopping frequency usage in neighboring superframes. This can therefore enable terminal devices using this frequency hopping scheme to comply with FCC dwell time rules as well as FCC pseudo-randomness and equal usage requirements.

Figure 27:
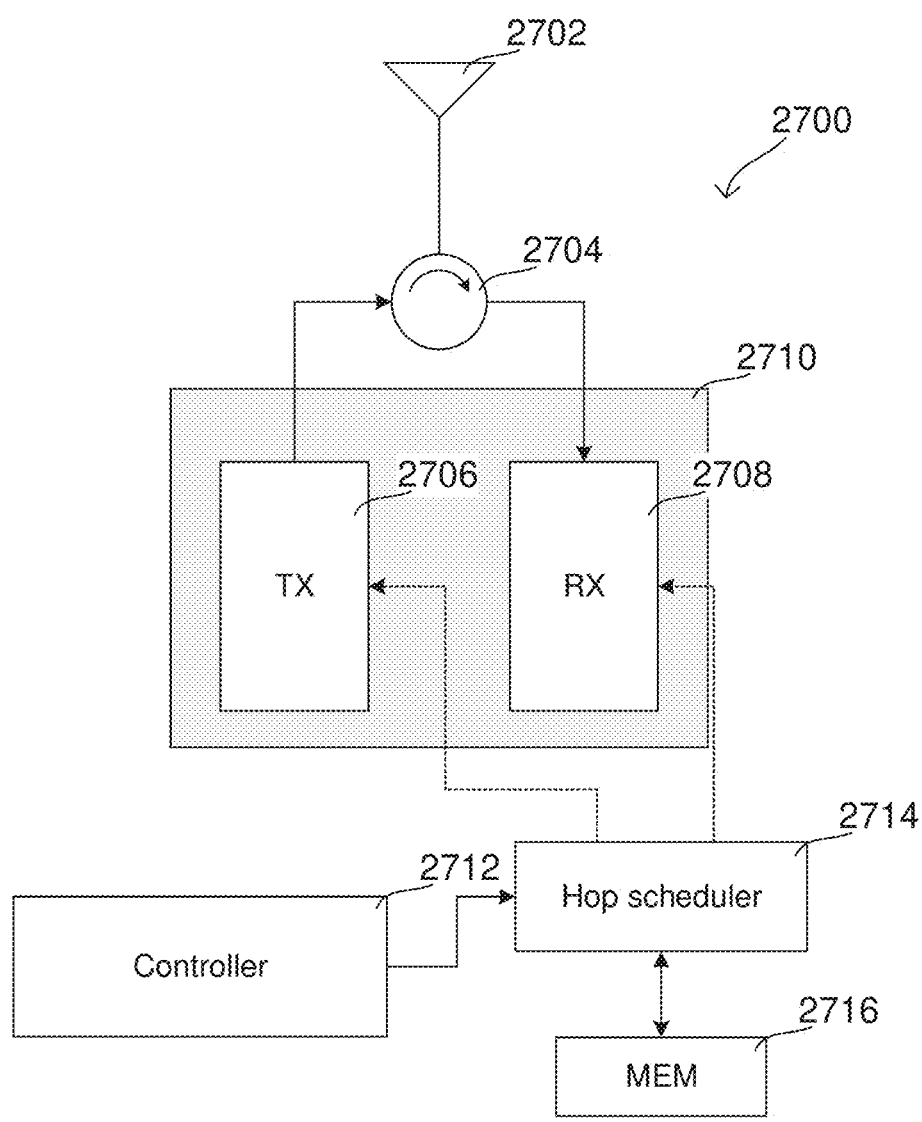
FIG. 27 shows an exemplary internal configuration of a terminal device for frequency hopping according to some aspects.

FIG. 27 shows an exemplary internal configuration of terminal device 2700 according to some aspects. In some aspects, one or more of terminal devices 1902-1908 can be configured in the manner of terminal device 2700. As shown in FIG. 27, terminal device 2700 may include antenna system 2702, duplexer 2704, transceiver 2710 (including transmitter 2706 and receiver 2708), controller 2712, hop scheduler 2714, and sequence memory 2716. Antenna system 2702 may include one or more antennas that are configured to transmit and receive wireless signals. Duplexer 2704 may be a duplexer configured to enable transmitter 2706 to transmit signals via antenna system 2702 and receiver 2708 to receive signals via antenna system 2702.

Transceiver 2710 may include transceiver 2706 and receiver 2708. Transmitter 2706 may be a transmitter including various transmission components of terminal device 2700. This can include, for example, an RF transceiver with a power amplifier, physical layer transmission circuitry and controllers, and/or baseband modem transmission components. Receiver 2708 may be a receiver including various reception components of terminal device 2700. This can include, for example, an RF transceiver with a low-noise amplifier, physical layer reception circuitry and controllers, and/or baseband modem reception components. Transceiver 2710 is can therefore include any one or more of RF components, physical layer components, or baseband modem components, and is not specifically limited to exclusively including any one of these types of components.

As shown in FIG. 27, hop scheduler 2714 may provide control signals to transmitter 2706 and receiver 2708 that control transmitter 2706 and receiver 2708 to transmit and receive on certain hopping frequencies at certain times. Accordingly, hop scheduler 2714 may be configured to control transmitter 2706 and receiver 2708 to follow a particular frequency hopping scheme. As described above, this frequency hopping scheme can include a data hopping sequence (e.g., used when terminal device 2700 is transmitting and receiving communication data with another terminal device) and/or a synchronization hopping scheme (e.g., when terminal device 2700 is a synchronization master configured to transmit synchronization signals or is a synchronization slave configured to receive synchronization signals). Hop scheduler 2714 may therefore use its control interface to transmitter 2706 and receiver 2708 to specify the hopping frequency at specific points in time.

For example, with reference to superframe 2614 of FIG. 26, terminal device 2700 may be a synchronization master. As previously described for superframe 2614, the synchronization hopping sequence may use hopping frequency 2604 throughout the duration of superframe 2614. Accordingly, hop scheduler 2714, following the synchronization hopping sequence, may use the control interface to control transmitter 2706 to use hopping frequency 2604 during superframe 2614. Transmitter 2706 may therefore transmit the synchronization signal (e.g., a series of synchronization bursts) on hopping frequency 2604 as shown in FIG. 26. The synchronization hopping sequence may specify a next hopping frequency for the next superframe (e.g., the superframe immediately following superframe 2614). Hop scheduler 2714 may therefore specify this next hopping frequency to transmitter 2706 (via control signals over the control interface) in the next superframe. Transmitter 2706 may therefore follow the control signals and use this next hopping frequency to transmit the synchronization signal during the next superframe.

In some cases, terminal device 2700 may also be transmitting and receiving data while it is a synchronization master (e.g., synchronization master 1902 in FIG. 19 when it is in a pairing with terminal device 1904). Accordingly, terminal device 2700 may follow a data hopping sequence that controls which hopping frequencies to use in each given frame. With reference again to superframe 2614 in FIG. 26, the data hopping sequence in this example may hop each frame from hopping frequencies 2602, 2606, 2608, 2610 and so forth until reaching hopping frequency 2612. Accordingly, hop scheduler 2714 may use the control interface to instruct transmitter 2706 and receiver 2708 to use the corresponding hopping frequency of the data hopping sequence for each frame. Transmitter 2706 and receiver 2708 may therefore follow the hopping of the data hopping sequence according to the order of hopping frequencies specified by hop scheduler 2714. Accordingly, transmitter 2706 and receiver 2708 may transmit and receive data (e.g., communication, control, and/or discovery, such as described above for FIG. 22) during each frame on the scheduled hopping frequency of the data hopping sequence.

In some aspects, hop scheduler 2714 may be configured to use predetermined data and synchronization hopping sequences, while in other aspects hop scheduler 2714 may be configured to dynamically determine the data and synchronization hopping sequences. In the case of predetermined data and synchronization hopping sequences, hop scheduler 2714 may be configured to retrieve scheduling data for the predetermined data and synchronization hopping sequences from sequence memory 2716. For example, scheduling data for a given data hopping sequence may specify the scheduled hopping frequency of the data hopping sequence for each of a plurality of frames (e.g., given the per-frame hopping of the data hopping sequence). The scheduling data for a given synchronization hopping sequence may specify the scheduled hopping frequency of the synchronization hopping sequence for each of a plurality of superframes (e.g., given the per-superframe hopping of the synchronization hopping sequence). Accordingly, hop scheduler 2714 may be configured to retrieve the scheduling data (which is precomputed) from sequence memory 2716 for a particular synchronization hopping sequence and/or data hopping sequence (depending on the current activity of terminal device 2700), and to use the scheduling data to generate the control signals used to control the hopping frequencies at transmitter 2706 and receiver 2708.

In the case of dynamic determination of synchronization and data hopping sequences, hop scheduler 2714 may be configured to dynamically determine the scheduling data for particular synchronization and/or data hopping sequences (e.g., in contrast to retrieving precomputed scheduling data from sequence memory 2716). In some aspects, hop scheduler 2714 may therefore be configured to use fixed rules that govern the synchronization and/or data hopping sequences to compute the corresponding scheduling data. For example, in some aspects, hop scheduler 2714 may be configured to select, from an overall set of hopping frequencies, a hopping frequency for a synchronization hopping sequence to use in each superframe (e.g., select, from an overall set of 63 hopping frequencies, one hopping frequency to use in each of a respective 63 superframes). Then, hop scheduler 2714 may be configured to select, from the overall set of hopping frequencies, hopping frequencies for a data hopping sequence to use in each frame of a given superframe where the data hopping sequence in each superframe follows the usage constraints described above. In other words, hop scheduler 2714 may be configured to select hopping frequencies for each given superframe where the data hopping sequence excludes 1) hopping frequencies scheduled for use in by the synchronization hopping sequence one or more superframes immediately following the given superframe (e.g., superframes N, N+1, and N+2 for a given superframe N), and 2) hopping frequencies used by the data hopping sequence in one or more superframes immediately preceding the given superframe (e.g., superframes N−1 and N−2 for a given superframe N) except for one or more initial hopping frequencies used by the data hopping sequences in the earliest occurring of the one or more superframes (e.g., the initial hopping frequencies used by the data hopping sequence in superframe N−1). Hop scheduler 2714 can therefore be configured to dynamically determine the synchronization and/or data hopping sequences.

Hop scheduler 2714 may therefore be configured to obtain scheduling data for the synchronization and/or data hopping sequences, such as by either retrieving precomputed scheduling data from sequence memory 2716 or by dynamically determining the scheduling data based on fixed rules for the synchronization and/or data hopping sequences.

Figure 28:
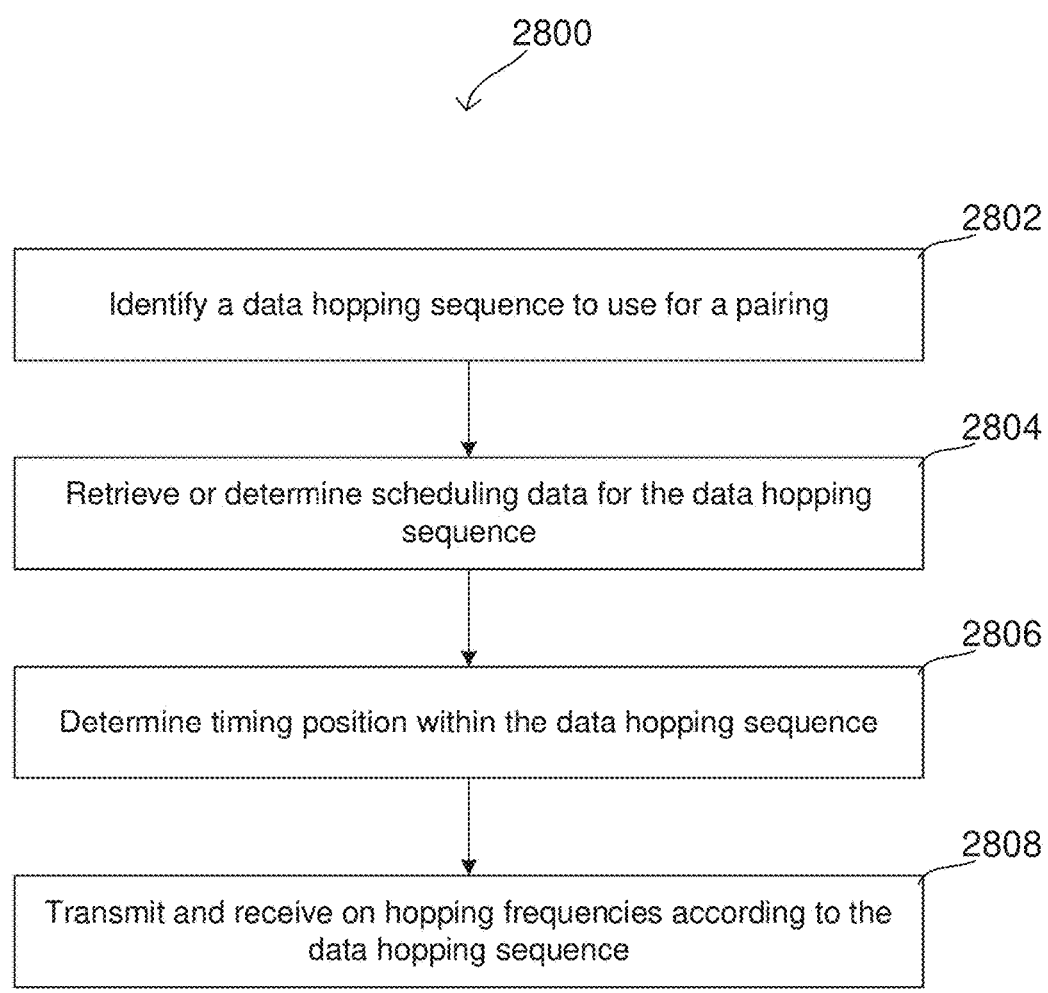
FIG. 28 shows an exemplary procedure for selecting and using data hopping sequences according to some aspects.

In some aspects, controller 2712 may be configured to specify the synchronization and/or data hopping sequences to hop scheduler 2714. FIG. 28 shows exemplary flow chart 2800 according to some aspects, which describes the procedure of selecting and using data hopping sequences at terminal device 2700. As shown in FIG. 28, controller 2712 may first identify a data hopping sequence to use for a pairing in stage 2802. For example, terminal device 2700 may have initially established a pairing with another terminal device (e.g., by performing a discovery procedure using an exchange of discovery initiation and discovery response messages), and may thus identify a data hopping sequence to use to exchange data with the other terminal device of the pairing. Accordingly, controller 2712 may select a data hopping sequence, such as from a predefined set of data hopping sequences. In some aspects, the predefined set of data hopping sequences may be orthogonal to each other (e.g., use different frequencies at each given time), and accordingly different pairings may be able to use different data hopping sequences of the predefined set to communicate with each other. In some aspects, controller 2712 may be configured to identify the data hopping sequence in stage 2802 based on a device ID, such as the device ID of terminal device 2700. For example, selection of data hopping sequences from the predefined set of data hopping sequences may be based on device ID, where each terminal device may use its own device ID as a basis for selecting one of the predefined set of data hopping sequences.

In some aspects, controller 2712 may select a sequence index in stage 2802 that uniquely identifies the data hopping sequence, such as where each of the predefined set of data hopping sequences has a unique sequence index. Controller 2712 may then provide this sequence index to hop scheduler 2714. Hop scheduler 2714 may then obtain the scheduling data for the selected data hopping sequence using its sequence index in stage 2804. For example, in aspects where hop scheduler 2714 uses precomputed scheduling data stored in sequence memory 2716, sequence memory 2716 may store scheduling data for each of the predefined set of hopping sequences. Hop scheduler 2714 may access sequence memory 2716 using the sequence index, and retrieve the scheduling data paired with the sequence.

In aspects where hop scheduler 2714 dynamically determines the scheduling data for the data hopping sequence, hop scheduler 2714 may determine the scheduling data for the hopping sequence based on the sequence index in stage 2804. For example, as previously described the sequence index may uniquely identify a data hopping sequence from a predefined set of data hopping sequences. Hop scheduler 2714 may therefore generate the scheduling data using fixed rules of the data hopping sequences using the sequence index.

After obtaining the scheduling data for the data hopping sequence, hop scheduler 2714 may determine the current timing position within the data hopping sequence in stage 2806. For example, the data hopping sequence may specify a certain hopping frequency based on the current system frame number of the device network. This can be used to ensure orthogonality between the data hopping sequences, where each data hopping sequence uses a different one of the overall set of hopping frequencies at each system frame of the device network. Accordingly, in stage 2806 hop scheduler 2714 may be configured to use the current system frame number of the device network (e.g., broadcasted by synchronization masters as system information in the synchronization signal) to determine the current timing position within the data hopping sequence (e.g., which frame to start at).

Hop scheduler 2714 may then use the control interface with transmitter 2706 and receiver 2708 to control transmitter 2706 and receiver 2708 to transmit and receive on hopping frequencies according to the data hopping sequence in stage 2808. Accordingly, hop scheduler 2714 may switch the hopping frequency during each frame according to the data hopping sequence, and transmitter 2706 and 2708 may consequently transmit and receive while following the data hopping sequence.

In some cases where terminal device 2700 is a synchronization master, hop scheduler 2714 may be configured to control dynamic blanking. For example, as previously indicated there may be scenarios where a hopping frequency scheduled for use in the data hopping sequence was used by terminal device 2700 as part of the synchronization hopping sequence within a ±20 second window. Hop scheduler 2714 may therefore be configured to check the hopping frequencies scheduled for use by the data hopping sequence to determine whether any of these hopping frequencies were previously used by the synchronization hopping sequence within a predefined past interval (e.g., 20 seconds in the past) or within a predefined upcoming interval (e.g., 20 seconds in the future). If hop scheduler 2714 identifies any of these blanking hopping frequencies, hop scheduler 2714 may send control signals to transmitter 2706 that instruct transmitter 2706 to blank transmission (e.g., to forego transmission) during the frames for which the blanking hopping frequencies are scheduled.

The aspects described above therefore use data hopping sequences in each superframe that selectively exclude certain hopping frequencies based on their past or upcoming usage. As described regarding these aspects, this can help to comply with various dwell time requirements while still making hopping resources available for terminal devices to exchange data and maintain synchronization. In other aspects of this disclosure, terminal devices can use a different frequency hopping scheme with a similar goal of complying with dwell time requirements.

With reference to these other aspects, terminal devices may likewise use a tiered frame structure for this frequency hopping scheme, where the frame structure includes frames, superframes composed of frames, and hyperframes composed of superframes. In one example, the number of frames P inside each superframe can be set to P=63 (in contrast to P=21 in other aspects) and the number of superframes M inside a hyperframe can be set to M=21 (in contrast to M=63 in other aspects). An overall set of hopping frequencies containing 63 total hopping frequencies can also be used. As further described below, the frequency hopping scheme can be organized in a special manner where certain hopping frequencies are allocated for synchronization, discovery, guard frequencies, and data in each superframe, and where this allocation cyclically shifts in each superframe.

Figure 29:
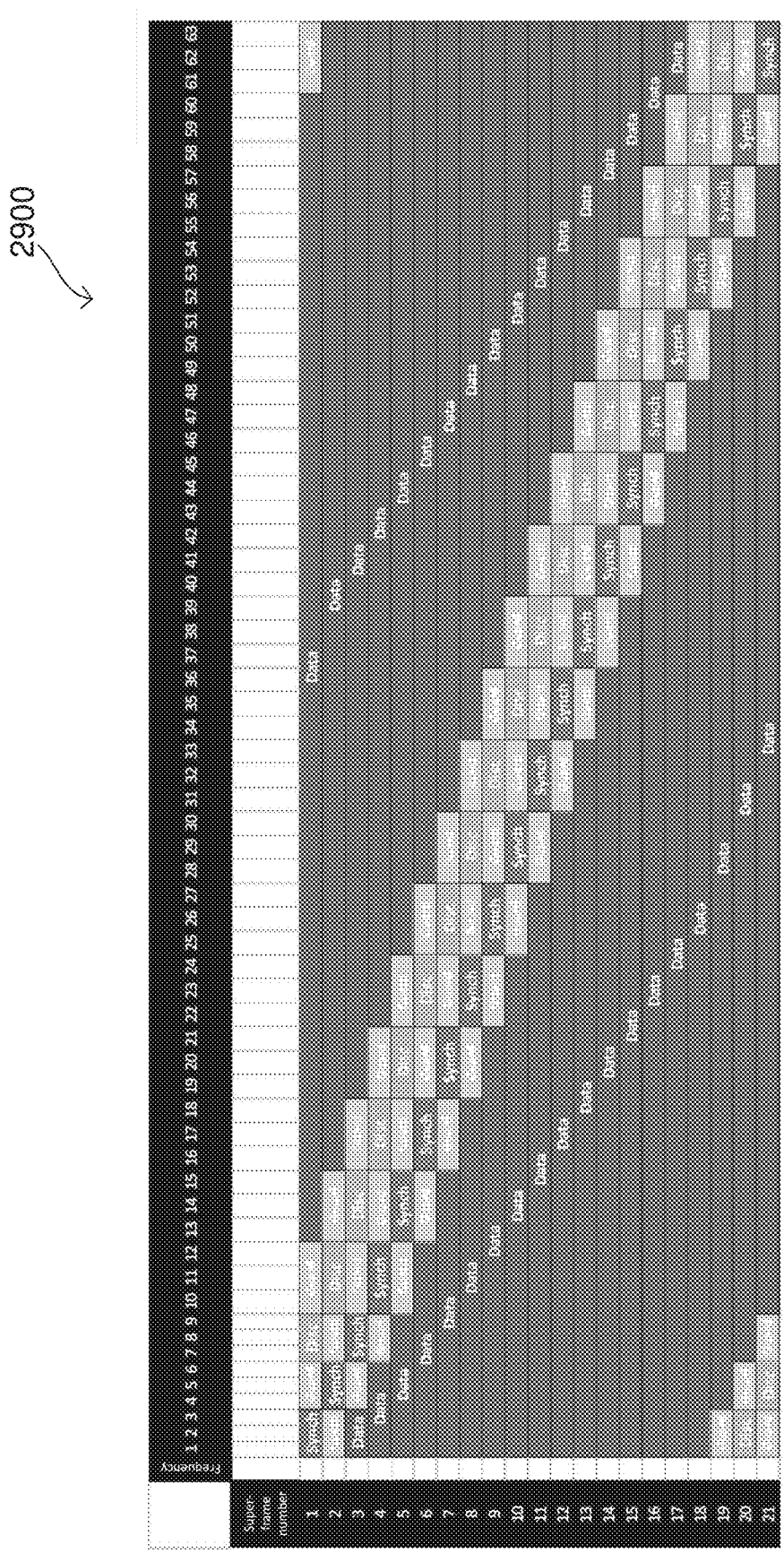
FIG. 29 shows an exemplary frequency chart across multiple superframe of a hyperframe according to some aspects.

FIG. 29 shows exemplary frequency chart 2900 according to some aspects, which illustrates this cyclically shifting allocation scheme. The horizontal "Frequency" axis includes the numerals 1-63, each of which refers to a logical index of a randomly-generated root hopping sequence. For example, the overall set of hopping frequencies (e.g., 63 in total) can be rearranged in a random manner (e.g., randomly ordered) to generate the root hopping sequence. The logical indices therefore refer to the hopping frequency that, after the random ordering is applied, is positioned at the corresponding position in the root hopping sequence. For example, if 63 hopping frequencies are randomly ordered to obtain the root hopping sequence, logical index 1 would identify the hopping frequency that is positioned first in the root hopping sequence, logical index 2 would identify the hopping frequency that is positioned second in the root hopping sequence, and so forth up to logical index 63 that identifies the hopping frequency positioned last in the root hopping sequence. Use of such randomly-generated root hopping sequences can therefore ensure randomization of hopping (e.g., in accordance with a short-term randomness rule issued by a regulatory body such as the FCC). The following description will use logical indices to refer to the hopping frequencies, with the understanding that each logical index refers to the hopping frequency in the corresponding position of the root hopping sequence.

While the horizontal "Frequency" axis depicts hopping frequencies, the vertical "Superframe" index goes over superframe numbers, such as for superframes 1-21 that compose a given hyperframe. As shown in frequency chart 2900, certain subsets of the overall set of frequencies in each superframe are allocated to synchronization ("Synch"), discovery ("Disc"), guard frequencies ("Guard"), and data ("Data"). However, the allocation does not stay constant, and instead the specific subset allocation cyclically shifts in each superframe. For example, as shown for Superframe 1, hopping frequencies 1-3 (i.e., the hopping frequencies at logical indices 1-3 of the root hopping sequence) are allocated to synchronization, hopping frequencies 4-6, 10-12, and 61-63 are allocated to guard frequencies, hopping frequencies 7-9 are allocated to discovery, and hopping frequencies 13-60 are allocated for data. This subset allocation then cyclically shifts by three hopping frequencies for Superframe 2, three hopping frequencies for Superframe 3, three hopping frequencies for Superframe 4, and four hopping frequencies for each of Superframes 5-21. As shown in FIG. 29, this ensures that no hopping frequency is used for synchronization or discovery in immediately succeeding superframes. Accordingly, each of the overall set of hopping frequencies is used exactly once for synchronization and once for discovery in each hyperframe (with Superframes 1-21 composing a given hyperframe). The placement of guard frequencies between the sync subset allocation (e.g., the subset of the overall set of hopping frequencies allocated to synchronization in a given superframe) and the discovery subset allocation (e.g., the subset of the overall set of hopping frequencies allocated to discovery in a given superframe), between the discovery subset allocation and the data subset allocation (e.g., the subset of the overall set of hopping frequencies allocated to data in a given superframe), and between the data subset allocation and the synchronization subset allocation offers separation between the various subset allocations so that, after cyclically shifting the subset allocations each superframe, there are no overlaps between the same subset allocation (e.g., the synchronization subset allocation uses different hopping frequencies in each subsequent superframe and the discovery subset allocation uses different hopping frequencies in each subsequent superframe).

Terminal devices using this frame structure, such as terminal devices 1902-1908 of device network 1900 in FIG. 19, may therefore use the synchronization and discovery subset allocations in each superframe to perform synchronization and discovery as applicable. The synchronization and discovery subset allocations over the superframes can be considered the synchronization hopping sequence and the discovery hopping sequence, respectively, where the synchronization hopping sequence hops to a different synchronization subset allocation in each superframe and the discovery hopping sequence hops to a different discovery subset allocation in each superframe.

The synchronization and discovery hopping sequences may be considered common hopping sequences, as the terminal devices in a given device network may all share a common synchronization and discovery hopping sequence (e.g., may follow the same synchronization and discovery hopping sequence, or in other words, may use the same synchronization subset allocation and the same discovery subset allocation in each superframe). The synchronization and discovery subset allocations may likewise be considered common subset allocations, as they are shared by the terminal devices of a device network in each superframe.

As shown in FIG. 29, each superframe may also have its own data subset allocation (e.g., a specific subset of the overall set of hopping frequencies that are allocated for data transfer between terminal devices). In the example of FIG. 29, the data subset allocation in each superframe may be a contiguous sequence of 48 hopping frequencies (e.g., 48 subsequent logical indices of the root hopping sequence). For example, the data subset allocation may be hopping frequencies 13-60 in Superframe 1, hopping frequencies 16-63 in Superframe 2, hopping frequencies 19-63 and 1-3 in Superframe 3 (per the cyclic shift). Accordingly, the data subset allocation may follow the same cyclic shift as the synchronization and discovery subset allocations each superframe (e.g., cyclically shifting either three or four hopping frequencies).

The data subset allocation may therefore be a specific subset of the overall set of hopping frequencies that are available to terminal devices for data exchange in a given superframe. As previously indicated, in some aspects the terminal devices may communicate in pairings, where each pairing uses a particular data hopping sequence selected from a predefined set of data hopping sequences. These data hopping sequences in a single superframe can be referred to as hopsets, where there may be a predefined set of hopsets for a given superframe and each hopset is available for a pairing of terminal devices to use for data exchange. As the data subset allocation, i.e., the hopping frequencies available for data exchange in a given superframe, are the same for all terminal devices, the predefined set of hopsets in each frame may be orthogonal patterns composed of the hopping frequencies in the data subset allocation.

Figure 30A:
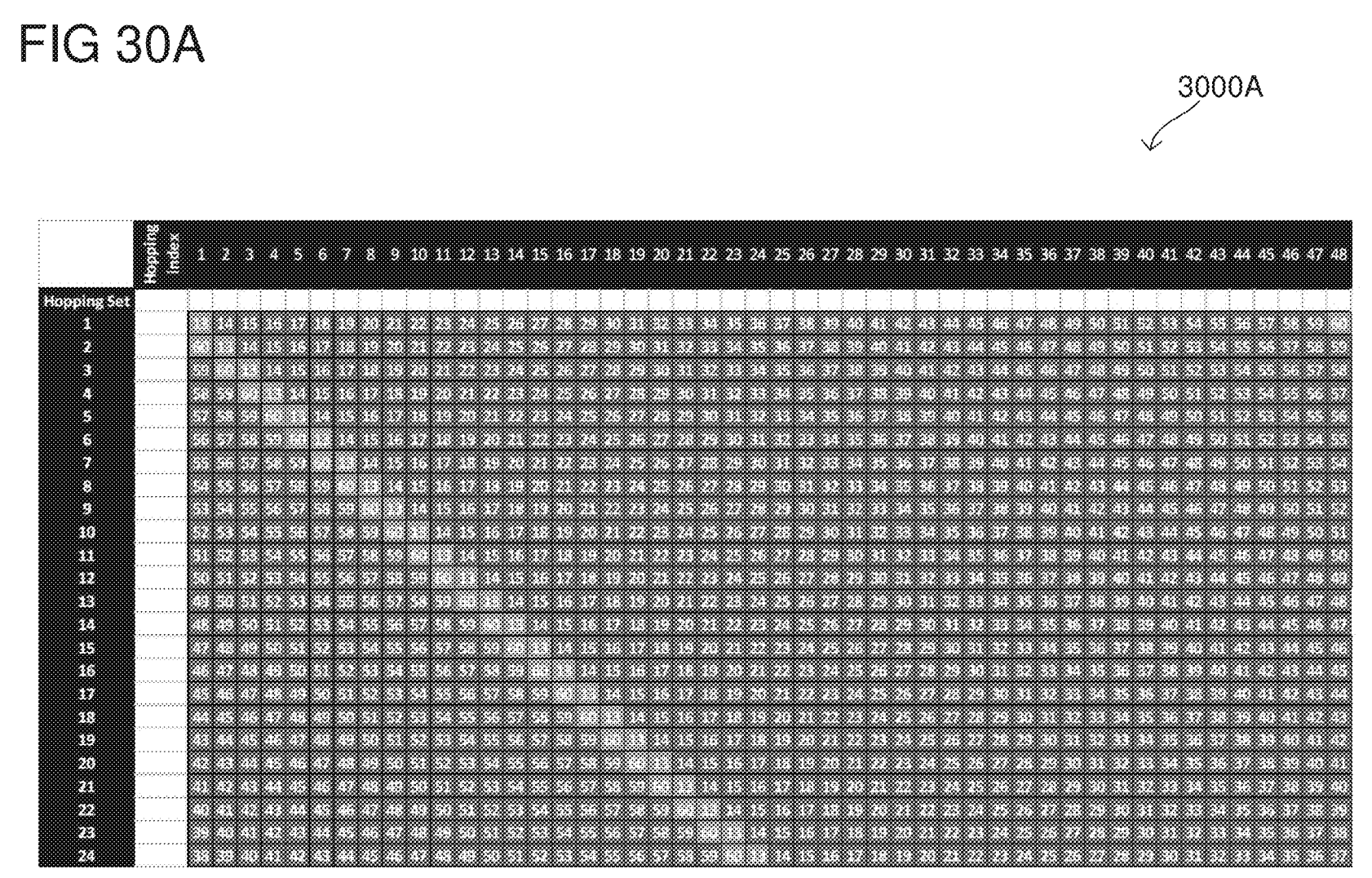
Figure 30B:
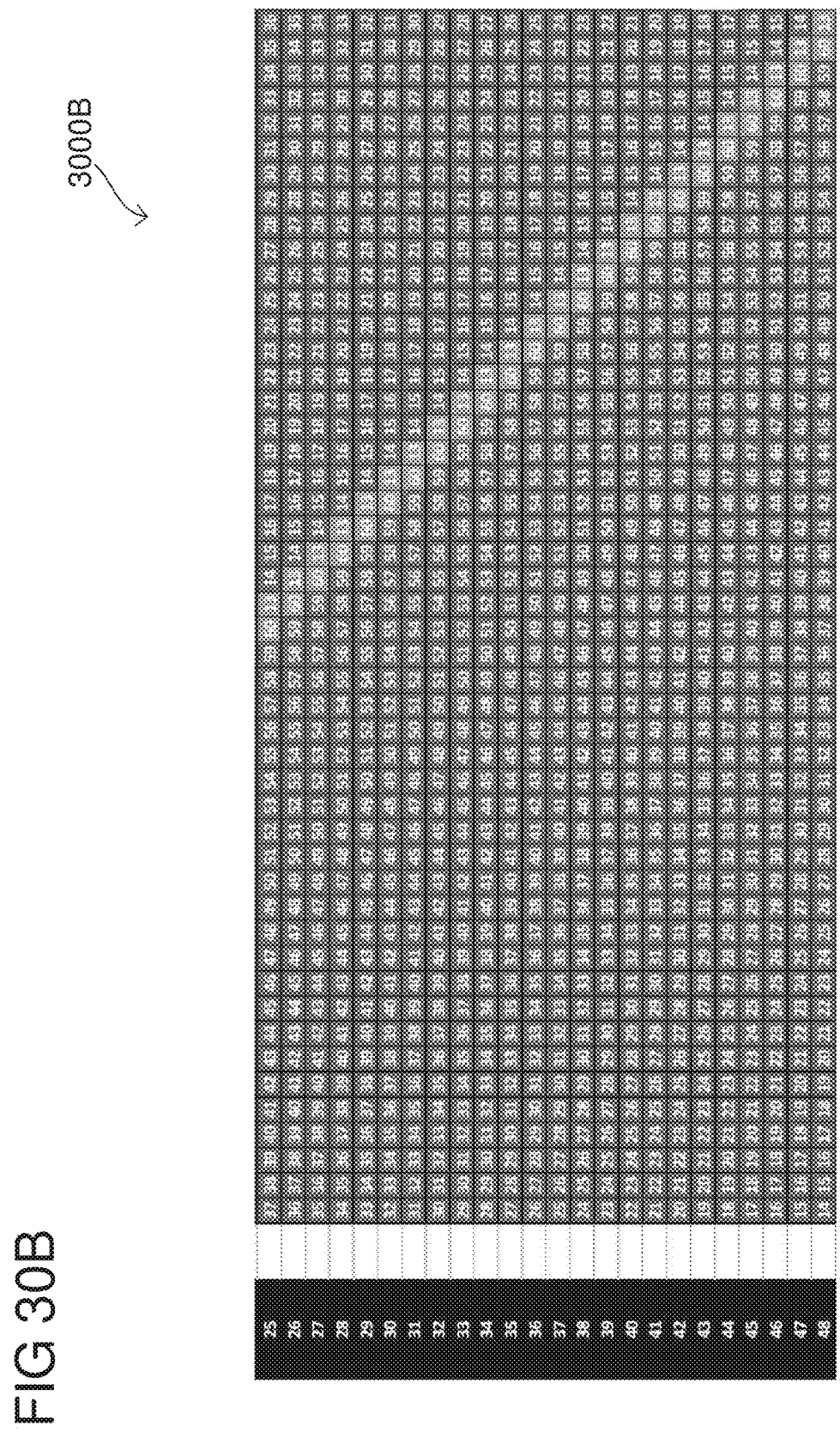

FIGS. 30A and 30B show exemplary hopset charts 3000A and 3000B according to some aspects, which illustrate a predefined set of hopsets for a given superframe. The vertical "Hopping Set" axis identifies each of the hopsets, while the horizontal "Hopping Index" axis gives the hopping index used by the data hopping sequence to hop between the hopping frequencies in a given hopset. This is further described below. As shown for the example of FIGS. 30A and 30B, there may be 48 hopsets, which may each be available to a single pairing of terminal devices to use. The example of FIGS. 30A and 30B may correspond to Superframe 1 of FIG. 29. Accordingly, each hopset may use the data subset allocation for Superframe 1, namely hopping frequencies 13-60 (which, as previously described, refer to logical indices of hopping frequencies within the root hopping sequence). This is shown by the elements of hopset charts 3000A and 3000B, which contain the logical indices 13-60. As can be seen in the columns of hopset charts 3000A and 3000B, each hopset uses a different hopping frequency for each hopping index, thus yielding a predefined set of hopsets that are orthogonal.

Pairings of terminal devices may therefore use a particular hopset for data transfer in a given superframe. However, in this example, there are more hops in each superframe than there are hopping frequencies in a hopset. As previously described for this example, there may be 63 hops in a given superframe (i.e., one per frame), while each hopset only includes 48 hopping frequencies. The data hopping sequence used by each pairing may therefore re-use some of the hopping frequencies in the hopset in each superframe, and may therefore be able to execute 63 hops per superframe.

Figure 31:
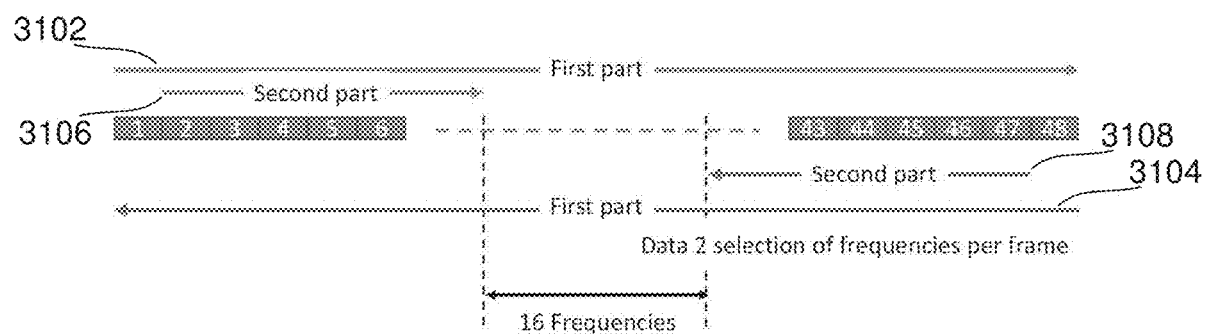
FIG. 31 shows an exemplary data hopping sequence using a counter-directional progression according to some aspects.

FIG. 31 illustrates an exemplary data hopping sequence using these hopsets according to some aspects. Similar to the example of FIG. 22, these aspects may provide two separate data channels for pairings to transmit and receive on. However, where the case of FIG. 22 used time duplexing to arrange the separate data channels (e.g., where different slots in time were assigned to data channel 1 or data channel 2), the aspects presently being described may use frequency duplexing to arrange the separate data channels. In other words, during each frame of a superframe, a first hopping frequency of the hopset may be used for data channel 1 while a second hopping frequency of the hopset may concurrently be used for data channel 2. For example, as shown in FIG. 31, the data hopping sequence (for a given pairing using a particular hopset) may use the hopping indices of the hopset (shown in the horizontal "Hopping Index" axis of hopset charts 3000A and 3000B) to control the hopping progression. Accordingly, the data hopping sequence may use hopping index 1 (referring to the logical index stored in hopping index 1 for the hopset, e.g., logical index 13 for hopping index 1 of hopset 1 in FIG. 30A, which in turn refers to the actual hopping frequency that is at logical index 1 of the root hopping sequence) for the first data channel in frame 1 and hopping index 48 (likewise referring to the logical index stored in hopping index 1 for the hopset, e.g., logical index 60 for hopping index 48 of hopset 1 in FIG. 30A) for the second data channel frame 1. Then, the data hopping sequence may use hopping index 2 for the first data channel in frame 2 and hopping index 47 for the second data channel in frame 2. The data hopping sequence may then use hopping index 3 for the first data channel in frame 3 and hopping index 46 for the second data channel in frame 3. The data hopping sequence may continue on this progression for each frame, namely by incrementing the hopping index used for the first data channel by one per frame (e.g., where the hopping index in each frame is higher than the hopping index from the preceding frame) and decrementing the hopping index used for the second data channel by one per frame (e.g., where the hopping index in each frame is lower than the hopping index from the preceding frame). This counter-directional progression of the data hopping sequence shown by arrows 3102 ("First part," starting from hopping index 1 on the left-hand side) for the first data channel and arrow 3104 ("First part," starting from hopping index 48 on the right-hand side).

The data hopping sequence (for each hopset) may therefore use this counter-directional progression for the first and second data channels over the first 48 hops of each superframe (e.g., using each hopping frequency in the data subset allocation for the current superframe a single time). As can be seen from examination of the hopping frequencies at each logical index of each hopset in hopset charts 3000A and 3000B, the counter-directional progression may yield orthogonal hopsets.

This may be referred to as the 'first part' of the data hopping sequence, as the data hopping sequence uses each hopping index of the hopset one time for the first data channel and one time for the second data channel. The data hopping sequence may then execute its second part, namely by re-using certain hopping indices for the remaining hops (e.g., 15 hops, one per frame) of the superframe. As shown by arrows 3106 ("Second part," on the left-hand side) and 3108 ("Second part," on the right-hand side) in FIG. 31, the second part of the data hopping sequence may again use a counter-directional progression for the first and second data channels (e.g., where the hopping index for the first data channel increments each frame and the hopping index for the second data channel decrements each frame). However, whereas the counter-directional progression of the first part of the data hopping sequence started at hopping indices 1 and 48 (e.g., the first and last hopping indices, at opposite ends of the hopset), the counter-directional progression of the second part may start at hopping indices 2 and 47 (e.g., the second and second-to-last hopping indices, also the same as the second hopping indices used in the first part of the data hopping sequence). The data hopping sequence may then use hopping index 3 for the first data channel in the next frame and hopping index 46 for the second data channel in this next frame. The data hopping sequence may then continue with the same counter-directional progression for 15 hops (e.g., 15 frames), where the hopping index for the first data channel increments by one and the hopping index for the second data channel decrements by 1. As shown in FIG. 31, the second part of the data hopping sequence may not use the middle 16 hopping indices of the hopset (in addition to the first and last hopping indices due to the starting points of the second part).

Figure 32:
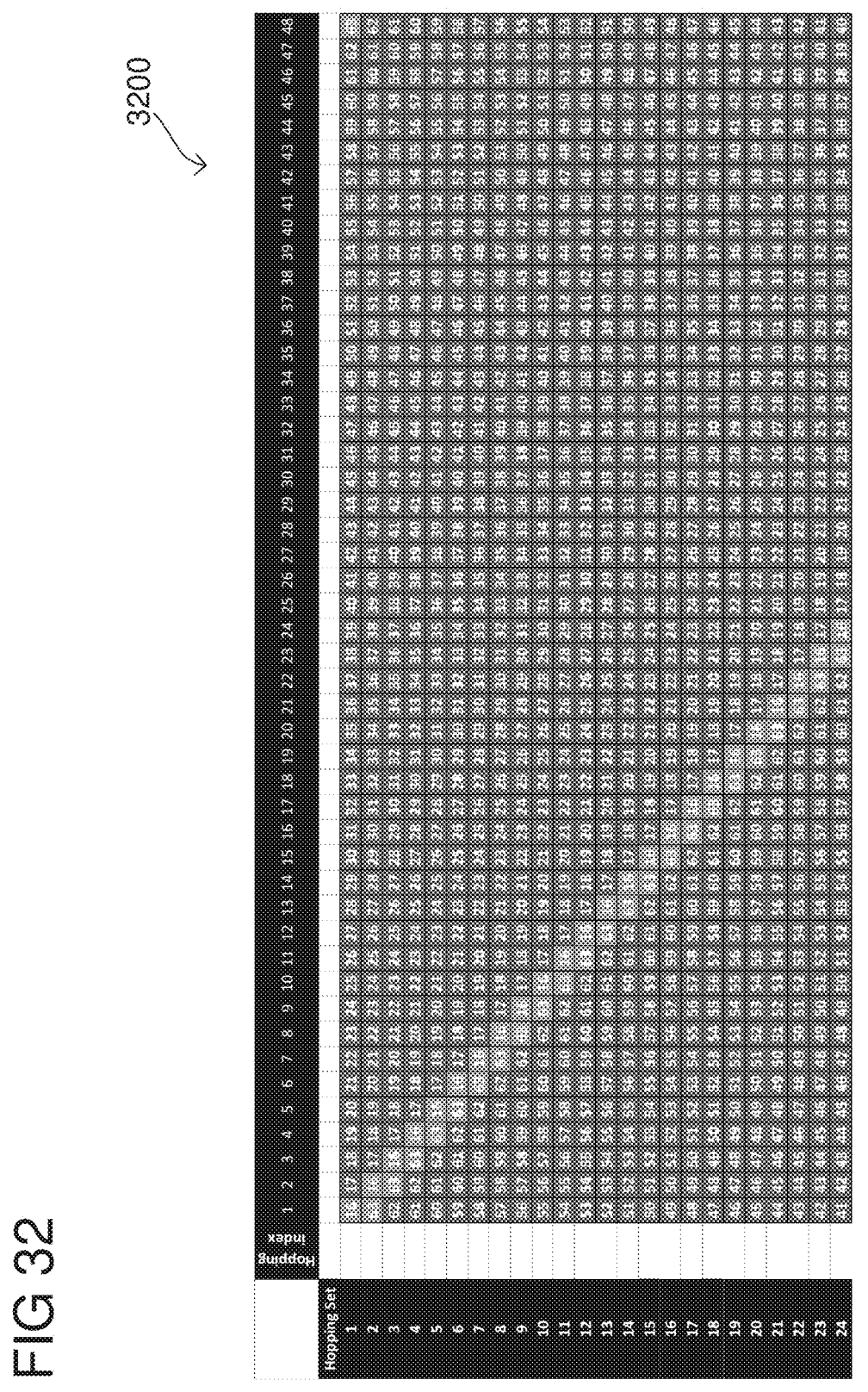

The first and second parts of the data hopping sequence may therefore include 63 hops, one per frame, thus providing the full set of hops for a given superframe. As previously indicated for FIG. 29, the data subset allocation (the hopping frequencies allocated for the hopsets) may cyclically shift by three or four hopping frequencies in each superframe. Accordingly, the hopping frequencies at each hopping index of each hopset may likewise cyclically shift, e.g., by the same three or four hopping frequencies that the data subset allocation shifts. FIG. 32 shows exemplary hopset chart 3200 according to some aspects, which illustrates this concept. In particular, hopset chart 3200 shows the hopping indices for the first 24 hopsets for Superframe 2 (following Superframe 1 as shown for the hopping indices in the hopsets of FIGS. 30A and 30B). As can be seen by comparing hopset charts 3000A (showing hopping indices for hopsets 1-24 in Superframe 1) and 3200 (showing hopping indices for hopsets 1-24 in Superframe 2), the hopping indices in hopset chart 3200 may be a cyclically-shifted version of the hopping indices in hopset chart 3000A, namely that is cyclically shifted by three hopping indices. The hopping indices in Superframe 3, as well as subsequent superframes, may similarly be cyclically shifted relative to the preceding superframe.

The terminal devices in a given pairing may therefore use these data hopping sequences for their assigned hopset in each superframe, including use of the first and second data channels that use the counter-directional progression over each frame of the superframe. This data hopping sequence may use all hopping frequencies evenly in each hyperframe.

Figure 33:
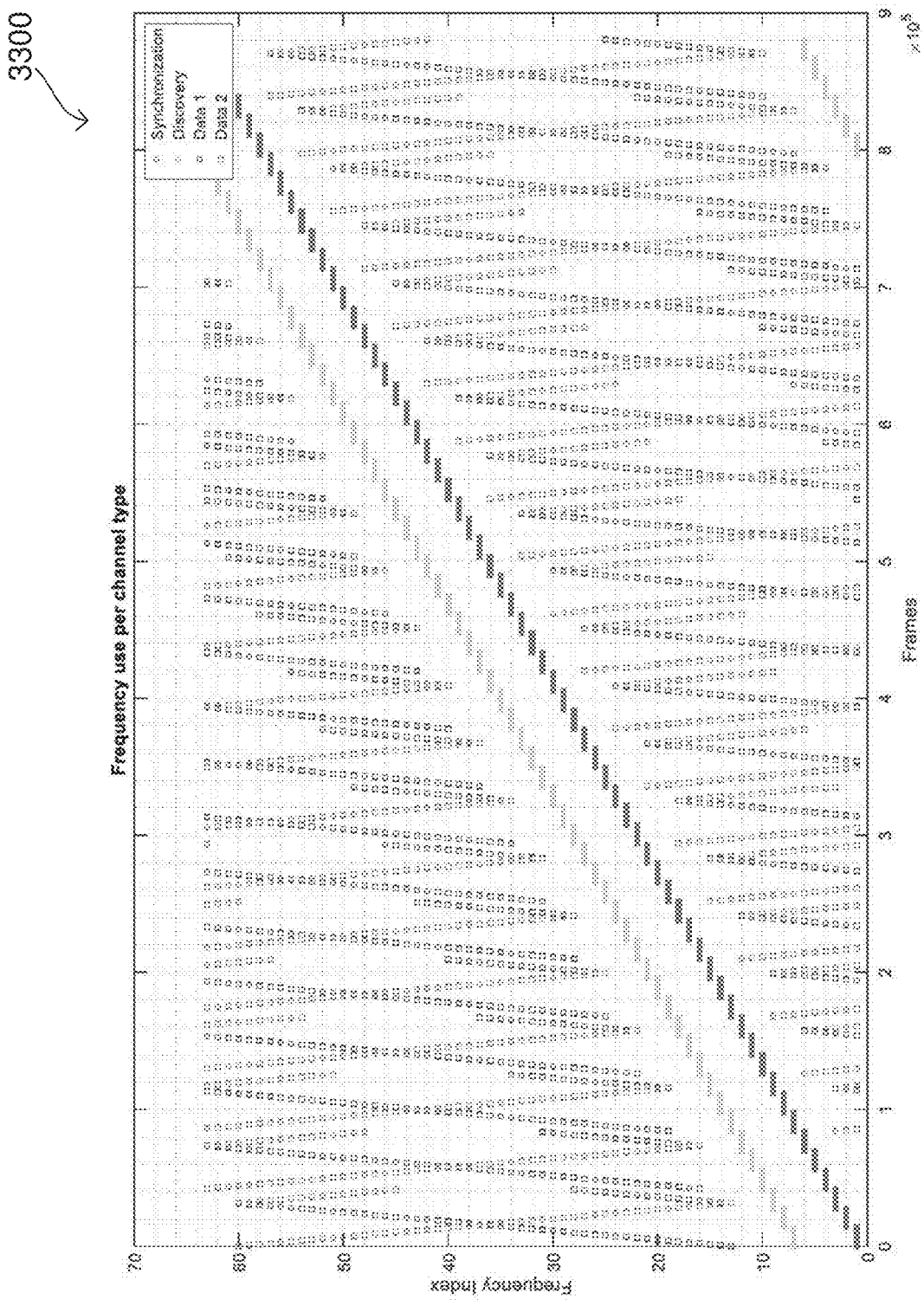
FIG. 33 shows an exemplary logical frequency usage chart according to some aspects.
Figure 34:
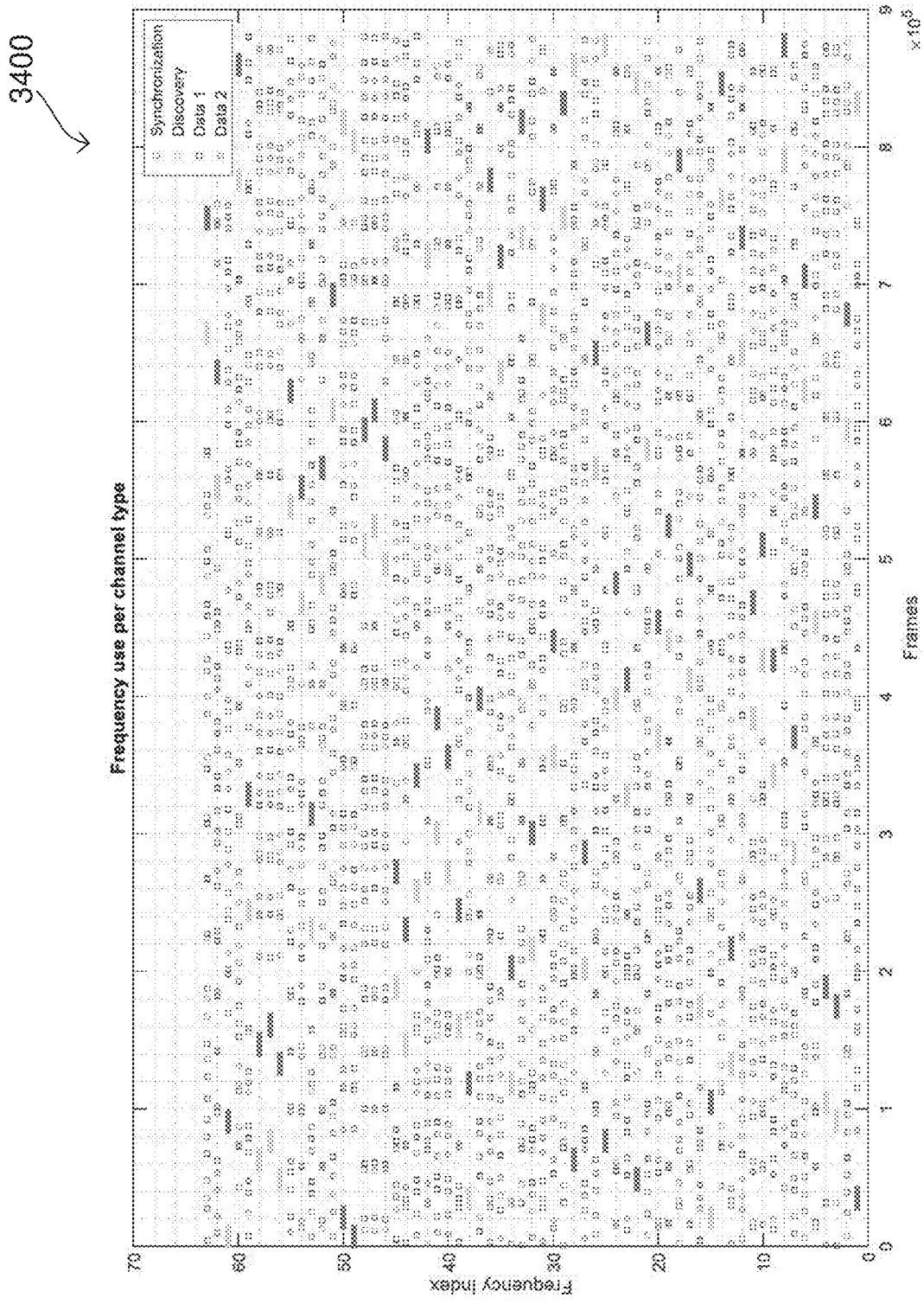
FIG. 34 shows an exemplary actual frequency usage chart according to some aspects.

FIGS. 33 and 34 show the logical and actual hopping frequency usage over time according to some aspects. FIG. 33 shows logical frequency usage chart 3300, where the vertical "Frequency Index" axis refers to the logical indices of the root hopping sequence and the horizontal "Frames" axis refers to the frames over time. As can be seen in FIG. 33, several logical indices are used throughout the duration of each entire superframe for the synchronization subset allocation and the discovery subset allocation. Each logical index is used for the synchronization subset allocation and the discovery subset allocation in exactly one superframe of the hyperframe. FIG. 33 also shows the counter-directional progression of the first and second parts of the data hopping sequence in each superframe, where it can be seen that the logical index used for the first data channel increments each frame and the logical index used for the second data channel decrements each frame.

FIG. 34 shows actual hopping frequency usage chart 3400, where the vertical "Frequency Index" axis refers to the actual frequency index (e.g., refers to the actual hopping frequency of the overall set of hopping frequencies, where the actual frequency $f_i$ can be found from actual frequency index $s_i$ with $f_i=f_0+s_i*\Delta f$ given frequency spacing $\Delta f$ and base frequency $f_0$) and the horizontal "Frames" axis refers to the frames over time. As previously detailed, the logical indices refer to a position within the root hopping sequence, where the root hopping sequence is a random ordering of the overall set of hopping frequencies. Accordingly, when the first and second parts of the data hopping sequence increment/decrement the logical by one for each superframe, this does not merely step to the next hopping frequency in the overall set of hopping frequencies. The next logical index instead refers to the next hopping frequency in the randomly-ordered root hopping sequence, which could be any hopping frequency in the overall set depending on the root hopping sequence. As shown in FIG. 34, this therefore results in a randomized distribution of actual frequency usage over time.

While these examples refer to specific values (e.g., for size of the overall set of frequencies, the number of frames P in a superframe, the number of superframes M in a hyperframe, etc.), these values are only used for exemplary purposes to describe aspects of this disclosure. These specific values may be based on a specific set of dwell time rules, such as the FCC dwell time rules. However, in various aspects, these values can be scaled as applicable, such as to meet other dwell time rules that are defined by different values. In one example, the overall set of hopping frequencies can be scaled to 60 frequencies.

The exemplary internal configuration of terminal device 2700 in FIG. 27 and the procedure of flow chart 2800 in FIG. 28 may also apply for various aspects of this cyclically shifting allocation scheme. For example, terminal device 2700 may establish a pairing with another terminal device. Using a single current superframe as an example, controller 2712 may identify a data hopping sequence to use for the paragon in the current superframe in stage 2802. For example, there may be a predefined set of hopsets available to pairings, where each hopset has a sequence of hopping indices that refer to different hopping frequencies (logical indices) that form the data subset allocation for the current superframe. Controller 2712 may therefore identify the appropriate hopset to use for the pairing (e.g., based on a device ID of terminal device 2700), such as hopset 1. Controller 2712 may then specify the hopset to hop scheduler 2714 (e.g., according to the index "1" that identifies hopset 1 amongst the predefined set of hopsets).

As described in FIG. 31, the data hopping sequence may use this hopset to apply a counter-directional progression along the hopping indices to select hopping indices (e.g., referring the logical indices) to use for the first and second data channel in each frame of the current superframe. Hop scheduler 2714 may then retrieve or dynamically determine the scheduling data (e.g., a data representation of the data hopping sequence) for this data hopping sequence in stage 2804. In some aspects, the scheduling data may be precomputed and stored in sequence memory 2716. For example, the precomputed scheduling data may specify that hopping index 1 (of hopset 1) is used for the first data channel and hopping index 48 is used for the second data channel in the first frame of the current superframe, that hopping index 2 is used for the first data channel and hopping index 47 is used for the second data channel in the second frame, and so forth according to the counter-directional progression for both the first and second parts of the data hopping sequence. As this scheduling data is precomputed, hop scheduler 2714 may be able to retrieve and follow it (e.g., without computing it dynamically).

In other aspects, hop scheduler 2714 may be configured to dynamically determine the scheduling data for the data hopping sequence in stage 2804. For example, given hopset 1, hop scheduler 2714 may be configured to compute scheduling data that details the counter-directional progression of the first and second parts of the data hopping sequence. Hop scheduler 2714 may use the fixed rules described above to dynamically determine the scheduling data, namely by starting from the first and last hopping indices for the first and second data channels, incrementing the hopping index for the first data channel by one and decrementing the hopping index for the second data channel by one each frame until all hopping indices have been used, re-starting from the second and second-to-last hopping indices for the first and second data channels, and incrementing the hopping index for the first data channel by one and decrementing the hopping index for the second data channel by one each frame until all frames in the current superframe have passed).

After obtaining the scheduling data for the data hopping sequence of the current superframe, hop scheduler 2714 may determine the current timing position within the data hopping sequence in stage 2806, such as based on the current system frame number of the device network. Then, hop scheduler 2714 may apply the data hopping sequence by controlling transmitter 2706 and receiver 2708 to transmit and receive on hopping frequencies according to the data hopping sequence in stage 2808. Transmitter 2706 and receiver 2708 may therefore hop to a new hopping frequency for each frame of the current superframe according to the data hopping sequence, and may therefore follow the counter-direction progression of the data hopping sequence to use the first and second data channels to exchange data with the other terminal device (which may likewise follow the same data hopping sequence). The data hopping sequence for the next superframe may follow similar rules (e.g., where the logical indices in each hopset cyclically shift by three or four hopping indices), and hop scheduler 2714 may continue to follow the data hopping sequence in subsequent superframes.

Some aspects of this disclosure may use additional features to help reduce interference. For example, as previously described the hopping sequences can be orthogonal to each other. Some aspects can increase (e.g., maximize) this orthogonality using the following two rules:

Rule 1: Use a mapping that maximizes the distance between active channels per frame. As there are, for example, 63 channels with a minimum (e.g., worst-case) distance of 400 kHz, the hopping sequences may only allow this minimum distance for a single occasion when comparing any two hopping sequences. For example, the hopping sequence suggested above can provide, for example, 60 or 48 mutually orthogonal data hopping sequences (e.g., where no two data hopping sequences used the same frequency index at the same time). Accordingly, at maximum 60 or 48 concurrent transmissions are possible in a way that leaves a worst-case 400 kHz between two subsequent transmissions at all times. As a general tradeoff for Rule 1, when the amount of available data hopping sequences are reduced, the data hopping sequences can be chosen in a way that leaves even larger spacing between multiple simultaneous transmissions.

Rule 2: Hop a minimum of 6 MHz for each hop. For example, if the highest hopping frequency is at 927.6 MHz and the lowest hopping frequency is at 902.4 MHz, the separation is 25.2 MHz. 24.4 MHz/6 MHz allows 3-4 6 MHz hops in the band.

Some aspects may increase the variety of available hopping sequences by combining device IDs to selecting the hopping sequence. For example, a given pairing can combine the last bits (e.g., last 4 bits) of the device ID of one terminal device with the last bits (e.g., last 4 bits) of the device ID of the other terminal device to select the hopping sequence (e.g., to select a hopset) for the pairing.

Some aspects may add an interference locator to manage the hopping pattern. For example, if there are 63 hopping frequencies available but the FCC requires use of only 50, a block of 13 channels (13*400 kHz=5.2 MHz) can be avoided. Accordingly, the 63/13=~5 positions of the hopping add can be added into a discovery message and result in 1 out of 5 sub-versions of a predefined hopping sequence. The interference locator could therefore detect the interference position and locate the hopping gap accordingly.

Some aspects may also combine hopping sequences with link adaptation strategies. For example, aspects can allocate the coded bits and their repetitions (e.g., different redundancy versions of a codeword like or direct repetitions of a codeword as in eMTC/NB-IoT, or HARQ retransmissions in different frames on different hopping frequencies) in a way that the transmission spans different frequencies with one or more hops in between. For example, if the hopping sequence always performs hops of a minimum distance of, for example, 6 MHz (or, e.g., more than 5 MHz), then the hopping position within the repeated transport packet can be combined. In this case the fixed repetition strategy (e.g., 2:1 or 4:1) is not motivated by coverage enhancement (e.g., SNR boost) but is instead motivated by redundancy/interference robustness. The activation of this redundancy mode could be activated by a band-channel-power search algorithm to locate the presence of such interferers.

Figure 35:
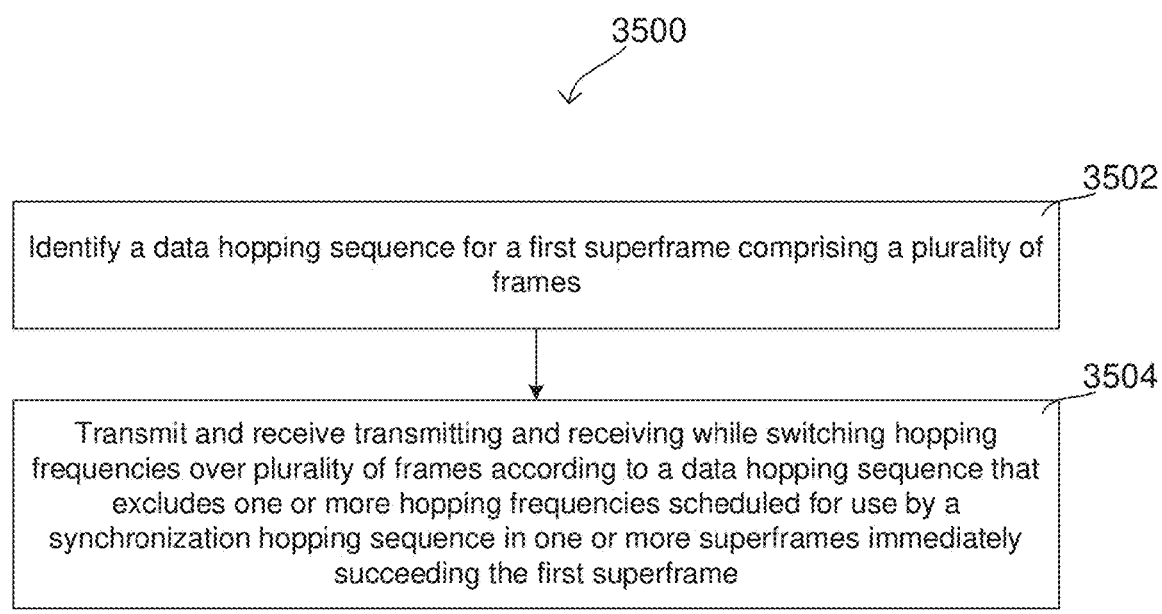
FIG. 35 shows a first exemplary method of operating a terminal device according to some aspects.

FIG. 35 shows exemplary method 3500 of operating a terminal device according to some aspects. As shown in FIG. 35, method 300 includes identifying a data hopping sequence for a first superframe including a plurality of frames (3502), and transmitting and receiving while switching hopping frequencies over plurality of frames according to a data hopping sequence that excludes one or more hopping frequencies scheduled for use by a synchronization hopping sequence in one or more superframes immediately succeeding the first superframe (3504).

Figure 36:
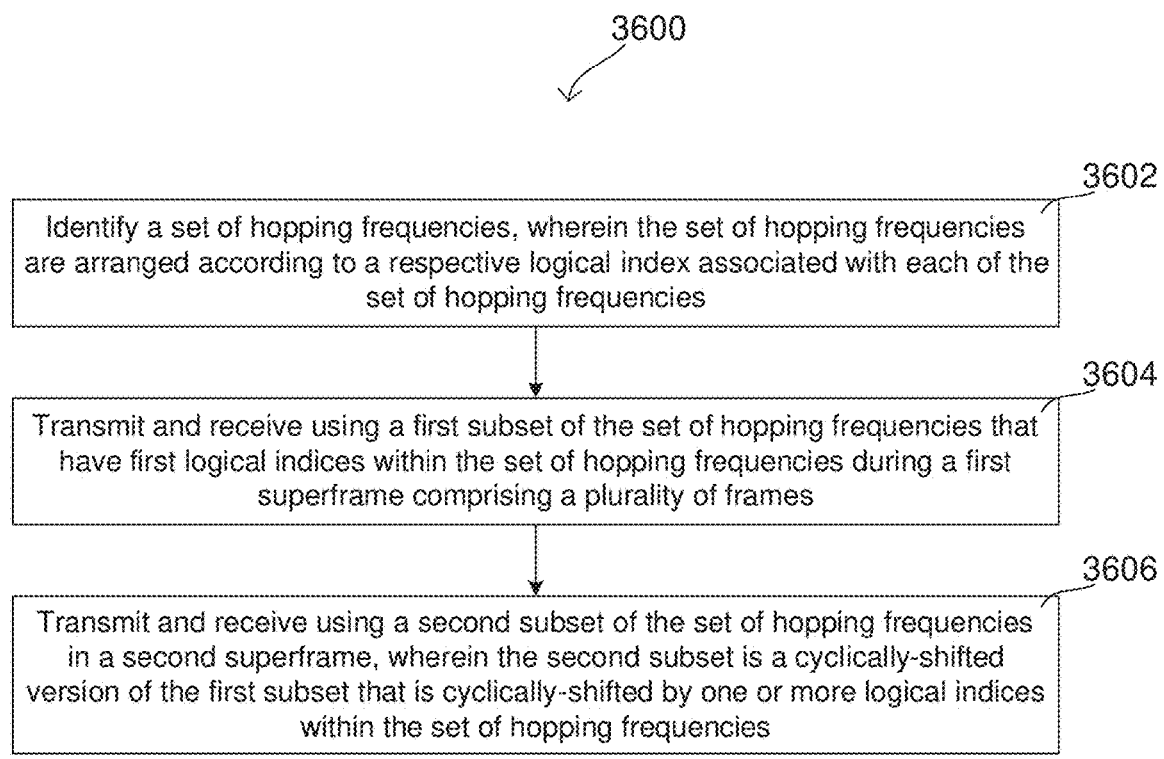
FIG. 36 shows a second exemplary method of operating a terminal device according to some aspects.

FIG. 36 shows exemplary method 3600 of operating a terminal device according to some aspects. As shown in FIG. 36, method 3600 includes identifying a set of hopping frequencies (3602), wherein the set of hopping frequencies are arranged according to a respective logical index associated with each of the set of hopping frequencies, transmitting and receiving using a first subset of the set of hopping frequencies that have first logical indices within the set of hopping frequencies during a first superframe including a plurality of frames (3604), and transmitting and receiving using a second subset of the set of hopping frequencies in a second superframe, wherein the second subset is a cyclically-shifted version of the first subset that is cyclically-shifted by one or more logical indices within the set of hopping frequencies (3606).

FIG. 37 shows exemplary method 3700 of operating a terminal device according to some aspects. As shown in FIG. 37, method 3700 includes identifying a set of hopping frequencies for a superframe that are each associated with a respective hopping index and are arranged in increasing order by hopping index (3702), for a first frame of a plurality of frames in the superframe, using a first hopping frequency of the set of hopping frequencies to transmit or receive for a first data channel and using a second hopping frequency of the set of hopping frequencies to transmit and receive for a second data channel (3704), and for each given frame remaining in the plurality of frames, using a hopping frequency for the first data channel that has a hopping index that is higher than the hopping frequency used for the first data channel in the frame preceding the given frame and using a hopping frequency for the second data channel that has a hopping index that is lower than the hopping frequency used for the second data channel in the frame preceding the given frame (3706).

Near-Far Effect Mitigation

Figure 38A:
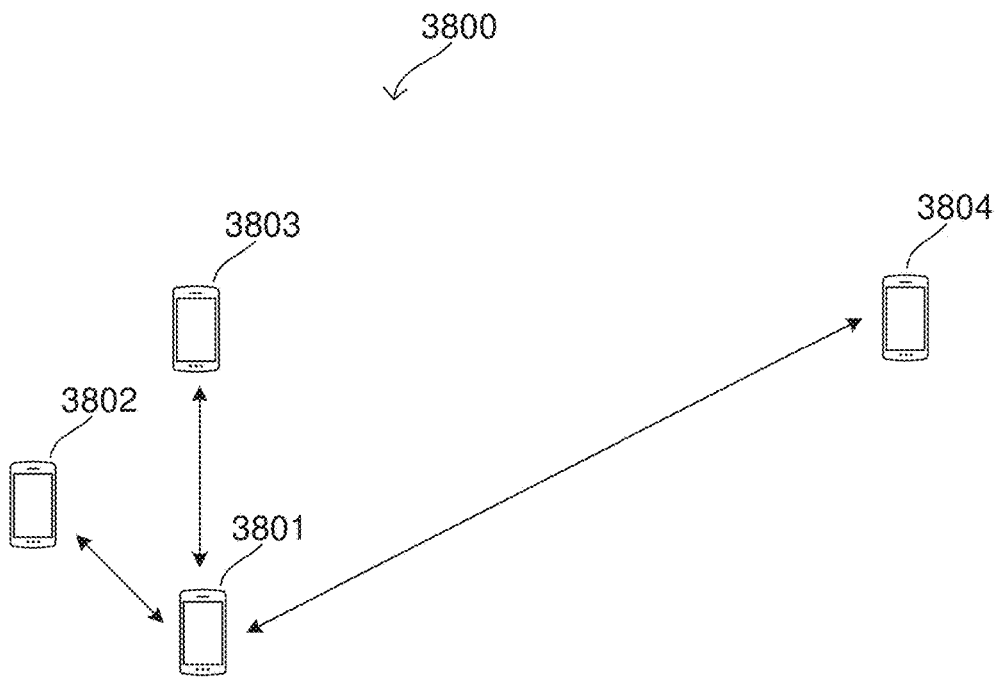
FIG. 38A shows an exemplary radio communication network according to some aspects including exemplary terminal devices.

FIG. 38A shows an exemplary radio communication network 3800 according to some aspects including exemplary terminal devices 3801, 3802, 3803, and 3804. It is appreciated that the number of four terminal devices shown in FIG. 38A is only exemplary and is scalable to any larger number. Arrows between pairs of terminal devices 3801, 3802 and 3801, 3803 and 3801, 3804, illustrate direct (e.g. device-to-device, D2D) communication between the respective terminal devices of each pair. In various aspects, direct communication between terminal devices may refer to an exchange of data signals between the terminal devices without e.g. any control by a centralized control node, such as a base station, however, not excluding the respective signals being e.g. relayed through a centralized control node. Even though not illustrated for conciseness purposes, any pair of terminal devices 3801, 3802, 3803, and 3804 may perform direct communication. In various aspects, the radio communication network 3800 of FIG. 38A may in be a device-to-device (D2D) communication network, e.g. an autonomous D2D communication network.

In order to start communications, terminal devices 3801, 3802, 3803, and 3804 may perform a discovery procedure during a discovery phase. During this phase, a first terminal device, e.g. terminal device 3801 in FIG. 3800 may transmit or broadcast a discovery initiation (DI) signal to be discoverable by other terminal devices, e.g. by terminal devices 3802, 3803, and 3804 in FIG. 38A. In various aspects, the terminal device 3801 may periodically transmit discovery initiation signals, e.g. adapting a periodicity to reduce battery consumption if there is no active communication or if no other terminal device enters a proximity region for a predefined timer. A terminal device receiving the DI signal from terminal device 3801, e.g. any one of terminal devices 3802, 3803, and 3804 in FIG. 38A may respond with a discovery response (DR) signal. After having received DR signals from terminal devices 3802, 3803, and 3804, terminal device 3801 may select one terminal device to start direct communications, e.g. terminal device 3804. In various aspects, such direct communications between terminal device 3801 and terminal device 3804 may be direct peer-to-peer communications.

Figure 38B:
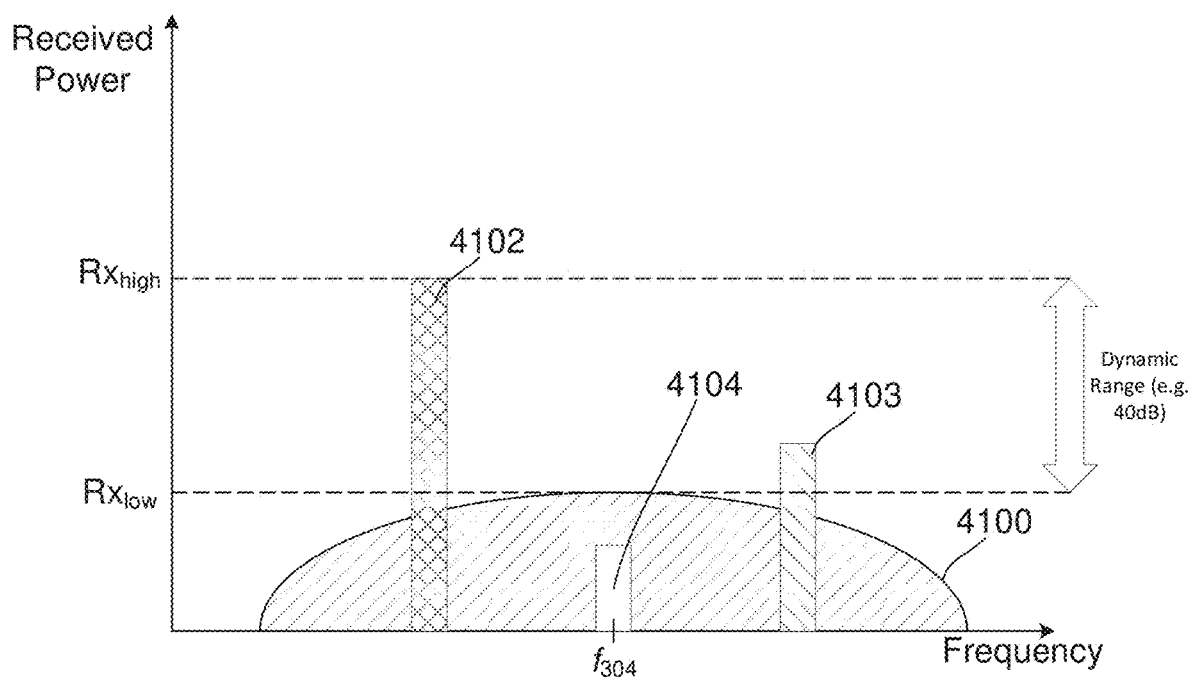
FIG. 38B shows exemplarily received power at a receiving terminal device according to some aspects.

FIG. 38B shows exemplarily received power at the terminal device 3801, the received power e.g. corresponding to power of signals transmitted by terminal devices 3802, 3803, and 3804. Such signals may involve DI and DR signals exchanged between respective discovery phases and/or data signals exchanged by terminal devices after respective discovery phases. In the illustration of FIG. 38B, received powers 4102, 4103, 4104 are caused by respective signals transmitted by terminal devices 3802, 3803, and 3804, respectively, and are received within a reception frequency window 4100 of terminal device 3801. In the figure, the reception frequency window 4100 of terminal device 3801 is tuned to a transmission frequency $f_{304}$ of terminal device 3804 selected for direct communications with terminal device 3801. In various aspects, a transmission frequency $f_{304}$ used by terminal device 3804 for communications with terminal device 3801 may thus be at the center of the reception frequency window 4100. Received powers 4102 and 4103 may result from signals not addressed to terminal device 3801, which, however, may nevertheless interfere with the signal desired to be received from terminal device 3804 at terminal device 3804.

Thus, as illustrated in FIG. 38B, e.g. in autonomous D2D communication networks, terminal devices may be distributed sources for signals and may be at different mutual distances. Therefore, a desired signal transmitted from a terminal device at a large distance (in the example terminal device 3804) may be interfered by transmissions from closer terminal devices (in the example terminal devices 3802, 3803). This may be the case even though transmissions from terminal devices at closer distance (in the example terminal devices 3802, 3803) may use different physical resources (i.e., different frequency channels, different spreading sequences, spatial processing) as the terminal device transmitting the desired signal (terminal device 3804).

FIG. 38B shows an exemplary case in which a signal strength (e.g. the corresponding signal power received at terminal device 3801) of the desired signal is much smaller than the strength of signals received by the closer terminal devices 3802, 3803. In other words, in cases in which an active gain control mechanism (AGC) adjusts a dynamic range of a receiver of terminal device 3801 based on a strongest received signal (signal from closest terminal device 3802) a desired signal (the signal transmitted by terminal device 3804) may be below the dynamic range and may thus not be receivable for terminal device 3801. In FIG. 38B, a maximum receive power $Rx_{high}$ and a minimum receive power $Rx_{low}$ are exemplarily indicated, the difference between these parameters corresponding to a dynamic range of a receiver of terminal device 3801. In various aspects, an exemplary dynamic range may be a range of 40 dB. However, for example in autonomous D2D communication networks, a difference between a received power of a signal received by a receiver (e.g. of terminal device 3801) from a terminal device in close proximity (e.g. from terminal device 3802) and a received power of a signal received from a terminal device far away (e.g. from terminal device 3804) may be on the order of 100 dB or higher.

Various aspects of the present disclosure employ an open loop link adaptation approach e.g. during the discovery phase and a closed loop link adaptation approach e.g. during a communication phase between two terminal devices. In various aspects, a receiver of a terminal device may be configured to receive a signal from at least one other terminal device for initiating direct communication between the terminal devices. In various aspects, the signal may be a discovery initiation (DI) signal. In various aspects, a terminal device may be configured to estimate at least one parameter indicative of a power reduction of a signal received from the at least one other terminal device, the power reduction being on a propagation path from the other terminal device. In various aspects, the parameter may be a power level representing the path loss between the terminal device and the at least one other terminal device. The terminal device may in various aspects be configured to transmit a response signal to the other terminal device at or using a transmission power level which is set based on the estimated parameter.

In various aspects, the transmission power level may correspond to a target receive power level of the terminal device increased based on the estimated parameter, e.g. increased by the power level representing the path loss. Thereby, the target receive power level of the terminal device may be set within, or close to the center, of a dynamic range of the terminal device. In other words, in various aspects, it may thereby be achieved that the response signal, in various aspects e.g. a discovery response (DR) signal, is received at the other terminal device at (or at a receive power level close to) the target receive power level of the terminal device. In various aspects, an effect may be achieved thereby that within a group of terminal devices located within a close proximity area, the terminal devices not necessarily having a direct communication relationship among each other, still an average receive power level may be a similar level for each of the terminal devices. In other words, in a case corresponding to the case of FIG. 38B, all signals at least from terminal devices within a close proximity area may result in received power levels e.g. at terminal device 3801 which would be within the dynamic range of a receiver of terminal device 3801.

Figure 39:
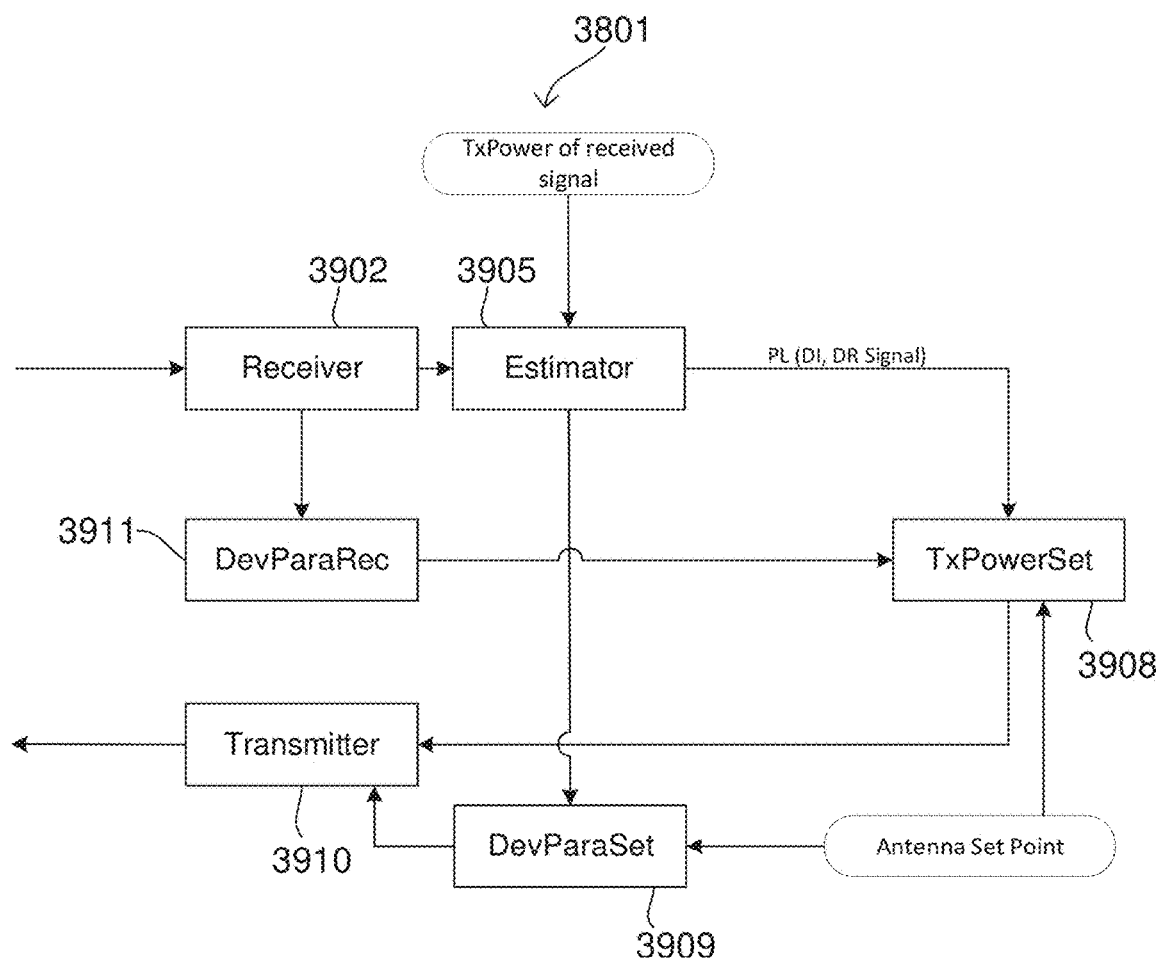
FIG. 39 shows an exemplary internal configuration of a terminal device in accordance with various aspects.

FIG. 39 shows an exemplary internal configuration of the terminal device 3801 related to link adaptation in accordance with various aspects of the present disclosure. Terminal devices 3802, 3803 and 3804 may in various aspects be configured in accordance with the configuration of terminal device 3801. The terminal device 3801 of FIG. 39 may be incorporated in or may be part of the baseband modem 206 of the terminal device 102 shown in FIG. 2. As the illustrated depiction of FIG. 39 is focused on link adaptation, for purposes of conciseness, FIG. 39 may not expressly show certain other components of terminal device 102. As shown in FIG. 39, in some aspects, the terminal device 3801 may include a receiver 3902, an estimator 3905, a transmission power setter 3908, a deviation parameter setter 3909, a transmitter 3910, and a deviation parameter receiver 3911. Each of receiver 3902, estimator 3905, transmission power setter 3908, deviation parameter setter 3909, transmitter 3910, and deviation parameter receiver 3911 may be structurally realized as hardware (e.g., as one or more digitally-configured hardware circuits, such as ASICs, FPGAs, or another type of dedicated hardware circuit), as software (e.g., one or more processors configured to retrieve and execute program code that defines arithmetic, control, and/or I/O instructions and is stored in a non-transitory computer-readable storage medium), or as a mixed combination of hardware and software. While receiver 3902, estimator 3905, transmission power setter 3908, deviation parameter setter 3909, transmitter 3910, and deviation parameter receiver 3911 are shown separately in FIG. 39, this depiction generally serves to highlight the operation of baseband modem 206 on a functional level. Receiver 3902, estimator 3905, transmission power setter 3908, deviation parameter setter 3909, transmitter 3910, and deviation parameter receiver 3911 can therefore each be implemented as separate hardware and/or software components, or one or more of receiver 3902, estimator 3905, transmission power setter 3908, deviation parameter setter 3909, transmitter 3910, and deviation parameter receiver 3911 can be combined into a unified hardware and/or software component (for example, a hardware-defined circuitry arrangement including circuitry to perform multiple functions, or a processor configured to execute program code that defines instructions for multiple functions).

Figure 40:
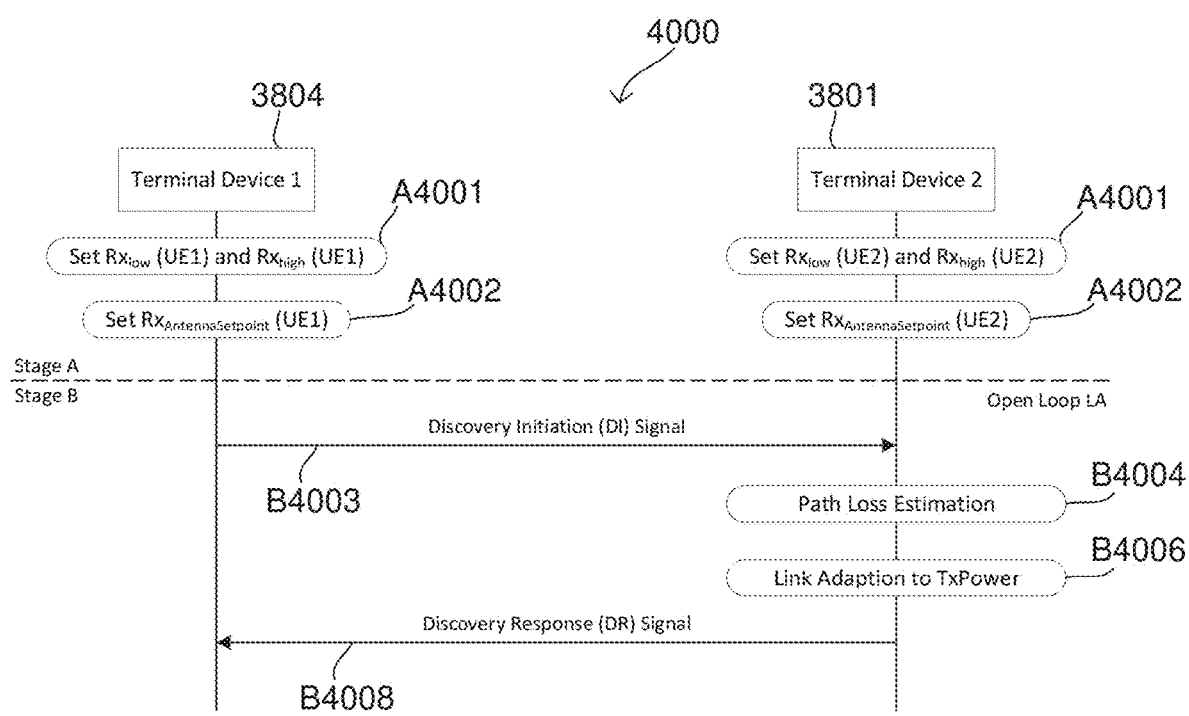
FIG. 40 shows an exemplary method which a terminal device may execute for link adaptation using the components of in accordance with various aspects.

FIG. 40 shows exemplary method 4000, generally divided into stage A and stage B. Stage A may be performed in advance, while stage B illustrates method stages terminal device 3801 (terminal device 2 being exemplary receiver of a DI signal from terminal device 1) may execute for link adaptation using the components of FIG. 39. Stage B may in various aspects correspond to a discovery phase during which terminal devices 3801 and 3804 (terminal device 1) exchange DI and DR signals for starting communications and during which terminal devices 3801 and 3804 may execute open loop link adaptation according to various aspects. It is appreciated that for the following description, a distance between terminal devices 3801 and 3804 can be a larger distance (as exemplarily illustrated in FIG. 38A) or a smaller distance (as e.g. the distance between terminal devices 3801 and 3802, or e.g. the distance between terminal devices 3801 and 3803, in FIG. 38A) or may be scalable as suitable.

While stages A4001 and A4002 may be performed by or for each of terminal devices 3801 and 3804 at any time in advance to actions performed at stage B and not necessarily simultaneously, these stages are exemplarily explained only for terminal device 3801 in the following for conciseness. In stage A4001, a maximum receive power level and a minimum receive power level receivable by receiver 3902 of terminal device 3801 are defined or set (e.g. $Rx_{high}$ and $Rx_{low}$ refer to FIG. 38B). In various aspects, the parameters $Rx_{high}$ and $Rx_{low}$ may be system parameters implemented at the terminal device 3801. In various aspects, the parameters may be defined as follows:

$Rx_{low} = Tx_{max}$ - maximum coupling loss; and
$Rx_{high} = Tx_{min}$ - minimum coupling loss.

In the definitions of $Rx_{high}$ and $Rx_{low}$, the parameter $Tx_{max}$ represents a maximum (e.g. technically possible) output power of terminal device 3801 and the parameter $Tx_{min}$ represents a minimum (e.g. technically possible) output power of terminal device 3801. These parameters may in various aspects be predetermined system parameters of the terminal device 3801. Further, a coupling loss may correspond to a loss of an antenna system of the terminal device 3801, that may occur when energy for data transmission is transferred from the antenna system to the environment. The minimum coupling loss may represent an energy loss occurring when e.g. an antenna system of terminal 3801 is at a closest distance e.g. from an antenna system of terminal 3804 (said closest distance may e.g. be a system defined by a standard or predefined in a different suitable manner). The maximum coupling loss may be a design parameter of a terminal device and may represent a maximum energy loss allowable when e.g. an antenna system of terminal 3801 is at a farthest distance e.g. from an antenna system of terminal 3804, said farthest distance e.g. being within a range of kilometers. In various aspects, a difference between $Rx_{high}$ and $Rx_{low}$ may represent a dynamic range of receiver 3902 of terminal device 3801.

In various aspects, at stage A4002, a target receive power level, also referred to herein as antenna set point, is set or predefined in between said maximum receive power level ($Rx_{high}$) and said minimum receive power level ($Rx_{low}$) receivable by the receiver. In various aspects, the target receive power level may be a power level $Rx_{AntennaSetpoint}$ predefined or set in between the maximum receive power level $Rx_{high}$ and the minimum receive power level $Rx_{low}$, wherein:

$$Rx_{AntennaSetpoint} = \frac{Rx_{low} + Rx_{high}}{2}.$$

In various aspects, the target receive power level, or antenna set point, may be set in advance and stored at each terminal device 3801 and 3804 and/or may be predefined in a standard. In various aspects, an initial target receive power level may be predefined for the terminal device 3801 and e.g. stored at a corresponding memory or implemented in the terminal device 3801, while it may be possible to employ a dynamically adjusted target receive power level for link adaptation procedures, this value being adjusted based on the predefined initial target receive power level stored and/or implemented at the terminal device 3801. In various aspects, e.g. the initial target receive power level may be predefined in a standard.

Turning to stage B of FIG. 40, the terminal device 3804 may in various aspects initiate a discovery phase by transmitting a DI signal to terminal device 3801 at stage B4003. Receiver 3902 of terminal device 3801 may in various aspects be configured to receive said signal from terminal device 3804. In various aspects, estimator 3905 of terminal device 3801 may then be configured to estimate at least one parameter indicative of a power reduction of the signal on a propagation path from terminal device 3804 to terminal device 3801 at stage B4004. In various aspects, terminal device 3801 may be configured to perform a first order path loss estimation at stage B4004 by measuring received power of e.g. the DI signal received from terminal device 3804. In various aspects, the received power may be expressed using a Received Signal Strength Indicator (RSSI). In various aspects, a power value $PL_{est}$ representing a path loss estimated at terminal device 3804 can e.g. be expressed as $$PL_{est} = Tx_{DI} - Rx_{DR},$$

where $Tx_{DI}$ is a value representing a signal transmission power for transmitting the DI signal from terminal device 3804 and $Rx_{DR}$ is a value representing a measured received power of the signal. In various aspects, a corresponding path loss estimation may be executed by terminal device 3801 similarly for a received data signal received from terminal device 3804.

In various aspects, the transmission power setter 3908 of terminal device 3801 may be configured to set a transmission power level to a link adapted transmission power $Tx_{DR}$ at stage B4006. In various aspects, the link adapted transmission power $Tx_{DR}$ may correspond to the target receive power level increased based on the estimated parameter. In various aspects, the link adapted transmission power $Tx_{DR}$ may correspond to the target receive power level increased by a power value corresponding to the power reduction of the signal. In various aspects, the link adapted transmission power $Tx_{DR}$ may be expressed as $$Tx_{DR} = Rx_{AntennaSetpoint} + PL_{est},$$

where $Rx_{AntennaSetpoint}$ is the target receive power level (antenna set point) and $PL_{est}$ is the power value representing the path loss estimated at terminal device 3801 at stage B4004.

Based on the estimated parameter, in various aspects, the transmitter 3910 of terminal device 3801 may thus be configured to transmit a response signal, e.g. a DR signal, to the terminal device 3804 at said transmission power at stage B4008. In various aspects, an effect may thereby be achieved that a power level at which terminal device 3804 receives the DR signal at stage is at least close to $Rx_{AntennaSetpoint}$. A deviation between the power level actually received at terminal device 3804 and $Rx_{AntennaSetpoint}$ may in various aspects be attributed to variations in a path loss value for communications between terminal devices 3801 and 3804 during the discovery phase (e.g. because terminal devices 3801 and 3804 may be moving or path conditions may change).

Figure 41A:
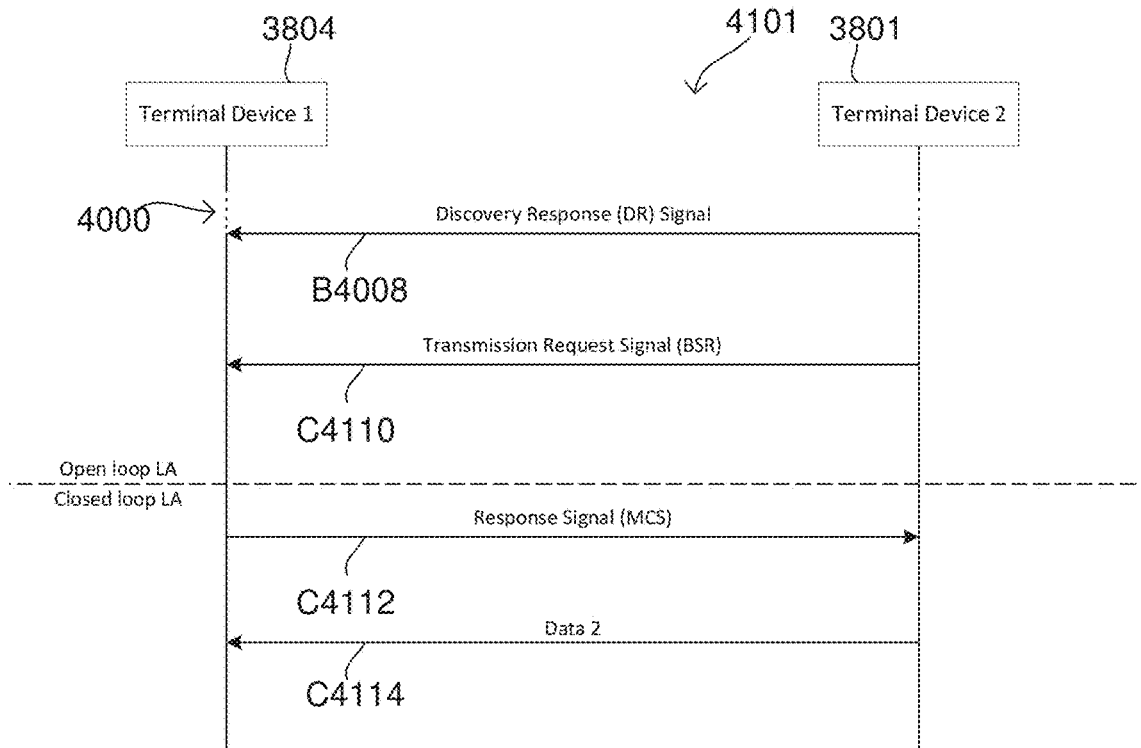
FIG. 41A shows an exemplary method which a terminal device may perform using the configuration shown in FIG. 39.
Figure 41B:
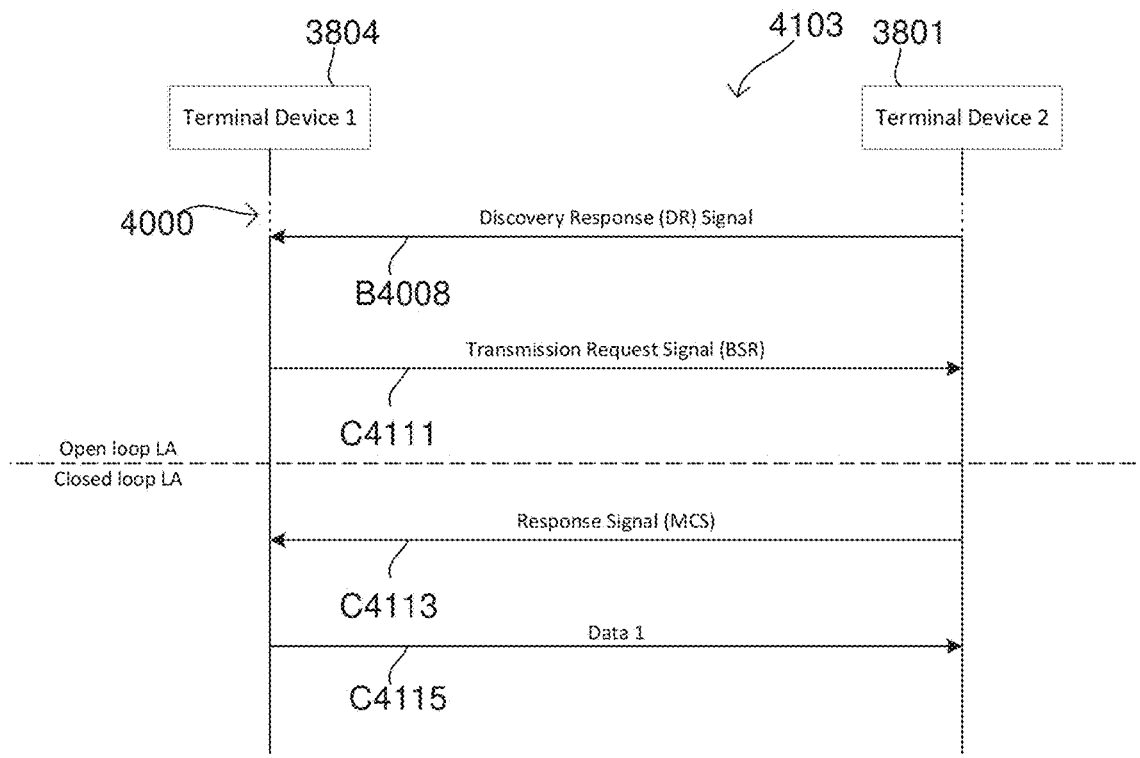
FIG. 41B shows an exemplary method which a terminal device may perform using the configuration shown in FIG. 39.

FIGS. 41A and 41B show exemplary methods 4101 and 4103, which terminal devices 3801 and 3804 may perform e.g. subsequent to method 4000 using the configuration shown in FIG. 39. For conciseness, only stage B4008 of method 4000 is shown in FIGS. 41A and 41B, which in various aspects may be a stage concluding a discovery phase between terminal devices 3801 and 3804. Following such discovery phase, terminal device 3801 (in the example the "discovery replier") may transmit a transmission request signal to terminal device 3804 at stage C4110. The transmission request signal may in various aspects be a message indicating to the terminal device 3804 the presence of data to be transmitted at terminal device 3801. For example, in certain aspects, the transmission request signal may correspond to or include a buffer status report (BSR) index. In certain aspects, a BSR index may be a (for example MAC layer) control element carrying information on how much data is present in a corresponding buffer at terminal device 3801.

As exemplarily shown in FIG. 41A, transmission of the transmission request signal may in various aspects be performed using open loop link adaptation or power control. Terminal device 3801 may be configured to perform open loop link adaptation for sending the transmission request signal based on the estimated path loss value $PL_{est}$ estimated at stage B4004. Terminal device 3801 may be configured to set a transmission power for transmitting the transmission request to a value below a maximum power so that it can still be received by terminal device 3804 while excessive interference to different terminal devices (e.g. terminal devices 3802, 3803) is avoided. For example, terminal device 3801 may choose a suitable coarse power level based on the estimated path loss value $PL_{est}$ estimated at stage B4004.

FIG. 41B shows a different example where following a discovery response signal from terminal device 3801, terminal device 3804 (in the example the "discovery initiator") may transmit a transmission request signal to terminal device 3801 at stage C4111. The transmission request signal transmitted by terminal device 3804 at stage C4111 may in various aspects be a signal of the same format as transmission request signal transmitted by terminal device 3801 at stage C4110. Terminal device 3804 may in various aspects be configured to transmit the transmission request signal at stage C4111 using open loop link adaptation or power control. Since terminal device 3804 is in the example the discovery initiator in various aspects, the terminal device 3804 may be configured to measure a received power of the DR signal transmitted by terminal device 3801. Terminal device 3804 may then be configured to set a transmission power level based on a target receive power level for terminal device 3804 in analogy to setting of the transmit power level for the DR signal by terminal device 3801 at stage B4008.

As shown in FIGS. 41A and 41B, following the transmission request signal, terminal device 3804 (FIG. 41A) or terminal device 3801 (FIG. 41B) may transmit a response signal to the respective other terminal device at stage C4112, C4113, respectively. In various aspects, the response signal transmitted at stages C4112, C4113 may be a grant message ("MCS"), which in various aspects may include modulation and coding scheme (MCS) information to be used for the subsequent data transmission. Transmitting the response signal at stage C4112 including the MCS, terminal device 3804 may perform closed-loop power control of a subsequent data transmission of terminal device 3801 e.g. by sending explicit transmission power settings to be used by terminal device 3801. In certain aspects, at stage 4114, terminal device 3801 may be configured to transmit its data ("Data 2") to terminal device 3804. Stages C4113 and C4115 are analogous for the case that terminal device 3801 transmits the response signal and terminal device 3804 transmits its data ("Data 1").

In various aspects, terminal device 3801 may be configured to perform a first open loop link adaption during a discovery phase, where terminal device 3801 recalculates a transmit power for transmitting a DR signal based on path loss to terminal device 3804. In various aspects, following a discovery phase, in a communication phase, a hybrid of open loop and closed loop power control may be applied.

In various aspects, similar to the discovery phase, also during the communication phase, the maximum receive power level $Rx_{high}$ and the minimum receive power level $Rx_{low}$ receivable by receiver 3902 of terminal device 3801 may be defined (in various aspects are e.g. predefined system parameters) for the terminal devices 3801, 3804. A target receive power level may be set in between the upper and lower bounds $Rx_{high}$ and $Rx_{low}$ (receiver dynamic range) as discussed above. In various aspects, for example when starting the communication phase or when starting a new data communication phase, the target receive power level may be dynamically set e.g. for each transmission e.g. depending on signal-to-noise ratio (SNR) requirements of a used modulation scheme such as e.g. BPSK, QPSK, 16QAM.

Referring back to FIG. 39, the terminal device 3801 may in various aspects be provided with a deviation parameter setter 3909, which may receive from the estimator 3909 a value, e.g. a path loss value, indicating a difference between a power level of a data signal received by the receiver 3902 and the target receive power level. In various aspects, the transmitter 3910 may be configured to transmit the deviation parameter to the terminal device 3804. In other words, in various aspects a deviation (said deviation parameter) between a real measured power, e.g. a RSSI, and the target receive power level, or antenna set point, may be reported. In various aspects, the deviation parameter may be included for example in a message including but not limited to buffer status report (BSR), acknowledgment (ACK) non-acknowledgement (NACK), and/or grant messages (MCS). The deviation parameter $\Delta Rx_{AntennaSetpoint}$ may in various aspects be expressed as $$\Delta Rx_{AntennaSetpoint} = Rx_{signal} - Rx_{AntennaSetpoint},$$

where $Rx_{signal}$ is a value representing a measured received power of the received signal, and $Rx_{AntennaSetpoint}$ is the target receive power level.

In various aspects, the receiver 3902 of terminal device 3804 is configured to receive the deviation parameter from the terminal device 3801. Having received the deviation parameter, in various aspects, the transmitter 3910 of terminal device 3804 is configured to adjust a transmission power level for transmission of a subsequent data signal based on the deviation parameter. A transmission power $Tx_n$ for transmission n of said subsequent data signal may in various aspects be expressed as $$Tx_n = Tx_{n-1} - \Delta Rx_{AntennaSetpoint},$$

where $Tx_{n-1}$ is a value representing a transmission power used by terminal device 3804 for a previous data transmission and $\Delta Rx_{AntennaSetpoint}$ is the deviation parameter.

Thus, in various aspects, each of terminal devices 3801, 3804 may transmit control signals based on the deviation of a received power from the target receive power level to the respective other terminal device to control a transmission power to be used by the other terminal device in a subsequent transmission.

In various aspects, e.g. during a communication phase following a discovery phase, transmit power levels can be adapted in larger (e.g., >10 dB) or smaller increments (e.g., 2 dB) to reach the desired target receive power level. In various aspects, e.g. loop filtering, for example using a running average or a proportional-integral-derivative (PID) controller may be employed at the transmit power adaptation e.g. to prevent or at least reduce potential power oscillations. In various aspects, it may be possible to confirm link adaption used during the communication phase by using an open loop estimated path loss value as performed during the discovery phase. In other words, in various aspects, it terminal devices 3801 and 3804 may be configured to transfer data in a hybrid mode between open and closed loop e.g. if reporting is not available. In various aspects, terminal devices 3801, 3804 may include a memory configured to store used transmission power levels for bridging communication gaps. For example, after a communication gap, communication may then be resumed using the stored transmission power levels.

In various aspects, a communication link established between terminal devices 3801 and 3804 e.g. during the discovery phase can be valid for a time duration e.g. within a range of minutes. However, even though a link may still be established during such time interval, a path loss value between terminal devices 3801 and 3804 may change from a value measured during the discovery phase. To enable communication also when a path loss value changes, in various aspects, terminal device 3801 may first start a transmission request attempt (e.g. by transmitting a BSR message) with the transmission power value derived from the path loss measured during the discovery phase. In case no response message (e.g. "MCS" in FIG. 41A) is received, terminal device 3801 may in certain aspects start a new transmission request attempt (e.g. by retransmitting a BSR message) in a subsequent frame. In various aspects, terminal device 3801 may increase the transmission power by a predefined value for the new transmission request. In various aspects, terminal device 3801 may repeat transmitting new transmission request attempts applying a power ramping, i.e. continuously ramping up the transmission power in the until a maximum transmission power has been reached. In various aspects, if transmission requests at maximum power fail for a predefined number of times, terminal device 3801 may stop repeating transmission request attempts. In various aspects, the terminal device 3801 may then start a new discovery phase by broadcasting a DI signal.

In various aspects, in addition or instead to the described power ramping, terminal device 3801 may add a predefined offset transmission power value to the power value determined during the discovery phase based on the measured path loss value. Said offset transmission power value may in certain aspects be set in proportion to a time from the conclusion or end of the discovery phase (e.g. a time after a DR message has been sent from terminal device 3801 to terminal device 3804 at stage B4008). In other words, the offset transmission power value may be set larger for a longer time since the discovery phase to compensate for a growing uncertainty of the previous path loss estimate.

In various aspects, once e.g. a BSR signal has been received in stage C4110 of FIG. 41A, or in stage C4111 in FIG. 41B, this signal may be responded e.g. by a grant message (stages C4112, C4113 in FIGS. 41A, 41B), in various aspects including modulation and coding scheme (MCS) information to be used for subsequent data transmission. In various aspects, terminal devices 3801, 3804 may start employing a closed loop link adaptation scheme by sending explicit transmission power settings to be used by the respective other terminal device for a subsequent data transmission. Such explicit transmission power settings may in various aspects e.g. be included in said grant message.

In various aspects, such closed loop signaling may include transmission of a power difference value that a terminal device may apply to a power level used for a previous transmission, e.g. for a BSR transmission. An effect achieved thereby in various aspects may be an effect that the terminal device transmitting the power difference value does not need to know the exact power level that was used by the receiver of the power difference value for its previous data transmission (e.g. for transmission of the BSR message).

In various aspects, terminal device 3801 may be configured to explicitly or implicitly encode an absolute transmission power level into a transmission request message, e.g. the BSR message transmitted in stage C4110 of FIG. 41A. In these aspects, estimator 3905 of terminal device 3804 may be configured to estimate a precise path loss value on a propagation path from the terminal device 3801 to terminal device 3804. In various aspects, terminal device 3804 may thus be configured to determine a transmission power level to be used based e.g. on its target received power level, interference conditions, and/or MCS settings. In various aspects, this transmission power may then be included e.g. as part of a grant message in addition to an MCS value.

In various aspects, terminal devices 3801, 3804 are configured to transmit acknowledgement messages, e.g. ACK/NACK messages, in response to received messages. In various aspects, further mechanisms for interference mitigation may be implemented in terminal devices 3801, 3804, such as for example but not limited to L2-level random repetitions to randomize the interferers, L1-level retransmissions which ensure the randomization of interferers, where both of these can be enabled through a precoding framework. In various aspects, a selection of precoders associated with (re)transmissions and a design of combiners at reception can in certain aspects be realized e.g. by exploiting the information about the interfering link and/or the channel reciprocity of the desired link.

Figure 42:
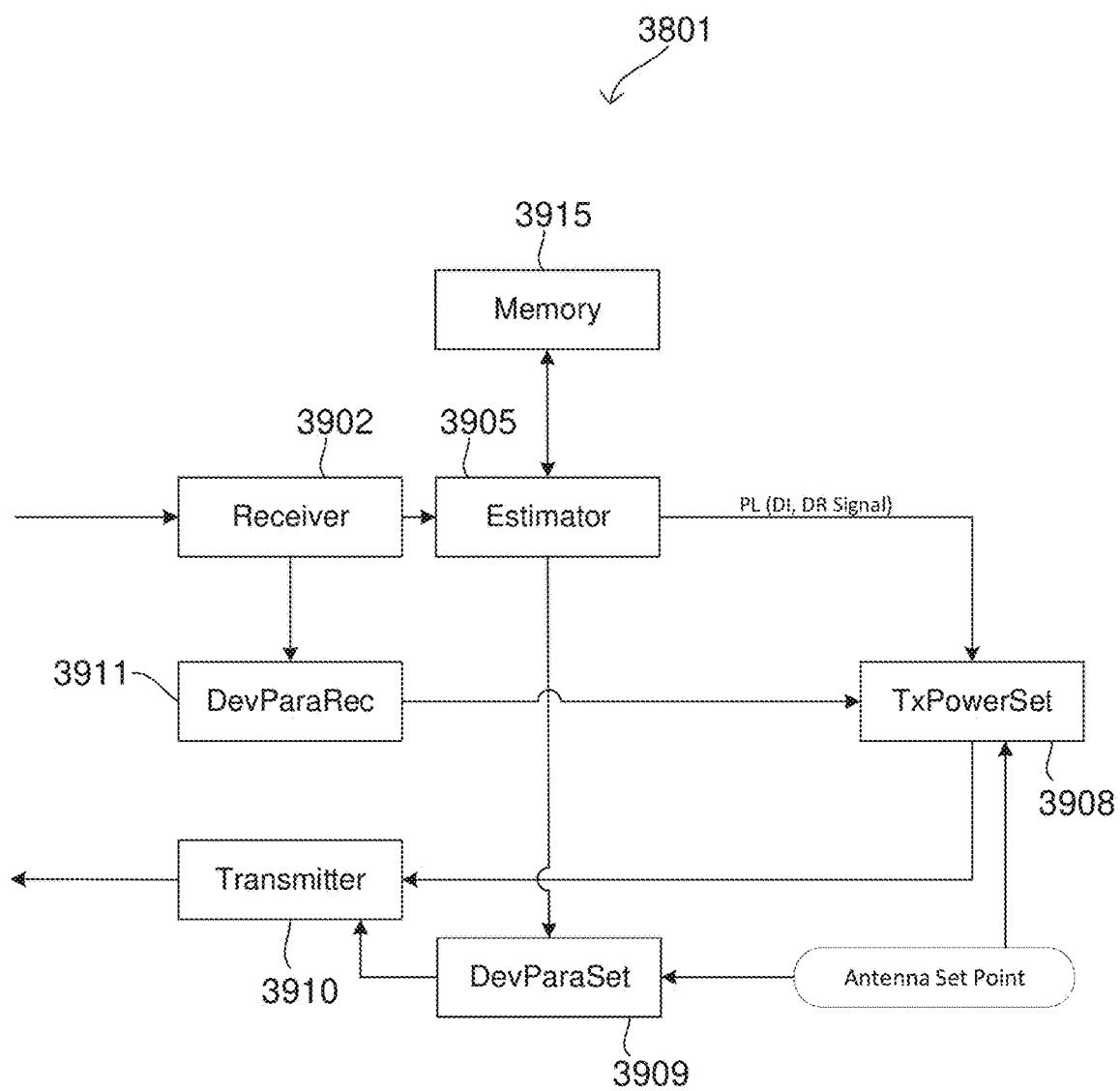
FIG. 42 illustrates the components of FIG. 39 and additionally a memory in accordance with various aspects.

FIG. 42 illustrates the components of FIG. 39 and additionally a memory 3915. For reasons of conciseness, a description of those components of FIG. 39 depicted also in FIG. 42 is omitted. In various aspects, the terminal device

3801 may further include said memory 3915 for storing a table including information defining the signal transmission power for the signal for initiating direct communication between the terminal devices. In these aspects, the estimator 3905 may be configured to extract the signal transmission power from the table. For example, in various aspects, discovery initiation messages may be provided with at least one predefined format and a transmission power level for transmitting the DI message may be predefined for each one of the at least one predefined format. The at least one predefined format and the at least one corresponding transmission power may be stored in said table at memory 3915 in various aspects.

Figure 43:
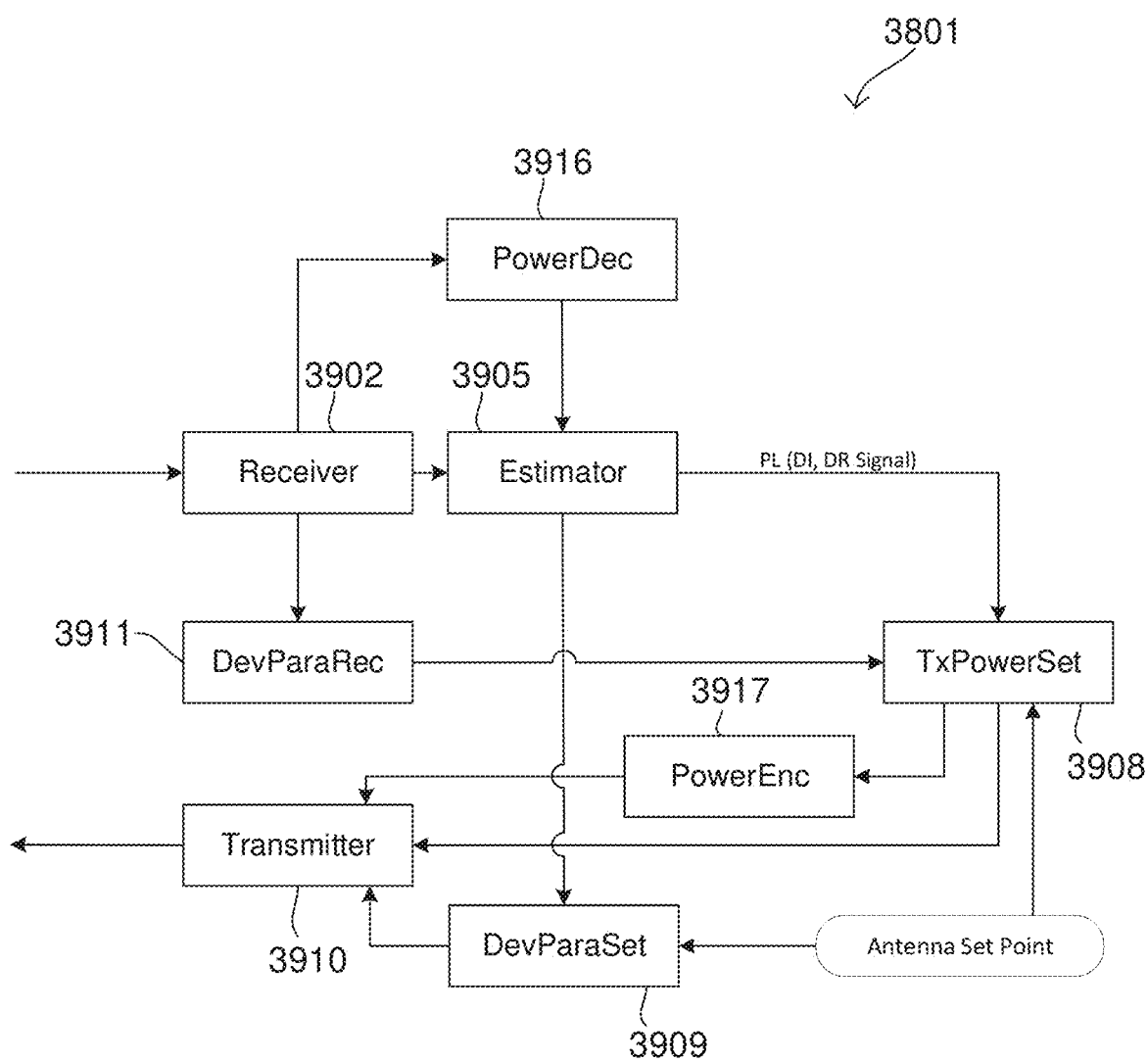
FIG. 43 illustrates the components of FIGS. 39 and/or 42 and additionally a power decoder in accordance with various aspects.

FIG. 43 illustrates the components of FIGS. 39 and/or 42 and additionally a power decoder 3916 and a power encoder 3917. For reasons of conciseness, a description of those components of FIGS. 39 and/or 42 depicted also in FIG. 43 is omitted. In various aspects, the information defining the signal transmission power is encoded in a received signal from the other terminal device. In various aspects, the received signal may be a DI signal, a DR signal and/or a data signal. In various aspects, the information may be encoded in the received signal for initiating direct communication between the terminal devices. In these aspects, the power decoder 3916 may be configured to extract and decode the information defining the signal transmission power from the received signal. In addition, in various aspects, the transmission power setter 3908 may be configured to pass the determined or set transmission power level to be used for a subsequent transmission to the power encoder 3917 which in various aspects may be configured to encode the information defining the signal transmission power into a subsequently transmitted signal transmitted by the transmitter 3910. In various aspects, the signal to be transmitted subsequently may be a (new) DI signal, a DR signal and/or a data signal.

Figure 44:
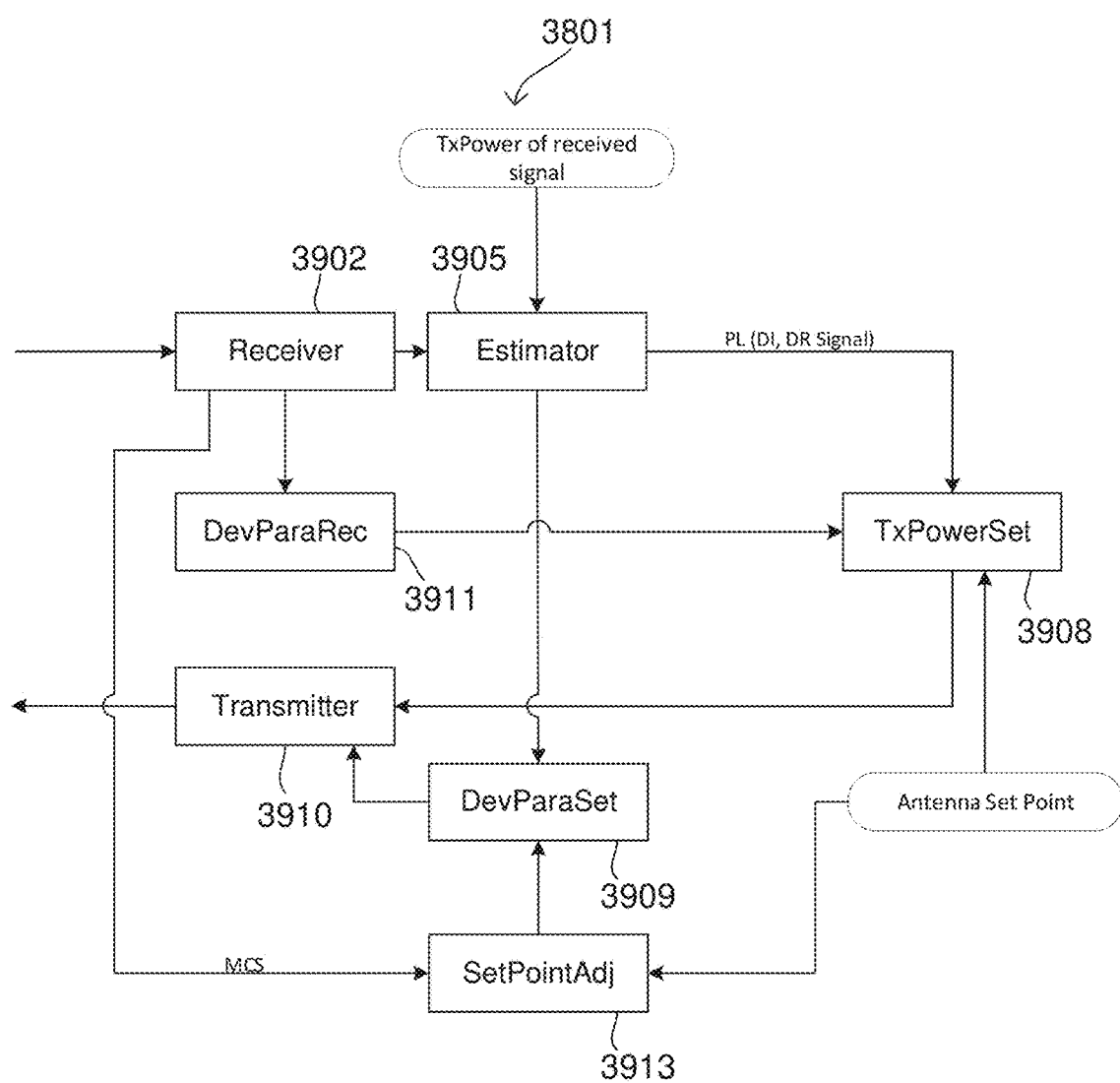
FIG. 44 illustrates the components of any one of FIGS. 39, 42, and/or 43 and additionally a dynamic target receive power level adjuster in accordance with various aspects.

FIG. 44 illustrates the components of any one of FIGS. 39, 42, and/or 43 and additionally a dynamic target receive power level adjuster 3913. For reasons of conciseness, a description of those components of any one of FIGS. 39, 42, and/or 43 also depicted in FIG. 44 is omitted. In various aspects, the terminal device 3801 may include a dynamic target receive power level adjuster 3913 for adjusting the target receive power level to be in between the maximum receive power level and the minimum receive power level based on transmission parameters. In various aspects, the transmitter may be configured to transmit a first data signal to the other terminal device at a transmission power level set based on the dynamic target receive power level. In various aspects, the transmission parameters may include at least a modulation scheme and/or coding scheme (e.g. MCS) to be used for transmission of the first data signal. As illustrated in FIG. 44, the dynamic target receive power level adjuster 3913 may adjust the antenna set point or target receive power level and may pass the adjusted value to the deviation parameter setter 3909.

Hierarchically Prioritized Synchronization for D2D Communication

Recent developments in wireless communications have shown increased focus on ad-hoc device-to-device (D2D) communications. Ad-hoc D2D communication networks can enable direct communication between terminal devices within, for example, 2 km of each other without involving a wireless network, and can therefore be beneficial when the terminal devices are out-of-network coverage or when the terminal devices are within network coverage but the network is congested. As there may not be a wireless network providing synchronization signals, the individual terminal devices may provide synchronization signals themselves in order to establish an ad-hoc D2D communications network. This can be problematic for terminal devices such as phones and tablets as the coverage range may be limited by the available maximum transmission power level and the rate of power consumption of its transmitter.

While recent proposals to the 3GPP Vehicle to Anything (V2X) standard specify a hierarchical synchronization scheme that extends the coverage of synchronization signals, this can be complicated and power consuming. Accordingly, various aspects of this disclosure provide a hierarchically prioritized synchronization scheme for terminal devices in an ad-hoc D2D communication network that is energy efficient and simple. As described herein, the hierarchically prioritized synchronization scheme can operate in-band (e.g., licensed spectrum) or out-of-band (e.g., public spectrum). In some aspects, the hierarchically prioritized synchronization scheme may be based on multiple timing sources having different timing accuracies, such as GNSS timing source and autonomous UTC timing source. As further described herein, the hierarchically prioritized synchronization scheme may be based on a set of PSS signals for priority detection. The ordered set of primary synchronization sequences may be used to determine synchronization priority so parallel resource monitoring and data traffic channel reception can be avoided. In some aspects, the hierarchically prioritized synchronization signals may be transmitted using direct spread spectrum techniques or frequency hopping techniques. In some aspects, guard periods have been added to cope with degraded UTC timing accuracy. In some aspects, an additional synchronization preamble sequence may be added after the synchronization sequence is transmitted to reduce synchronization errors. In some aspects, the hierarchically prioritized synchronization scheme may include a handover process that rotates the roles of each terminal device to redistribute the power consuming tasks and balance power consumption among the terminal devices. In some aspects, a terminal device may synchronize to a simple autonomous timing source rather than synchronize to a more complicated external timing source in order to reduce battery consumption.

The general architecture of a wireless communication network and configuration of a terminal device operating in the wireless communication network is described first, followed by a general and detailed description of configuration of the terminal device operating in an ad-hoc D2D communications network. FIGS. 45A-45F show exemplary network and device arrangements for a hierarchical synchronization for D2D wireless communications according to some aspects of the present disclosure. Generally, FIG. 45A also shows exemplary radio communication network 4590 according to some aspects, which may include terminal devices 4502-10 and 4502-11 and network access nodes 4580 and 4582. Radio communication network 4590 may communicate with terminal devices 4502-10 and 4502-11 via network access nodes 4580 and 4582 over a radio access network. Although certain examples described herein may refer to a particular radio access network context (e.g., LTE, UMTS, GSM, other 3rd Generation Partnership Project (3GPP) networks, WLAN/WiFi, Bluetooth, 5G, mmWave, etc.), these examples can be applied to any other type or configuration of radio access network. The number of network access nodes and terminal devices in radio communication network 4590 is exemplary and is scalable to any amount.

In an exemplary cellular context, network access nodes 4580 and 4582 may be base stations (e.g., eNodeBs, NodeBs, Base Transceiver Stations (BTSs), or any other type of base station), while terminal devices 4502-10 and 4502-11 may be cellular terminal devices (e.g., Mobile Stations (MSs), User Equipments (UEs), or any type of cellular terminal device). Network access nodes 4580 and 4582 may therefore interface (e.g., via backhaul interfaces) with a cellular core network such as an Evolved Packet Core (EPC, for LTE), Core Network (CN, for UMTS), or other cellular core networks, which may also be considered part of radio communication network 4590. The cellular core network may interface with one or more external data networks. In an exemplary short-range context, network access node 4580 and 4582 may be access points (APs, e.g., WLAN or WiFi APs), while terminal device 4502-10 and 4502-11 may be short range terminal devices (e.g., stations (STAs)). Network access nodes 4580 and 4582 may interface (e.g., via an internal or external router) with one or more external data networks.

Figure 45A:
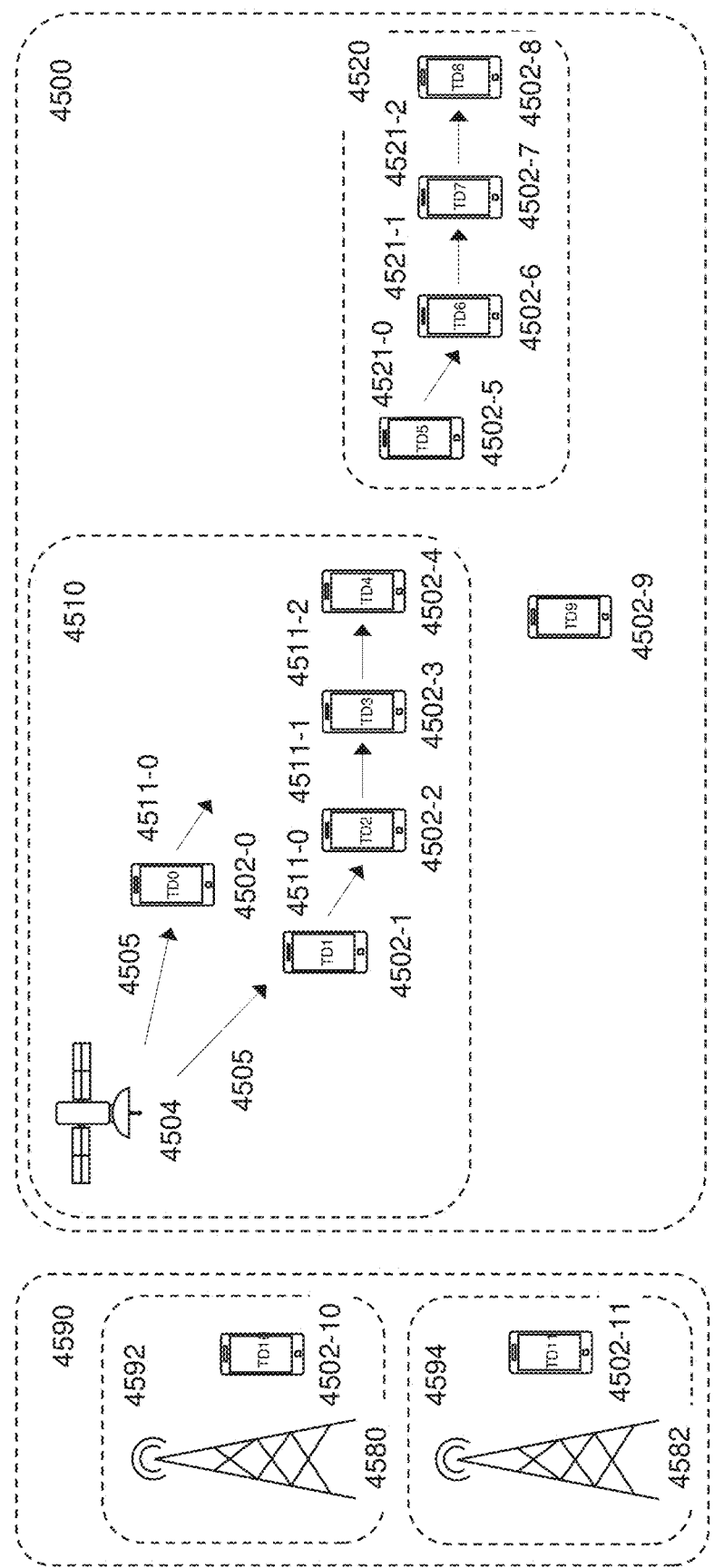
FIG. 45A-45F show various exemplary radio communication networks according to some aspects.

Network access nodes 4580 and 4582 (and, optionally, other network access nodes of radio communication network 4590 not explicitly shown in FIG. 45A) may accordingly provide a radio access network to terminal devices 4502-10 and 4502-11 (and, optionally, other terminal devices of radio communication network 4590 not explicitly shown in FIG. 45A). In an exemplary cellular context, the radio access network provided by network access nodes 4580 and 4582 may enable terminal devices 4502-10 and 4502-11 to wirelessly access the core network via radio communications. The core network may provide switching, routing, and transmission, for traffic data related to terminal devices 4502-10 and 4502-11, and may further provide access to various internal data networks (e.g., control nodes, routing nodes that transfer information between other terminal devices on radio communication network 4590, and the like) and external data networks (e.g., data networks providing voice, text, multimedia (e.g., audio, video, image), and other Internet and application data). In an exemplary short-range context, the radio access network provided by network access nodes 4580 and 4582 may provide access to internal data networks (e.g., for transferring data between terminal devices connected to radio communication network 4590) and external data networks (e.g., data networks providing voice, text, multimedia (audio, video, image), and other Internet and application data).

The radio access network and core network (if applicable, such as for a cellular context) of radio communication network 4590 may be governed by communication protocols that can vary depending on the specifics of radio communication network 4590. Such communication protocols may define the scheduling, formatting, and routing of both user and control data traffic through radio communication network 4590, which includes the transmission and reception of such data through both the radio access and core network domains of radio communication network 4590. Accordingly, terminal devices 4502-10 and 4502-11 and network access nodes 4580 and 4582 may follow the defined communication protocols to transmit and receive data over the radio access network domain of radio communication network 4590, while the core network may follow the defined communication protocols to route data within and outside of the core network. Exemplary communication protocols include LTE, UMTS, GSM, WiMAX, Bluetooth, WiFi, mmWave, etc., any of which may be applicable to radio communication network 4590.

Figure 47:
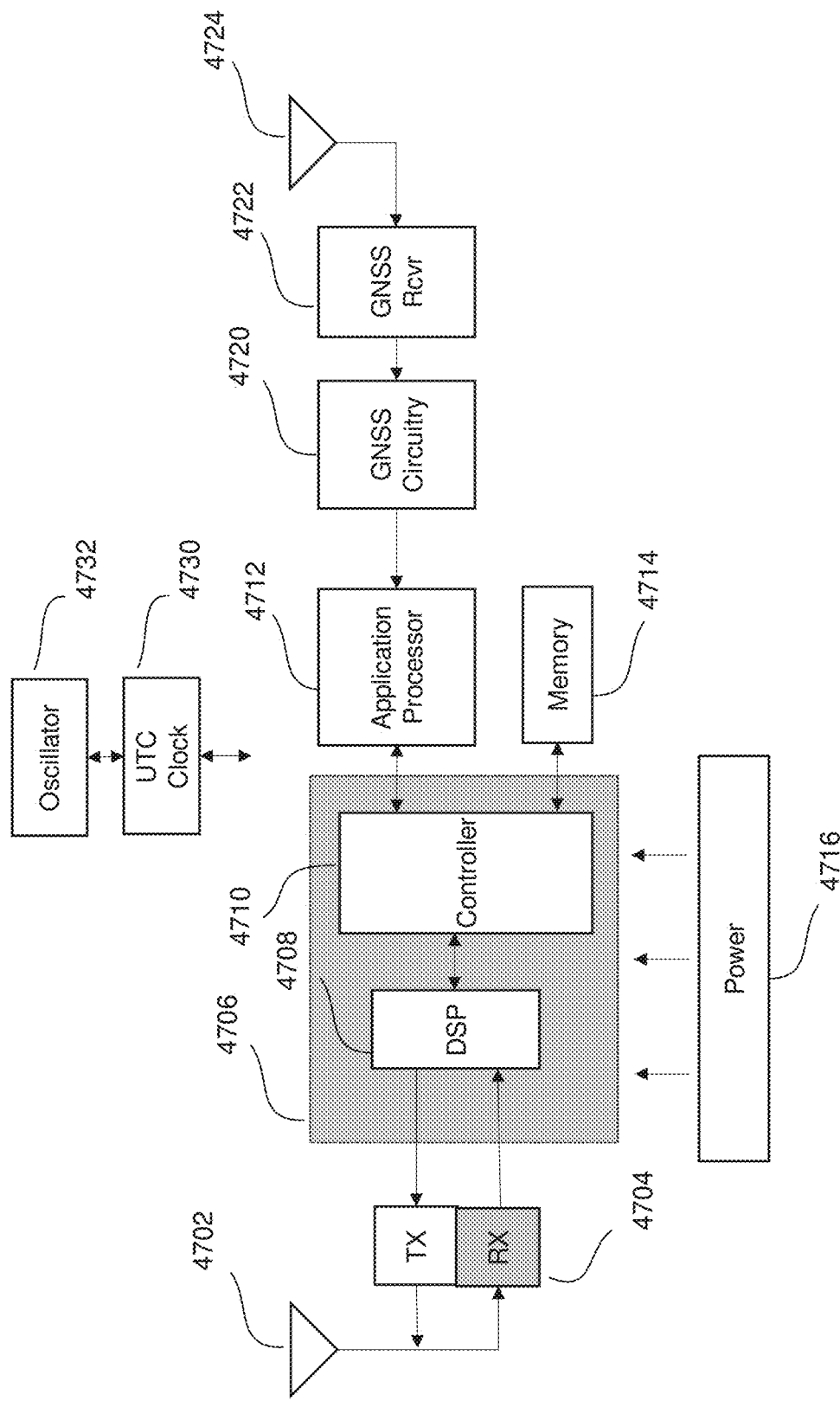
FIG. 47 shows an exemplary internal configuration of a terminal device according to some aspects.

FIG. 47 depicts a general terminal device architecture for wireless communications. FIG. 47 shows an internal configuration of terminal device 4502-n according to some aspects, which may include antenna system 4702, radio frequency (RF) transceiver 4704, baseband modem 4706 (including digital signal processor 4708 and controller 4710), application processor 4712, and memory 4714. Although not explicitly shown in FIG. 47, in some aspects terminal device 4502-n may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 4502-n may transmit and receive radio signals from one or more radio access networks. Baseband modem 206 may direct such communication functionality of terminal device 4502-n according to the communication protocols associated with each radio access network, and may execute control over antenna system 4702 and RF transceiver 4704 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 4502-n shown in FIG. 47 depicts only a single instance of such components.

Terminal device 4502-n may transmit and receive wireless signals with antenna system 4702, which may be a single antenna or an antenna array that includes multiple antennas. In some aspects, antenna system 4702 may additionally include analog antenna combination and/or beamforming circuitry. In the receive (RX) path, RF transceiver 4704 may receive analog radio frequency signals from antenna system 4702 and perform analog and digital RF front-end processing on the analog radio frequency signals to produce digital baseband samples (e.g., In-Phase/Quadrature (IQ) samples) to provide to baseband modem 4706. RF transceiver 4704 may include analog and digital reception components including amplifiers (e.g., Low Noise Amplifiers (LNAs)), filters, RF demodulators (e.g., RF IQ demodulators)), and analog-to-digital converters (ADCs), which RF transceiver 4704 may utilize to convert the received radio frequency signals to digital baseband samples. In the transmit (TX) path, RF transceiver 4704 may receive digital baseband samples from baseband modem 4706 and perform analog and digital RF front-end processing on the digital baseband samples to produce analog radio frequency signals to provide to antenna system 4702 for wireless transmission. RF transceiver 4704 may thus include analog and digital transmission components including amplifiers (e.g., Power Amplifiers (PAs), filters, RF modulators (e.g., RF IQ modulators), and digital-to-analog converters (DACs), which RF transceiver 4704 may utilize to mix the digital baseband samples received from baseband modem 4706 and produce the analog radio frequency signals for wireless transmission by antenna system 4702. In some aspects baseband modem 4706 may control the radio transmission and reception of RF transceiver 4704, including specifying the transmit and receive radio frequencies for operation of RF transceiver 4704.

As shown in FIG. 47, baseband modem 4706 may include digital signal processor 4708, which may perform physical layer (PHY, Layer 1) transmission and reception processing to, in the transmit path, prepare outgoing transmit data provided by controller 4710 for transmission via RF transceiver 4704, and, in the receive path, prepare incoming received data provided by RF transceiver 4704 for processing by controller 4710. Digital signal processor 4708 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 4708 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 4708 may include one or more processors configured to retrieve and execute program code that defines control and processing logic for physical layer processing operations. In some aspects, digital signal processor 4708 may execute processing functions with software via the execution of executable instructions. In some aspects, digital signal processor 4708 may include one or more dedicated hardware circuits (e.g., ASICs, FPGAs, and other hardware) that are digitally configured to specific execute processing functions, where the one or more processors of digital signal processor 4708 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 4708 may be realized as a coupled integrated circuit.

Terminal device 4502-$n$ may be configured to operate according to one or more radio communication technologies. Digital signal processor 4708 may be responsible for lower-layer processing functions (e.g., Layer 1/PHY) of the radio communication technologies, while controller 4710 may be responsible for upper-layer protocol stack functions (e.g., Data Link Layer/Layer 2 and/or Network Layer/Layer 3). Controller 4710 may thus be responsible for controlling the radio communication components of terminal device 4502-$n$ (antenna system 4702, RF transceiver 4704, and digital signal processor 4708) in accordance with the communication protocols of each supported radio communication technology, and accordingly may represent the Access Stratum and Non-Access Stratum (NAS) (also encompassing Layer 2 and Layer 3) of each supported radio communication technology. Controller 4710 may be structurally embodied as a protocol processor configured to execute protocol stack software (retrieved from a controller memory) and subsequently control the radio communication components of terminal device 4502-$n$ to transmit and receive communication signals in accordance with the corresponding protocol stack control logic defined in the protocol stack software. Controller 4710 may include one or more processors configured to retrieve and execute program code that defines the upper-layer protocol stack logic for one or more radio communication technologies, which can include Data Link Layer/Layer 2 and Network Layer/Layer 3 functions. Controller 4710 may be configured to perform both user-plane and control-plane functions to facilitate the transfer of application layer data to and from radio terminal device 4502-$n$ according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by controller 4710 may include executable instructions that define the logic of such functions.

In some aspects, terminal device 4502-$n$ may be configured to transmit and receive data according to multiple radio communication technologies. Accordingly, in some aspects one or more of antenna system 4702, RF transceiver 4704, digital signal processor 4708, and controller 4710 may include separate components or instances dedicated to different radio communication technologies and/or unified components that are shared between different radio communication technologies. For example, in some aspects controller 4710 may be configured to execute multiple protocol stacks, each dedicated to a different radio communication technology and either at the same processor or different processors. In some aspects, digital signal processor 4708 may include separate processors and/or hardware accelerators that are dedicated to different respective radio communication technologies, and/or one or more processors and/or hardware accelerators that are shared between multiple radio communication technologies. In some aspects, RF transceiver 4704 may include separate RF circuitry sections dedicated to different respective radio communication technologies, and/or RF circuitry sections shared between multiple radio communication technologies. In some aspects, the RF circuitry sections may be configurable to operate in different frequency bands on one or more radio communication technologies. In some aspects, antenna system 4702 may include separate antennas dedicated to different respective radio communication technologies, and/or antennas shared between multiple radio communication technologies. Accordingly, while antenna system 4702, RF transceiver 4704, digital signal processor 4708, and controller 4710 are shown as individual components in FI, in some aspects antenna system 4702, RF transceiver 4704, digital signal processor 4708, and/or controller 4710 can encompass separate components dedicated to different radio communication technologies.

Terminal device 4502-$n$ may also include GNSS antenna 4724, GNSS receiver 4722, and GNSS circuitry 4720. The terminal device 4502-$n$ may receive GNSS signals from one or more GNSS satellites. GNSS circuitry 4720 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, GNSS circuitry 4720 may include one or more processors configured to retrieve and execute program code that defines control and processing logic for synchronizing to one or more GNSS signals. In some aspects, GNSS circuitry 4720 may execute processing functions with software via the execution of executable instructions.

Terminal device 4502-$n$ may also include oscillator 4732 and UTC clock 4730 that provides timing to the terminal device. In some aspects, the UTC clock timing may be corrected based on radio signals from one or more radio access networks. For example, the baseband modem 4708 may adjust the UTC clock timing.

Terminal device 4502-n may also include application processor 4712 and memory 4714. Application processor 4712 may be a CPU, and may be configured to handle the layers above the protocol stack, including the transport and application layers. Application processor 4712 may be configured to execute various applications and/or programs of terminal device 4502-n at an application layer of terminal device 4502-n, such as an operating system (OS), a user interface (UI) for supporting user interaction with terminal device 4502-n, and/or various user applications. The application processor may interface with baseband modem 4706 and act as a source (in the transmit path) and a sink (in the receive path) for user data, such as voice data, audio/video/image data, messaging data, application data, basic Internet/web access data, etc. In the transmit path, controller 4710 may therefore receive and process outgoing data provided by application processor 4712 according to the layer-specific functions of the protocol stack, and provide the resulting data to digital signal processor 4708. Digital signal processor 4708 may then perform physical layer processing on the received data to produce digital baseband samples, which digital signal processor may provide to RF transceiver 4704. RF transceiver 4704 may then process the digital baseband samples to convert the digital baseband samples to analog RF signals, which RF transceiver 4704 may wirelessly transmit via antenna system 4702. In the receive path, RF transceiver 4704 may receive analog RF signals from antenna system 4702 and process the analog RF signals to obtain digital baseband samples. RF transceiver 4704 may provide the digital baseband samples to digital signal processor 4708, which may perform physical layer processing on the digital baseband samples. Digital signal processor 4708 may then provide the resulting data to controller 4710, which may process the resulting data according to the layer-specific functions of the protocol stack and provide the resulting incoming data to application processor 4712. Application processor 4712 may then handle the incoming data at the application layer, which can include execution of one or more application programs with the data and/or presentation of the data to a user via a user interface.

Memory 4714 may embody a memory component of terminal device 4502-n, such as a hard drive or another such permanent memory device. Although not explicitly depicted in FIG. 47, the various other components of terminal device 4502-n shown in FIG. 47 may additionally each include integrated permanent and non-permanent memory components, such as for storing software program code, buffering data, etc. As referenced herein, a memory can store data in a permanent manner by storing it in a permanent memory (e.g., a non-volatile memory that retains data after being powered off and on).

In accordance with some radio communication networks, terminal devices 4502-10 and 4502-11 may execute mobility procedures to connect to, disconnect from, and switch between available network access nodes of the radio access network of radio communication network 4590. As each network access node of radio communication network 4590 may have a specific coverage area, terminal devices 4502-10 and 4502-11 may be configured to select and re-select between the available network access nodes in order to maintain a strong radio access connection with the radio access network of radio communication network 4590. For example, terminal device 4502-10 may establish a radio access connection with network access node 4580 while terminal device 4502-11 may establish a radio access connection with network access node 4582. In the event that the current radio access connection degrades, terminal devices 4502-10 or 4502-11 may seek a new radio access connection with another network access node of radio communication network 4590; for example, terminal device 4502-11 may move from the coverage area of network access node 112 into the coverage area of network access node 4580. As a result, the radio access connection with network access node 4582 may degrade, which terminal device 4502-11 may detect via radio measurements such as signal strength or signal quality measurements of network access node 4582. Depending on the mobility procedures defined in the appropriate network protocols for radio communication network 4590, terminal device 4502-11 may seek a new radio access connection (which may be, for example, triggered at terminal device 4502-11 or by the radio access network), such as by performing radio measurements on neighboring network access nodes to determine whether any neighboring network access nodes can provide a suitable radio access connection. As terminal device 4502-11 may have moved into the coverage area of network access node 4580, terminal device 4502-11 may identify network access node 4580 (which may be selected by terminal device 4502-11 or selected by the radio access network) and transfer to a new radio access connection with network access node 4580. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios.

When terminal devices 4502-n are out-of-network coverage or when the wireless network is congested, their radio access technology may be used to establish D2D communication between two or more the terminal devices in absence of any network coordination. For example, the terminal devices 4502-n may use LTE radio access technology for direct communication with each other in a licensed spectrum when the terminal devices are out of LTE cellular network coverage. Alternatively, the terminal devices 4502-n may use LTE radio access technology for direct communication with each other in an unlicensed spectrum to minimize potential interference with the LTE cellular network when the terminal devices are out of LTE cellular network coverage or there is congestion on the LTE cellular network. Alternatively, a terminal device may use any other radio access technology.

In particular, FIG. 45A shows exemplary D2D communication network 4500 according to some aspects, which may include terminal devices 4502-0 to 4502-9 and external synchronization timing source 4504. Terminal devices 4502-0 to 4502-9 may be capable of communicating with radio communication network 4590 but may be out-of-range of radio communication network 4590 which includes network access node 4592. Nevertheless, terminal devices 4502-0 to 4502-9 may use their radio access network transmitters/receivers to establish direct communication with each other over radio resources shared by radio communication network 4590 (e.g., licensed spectrum). Alternatively, terminal devices 4502-0 to 4502-9 may also use their radio access network transmitters/receivers to establish direct communication with each other over publicly accessible radio resources (e.g., unlicensed spectrum). In some aspects, the one or more antenna systems 202, RF transceiver 204, DSP 208, and controller 210 may be configured to transmit and receive in various frequency bands. The number of terminal devices in D2D communication network 4500 is exemplary and is scalable to any amount.

As previously introduced, various aspects of this disclosure provide a hierarchically prioritized synchronization scheme that may be based on a plurality of timing sources. These timing sources may include a reliable global or externally regulated timing source 4504 and a local or internal autonomous independent timing source. The global/external timing source and any synchronization signal based on the global/external timing source may have priority over a local/internal timing source and any synchronization signal based on the local/internal timing source. Generally, a terminal device may synchronize to a higher priority synchronization signal whenever it is available. In order to facilitate communication between groups of terminal devices synchronized to different timing sources, the plurality of synchronization timing sources should be approximately synchronous. For example, the plurality of timing sources may be set to the same time standard such as the Coordinated Universal Time (UTC) standard.

The reliable global or externally regulated timing may be provided by a Global Navigation Satellite System (GNSS) since GNSS timing is synchronized to the UTC standard. The local or internally independent timing may be provided by a free running UTC clock of one of the terminal devices. Without feedback from a network to correct local oscillator drift, a terminal device's UTC time may be inaccurate. Its inaccuracy may be in the order of 100 ms. Accordingly, such an autonomous UTC clock is loosely synchronous to the UTC standard. Although a free running UTC timing is a degraded UTC timing, the use of even a degraded UTC timing minimizes the likelihood of misalignments. Alternatively, the global/external timing source may be provided by television broadcast system, cellular network, etc.

The use of GNSS and UTC based synchronization timing sources reduces synchronization search time because a terminal device can expect a GNSS based timing source reference to be within UTC time accuracy, since GNSS timing is synchronized to the UTC Standard. Thus, when no GNSS based synchronization timing source is available, a terminal device becomes an autonomous synchronization source using its own inaccurate UTC time instead of being completely asynchronous with GNSS timing.

Referring to FIG. 45A, terminal devices 4502-0 to 4502-9 may receive and synchronize to synchronization signals 4505 provided by a global/external synchronization timing source 4504. For example, the global/external synchronization timing source 4504 may be a GNSS satellite providing GNSS synchronization signals 4505 and terminal devices 4502-0 to 4502-9 may be user equipment (UE) capable of receiving and synchronizing to GNSS signals if they are within GNSS coverage. In particular, terminal devices 4502-0 and 4502-1 are within coverage of at least one GNSS satellite and may be synchronized to the GNSS timing provided by the at least one GNSS satellite. Terminal devices 4502-0 and 4502-1 may propagate a synchronization signal to extend GNSS based synchronization coverage to terminal devices outside of GNSS coverage. For example, terminal devices 4502-0 and 4502-1 may both provide a GNSS based synchronization signal by transmitting a D2D synchronization signal "tGNSS hop 1" 4511-0 which indicates that it is one hop away from a GNSS timing source.

Figure 45B:
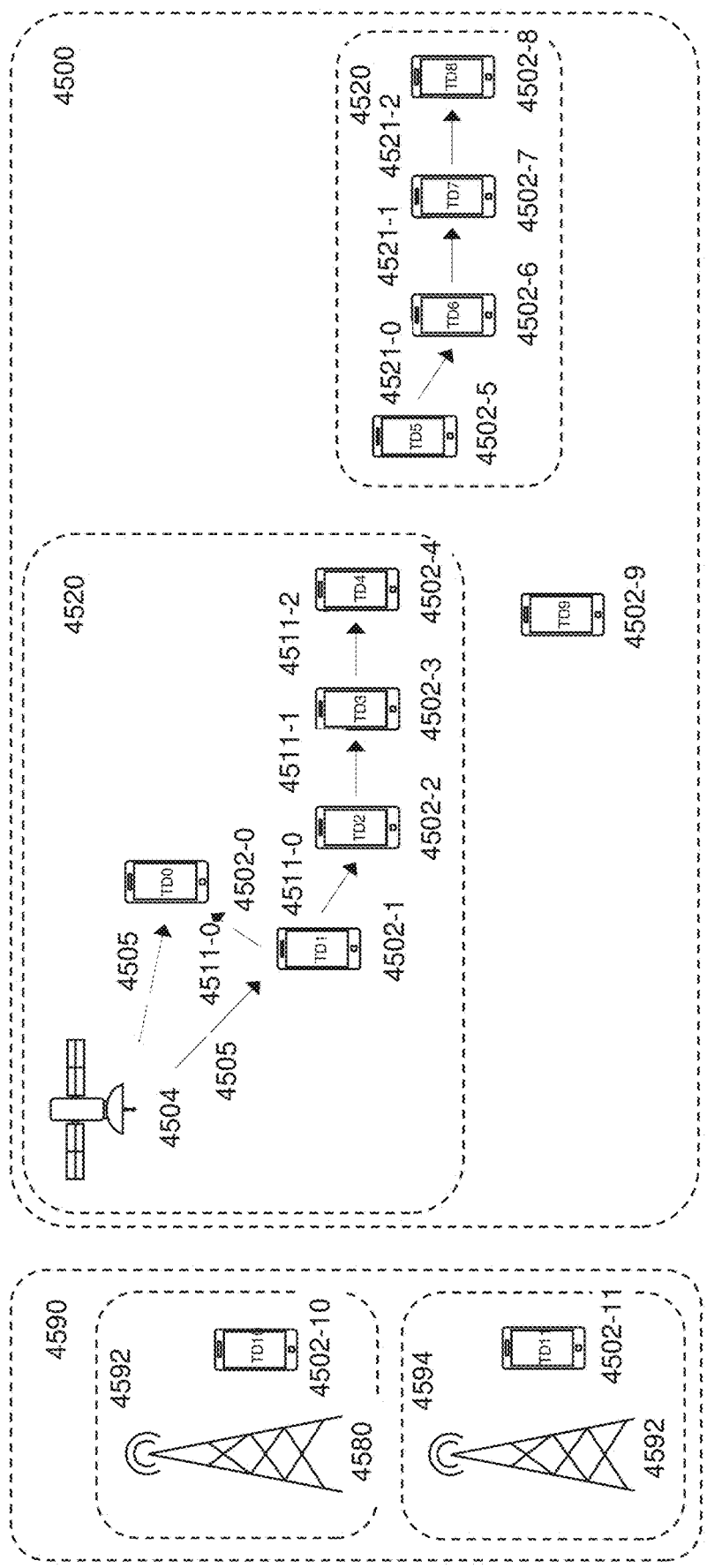
Figure 45C:
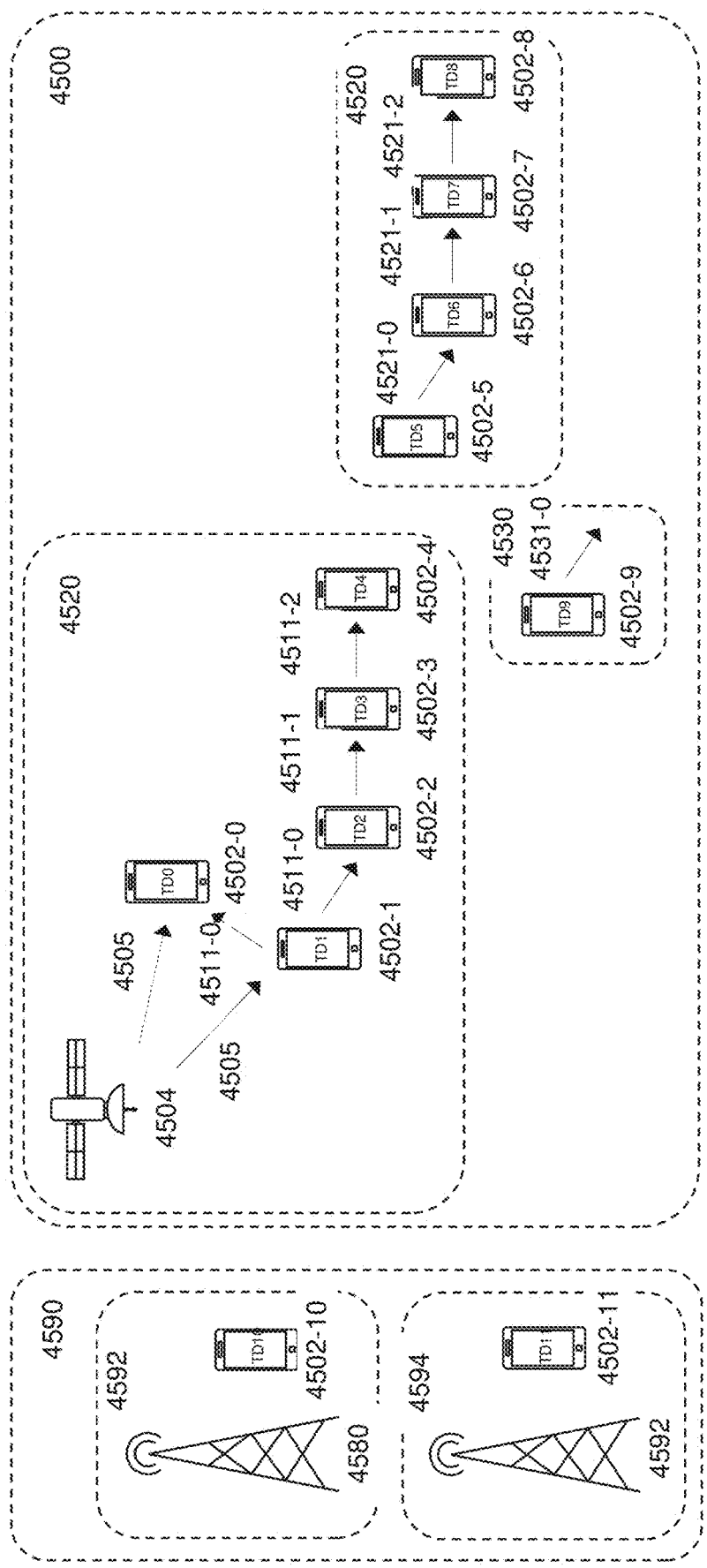
Figure 45D:
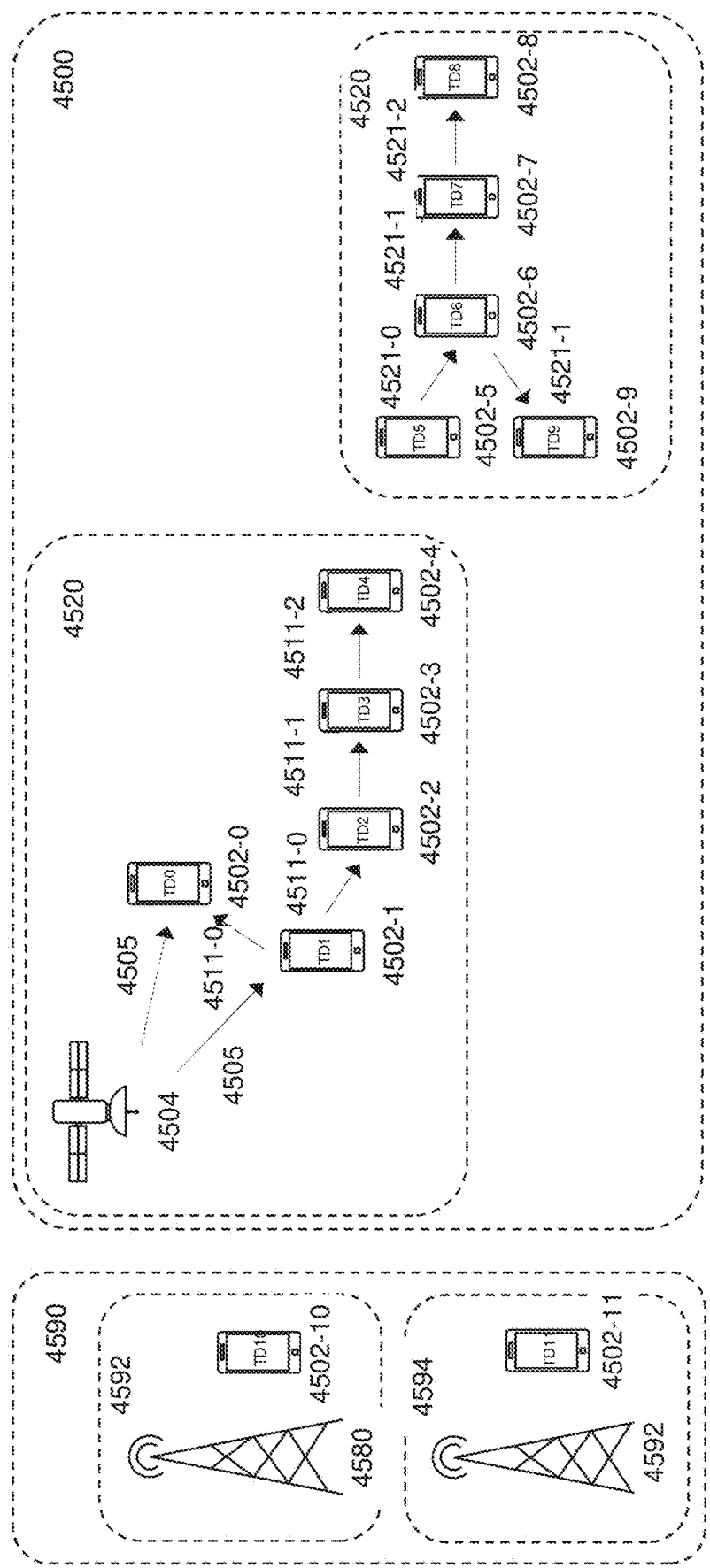

An ad-hoc D2D communication network utilizing a hierarchically prioritized synchronization scheme may provide a wider coverage area. FIGS. 46A-E show exemplary "D2D cells" or ranges of D2D synchronization signal transmissions of the exemplary network and device arrangements of FIGS. 45A-E, respectively. Referring to FIG. 46A, the dashed circle around each terminal device 4502-*n* indicates the range of transmission of a D2D synchronization signal relayed/propagated by a respective terminal device, i.e., a "D2D cell". The arrow directed to each respective terminal device indicates the D2D synchronization signal received by the respective terminal device. The dashed circle around global/external synchronization timing source 4504 indicates the geographical area covered by a synchronization signal transmitted by the external synchronization timing source, e.g., a GNSS signal transmitted by a GNSS satellite. In particular, FIG. 46A shows that terminal devices 4502-0 and 4502-1 are within direct GNSS coverage and terminal devices 4502-0 and 4502-2 are within D2D cell coverage of terminal device 4502-1. Although terminal device 4502-4 is out-of-range of terminal device 4502-1, it may still part of the ad-hoc network via synchronization signals 4511-0, 4511-1, and 4511-2 relayed from terminal devices 4502-1, 4502-2, and 4502-3, respectively.

Terminal devices that are outside direct coverage of an external synchronization timing source 4504 may search for a D2D synchronization signal based on the external synchronization timing source 4504. Referring to FIGS. 45A and 46A, terminal device 4502-2 is not within GNSS coverage but is within D2D cell coverage of terminal device 4502-1. Terminal device 4502-2 is able to find and synchronize to the D2D synchronization signal "tGNSS hop 1". Accordingly, terminal device 4502-2 is within some GNSS coverage. Once synchronized, terminal device 4502-2 may relay a further synchronization signal by transmitting a D2D synchronization signal "tGNSS hop 2" 4511-1 which indicates that it is two hops away from a GNSS timing source. Thus, terminal device 4502-2 is receiving "tGNSS hop 1" 4511-0 and relaying "tGNSS hop 2" 4511-1 to further extend some GNSS coverage.

Such relay mechanism may be continued infinitely using, e.g. further, repeated, or toggled synchronization resources after some relay hops. For example, referring again to FIGS. 45A and 46A, terminal device 4502-3 may be even further outside of GNSS coverage but is within D2D cell coverage of terminal device 4502-2. Thus, terminal device 4502-3 is able to find and synchronize to the D2D synchronization signal "tGNSS hop 2" 4511-1 relayed by terminal device 4502-2. Once synchronized, terminal device 4502-3 may relay a further synchronization signal by transmitting a D2D synchronization signal "tGNSS hop 3" 4511-2 which indicates that it is three hops away from a GNSS timing source. Terminal device 4502-4 may yet be further outside of GNSS coverage but is within D2D cell coverage of terminal device 4502-3. Thus, terminal device 4502-4 is able to find and synchronize to the D2D synchronization signal "tGNSS hop 3" 4511-2 relayed by terminal device 4502-3. Once synchronized, terminal device 4502-4 may decide not to relay a further synchronization signal. For example, terminal device 4502-4 may determine that a further relay synchronization signal would not satisfy latency requirements of the system. In the arrangement shown in FIGS. 45A and 46A, terminal devices 4502-0 to 4502-4 are within some GNSS coverage. Thus, terminal devices 4502-0 to 4502-4 are members of a synchronization group 4510 based on an external synchronization timing source.

As shown in FIGS. 45A and 46A, there may be one or more groups of terminal devices in the D2D communication network 4500 without any coverage from an external synchronization timing source. In particular, terminal devices 4502-5 to 4502-8 have no GNSS coverage at all. These terminal devices are not in GNSS coverage and are beyond the range of any terminal device providing a GNSS based D2D synchronization signal. Since GNSS timing is synchronized to Universal Coordinated Time (UTC), this group of terminal devices and any other group of terminal devices without any GNSS coverage should use their own UTC timing for synchronization in order to facilitate communication between devices from two or more different synchronization groups and minimize interference with the radio resources utilized by the different groups.

Referring to FIGS. 45A and 46A, terminal device 4502-5 may be a terminal device that is unable to find any D2D synchronization signal and decides to become an autonomous synchronization source. It generates and transmits a D2D synchronization signal "tUTC hop 1" 4521-0 derived from its own UTC timing which is approximately synchronous to GNSS timing subject to local oscillator errors and propagation errors. The D2D synchronization signal "tUTC hop 1" 4521-0 should indicate that it is one hop away from an autonomous synchronization timing source, e.g. itself (in other words, its own internal synchronization timing source). As shown in FIGS. 45A and 45A, terminal device 4502-6 is within D2D cell coverage of terminal device 4502-5. Thus, terminal device 4502-6 is able to find and synchronize to the D2D synchronization signal "tUTC hop 1" 4521-0, which it has determined is the best D2D synchronization signal to which it can currently synchronize. Once synchronized, terminal device 4502-6 may relay a further synchronization signal based on "tUTC hop 1" 4521-0 by transmitting a D2D synchronization signal "tUTC hop 2" 4521-1 using other radio resources to further extend coverage of the autonomous synchronization timing originated by terminal device 4502-5. The D2D synchronization signal "tUTC hop 2" 4521-1 indicates that it is two hops away from an autonomous synchronization timing.

Again, such relay mechanism may be continued infinitely using, e.g. further, repeated, or toggled synchronization resources after some relay hops to allow quasi infinite relay of the synchronization timing. For example, referring again to FIGS. 45A and 46A, terminal device 4502-7 may be out-of-range of D2D cell coverage of terminal device 4502-5 but is within D2D cell coverage of terminal device 4502-6. Thus, terminal device 4502-7 is able to find and synchronize to the D2D synchronization signal "tUTC hop 2" 4521-1, which it has determined is the best D2D synchronization signal to which it can currently synchronize. Once synchronized, terminal device 4502-7 may relay a further synchronization signal based on "tUTC hop 2" 4521-1 by transmitting a D2D synchronization signal "tUTC hop 3" 4521-2 using other radio resources. The D2D synchronization signal "tUTC hop 3" 4521-2 indicates that it is three hops away from an autonomous synchronization timing. Terminal device 4502-8 may yet be further away from terminal device 4502-5 but is within D2D cell coverage of terminal device 4502-7. Thus, terminal device 4502-8 is able to find and synchronize to the D2D synchronization signal "tUTC hop 3" 4521-2 relayed by terminal device 4502-7. Once synchronized, terminal device 4502-8 may decide not to relay a further synchronization signal. For example, terminal device 4502-8 may determine that a further relay synchronization signal would not satisfy latency requirements of the system. In the arrangement shown in FIGS. 45A and 46A, terminal devices 4502-5 to 4502-8 are out-of-range of any GNSS coverage but are all synchronized to a UTC timing provided by terminal device 4502-5. Thus, terminal devices 4502-5 to 4502-8 are members of a synchronization group 4520 based on an autonomous synchronization timing source that is approximately synchronous with the global/external synchronization timing source 4504.

For example, referring to FIGS. 45A and 46A, the synchronization priority from highest to lowest is: GNSS signal 105->tGNSS hop 1 (GNSS relay 1st hop) 4511-0->tGNSS hop 2 (GNSS relay 2nd hop) 4511-1->tGNSS hop3 (GNSS relay 3rd hop) 4511-2->tUTC hop 1 (UTC relay 1st hop) 4521-0->tUTC hop 2 (UTC relay 2nd hop) 4521-1->tUTC hop3 (UTC relay 3rd hop) 4521-2. In general, externally based D2D synchronization signals such as GNSS based D2D synchronization signals have higher priority than autonomously based D2D synchronization signals such as UTC based D2D synchronization signals. D2D synchronization signals having fewer hops have higher priority.

It may generally be desirable to be able to synchronize to a global/external synchronization signal or to synchronize to the highest priority D2D synchronization signal that is available. For example, a terminal device 4502-n within coverage of a global/external synchronization timing reference source 4504 may synchronize to the global/external synchronization signal 4505 and not search for any D2D synchronization signals. Once synchronized to a global/external timing, the terminal device 4502-n may transmit a D2D synchronization signal 4511-0 based on the global/external synchronization signal 4505. The relayed global/external based synchronization signal 4511-0 should contain information that indicates how it is related to the global/external timing source (e.g., hop distance). A terminal device 4502-n that is not in coverage of a global/external timing reference source 4504 may search to find all available D2D synchronization signals and synchronize to the best (e.g., highest priority or strongest signal) D2D synchronization signal found. If a terminal device 4502-n is unable to find any D2D synchronization signal, it may transmit a local autonomous based synchronization signal that may be used to start a new synchronization group. The relayed local autonomous based synchronization signal should contain information that indicates how it is related to the local autonomous timing source. To reduce timing conflicts, the local autonomous D2D synchronization signal should be derived from a timing that is synchronous with the global/external timing. For example, if the global/external timing is a GNSS timing, the terminal device may use its own UTC timing.

A terminal device 4502-n not in direct coverage of an external synchronization timing source 4504 should at least periodically seek a more accurate synchronization source while in operation. For example, referring to FIG. 45A, a terminal device 4502-8 synchronized to UTC timing "tUTC hop 3" 4521-2 may implement a mechanism to continuously search for a synchronization signal corresponding to neighboring D2D cells by searching for "tUTC hop 1" or "tUTC hop 2" and preferably "tGNSS hop 1", "tGNSS hop 2", or "tGNSS hop 3".

Figure 48A:
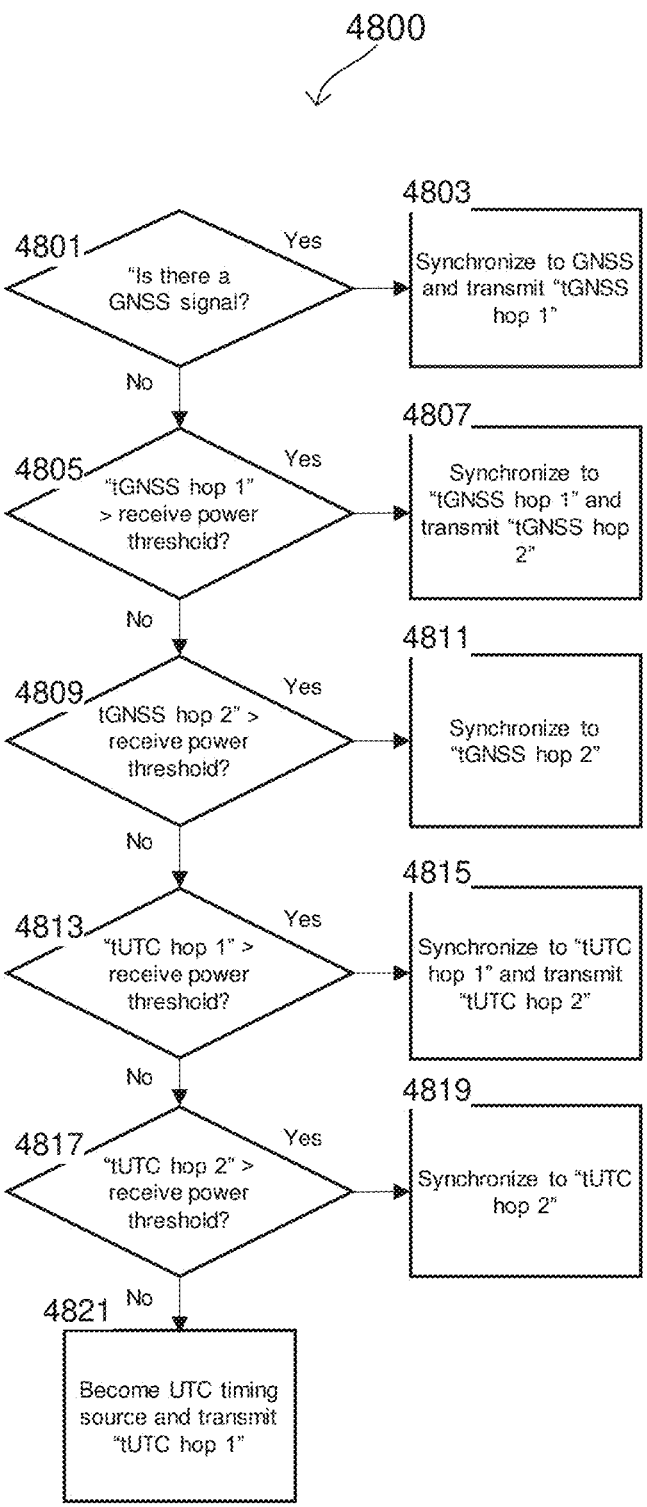
FIGS. 48A and 48B show exemplary procedures for synchronization selection search according to some aspects.

FIG. 48A shows an exemplary method 4800 of a synchronization selection search according to some aspects. Method 4800 is described below with respect to the system arrangement to FIG. 45E in which unsynchronized terminal device TD9 4502-9 is attempting to join a D2D communication network 4500. Referring to FIG. 48A, in 4801, TD9 may search for any GNSS signal. If TD9 finds a GNSS signal 4505, it may synchronize to the GNSS signal 4505 and transmit a D2D synchronization signal 4511-0 indicating that it is one hop away from a GNSS source 4504. If TD9 is unable to find a GNSS signal 4505, it then searches for the highest priority D2D synchronization signal 4511-0 indicating that is it one hop away from a GNSS source 4504. If TD9 finds a D2D synchronization signal 4511-0, it may synchronize to the D2D synchronization signal 4511-0 and transmit a next lower priority D2D synchronization signal 4511-1 indicating that it is two hops away from a GNSS source 4504. If TD9 is unable to find a D2D synchronization signal 4511-1, it then searches for the next lower priority D2D synchronization signal 4511-1 indicating that is it two hops away from a GNSS source 4504. If TD9 finds a D2D synchronization signal 4511-1, it may synchronize to the D2D synchronization signal 4511-1 and determine whether to transmit a next lower priority D2D synchronization signal 4511-2 indicating that it is three hops away from a GNSS source 4504. This determination may be made based on latency requirements, channel conditions, etc. If TD9 is unable to find a D2D synchronization signal 4511-1, it then searches for the next lower priority D2D synchronization signal 4511-2. In this example, D2D synchronization signal 4511-2 is based on the autonomous timing of TD5 4502-5 indicating that is it on hop away from a UTC source TD5. If TD9 finds a D2D synchronization signal 4511-2, it may synchronize to the D2D synchronization signal 4511-2 and transmit a next lower priority D2D synchronization signal 4511-3 indicating that it is two hops away from a UTC source TD5. In this example, D2D synchronization signal 4511-3 is the lowest priority D2D synchronization signal. If TD9 is unable to find a D2D synchronization signal 4511-3, it won't search for the next lower priority D2D synchronization signal 4511-4. Instead, TD9 may become an autonomous timing source and transmit D2D synchronization signal 4511-2 indicating that it is one hop away from a UTC source. If TD9 finds a D2D synchronization signal 4511-3, it may synchronize to the D2D synchronization signal 4511-3 and determine whether to transmit a next lower priority D2D synchronization signal 4511-4 indicating that it is three hops away from a UTC source TD5 This determination may be made based on latency requirements, channel conditions, etc.

To facilitate the search and identification of D2D synchronization signals and selection of an optimal synchronization signal to synchronize to, a D2D synchronization signal may include information that allows a receiving terminal device to synchronize to the transmitting terminal device. A frame structure is described below with reference to FIG. 58. The information may include a synchronization sequence. The synchronization sequence is selected from a plurality of distinct synchronization sequences. Each D2D synchronization signal may include a distinct primary synchronization signal (PSS) sequence. A PSS sequence may be a downlink signal used by a terminal device to obtain frame timing. The correlation between a received sequence and the ideal sequence should be the greatest when there is no lag. The sequence should have zero cyclic autocorrelation for any non-zero lag. For example, each primary synchronization signal sequence may be a distinct frequency domain Zadoff-Chu code sequence. Other sequences may be used.

The plurality of distinct PSS sequences may be arranged in an ordered set. Each of the PSS sequences and the order of the PSS sequences should be known to all terminal devices. The ordered set should allow any terminal device that is not within coverage of a synchronization timing source to determine whether there is another synchronization source that is closer to the external timing source. For example, a D2D synchronization signal that includes the first PSS sequence of the ordered set of sequences should be the highest priority D2D synchronization signal, a D2D synchronization signal that includes the second PSS sequence of the ordered set of sequences should be the second highest priority D2D synchronization signal, a D2D synchronization signal that includes the third sequence of the ordered set of sequences should be the third highest priority D2D synchronization signal, and so on. Thus, each D2D synchronization signal may include a PSS sequence corresponding to its priority. A terminal device searching for a D2D synchronization signal of a particular priority may search for the corresponding PSS sequence in the D2D synchronization signal.

When searching for a D2D synchronization signal, a terminal device may iteratively search for each D2D synchronization signal until a D2D synchronization signal corresponding to a highest available priority is found. For example, if a D2D synchronization signal included distinct PSS sequences, a terminal device may iteratively search for each of the PSS sequences of the ordered set of PSS sequences one by one starting from the highest priority and stopping when a D2D synchronization signal including a particular PSS sequence is found. Or it may only search for PSS sequences corresponding to sources with some GNSS based coverage, or it may search for PSS sequences indicating a first hop from a timing source. The priority of each PSS sequence is predefined and whether a PSS sequence corresponds to an external timing source or an autonomous timing source is also predefined. This information is all known to all terminal devices participating in the D2D communication network.

For example, referring to FIGS. 45A and 46A, the D2D communication network includes GNSS based D2D synchronization signals corresponding to three different priority levels (e.g., one hop, two hops, three hops) as well as non-GNSS based D2D synchronization signals corresponding to three different priority levels (e.g., one hop, two hops, three hops). Accordingly, six distinct primary synchronization sequences, each corresponding to a D2D synchronization signal of a particular priority, should be used. As shown in Table 1A, a first primary synchronization sequence (PSS0) may correspond to a GNSS based D2D synchronization signal that is a one hop away from a GNSS source, a second primary synchronization sequence (PSS1) may correspond to a GNSS based D2D synchronization signal that is two hops away from a GNSS source, a third primary synchronization sequence (PSS2) may correspond to a GNSS based D2D synchronization signal that is three hops away from a GNSS source, a fourth primary synchronization sequence (PSS3) may correspond to a UTC based D2D synchronization signal that is a one hop away from a UTC source, a fifth primary synchronization sequence (PSS4) may correspond to a UTC based D2D synchronization signal that is two hops away from a UTC source, and a sixth primary synchronization sequence (PSS5) may correspond to a UTC based D2D synchronization signal that is three hops away from a UTC source.

TABLE 1A

| Propagated/Relay D2D Synchronization Signal | PSSn |
|---|---|
| tGSNN hop 1 | 0 |
| tGSNN hop 2 | 1 |
| tGSNN hop 3 | 2 |
| tUTC hop 1 (Non-GNSS) | 3 |
| tUTC hop 2 (Non-GNSS) | 4 |
| tUTC hop 3 (Non-GNSS) | 5 |

Figure 45E:
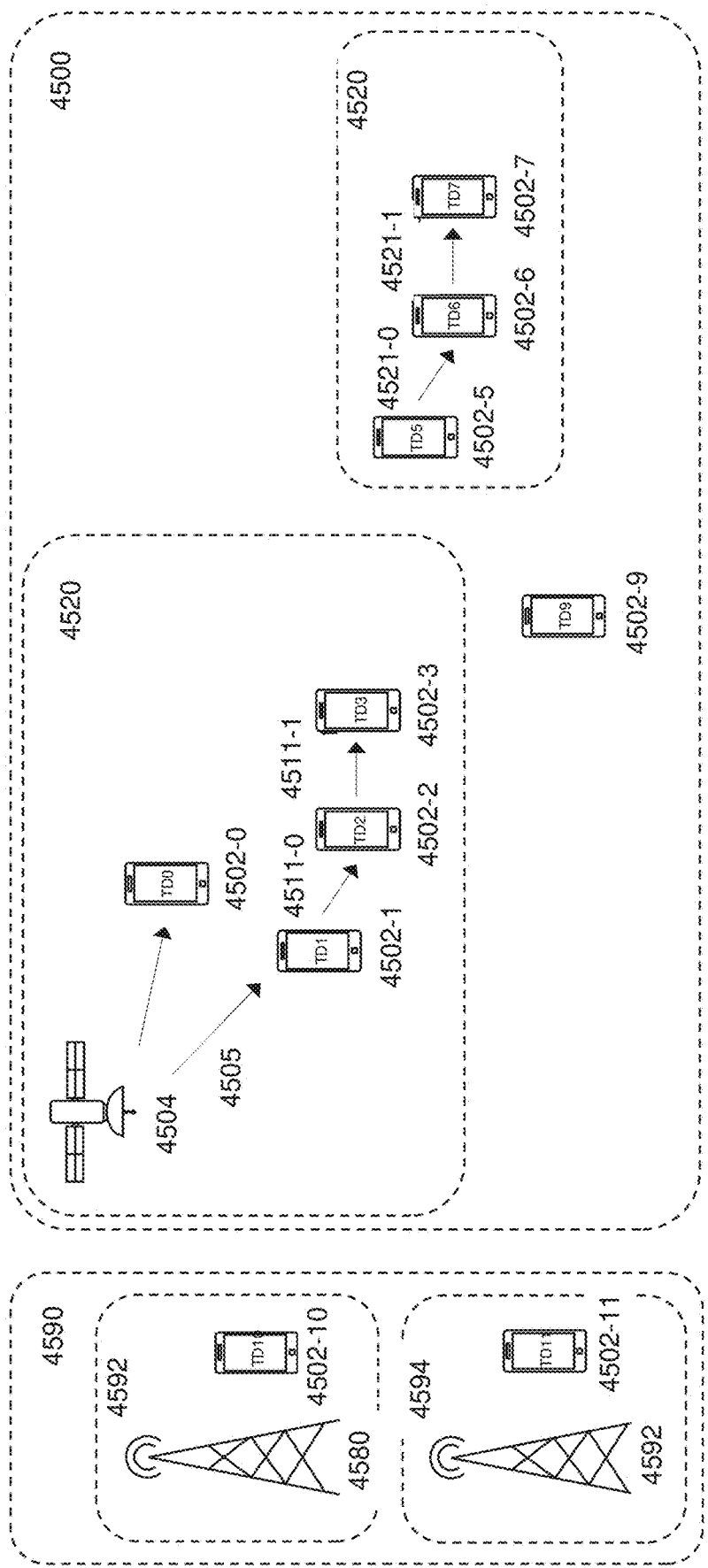
Figure 45F:
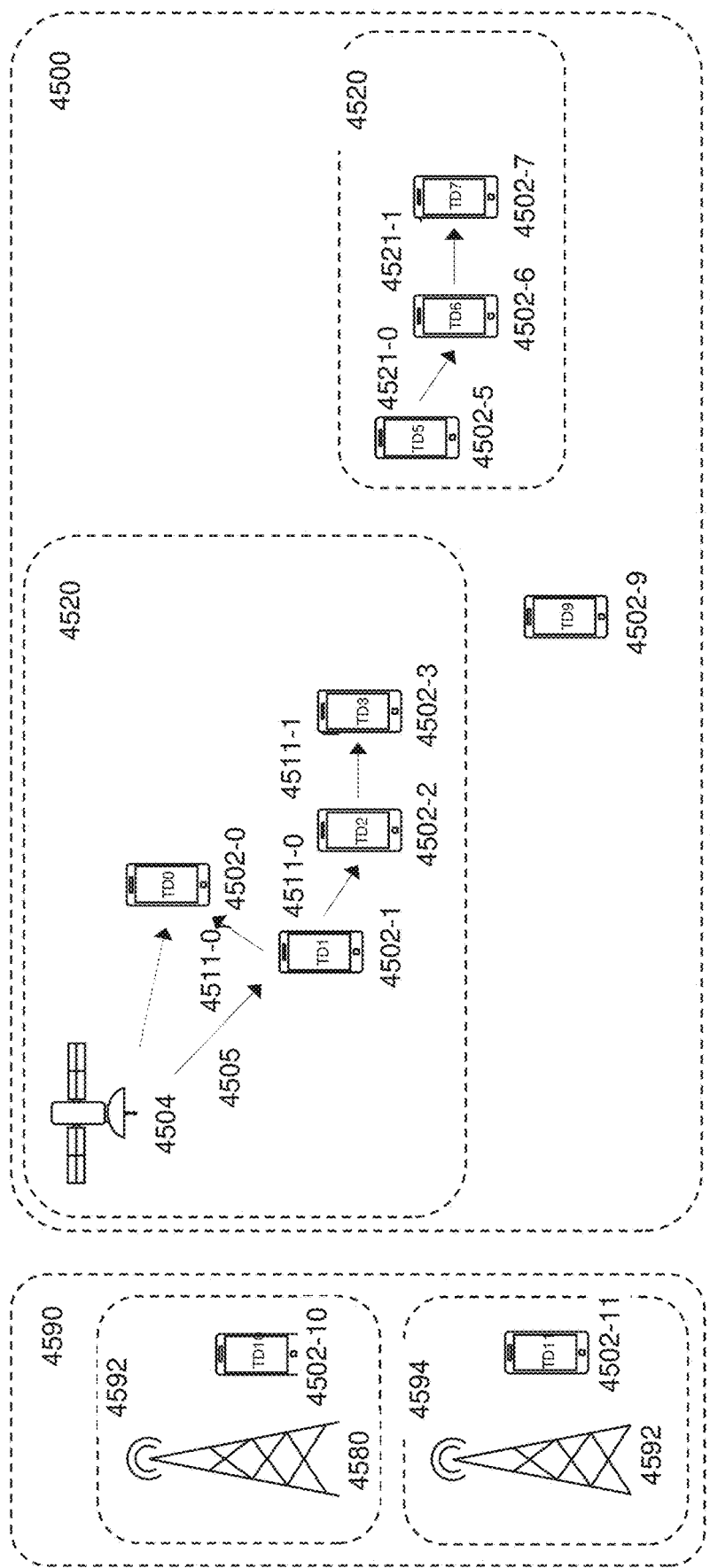
Figure 46A:
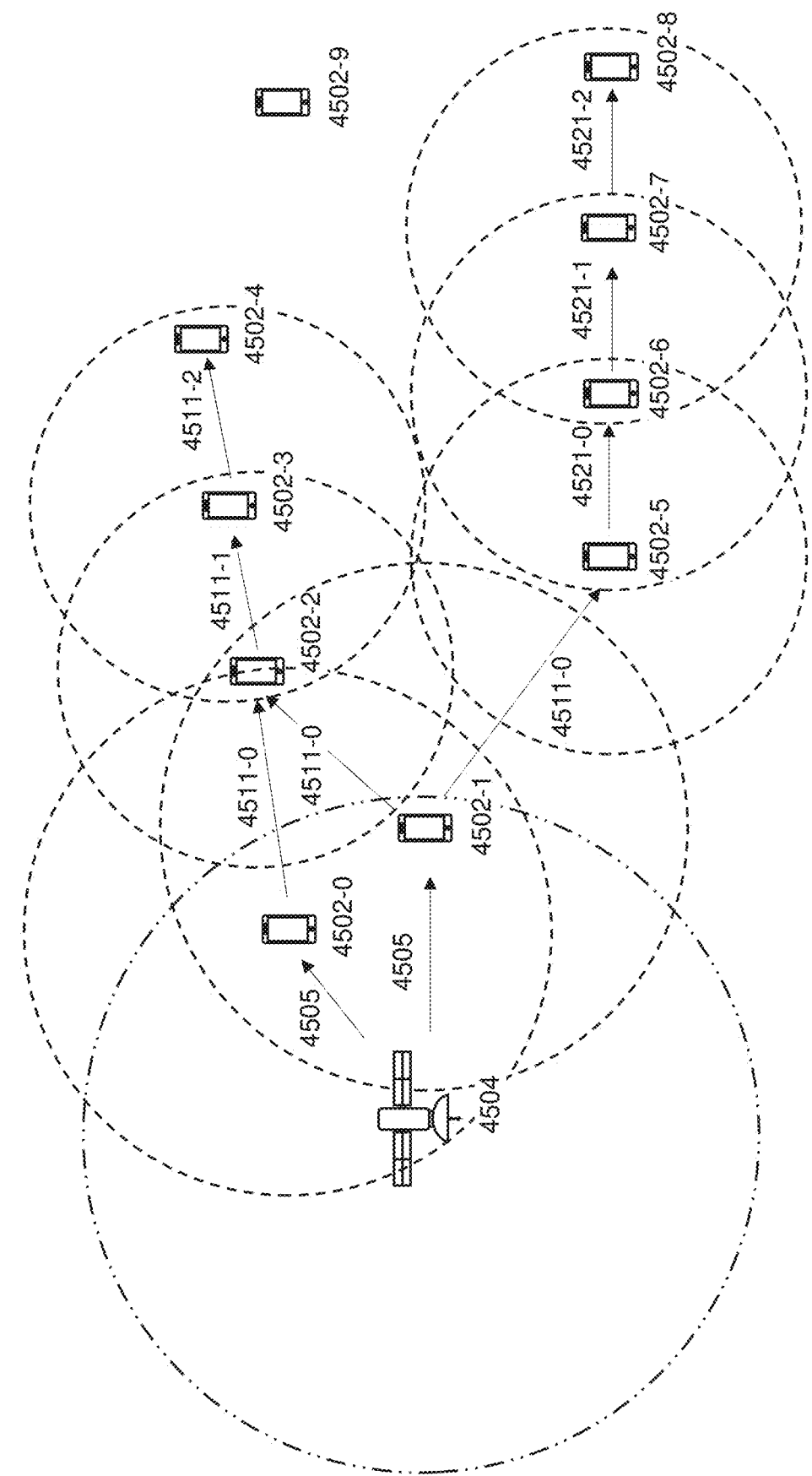
FIGS. 46A-46E show exemplary ranges of D2D synchronization signal transmissions according to some aspects.
Figure 46B:
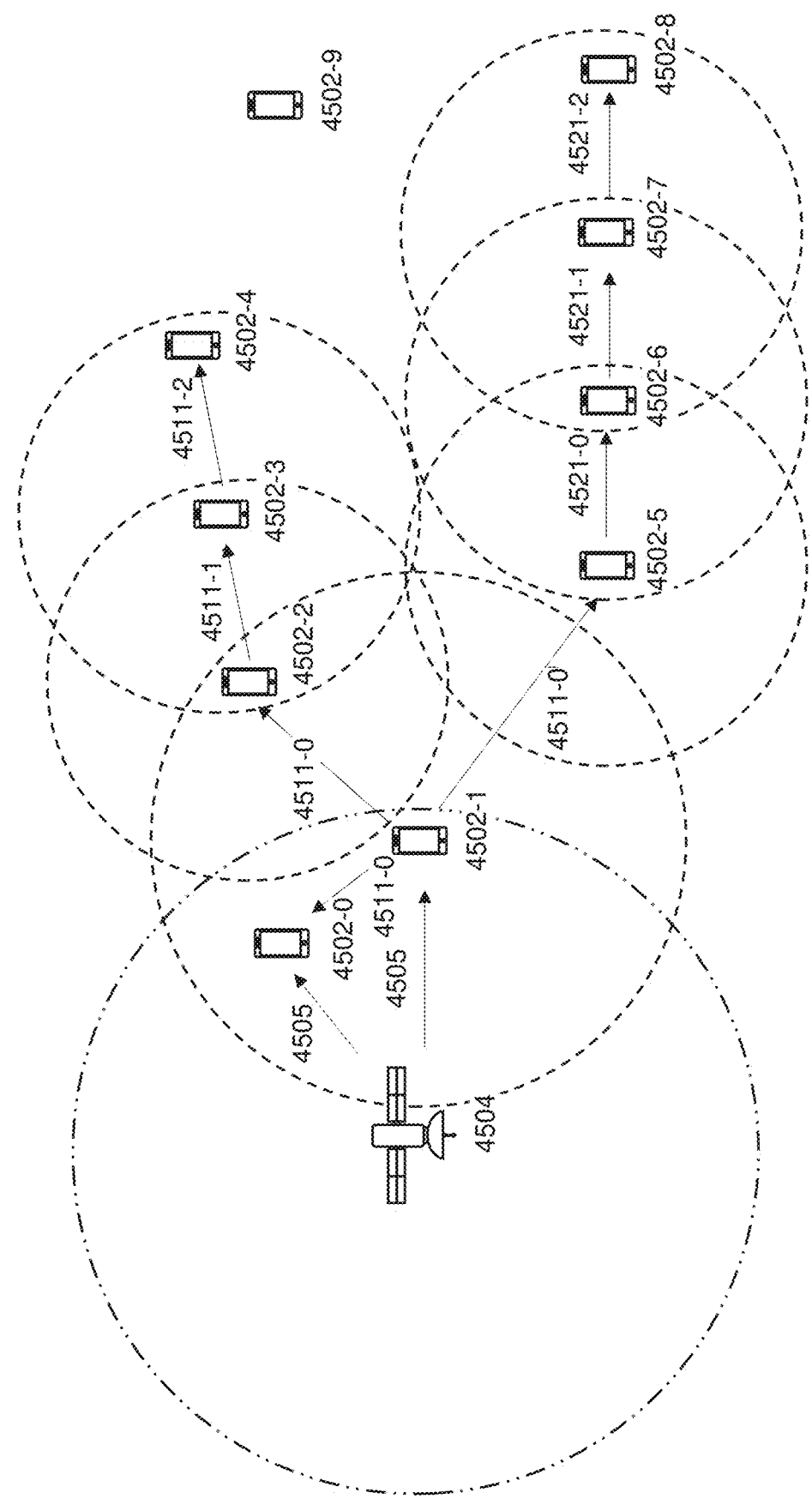
Figure 46C:
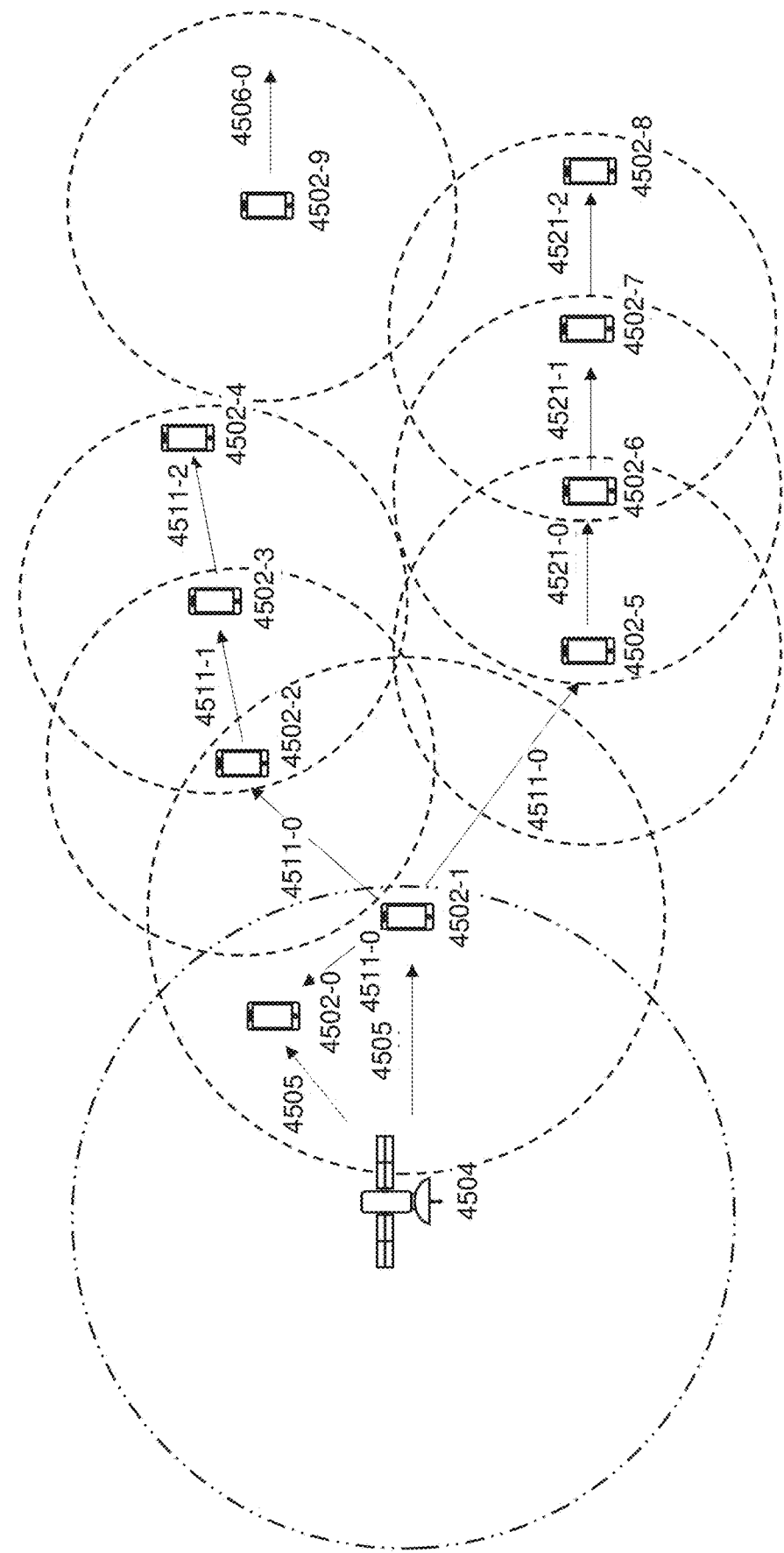
Figure 46D:
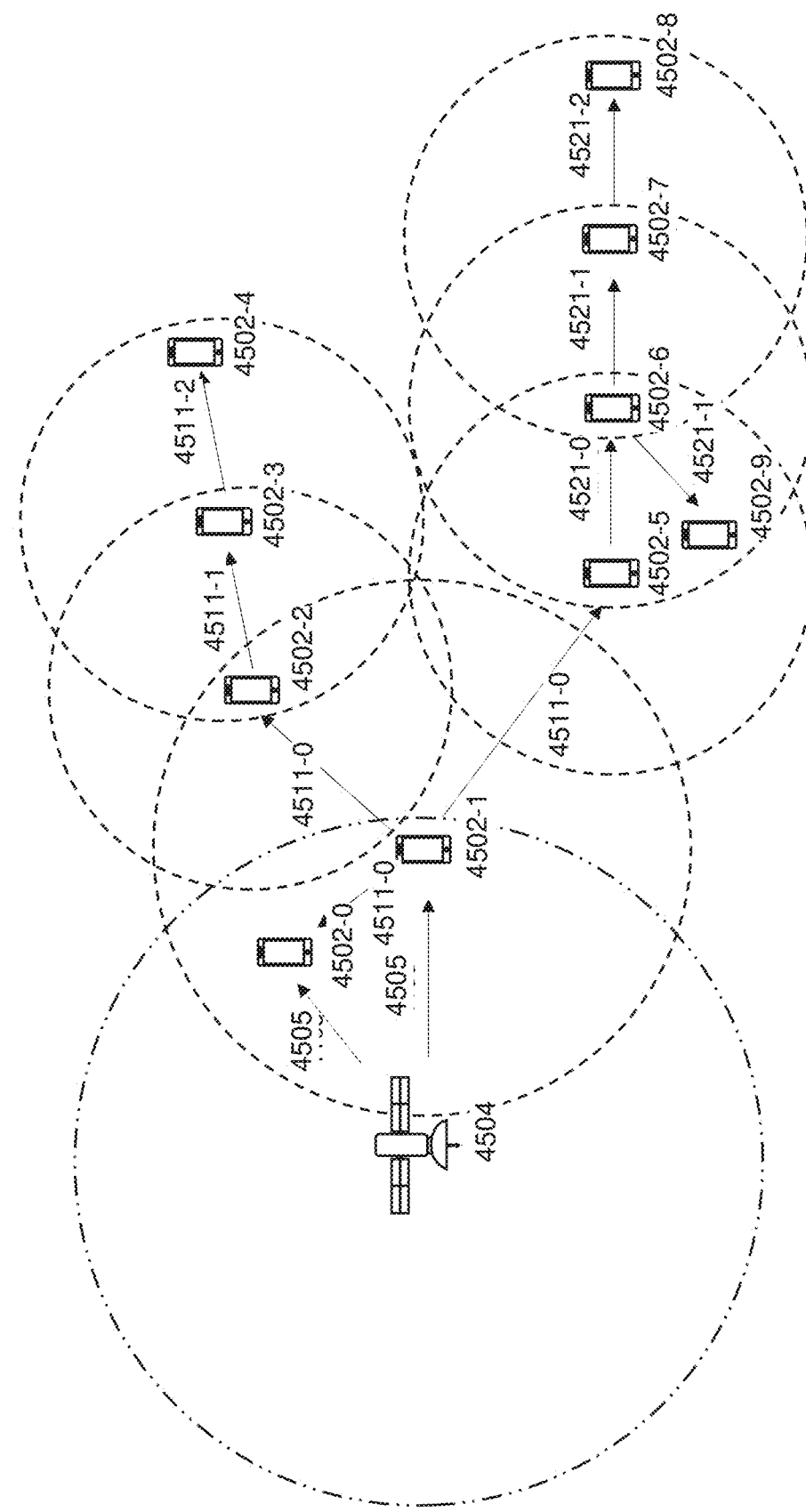
Figure 46E:
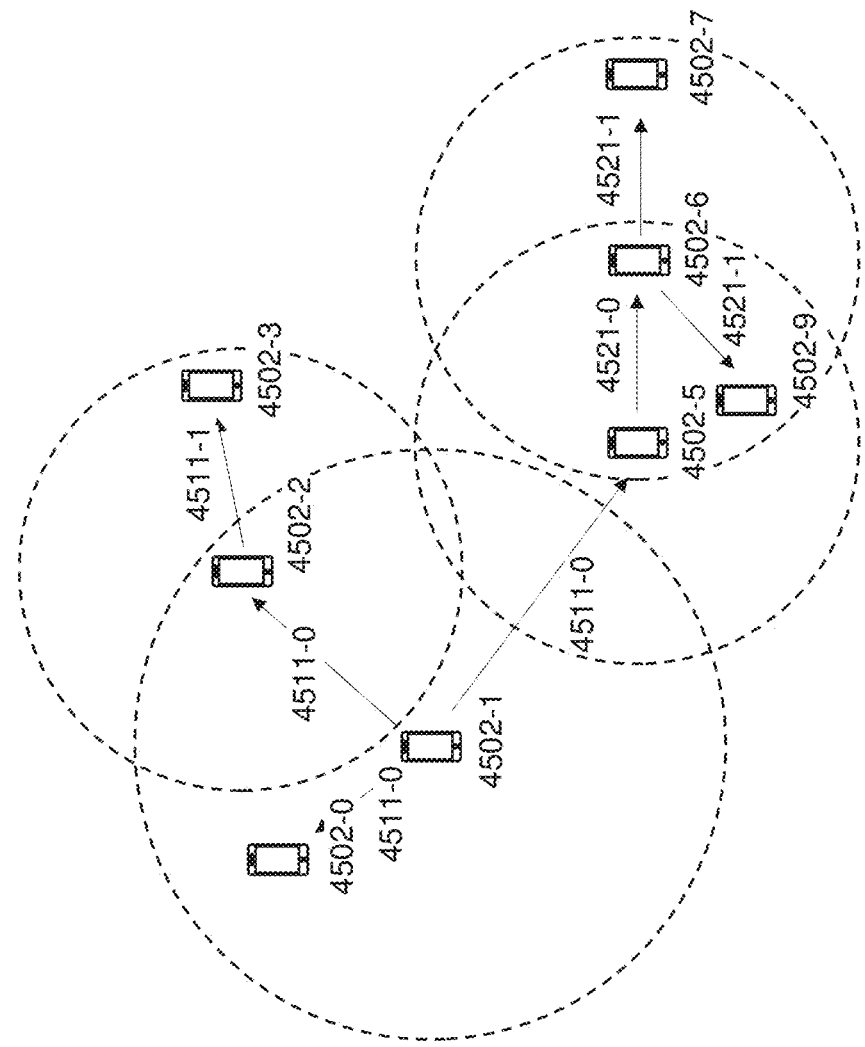

For example, referring to FIGS. 45E and 46E, the D2D communication network includes GNSS based D2D synchronization signals corresponding to two different priority levels (e.g., two hops) as well as non-GNSS based D2D synchronization signals corresponding to two different priority levels (e.g., two hops). Accordingly, four distinct primary synchronization sequences, each corresponding to a D2D synchronization signal of a particular priority, should be used. As shown in Table 45B, a first primary synchronization sequence (PSS0) may correspond to a GNSS based D2D synchronization signal that is a one hop away from a GNSS source, a second primary synchronization sequence (PSS1) may correspond to a GNSS based D2D synchronization signal that is two hops away from a GNSS source, a third primary synchronization sequence (PSS2) may correspond to a UTC based D2D synchronization signal that is a one hop away from a UTC source, a fourth primary synchronization sequence (PSS3) may correspond to a UTC based D2D synchronization signal that is two hops away from a UTC source.

TABLE 1

| Propagated/Relay D2D Synchronization Signal | PSSn |
| --- | --- |
| tGNSS hop 1 | 0 |
| tGNSS hop 2 | 1 |
| tUTC hop 1 (Non-GNSS) | 2 |
| tUTC hop 2 (Non-GNSS) | 3 |

In some aspects, the synchronization sequences may indicate whether the transmitting device (of the synchronization sequence) is a single hop or multiple hops from a GNSS source (e.g., regulated external timing reference source) or UTC source (e.g., an independent timing reference course). For example, PSS0 may indicate that the synchronization sequence is a single hop from a GNSS source (e.g., that the transmitting device is synced directly with a GNSS source, e.g., "tGNSS hop 1"), while PSS1 may indicate that the synchronization sequence is multiple hops from a GNSS source (e.g., that the transmitting device is synced with another transmitting device that is also synced with a GNSS source by at least one hop, e.g., any hop greater than "tGNSS hop 1"). Similarly, PSS2 may indicate that the synchronization sequence is a single hop from a UTC source (e.g., that the transmitting device is synced with its own internal UTC source, e.g., "tUTC hop 1"), while PSS3 may indicate that the synchronization sequence is multiple hops from a UTC source (e.g., that the transmitting device is synced with another transmitting device that is also synced with a UTC source by at least one hop, e.g., any hop greater than "tUTC hop 1"). Terminal devices may then use a prioritized hierarchy that prioritizes, from highest to lowest, PSS0, PSS1, PSS2, and PSS3 (e.g., that prioritizes regulated external timing reference sources over independent timing reference resource, and that prioritizes single hops over multiple hops).

Although it is more reliable to synchronize to an external timing source when it is available, synchronizing to an external timing source may not be energy efficient. For example, referring to the network arrangement shown in FIG. 45A, a terminal device 4502-n capable of receiving and processing GNSS signals may synchronize to a GNSS synchronization signal provided by one or more GNSS satellites. However, searching and synchronizing to a GNSS satellite requires a considerable amount of processing and power. Rather than always synchronizing to a GNSS timing source when it is available, a terminal device 4502-n should be capable to select an alternative synchronization reference source as a primary synchronization reference source.

Additionally, the transmission of D2D synchronization signals can use a large amount of power. In order to increase the efficiency of the hierarchically prioritized synchronization scheme, the number of terminal devices propagating D2D synchronization signals may be reduced. A terminal device 4502-n may decide not to propagate a D2D synchronization signal indicating an nth hop if it finds another nearby terminal device 4502-n that is already propagating a D2D synchronization signal indicating an nth hop.

To facilitate a more energy efficient hierarchically prioritized synchronization scheme, each terminal device 4502-n may be further configured have different roles to reduce redundancy. For example, instead of having multiple terminal devices transmitting the same D2D synchronization signal of a particular priority, there may be a "Master" terminal device and a "Slave" terminal device where only the "Master" terminal device may propagate a D2D synchronization. Generally, only one terminal device may be elected or selected as a "Master" corresponding to a particular synchronization priority level so that only one terminal device transmits a D2D synchronization signal at that priority level. For example, a terminal device 4502-n may be a MasterSync (priority 1), a MasterSync Slave (priority 1), a Relay MasterSync (priority 2), or a Relay Slave (priority 2). Table 2 identifies various states of terminal devices 4502-n in an ad-hoc D2D communication network 4500 in accordance with the arrangement shown in FIG. 45A. Table 2 also provides a brief description of each state and its associated role.

TABLE 2

| State | Description |
| --- | --- |
| Unsynched | TD is not synchronized |
| External MasterSync | TD is synchronized to an external source and sends D2D synchronization signal indicating highest priority (e.g., GNSS MasterSync is a TD synchronized to a GNSS satellite and transmits "tGNSS hop 1") |
| External MasterSync Slave (w/external source coverage) | TD is in external source coverage but is synchronized to External MasterSync instead and does not send any D2D synchronization signal (e.g., GNSS MasterSync is a TD synchronized to External MasterSync even though it is within GNSS coverage and does not transmit a D2D synchronization signal) |
| External MasterSync Slave (w/o external source coverage) | TD is not in external source coverage so is synchronized to External MasterSync and does not send any synchronization signal (e.g., GNSS MasterSync Slave is not in GNSS coverage so is synchronized to GNSS MasterSync and does not transmit a D2D synchronization signal) |

TABLE 2-continued

| State | Description |
|---|---|
| External Relay MasterSync | TD is synchronized to External MasterSync or another External Relay MasterSync and sends D2D synchronization signal having a priority corresponding to its hop distance from External MasterSync (e.g., GNSS Relay MasterSync is a TD synchronized to a GNSS MasterSync or another GNSS Relay MasterSync and transmits a D2D synchronization signal corresponding to its hop distance from a GNSS MasterSync) |
| External Relay Slave | TD is synchronized to an External Relay MasterSync and does not send any D2D synchronization signal (e.g., GNSS Relay Slave is a TD synchronized to a GNSS Relay MasterSync and does not transmit a D2D synchronization signal) |
| External Relay Master Sync N (N is an integer >1) | TD is synchronized to External Relay Master Sync N-1 and sends D2D synchronization signal having a priority "hop N" corresponding to its hop distance from External MasterSync (e.g., GNSS Relay MasterSync N is a TD synchronized to GNSS Relay MasterSync N-1 and transmits a D2D synchronization signal "tGNSS hop N" corresponding to its hop distance from a GNSS MasterSync) |
| External Relay Slave N | TD is synchronized to External Relay MasterSync N and does not send any D2D synchronization signal (e.g. GNSS Relay Slave N is a TD is synchronized to GNSS Relay Master Sync N and does not transmit a D2D synchronization signal) |
| Internal MasterSync | TD uses its own timing (e.g., UTC) and sends a D2D synchronization signal indicating highest priority non-external (e.g., non-GNSS MasterSync is a TD synchronized to a itself and transmits "tUTC hop 1") |
| Internal MasterSync Slave | TD is synchronized to Internal MasterSync and does not send any D2D synchronization signal (e.g., non-GNSS MasterSync Slave is a TD synchronized to Internal MasterSync and does not transmit a D2D synchronization signal) |
| Internal Relay MasterSync | TD is synchronized to Internal MasterSync or another Internal Relay MasterSync and sends a D2D synchronization signal having a priority corresponding to its hop distance from External MasterSync and its hop distance from Internal MasterSync (e.g., non-GNSS Relay MasterSync is a TD synchronized to a GNSS MasterSync or another GNSS Relay MasterSync and transmits a D2D synchronization signal corresponding to its hop distance from GNSS MasterSync and its hop distance from non-GNSS MasterSync) |
| Internal Relay Slave | TD is synchronized to Internal Relay MasterSync and does not send any D2D synchronization signal (e.g., non-GNSS Relay Slave is a TD synchronized to a non-GNSS Relay MasterSync and does not transmit a D2D synchronization signal) |
| Internal Relay MasterSync M (M is an integer >1) | TD is synchronized to Internal Relay MasterSync N-1 and sends D2D synchronization signal having a priority "hop M + N" corresponding to its hop distance from External MasterSync and its hop distance from Internal MasterSync (e.g., non-GNSS Relay MasterSync M is a TD synchronized to non-GNSS MasterSync M-1 and transmits a D2D synchronization signal "tUTC hop M + N" corresponding to its hop distance from a GNSS MasterSync and its hop distance from a non-GNSS MasterSync) |
| Internal Relay Slave M | TD is synchronized to Internal Relay MasterSync M and does not send any D2D synchronization signal (e.g., non-GNSS Relay Slave M is a TD synchronized to non-GNSS Relay MasterSync M and does not transmits a D2D synchronization signal) |

For example, Tables 3A-E identify the states of each terminal device according to the D2D communication network arrangement shown in FIGS. 45A-E, respectively.

TABLE 3A

| TD | Propagated D2D Relay Sync Signal | PSSn | State |
|---|---|---|---|
| TD 4502-0 | tGSNN hop 1 | 0 | GNSS MasterSync |
| TD 4502-1 | tGSNN hop 1 | 0 | GNSS MasterSync |
| TD 4502-2 | tGSNN hop 2 | 1 | GNSS Relay MasterSync 1 |
| TD 4502-3 | tGSNN hop 3 | 2 | GNSS Relay MasterSync 2 |
| TD 4502-5 | tUTC hop 1 (Non-GNSS) | 3 | Non-GNSS MasterSync |
| TD 4502-6 | tUTC hop 2 (Non-GNSS) | 4 | Non-GNSS Relay MasterSync 1 |
| TD 4502-7 | tUTC hop 3 (Non-GNSS) | 5 | Non-GNSS Relay MasterSync 2 |
| TD 4502-4 | | | GNSS Relay MasterSync Slave 2 |
| TD 4502-8 | | | Non-GNSS Relay MasterSync Slave 2 |
| TD 4502-9 | | | Unsynchronized |

TABLE 3B

| Sync Source | Propagated D2D Relay Sync Signal | PSSn | State |
|---|---|---|---|
| TD 4502-0 | | | GNSS MasterSync Slave (w/GNSS coverage) |
| TD 4502-1 | tGSNN hop 1 | 0 | GNSS MasterSync |
| TD 4502-2 | tGSNN hop 2 | 1 | GNSS Relay MasterSync 1 |
| TD 4502-3 | tGSNN hop 3 | 2 | GNSS Relay MasterSync 2 |
| TD 4502-5 | tUTC hop 1 (Non-GNSS) | 3 | Non-GNSS MasterSync |
| TD 4502-6 | tUTC hop 2 (Non-GNSS) | 4 | Non-GNSS Relay MasterSync 1 |
| TD 4502-7 | tUTC hop 3 (Non-GNSS) | 5 | Non-GNSS Relay MasterSync 2 |
| TD 4502-4 | | | GNSS Relay MasterSync Slave 2 |
| TD 4502-8 | | | Non-GNSS Relay MasterSync Slave 2 |
| TD 4502-9 | | | Unsynchronized |

TABLE 3C

| Sync Source | Propagated D2D Relay Sync Signal | PSSn | State |
|---|---|---|---|
| TD 4502-0 | | | GNSS MasterSync Slave (w/GNSS coverage) |
| TD 4502-1 | tGSNN hop 1 | 0 | GNSS MasterSync (Group 1) |
| TD 4502-2 | tGSNN hop 2 | 1 | GNSS Relay MasterSync 1 |
| TD 4502-3 | tGSNN hop 3 | 2 | GNSS Relay MasterSync 2 |
| TD 4502-5 | tUTC hop 1 (Non-GNSS) | 3 | Non-GNSS MasterSync (Group 2) |
| TD 4502-6 | tUTC hop 2 (Non-GNSS) | 4 | Non-GNSS Relay MasterSync 1 |
| TD 4502-7 | tUTC hop 3 (Non-GNSS) | 5 | Non-GNSS Relay MasterSync 2 |
| TD 4502-4 | | | GNSS Relay MasterSync Slave 2 |
| TD 4502-8 | | | Non-GNSS Relay MasterSync Slave 2 |
| TD 4502-9 | tUTC hop 1 (Non-GNSS) | 3 | Non-GNSS MasterSync (Group 3) |

TABLE 3D

| Sync Source | Propagated D2D Relay Sync Signal | PSSn | State |
|---|---|---|---|
| TD 4502-0 | | | GNSS MasterSync Slave (w/GNSS coverage) |
| TD 4502-1 | tGNSN hop 1 | 0 | GNSS MasterSync |
| TD 4502-2 | tGNSN hop 2 | 1 | GNSS Relay MasterSync 1 |
| TD 4502-3 | tGNSN hop 3 | 2 | GNSS Relay MasterSync 2 |
| TD 4502-5 | tUTC hop 1 (Non-GNSS) | 3 | Non-GNSS MasterSync |
| TD 4502-6 | tUTC hop 2 (Non-GNSS) | 4 | Non-GNSS Relay MasterSync 1 |
| TD 4502-7 | tUTC hop 3 (Non-GNSS) | 5 | Non-GNSS Relay MasterSync 2 |
| TD 4502-4 | | | GNSS Relay MasterSync Slave 2 |
| TD 4502-8 | | | Non-GNSS Relay MasterSync Slave 2 |
| TD 4502-9 | tUTC hop 1 (Non-GNSS) | 3 | Non-GNSS Relay MasterSync Slave 1 |

TABLE 3E

| Sync Source | Propagated D2D Relay Sync Signal | PSSn | State |
|---|---|---|---|
| TD 4502-0 | | | GNSS MasterSync Slave (w/GNSS coverage) |
| TD 4502-1 | tGSNN hop 1 | 0 | GNSS MasterSync |
| TD 4502-2 | tGSNN hop 2 | 1 | GNSS Relay MasterSync |
| TD 4502-5 | tUTC hop 1 (Non-GNSS) | 2 | Non-GNSS MasterSync |
| TD 4502-6 | tUTC hop 2 (Non-GNSS) | 3 | Non-GNSS Relay MasterSync |
| TD 4502-9 | | | Unsynchronized |

According to some aspects, duplicative D2D synchronization signals may not be transmitted. Referring to FIG. 45A, terminal device TD0 4502-0 may reduce its power consumption if it can stop transmitting a D2D synchronization signal "tGNSS hop 1" 4511-0. For example, TD0 4502-0 may detect that TD1 4502-1 is nearby and is already transmitting D2D synchronization signal "tGNSS hop 1" 4511-0, and may determine not to transmit a D2D synchronization signal since its D2D synchronization signal may be redundant. Additionally, according to some aspects, when a plurality of terminal devices 4502-n are in within coverage of an external timing source 4504, one of the terminal devices may synchronize to the external synchronization signal 4505 provided by the external timing source and may serve as the main external based D2D synchronization signal reference. The other terminal devices may synchronize a D2D synchronization signal provided by the terminal device that is synchronized to the external synchronization signal 4505. For example, referring to FIG. 45B, terminal device TD1 4502-1 may be synchronized to a GNSS synchronization signal 4505 provided by GNSS satellite 4504 and may serve as the GNSS MasterSync and the other terminal devices may be GNSS MasterSync Slaves (w/GNSS coverage). Similarly, when a plurality of terminal devices 4502-n are out of GNSS coverage but are nearby each other, one of the terminal devices may become the non-GNSS MasterSync and serve as the main autonomous based synchronization signal reference. The other nearby terminal devices may find D2D synchronization signal "tUTC hop 1" and decide to synchronize and become a MasterSync Slave to reduce redundancy and interference and to conserve power.

Figure 50:
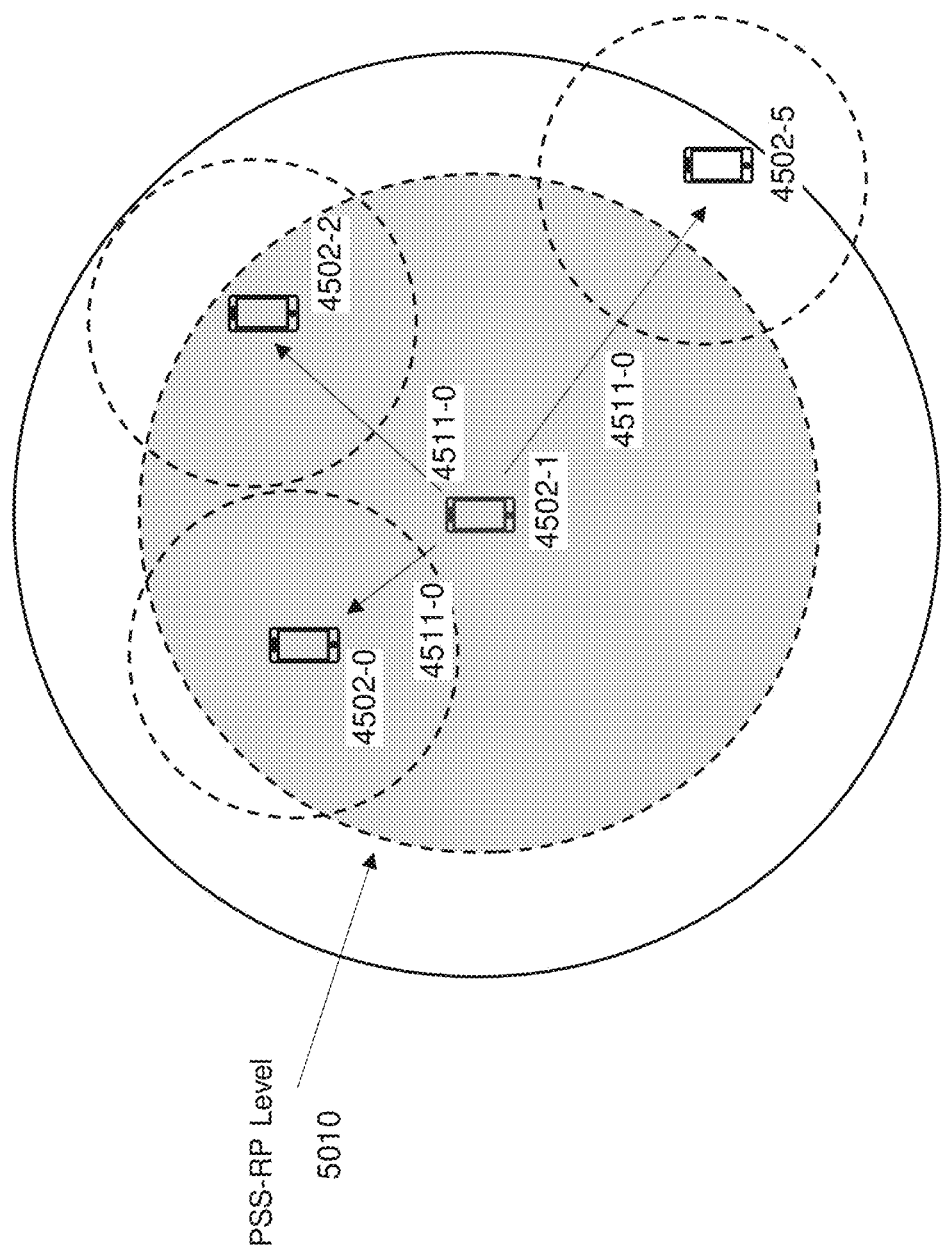
FIG. 50 shows an exemplary diagram of transmission range and range of acceptable RP threshold of a terminal device according to some aspects.

FIG. 50 shows exemplary diagram of transmission range and range of acceptable RP threshold of a terminal device. For each detected PSSn of a D2D synchronization signal, a terminal device may measure the received power (PSSn-RP) and compare it to a threshold value 5010 to determine its validity. It may select a D2D synchronization signal source based on the following scheme.

In some aspects, an unsynchronized terminal device 4502-n initially joining a D2D communication network 4500 first searches for a terminal device acting as an external MasterSync or Relay MasterSync. If such a terminal device is found, the unsynchronized terminal device synchronizes to it and becomes a "Slave" to such terminal device. The newly synchronized terminal device then determines if it should relay an external based D2D synchronization signal. If no such terminal device is not found, the unsynchronized terminal device may become the external MasterSync if it is able to synchronize to the synchronization signal of the external timing source 4504. If the terminal device is out of coverage of the external timing source, the unsynchronized terminal device searches for a terminal device acting as an autonomous MasterSync or Relay MasterSync. If such a terminal device is found, the unsynchronized terminal device synchronizes to it and becomes a "Slave" to such terminal device. The newly synchronized terminal device then determines if it should relay an autonomous based D2D synchronization signal. If no such terminal device is found, the unsynchronized terminal device may become the autonomous MasterSync.

Figure 48B:
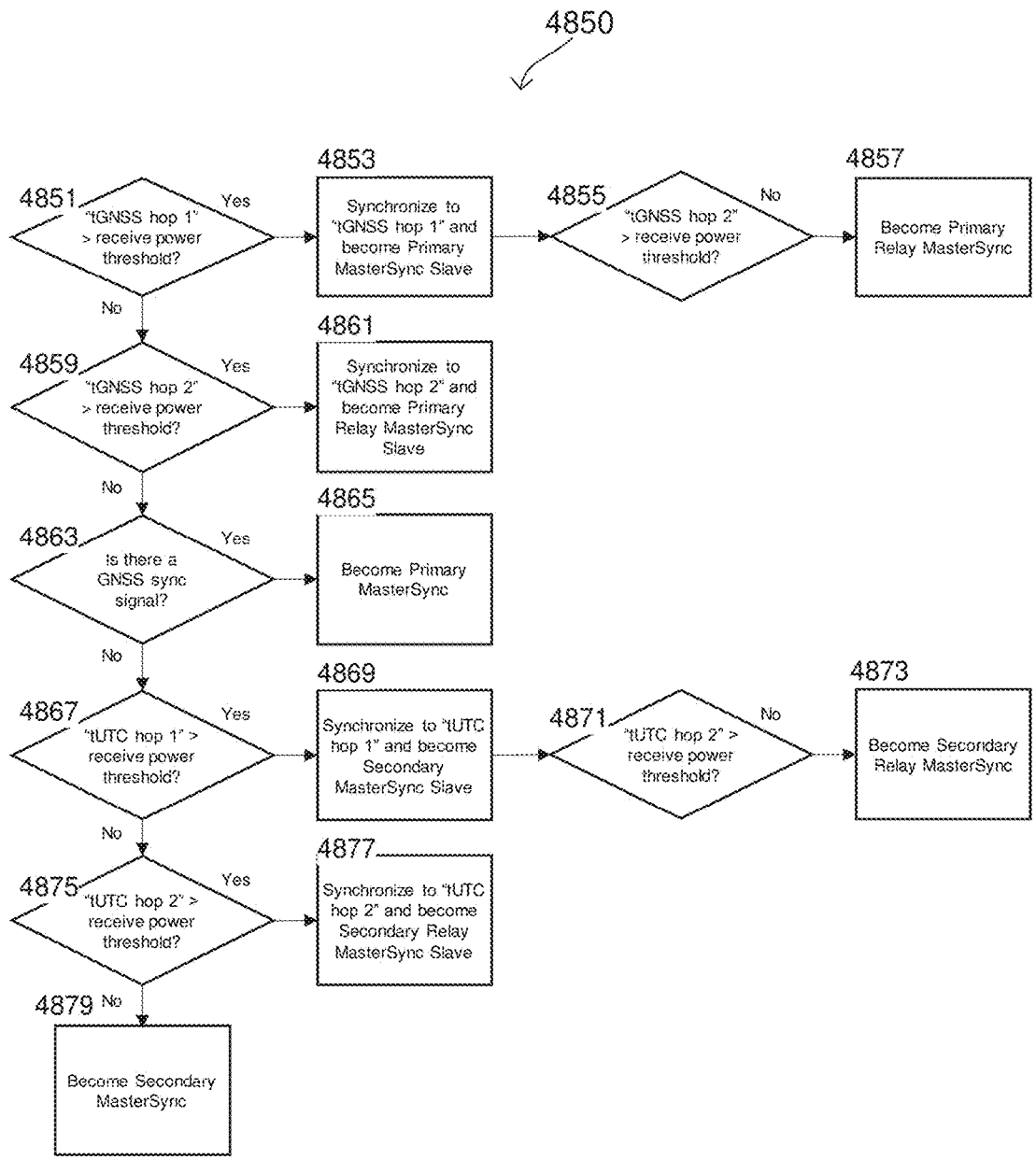
Figure 51A:
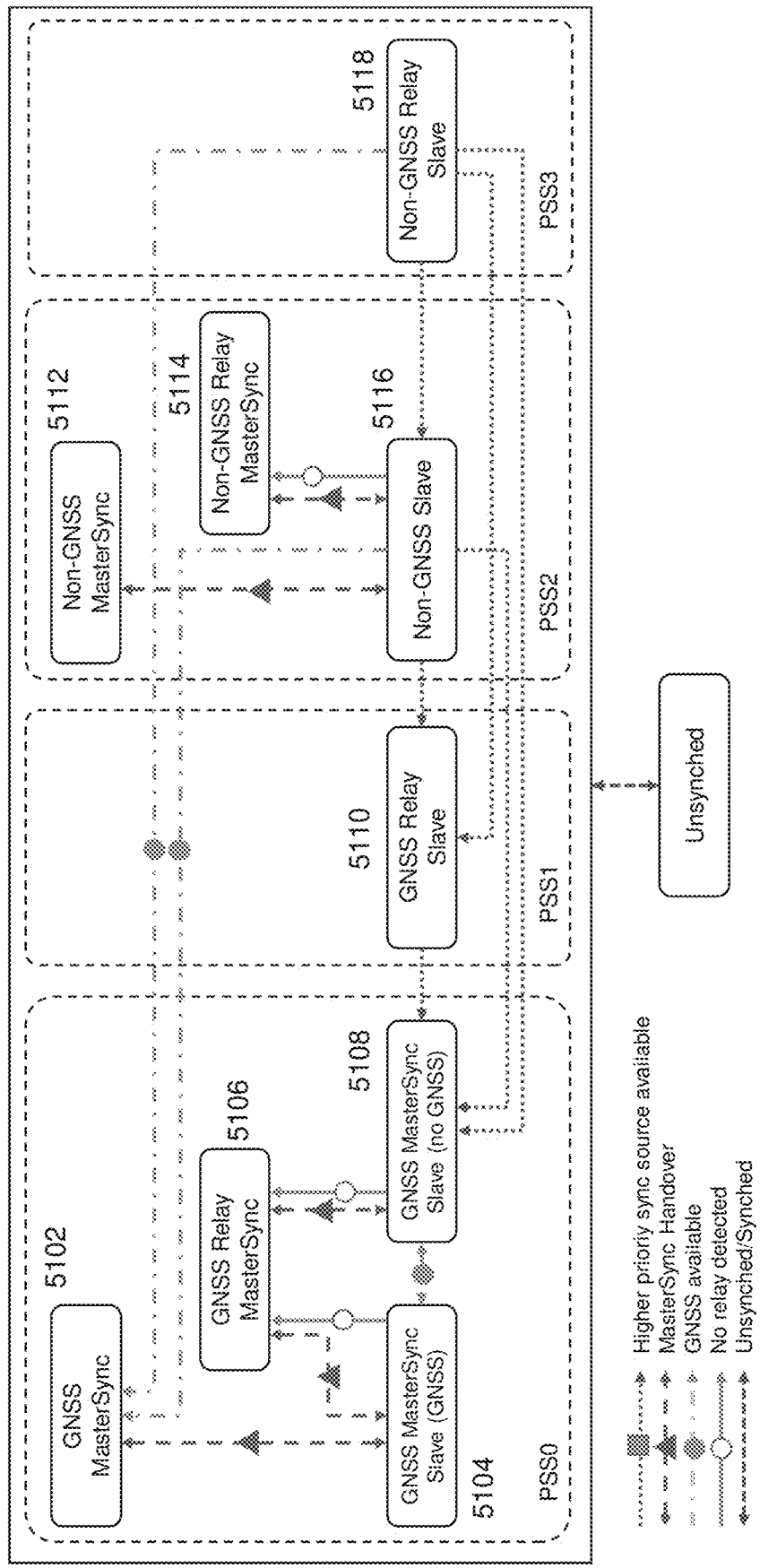

FIG. 48B shows an exemplary method 4850 of a synchronization selection search according to some aspects. Method 4850 is described below with respect to the system arrangement of FIGS. 45F and 46F and Table 3E in which TD9 4502-9 is attempting to join a D2D communication network. FIGS. 51A, 51B, and 52C, show a state diagram and timing diagram showing the search states and the search windows of the exemplary method 4850. In these examples, TD9 4502-9 may use a prioritized hierarchy of synchronization sequences to select a synchronization source to use, where certain types of synchronization sequences (e.g., PSS0-PSS3) are prioritized differently. This synchronization sequence search function can be controlled by controller 4710 of TD9 4502-9, which may use transceiver 4704 and GNSS circuitry 4720/GNSS receiver 4722 to perform the synchronization sequence search function.

In 4851, terminal device TD9 4502-9 is unsynchronized and seeks to join a D2D communication network. It first searches for PSS0 ("tGNSS hop 1," e.g., a single hop from a GNSS source) 4511-0. If TD9 4502-9 detects PSS0 and the received power PSS0-RP is above a minimum PSS0-RP threshold, PSS0 is found.

In 4853, PSS0 is found and TD9 4502-9 selects terminal device TD1 4502-1 transmitting PSS0 (i.e, GNSS MasterSync) as its primary GNSS based synchronization reference source and TD9 4502-9 becomes a GNSS MasterSync Slave. In 4855, TD9 4502-9 then searches for PSS1 ("tGNSS hop 2," e.g., multiple hops from a GNSS source) 4511-1. If TD9 4502-9 detects PSS1 and the received power PSS1-RP is above a minimum PSS1-RP threshold, PSS1 is found. In 4857, TD9 4502-9 does not find PSS1 and becomes a GNSS Relay MasterSync and propagates PSS1 4511-1. If TD9 4502-9 finds PSS1, it remains GNSS MasterSync Slave.

In 4859, terminal device TD9 4502-9 does not find PSS0 ("tGNSS hop 1," e.g., a single hop from a GNSS source) and so searches for PSS1 ("tGNSS hop 2," e.g., multiple hops from a GNSS source) 4511-1. If TD9 4502-9 detects PSS1 and the received power PSS1-RP is above a minimum PSS1-RP threshold, PSS1 found. In 4861, PSS1 is found and terminal device TD9 4502-9 selects the terminal device TD2 4502-2 transmitting PSS1 (i.e., GNSS Relay MasterSync) as its GNSS based synchronization reference source and terminal device TD9 4502-9 becomes a GNSS Relay Slave.

In 4863, terminal device TD9 4502-9 does not find PSS0 or PSS1, so it searches for GNSS signals. TD9 4502-9 may use its GNSS circuitry 4720, GNSS receiver 4722, and GNSS antenna 224, and any well-known technique to search for GNSS synchronization signals 4505. In 4865, TD9 4502-9 finds at least one GNSS synchronization signals 4505 and synchronizes to it and selects the GNSS source 4504 as its GNSS synchronization reference source. TD9 4502-9 becomes GNSS MasterSync and begin propagating PSS0 4511-0.

In 4867, terminal device TD9 4509-2 does not find any GNSS synchronization signals so it searches for PSS2 ("tUTC hop 1," e.g., a single hop from a UTC source, which can be internal to the transmitting device) 4521-0. If terminal device TD9 4502-9 detects PSS2 and PSS2-RP is above a minimum PSS2-RP threshold, PSS2 is found.

In 4869, PSS2 is found and terminal device TD9 4502-9 selects the terminal device TD5 4502-5 transmitting PSS2 (i.e, non-GNSS MasterSync) as its primary non-GNSS based synchronization reference source and terminal device TD9 becomes a non-GNSS MasterSync Slave. In 4871, terminal device TD9 then searches for PSS3 ("tUTC hop 2," e.g., multiple hops from a UTC source) 4521-1. If TD9 detects PSS3 and the received power PSS3-RP is above a minimum PSS3-RP threshold, PSS3 is found. In 4873, TD9 does not find PSS3, it becomes a non-GNSS Relay MasterSync and propagate PSS3. If TD9 finds PSS3, it remains non-GNSS MasterSync Slave.

In 4875, terminal device TD9 4502-9 does not find PSS2 ("tUTC hop 1") and so searches for PSS3 ("tUTC hop 2") 4521-1. If TD9 4502-9 detects PSS3 and PSS3-RP is above a minimum PSS3-RP threshold, PSS3 is found. In 4877, PSS3 if found and terminal device TD9 4502-9 selects the terminal device TD6 4502-6 transmitting PSS3 (i.e, non-GNSS Relay MasterSync) as its non-GNSS based synchronization reference source and terminal device TD9 becomes a non-GNSS Relay Slave.

In 4879, terminal device TD9 does not find any PSSs (i.e., not detected or minimum threshold for received power is not met) or any GNSS synchronization signals, so it becomes the non-GNSS MasterSync and propagates PSS2.

In some aspects, with reference to the internal configuration shown in FIG. 47, controller 4710 may be configured to control this synchronization sequence search function of each terminal device. Accordingly, controller 4710 may use transceiver 4704 and GNSS circuitry 4720 to search for D2D synchronization sequences (e.g., PSSs) and/or GNSS signals. In some aspects, controller 4710 may use the prioritized hierarchy described above (e.g., that prioritizes PSS0-PSS3, such as by prioritizing single hops over multiple hops and regulated external timing reference sources over independent timing reference sources).

Each PSSn may be transmitted at the same power level or at different power levels. For example, the MasterSync may be configured to transmit PSS0 at a high power level.

The minimum threshold for the received power PSSn-RP may be the same for all synchronization signals. It may also be different.

The terminal devices may apply any well-known technique for searching PSS sequences.

Thus, in general, an unsynchronized terminal device first searches for any external based D2D synchronization signal beginning with the highest priority external based D2D synchronization signal to the lowest priority external based D2D synchronization signal. If an external based D2D synchronization signal is found, the unsynchronized terminal device synchronizes to the external based D2D synchronization that is found and relays a further D2D synchronization signal only if it can't find another D2D synchronization signal of the same priority. If no external based D2D synchronization signal is found, the unsynchronized terminal device may next search for any synchronization signal provided by an external synchronization source. If such synchronization signal is found the unsynchronized terminal device may synchronize to it. If such synchronization signal is not found, the unsynchronized terminal device may further search for any autonomous based D2D synchronization signal beginning with the highest priority to the lowest priority autonomous based D2D synchronization signal. If an autonomous based D2D synchronization signal is found, the unsynchronized terminal device synchronizes to the internal based D2D synchronization that is found and relays a further D2D synchronization signal only if it can't find another D2D synchronization signal of the same priority. If no autonomous based D2D synchronization signal is found, the unsynchronized terminal device may use its own timing and propagate a autonomous based D2D synchronization signal according to its own timing.

According to some aspects, a scheme for hierarchically prioritized synchronization in an ad-hoc D2D communication network is provided where there is a plurality of synchronization timing sources and the plurality of synchronization timing sources are synchronized to the same time standard. For example, the time standard may be the Coordinated Universal Time (UTC) standard.

According to some aspects, the terminal devices may be configured into a plurality of synchronization groups, each synchronization group deriving its timing from a respective one of the plurality of synchronization timing sources. A synchronization group may include one or more terminal devices. The terminal devices of one synchronization group may derive their timing from an external synchronization timing source that is synchronized to a particular time standard.

According to some aspects, at least one terminal device of a synchronization group should be directly synchronized to a synchronization timing source and relay a synchronization signal based on the synchronization timing source so that a nearby terminal device may synchronize to the synchronization timing source even if the terminal device cannot directly communicate with the synchronization timing source.

According to some aspects, the terminal devices of one synchronization group may derive their timing from an autonomous synchronization timing source provided by a selected terminal device of the synchronization group. The autonomous synchronization timing source is synchronized to the particular time standard.

According to some aspects, at least one terminal device that is outside of coverage of an external synchronizing timing source may become an autonomous synchronization timing source and relay a synchronization signal based on its own internal timing to a nearby terminal device.

Power consumption of a terminal device may depend on the role of the terminal device. For example, "Slave" terminal devices (e.g., MasterSync Slave nor Relay Slave) do not transmit D2D synchronization signals. Only "Master" terminal devices (e.g., MasterSync and a Relay MasterSync) transmit D2D synchronization signals. Further, a MasterSync may be configured to transmit a D2D synchronization signal at a higher power level (e.g., maximum transit power level pursuant to regulations) than a Relay MasterSync. Additionally, an external MasterSync must maintain synchronization with an external timing source. For example, maintaining GNSS synchronization may be power consuming. Thus, a terminal device that is a MasterSync, especially an external MasterSync, may consume a disproportionate amount of power maintaining the backbone signals of the ad-hoc network.

Due to the imbalance of the power consumption arising from the different roles that a terminal device may perform, the different roles (especially the MasterSync) should be rotated among at least some of the terminal devices of a D2D communication network so that the power load is more uniformly distributed. Without centralized coordination, the rotation of the roles in an ad-hoc communication network may be efficiently achieved through a pseudo-random or quasi-random handover scheme.

For example, a "Master" terminal device (e.g., MasterSyncs and/or Relay MasterSyncs) transmitting a D2D synchronization signal corresponding to a particular priority level may stop transmitting its D2D synchronization signal and a corresponding "Slave" terminal device (e.g., Master Slave and/or Relay Slave) may randomly begin transmitting a D2D synchronization signal, thus becoming the new "Master" terminal device. Such a MasterSync handover may work between "MasterSync<->Slave 1" or "Relay MasterSync 1<->Slave 1" or "Relay MasterSync 2<->Slave 2" or "Relay MasterSync 3<->Slave 3" an so on. A state diagram of a MasterSync handover between "MasterSync<->Slave 1" or "Relay MasterSync 1<->Slave 1" is shown in FIG. 51A. Dependent on which handover should be performed (different triggers, e.g. at different time instances) the corresponding (Relay) MasterSync needs to stop transmitting a D2D synchronization signal including a PSS sequence.

For example, during a MasterSync handover, a MasterSync periodically stops sending a D2D synchronization signal (e.g., "tGNSS hop 1" or "tUTC hop 1") and another terminal device may take over the MasterSync role in a quasi-random fashion. There will be a limited period during which no synchronization signal of a particular priority level is sent until another terminal device takes over the MasterSync role.

FIG. 49 shows exemplary method 4900 of a MasterSync handover in a D2D communication network according to some aspects of the present disclosure In 4901, at a given time TS, a "Master" terminal device that is part of a D2D communication network should stop sending its D2D synchronization signal and become a "Slave" terminal device. For example, a MasterSync terminal device should stop sending a MasterSync D2D synchronization signal (e.g., a D2D synchronization signal including a PSS corresponding to "tGNSS hop 1" or "tUTC hop 1") and become a MasterSync Slave. In 4903, one or more "Slave" terminal devices (including the former MasterSync) may start a timer for a sync transmit wait period having a respective duration TR (i.e., "TR timer") which corresponds to how long a respective terminal device will wait before it attempts to transmit a D2D synchronization signal. The value of each respective TR should be different and may be based on various criteria of a respective terminal device including, e.g. battery level, last time being a "Master" terminal device (MasterSync or Relay MasterSync), RSSI level, etc. and may also include a random component. The value of each TR value should be between 0 and TRmax. For example, TRmax may be about five second. In 4905, while the TR timer of a terminal device is running, the respective terminal device monitors the synchronization channel for any D2D synchronization signal. In 4907, once the TR timer of a "Slave" terminal device expires, the respective "Slave" terminal device transmits a D2D synchronization signal and becomes a "Master" terminal device. In 4909, when a "Slave" terminal device finds a D2D synchronization signal while its TR timer is still running, it will stop its TR timer, synchronize to the D2D synchronization signal, and initially defaults to being a slave terminal device (i.e., it doesn't propagate a further D2D synchronization signal) based on the received priority of the received D2D synchronization signal. It may determine whether it has to relay a further D2D synchronization signal based on the synchronization selection scheme. The terminal device that has the shortest TR timer effectively becomes the new "Master" terminal device.

The probability that a candidate terminal device will become the "Master" terminal device (e.g., small value for TR) of a priority level is higher when the candidate terminal device battery level is good, the received signal strength information (RSSI) of the D2D synchronization signal from the former "Master" terminal device is high (e.g., close proximity to former "Master" terminal device), the candidate terminal device is not moving fast, and the length of time since the candidate terminal device was a MasterSync or a Relay MasterSync last is longer. To limit contention, only terminal devices nearby the former "Master" terminal device may become a candidate to be the next "Master" terminal device. For example, the proximity of a candidate terminal device to the former "Master" terminal device may be determined by the RSSI of the D2D synchronization signal/PSS transmitted by the former "Master" terminal device that is ascertained at the candidate terminal device. If a candidate terminal device determines that the RSSI of the D2D synchronization signal it received from the former "Master" terminal device is above a particular threshold, it starts its TR timer and becomes a candidate to be the next "Master" terminal device.

There is a trade-off between the maximum allowed TR (i.e., TRmax) which is the maximum time that no D2D synchronization signal will be sent and the probability that two or more candidate terminal devices will become "Master" terminal devices at the same time.

FIG. 51A shows exemplary state diagram 5100 of a terminal device in a D2D communication network according to some aspects of the present disclosure. FIG. 51A includes a state diagram of an exemplary MasterSync handover.

In the case when two or more candidate terminal devices become a "Master" terminal device, they may generate a single frequency network (SFN) which will not degrade the system performance. Multiple MasterSync (or multiple Relay MasterSyncs) that have the same synchronization will transmit exactly identical PSS waveforms during the same time slot on the same frequency forming a single frequency network (SFN). For a slave device that receives during these time slots and on these frequencies and who is in range of multiple transmitters, the signals arriving from different transmitters cannot be identified as originating from different transmitters because they could also be received from a single transmitter via multiple propagation paths arriving with different powers and relative delays. During the next MasterSync handover, this could collapse back to one MasterSync again.

D2D synchronization signals may be transmitted on a predefined frequency channel. For example, it may be transmitted at a central frequency Fsynch=180 kHz located in a specific portion of the 900 MHz frequency band in North America or a specific portion of the ISM 800 MHz frequency band in Europe. Each D2D synchronization signal may also be transmitted on a different radio resource. A radio resource may be a particular time slot and/or a particular frequency and/or a particular code to be used for transmission or reception. A more detailed description of the synchronization channel and its resources are described below with respect to FIG. 58.

D2D synchronization signals may also be transmitted on a frequency hopping channel with a known hopping pattern. When the synchronization channel is subject to frequency hopping, the frequency hopping pattern should not be applied blindly which further reduces synchronization time and power consumption. For example, the frequency hopping pattern should be aligned to GNSS timing. Instead of searching all frequencies blindly when no GNSS coverage is available, a terminal device out of GNSS coverage may quickly determine that there are no GNSS based D2D synchronization signals.

Figure 52A:
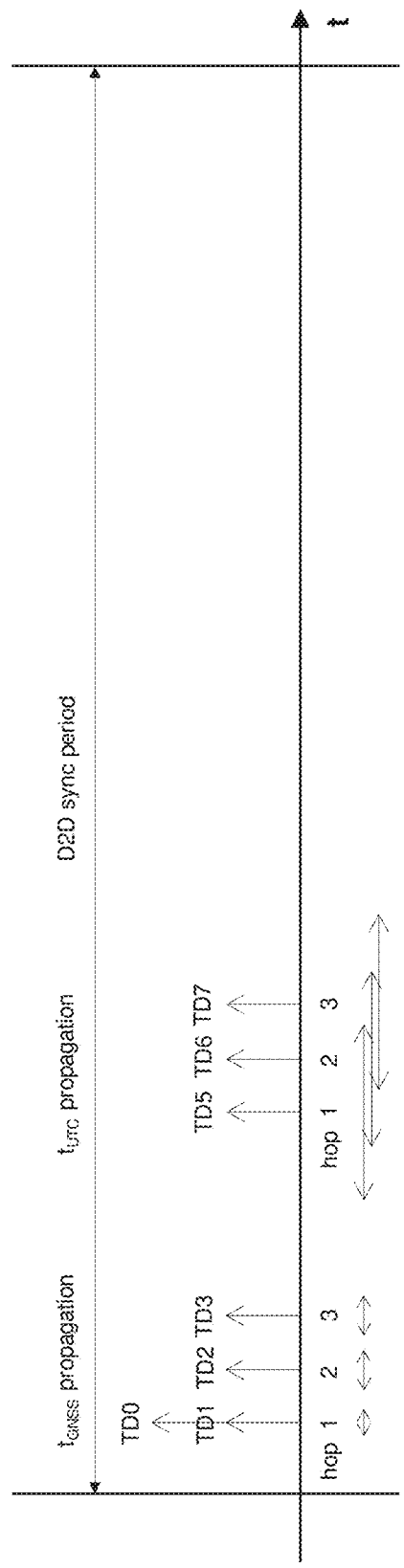
FIGS. 52A-52C show exemplary synchronization sequence reception and hopping by terminal devices according to some aspects.

FIG. 52A shows a D2D sync period and an exemplary synchronization resource usage by each terminal device of the D2D communication network arrangement shown in FIG. 45A.

Referring to FIG. 52A, terminal devices TD0-TD3 are within some GNSS based coverage. Each of terminal devices TD0 and TD1 can synchronize to a GNSS timing source. If they both become MasterSyncs, they may both relay a GNSS based D2D synchronization signal via "tGNSS hop 1". Since both TD0 and TD1 use the same radio resource to transmit, the D2D synchronization signals should be transmitted using a technique that would prevent interference. For example, TD0 and TD1 may each transmit the same PSS corresponding to "tGNSS hop 1" using a single frequency network (SFN) technique. The SFN technique may also be used in transmitting D2D synchronization signals in further hops to similarly avoid interference by simultaneous transmissions of a particular PSS signal.

TD2 may receive a PSS corresponding to "tGNSS hop 1" from TD1. Once TD2 is synchronized, TD2 may relay a further GNSS based D2D synchronization signal via a PSS corresponding to "tGNSS hop 2" that may be received by TD3 which then may relay a further GNSS based D2D synchronization signal via a PSS corresponding to "tGNSS hop3" that may be received by TD4. Referring to FIG. 52A, the relaying of D2D synchronization signals may stop after the 3rd hop due to issues of latency, inaccuracy, and/or resource usage.

Referring again to FIG. 52A, the radio resources used to transmit primary synchronization signals corresponding to "tGNSS hop 1" . . . "tGNSS hop 3" are e.g. separated in time. For example, the time duration between the beginning of the D2D sync period and the TD1 may be in the range from about 33 ms to about 39 ms. For example, the time between TD1 and TD2 may be about 3 ms. In addition to temporal separation, frequency or code separation may also be used. For example, quasi orthogonal synchronization signals may be used. For robust handling of large D2D sync periods and/or poor oscillator stability of the respective terminal devices, the relaying should be scheduled 'forward' in time, i.e., "tGNSS hop 2" should be transmitted later in time than "tGNSS hop 1".

Referring still to FIG. 52A, terminal devices TD5-TD8 are out of any GNSS coverage. TD5 may determine that it should become an autonomous D2D synchronization source. TD5 generates a D2D synchronization signal based on its UTC time and transmits a PSS corresponding to "tUTC hop 1" on a radio resource that is substantially separated in time from the radio resources used by the GNSS based D2D synchronization signals to cope with UTC timing inaccuracy. For example, the gap between the last GNSS based D2D synchronization signal and the first UTC based D2D synchronization signal (e.g. TD3 and TD5 respectively in FIG. 52A) may be in the range from about 15 ms to about 17 ms. The range may be as high as the maximum UTC inaccuracy. Further, non-GNSS based D2D synchronization signals may be relayed in the same manner as for GNSS based D2D synchronization signals. For example, TD6 may receive a PSS corresponding to "tUTC hop 1" from TD5. Once TD6 is synchronized, TD6 may relay a further non-GNSS based D2D synchronization signal via a PSS corresponding to "tUTC hop 2" that may be received by TD7 which may then relay a further non-GNSS based D2D synchronization signal via a PSS corresponding to "tUTC hop3" that may be received by TD8. Referring to FIG. 52A, the relaying of D2D synchronization signals may stop after the 3rd hop due to issues of latency, inaccuracy, and/or resource usage.

The terminal devices that do not have an optimal synchronization source should continue to search for a better synchronization source. FIG. 52C shows an exemplary timing diagram for D2D synchronization signals, synchronization windows, and search windows of a D2D sync period for various terminal devices of the D2D communication network arrangement shown in FIG. 45A. Referring to FIG. 52C, the corresponding receive synchronization windows (diagonally striped block) and search windows (white block) are shown for each D2D synchronization signal transmitted by a terminal device. In the exemplary timing of FIG. 52C, the transmit timings of the synchronization signals (solid block) transmitted by each terminal device correspond to the exemplary timings illustrated in FIG. 52A.

Referring to FIGS. 52C and 45A, terminal devices TD0 and TD1 are within GNSS coverage and can synchronize to a GNSS source directly based on received GNSS signals. They do not need to synchronize or search for any D2D synchronization signals. However, to reduce power consumption, one of them may decide to synchronize to the D2D synchronization signal of the other instead of synchronizing to a GNSS source directly. In this power saving use case as illustrated in FIG. 45B, for example, TD0 (i.e., becomes GNSS MasterSync Slave with GNSS) may search for and synchronize to "tGNSS hop 1" transmitted by TD1 (i.e., GNSS MasterSync).

Referring to FIGS. 52C and 45A, since TD2 is synchronized to "tGNSS hop 1" 5211-1 which is the D2D synchronization signal having the highest priority there is no need to search for a higher priority D2D synchronization signal. However, due to local oscillator drifts, TD2 should continuously perform time and frequency synchronization tracking of "tGNSS hop 1" 5211-1. To cope with oscillator timing drift that may occur, the receiver synchronization window 5213-2, i.e., RX sync time, should be longer than the duration of "tGNSS hop 1" 5211-1. Additionally, TD2 may search for a GNSS signal. If TD2 finds a GNSS signal, it may synchronize directly to the GNSS timing source.

Similarly, TD3 should maintain synchronization to "tGNSS hop 2" 5211-2, by continuously performing time and frequency synchronization tracking of "tGNSS hop 2" during a receiver synchronization windows 5213-3 which should be longer than "tGNSS hop 2" 5211-2. Additionally, TD3 may also search for "tGNSS hop 1" 5211-1 during a search window 5215-3 preceding the synchronization window 5213-3. Similarly, TD4 should maintain synchronization to "tGNSS hop 3" 5211-3 by continuously performing time and frequency synchronization tracking of "tGNSS hop 3" during a receiver synchronization window 5213-4 which should be longer than "tGNSS hop 3" 5211-3. And TD4 may also search for "tGNSS hop 1" 5211-1 during a search window 5215-4 preceding the synchronization window 5213-4.

Referring to FIG. 52C, TD5 transmits a D2D synchronization signal based on its UTC time "tUTC hop 1" 5211-5 while searching for any GNSS based D2D synchronization signal 5211-1, 5211-2, 5211-3 during corresponding search window 5215-5. The search may be limited to higher priority GNSS based synchronization signals, i.e., signals with less hops. To compensate for any inaccuracies of an autonomous UTC timing of TD5, the search window 5215-5 should be longer than the transmission time of each of the GNSS based D2D synchronization signals combined. Similarly, TD6-TD8 should search for GNSS based D2D synchronization signals, especially higher priority GNSS based D2D synchronization signals. For example, TD6, TD7, and TD8 may search for GNSS based D2D synchronization signals in search windows 5215-6, 5215-7a, and 5215-8a, respectively. Additionally, TD7-TD8, like TD3-TD4, should also search for higher priority D2D synchronization signals within their own synchronization group, e.g., a higher priority non-GNSS hop synchronization signal within their synchronization group. For example, TD7 may search for "tUTC hop 1" 5211-5 during a search window 5215-7b and TD8 may search for "tUTC hop 1" 5211-5 during a search window 5215-8b. An unsynchronized terminal device e.g., TD9, should search for GNSS and non-GNSS based synchronization signals before determining that it should become an autonomous UTC based D2D synchronization source itself. It may be possible to have more than one autonomous UTC based synchronization groups. If the radio resources allocated for UTC hop synchronization signals are not bound to some range, a search window would need to cover about 100% of the D2D sync period. Once a terminal device TD9 is synchronized to D2D synchronization signal, it can limit its search of a higher priority D2D synchronization signal to a smaller window.

In the hierarchically prioritized synchronization scheme described herein, D2D communication between terminal devices synchronized to different timing groups may be efficiently realized since interference from one or more autonomously synchronized groups of terminal devices is reduced. Terminal devices that are completely outside the range of an external synchronizing timing source may rely on internal UTC timing for autonomous synchronization. Although a free running UTC timing is a degraded UTC timing, the use of even a degraded UTC timing minimizes the likelihood of misalignments.

Additionally, guard periods may be added to compensate for inaccuracies of the degraded UTC timing of corresponding terminal devices.

Figure 52B:
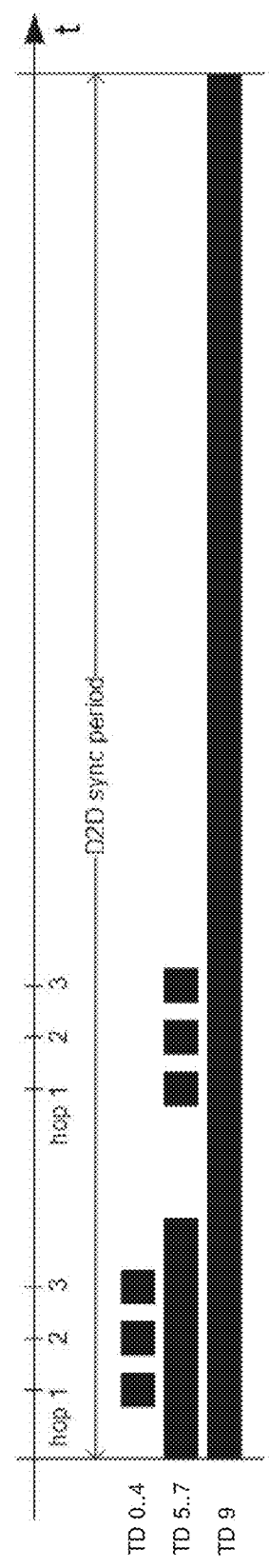
Figure 52C:
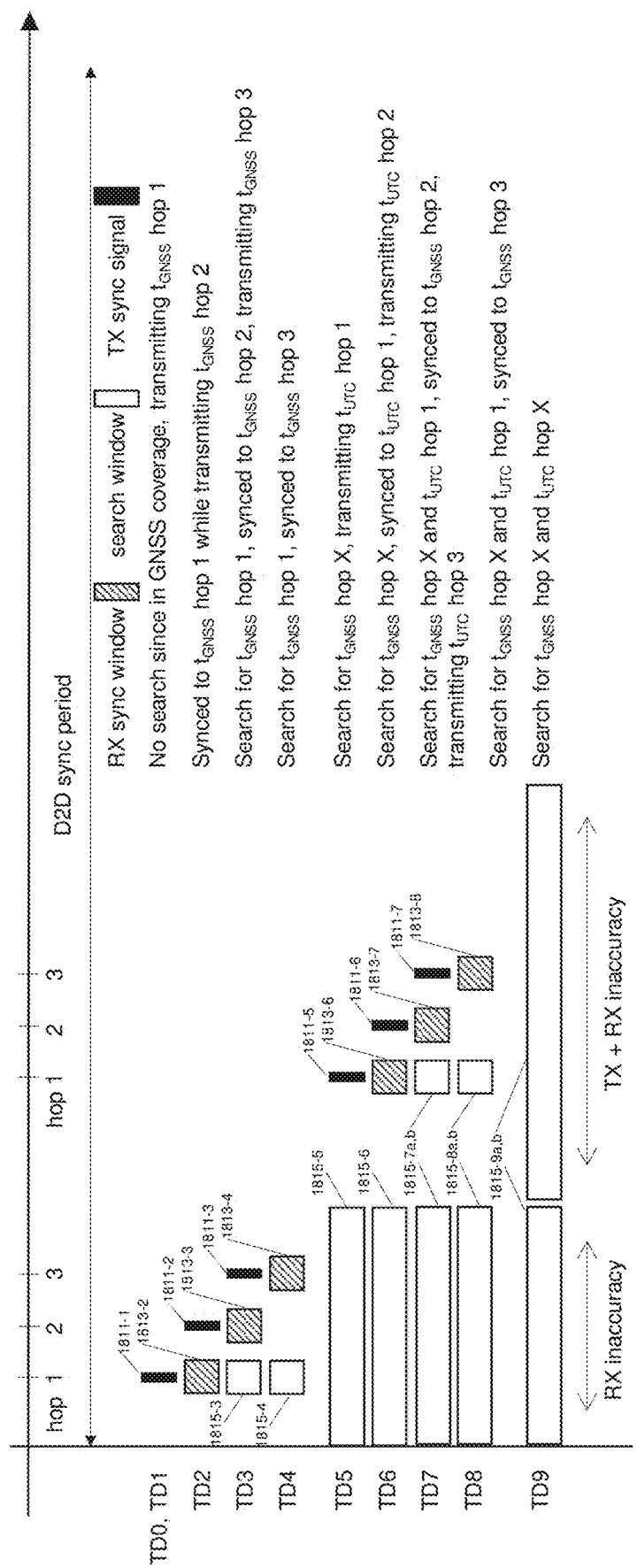

In FIG. 52B, guard periods for D2D radio resource usage are shown. Any D2D communication by terminal devices being synchronized to GNSS based D2D synchronization signals should not use radio resources within some guard period (solid black block) around each of the GNSS hop synchronization signals. A guard period allows any terminal device to synchronize or search for synchronization signals while accounting for potential oscillator timing drifts. Similarly, for terminal devices synchronizing to non-GNSS based D2D synchronization signals, guard periods large enough to account for UTC inaccuracy should be included around each of the non-GNSS hop synchronization signal locations and a single guard period may be included around all of the GNSS based hop synchronization signal locations. Guard intervals around GNSS synchronization relay radio resources allow quasi synchronous search for the relay resources without interruption of D2D communications.

Even in a system where a synchronization source or a relayed/forwarded synchronization source is available to all terminal devices, the synchronization signal received by the terminal devices may not be sufficient to achieve the required synchronization between the terminal devices for various reasons. For example, due to power budget constraints, the forwarded/relayed synchronization signal transmissions may have to be shorter than needed especially when the link between the user and the sync source is poor. In a hierarchically prioritized synchronization scheme, terminal devices within communication range may be synchronized to distinct synchronization sources. Even with the overall goal to have a common timing in the system (e.g. because all sync sources derive their timing from UTC timing as a common reference), different sync sources that are not in mutual communication range could have significant relative. Residual synchronization errors may occur with due to differences between the oscillators of the transmitter and receiver. Since synchronization signals cannot be transmitted during the whole frame so that in the time elapsed between the transmission of synchronization signals and the transmission of data signals the oscillator of either of the transmitting or receiving terminal device may have drifted too much. Since the relative error between the terminal devices is relevant for data transmission between terminal devices, the errors towards the common synchronization reference might add up to a larger relative error.

Even with perfect synchronization to their timing reference (e.g. in case of common GNSS reference), terminal devices may still be not sufficiently synchronized due to the unaccounted propagation delay (e.g., up to 10 usec and thus larger than a CP length of 7 usec) and potentially also due to Doppler shifts from fast relative movements (though probably less critical). Errors may also accumulate from propagation errors over multiple steps.

The potential synchronization error sources discussed above may not be sufficient to achieve symbol-level synchronization (on the order of usec) but should still be sufficient to achieve frame/slot-level synchronization (of the order of msec). To cope with these errors, e.g., terminal device oscillator inaccuracies, synchronization signals may be sent more frequently, e.g. each 160 ms but this would increase power consumption immensely. Alternatively, to achieve symbol-level synchronization a further stage may be added to the synchronization process discussed above.

Figure 53:
FIG. 53 shows an example of a two-stage synchronization scheme according to some aspects.

To overcome residual synchronization errors and to achieve synchronization on the symbol level, the synchronization process may include two stages. For example, the first synchronization stage 5310 for synchronizing to a primary synchronization sequence that is transmitted for a number of subframes (i.e., the primary synchronization sequence may partially repeat) may be augmented with a second synchronization stage for fine tuning the synchronization. Each transmitter may prepend a preamble to its data payload transmission which allows a receiver to fine tune its synchronization to that of the transmitter. FIG. 53 shows an example of a two-stage synchronization scheme and an exemplary preamble in front of each data payload transmission. Referring to FIG. 53, in stage 1 5310, terminal device 5302 transmits a PSS synchronization signal 5301 to terminal devices 5304 and 5306. In stage 2 5320, after a few subframes of the PSS signal 5301 has been transmitted to terminal devices 5304 and 5306, terminal device 5304 begins transmitting data transmission signal 5321 to terminal device 5306.

Referring to FIG. 53, a guard period 5322 is placed at the beginning of the data transmission signal 5321 for the second synchronization stage 5320. The size of the guard period 5322 should be a time equivalent to at least one symbol. In some aspects, the guard period 5322 may be a few symbols long. The guard period 5322 at the beginning of the data transmission signal 5321 prevents transmissions in adjacent slots from colliding if there is a timing error between the two terminal devices. For example, referring again to FIG. 53, terminal devices 5304 and 5306 may not be perfectly synchronized where e.g. terminal device 5304 transmits in a frame and terminal device 5306 transmits in a subsequent frame in a way that either terminal device 5304 transmits too late or terminal device 5306 transmits too early (or both) as seen from terminal device 5302 so that for terminal device 5302 for some time at the end of the first or the beginning of the subsequent frame the transmissions from terminal devices 5304 and 5306 interfere. Additionally, timing errors may occur due to propagation delays between terminal devices 5304 and 5306 and these timing errors may not be correctable when terminal devices 5304 and 5306 are synchronized to a third synchronization source, e.g., terminal device 5302. After the guard period 5322, two preamble sequences may be used. They could also be identical sequences. A first sequence, AGC preamble 5324, is sent that allows a receiver, e.g., terminal device 5306, to find the correct AGC gain setting. Since a potential transmitter, e.g., terminal device 5304, in an ad-hoc system can have significantly varying distances and thus the received power levels can vary dramatically, the correct gain cannot be known in advance and the receiver, e.g., terminal device 5306, might take some time to find the correct setting. After the gain is adjusted, the receiver, e.g., terminal device 5306, is then able to receive a known reference sequence, e.g., sync preamble 5326, that allows time and frequency synchronization with the transmitter, e.g., terminal device 5304. Since both the receiver and transmitter, e.g., terminal devices 5304 and 5306, have gone through the first synchronization stage 5310, the residual error that is to be compensated here is expected to be much smaller than the initial uncertainty when synchronizing to a PSS. For example, the preambles may be any sequence or waveform that is known to the receiver, e.g. sounding reference symbols (SRS) or demodulation reference symbols (DM-RS) as used in LTE uplink could be used as an example. For the AGC preamble, it is assumed that the transmitter transmits a constant power that is representative of the following transmission so that the receiver can set its gain. For the synchronization preamble any waveform that is suitable to allow the receiver to perform (additional) time/frequency offset estimation is useful.

For that reason, the synchronization preamble 5326 may be much shorter than a PSS. During transmission of the data transmission signal 5321, as is standard, e.g. with LTE uplink transmission, demodulation reference symbols (DM-RS) are inserted that allow demodulation and also time and frequency tracking during the reception.

According to some aspects, the use of guard periods and sync preambles may allow greater tolerance of otherwise unavoidable timing errors due to propagation delays and relaxes the performance requirements for the initial synchronization mechanism. Thus residual synchronization errors may be overcome. The guard period and synchronization preamble that may be prepended to each transmission allows the receiving terminal device to correct any remaining relative synchronization errors in addition to choosing the correct gain setting.

According to some aspects, the UTC synchronization relay radio resources may be chosen randomly by the terminal device that becomes the autonomous synchronization timing source. According to other aspects, the UTC synchronization relay radio resources are fixed in time to the GNSS synchronization source radio resources. According to some aspects, the hierarchical synchronization scheme may be extended to use cellular based synchronization timing sources as the external synchronization source. For example, the external synchronization source may be a cellular signal rather than a GNSS signal or the external synchronization source may be provided by either a cellular signal or a GNSS signal.

In another exemplary D2D communication network 4500, terminal devices 4502-0 to 4502-9 may be within coverage of radio communication network 4590 but may use their radio access network transmitters/receivers to communicate with each other over radio resources that are not used by the radio communication network 4590 (e.g., unlicensed spectrum). This use scenario may be due to congestion in the radio communication network 4590.

This synchronization process may be used for device to device communication in out-of-coverage areas. It may also be used for device to device communication in unlicensed frequency bands.

Radio Resource Allocation for D2D Communication

In a decentralized and distributed D2D communication network, terminal devices may coordinate resource usage among themselves. While approaches based on network coordinated resource management may be suitable to manage D2D communication resources, they can be inefficient. For example, one terminal device may become a "master coordinator" and take over the role of a network coordinator and broadcast information about common resources to nearby terminal devices. However, since D2D communication networks have limited transmission range and capacities, such management broadcasts will occupy much of the available common radio resources further reducing the limited capacity for data transmissions. Further, it is not energy efficient since the "master coordinator" terminal device must frequently broadcast information about common resources and the "non-master coordinator" terminal devices must continuously listen for the broadcasts which is also battery draining. Moreover, since D2D communication networks are not cellular in nature, radio resource coordination may be limited to randomized access to minimize collisions on the radio interface. A more efficient way of organizing radio resources for D2D communication is needed.

First, it may be recognized that dynamic discovery of terminal devices may not always be used. In some circumstances, D2D communication may be desired among a known group of terminal devices. For example, a family going hiking may have limited reception because the cellular network coverage may be poor in the forest. In another example, a group of friends going to a sporting event may have limited service because the cellular network may be congested. In such circumstances, since membership in each of the groups of terminal devices that may seek to transmit and receive D2D communications with each other is known a priori and fixed, radio resources may be preallocated based on the anticipated need for D2D communication.

Accordingly, various aspects of this disclosure provide an a priori radio resource allocation scheme for a decentralized and distributed D2D communication network that improves transmission capacity and energy efficiency. As described herein, since the group associations may be established while the terminal devices are still within network coverage (e.g., while each terminal device is still connected to the network backbone via a wide area network (WAN) connection), the a priori radio resource allocation scheme may include a cellular base node or a cloud based server providing a priori resource management of common and/or dedicated radio resources. In some aspects, a cloud based server may determine the resource allocations and provide the allocation information to each respective terminal device of a group while the respective terminal device is still within network coverage. The a priori radio resource allocation scheme may apply to in-band (e.g., licensed spectrum) or out-of-band (e.g., public spectrum) D2D communications. In some aspects, group formation may include a plurality of terminal devices forming an exclusive group via an invitation process (e.g., "friending"). In some aspects, group formation may include a single terminal device joining an inclusive group of terminal devices via a subscription process. The group associations may be formed manually by users of terminal devices via a high level software application. The group associations may be formed automatically by a communication program anticipating the need for D2D communication.

Figure 54:
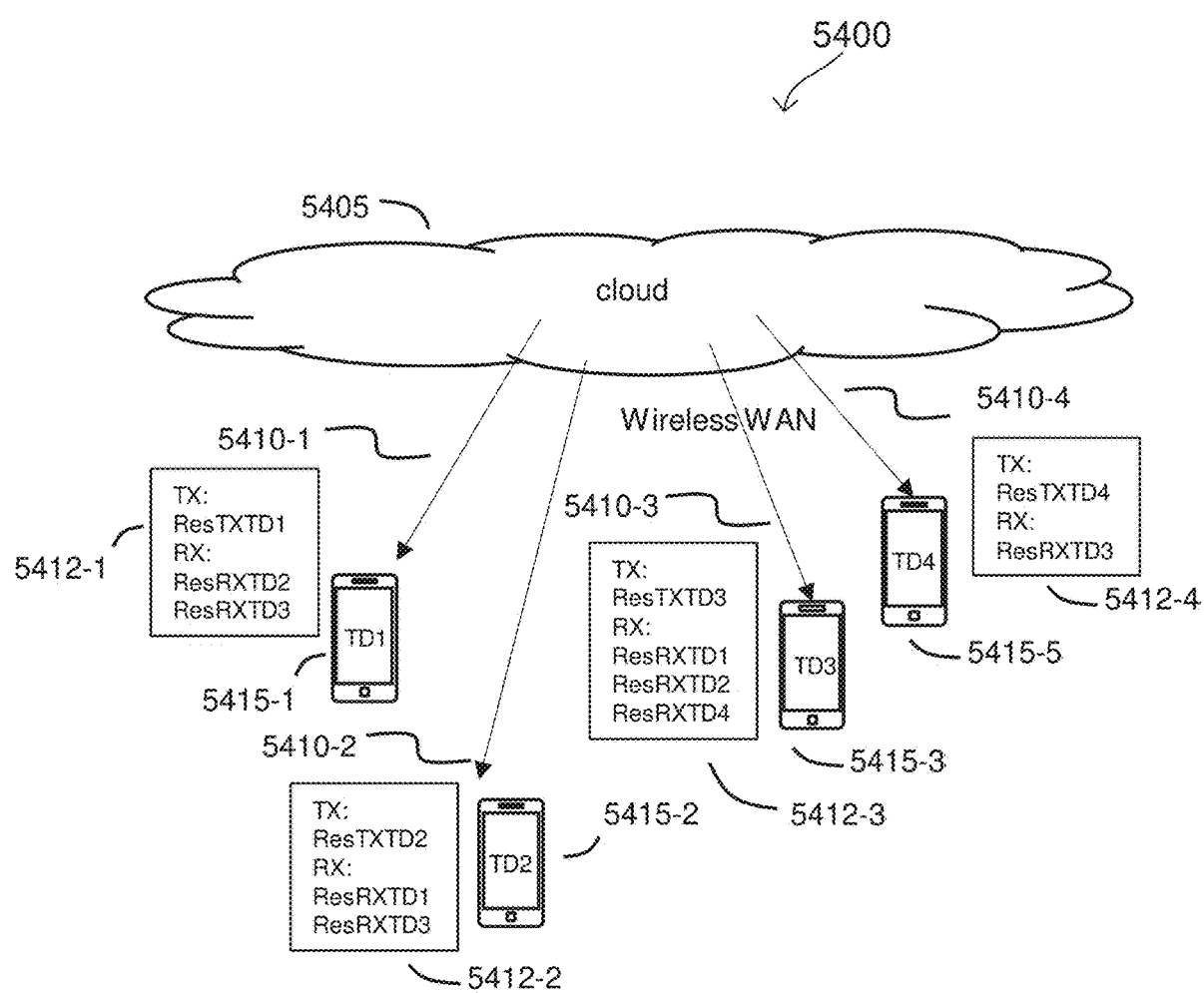
FIG. 54 shows an exemplary wireless communication network and device arrangement for an a priori radio resource allocation scheme according to some aspects.

FIG. 54 shows exemplary wireless communication network and device arrangement for an a priori radio resource allocation scheme according to some aspects of the present disclosure. In particular, FIG. 54 shows exemplary wireless communication network 5400 according to some aspects, which may include terminal devices 5415-1, 5415-2, 5415-3, and 5415-4 and network cloud 5405. The network cloud 5405 may include a radio communication network 4590 including network access nodes 4580 and 4582 providing wireless wide area (WAN) network coverage to terminal devices 5415-1 to 5415-4. A terminal device 5415-$n$ may be the same as or similar to terminal device 4502-$n$. The radio communication network 4590 may be connected to one or more servers 4570 via an internet backbone 4560. Although certain examples described herein may refer to a particular radio access network context (e.g., LTE, UMTS, GSM, other 3rd Generation Partnership Project (3GPP) networks, WLAN/WiFi, Bluetooth, 5G, mmWave, etc.), these examples may be readily applied to any other type or configuration of radio access network. The number of network access nodes and terminal devices in radio communication network 4590 is exemplary and is scalable to any amount.

The one or more servers 4570 may act as network based coordinator by providing cloud services including managing radio resources of terminal devices 5415-1 to 5415-4 to facilitate D2D communications when the terminal devices 5415-1 to 5415-4 are unable to connect to the network cloud 5405. The one or more servers 4570 may determine and statically allocate the radio resources for transmission and/or reception of D2D communications for a group of terminal devices and inform each respective terminal device of the group of terminal devices about the a priori assigned resources before any of the terminal devices communicate via D2D radio access. For example, the one or more servers 4570 may calculate all D2D resource allocations and provide the information to terminal devices 5415-1 to 5415-4 for offline use (e.g., the D2D resource allocation may be precomputed and stored, and terminal devices 5415-1 to 5415-4 may therefore not use dynamic resource allocation during operation). In some aspects, the one or more servers 4570 may determine D2D resource allocation based on a terminal device identifier. For example, a globally unique SIM number or MAC address may be such a terminal device identifier. In some aspects, the one or more servers 4570 may determine the D2D resource allocation based on communication relationships between terminal devices 5415-1 to 5415-4 (e.g., pairings or friendships that are known to the one or more servers 4570), device capabilities, device status (e.g., battery level, network coverage, type of cellular service), desired bandwidth between a particular pairing of terminal devices 5415-1 to 5415-4, orthogonality of resources, a requirement to have common or separate channels, or a local interference situation to between terminal devices 5415-1 to 5415-4.

In some aspects, the one or more servers 4570 may also update the D2D resource allocation (e.g., may update a priori allocations). For example, if terminal devices 5415-1 to 5415-4 connect to the network cloud 5405 at a later time, the one or more servers 4570 may propagate updated D2D resource allocations to terminal devices 5415-1 to 5415-4, or if some of the terminal devices 5415-1 to 5415-4 connect to the network cloud 5405 and receive the updated D2D resource allocation and subsequently forward the updated D2D resource allocation to the remaining of the terminal devices 5415-1 to 5415-4.

Figure 57:
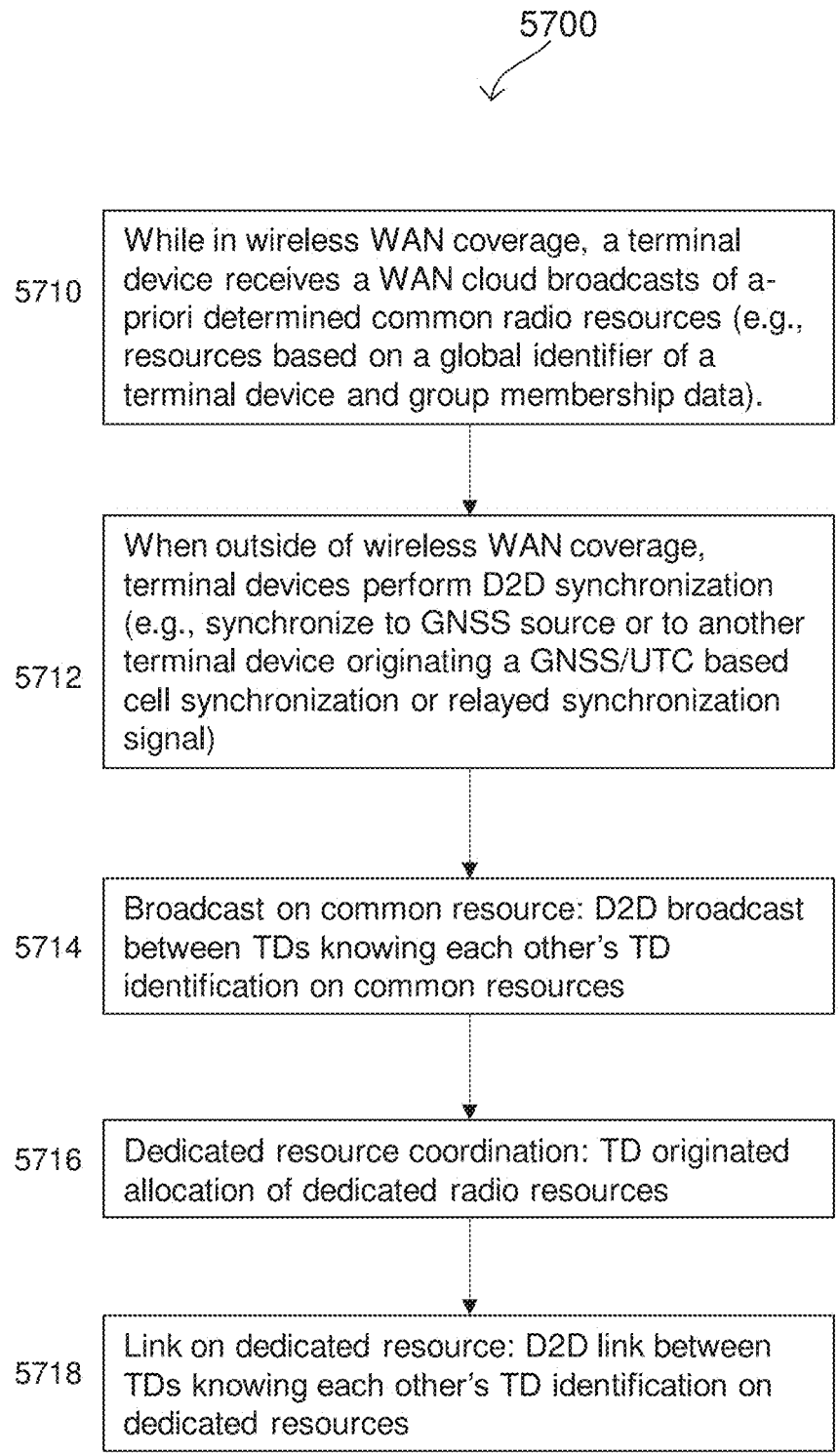
FIG. 57 shows an exemplary method for a priori resource allocation for a D2D communication network according to some aspects.

FIG. 57 shows an exemplary method 5700 for a priori resource allocation for a D2D communication network. In 5710, while in wireless WAN coverage, a terminal device receives a WAN cloud broadcasts of a priori determined common radio resources (e.g., resources based on a global identifier of a terminal device and group membership data). The a priori resource allocation may be determined by one or more servers 4570 based on group information including unique member identification information provided by a terminal device 5415-n and received by the one or more servers 4570.

In 5712, when outside of wireless WAN coverage, terminal devices perform D2D synchronization (e.g., synchronize to GNSS source or to another terminal device originating a GNSS/UTC based cell synchronization or relayed synchronization signal).

In 5714, any one of terminal devices 5415-1 to 5415-4 may perform broadcast transmissions to others of terminal devices 5415-1 to 5415-4 on common resources. For example, the D2D resource allocation may specify certain resources that are allocated for broadcast to multiple of terminal devices 5415-1 to 5415-4. Terminal devices 5415-1 to 5415-4 may therefore use these common resources to broadcast information to each other, as applicable.

In 5716, terminal devices 5415-1 to 5415-4 may coordinate their dedicated radio resources. For example, the D2D resource allocation may specify certain resources that are available for specific ones of terminal devices 5415-1 to 5415-4 (e.g., specific pairings) to perform dedicated transmission to each other. After coordinating these dedicated radio resources in 5716, terminal devices 5415-1 to 5415-4 may use links with each other on these dedicated resources to perform dedicated transmission. For example, terminal devices 5415-1 to 5415-4 may identify the other terminal devices based on their device identity, and may then identify the dedicated resources that the D2D resource allocation specifies for links with the other terminal devices. Terminal devices 5415-1 to 5415-4 may then perform dedicated transmissions with each other (e.g., in pairings) using the dedicated resources of the D2D resource allocation (e.g., which are allocated for specific terminal devices based on device identity).

Once the one or more servers 4570 determine D2D resource allocation for one or more groups, the one or more servers 4570 may provide information about the D2D resources allocation by any wireless or wired WAN service to all terminal devices of the one or more group before any terminal device leaves WAN coverage. For example, the information may be unicasted, multicasted, or broadcasted. Referring to FIG. 54, the one or more servers 4570 may transmit signals 5410-n including the D2D resource allocation information 5412-n to terminal devices TD1, TD2, TD3, and TD4 5415-n, respectively.

The allocation information to each respective terminal device may include uplink radio resources (ResTX) in which the respective terminal device may use for transmission. In some aspects, the uplink (i.e., transmit) resources may be defined in a broadcast manner i.e. the same radio resource may be used for one-to-one transmissions as well as one-to-many transmissions. Additionally, the allocation information to each respective terminal device may include downlink radio resources (ResRX) in which the respective terminal device may use to receive on. That is, for each terminal device, ResRX is provided so that the respective terminal device knows how to receive any D2D transmission from a transmission resource used by another terminal device that is known to the respective terminal device. Referring to FIG. 54 and Table 4 below, TD1 5415-1 is known to TD2 5415-2 and TD3 5415-3, TD2 is known to TD1 5415-1 and TD3 5415-3, TD3 is known to TD1 5415-1, TD2 5415-2, and TD4 5415-4, and TD4 is known only to TD3 5415-3. Accordingly, TD1 may communicate with TD2 and/or TD3, TD2 may communicate with TD1 and/or TD3, and TD3 may communicate with TD1, TD2, and/or TD3, and TD4 can only communicate with TD3. The allocated radio resources may be time resources, frequency resources, time and frequency resources, chip or code resources, etc.

TABLE 4

| Terminal Devices | Transmit Resources | Receive Resources |
|---|---|---|
| TD1 | $RES_{TX,\,TD1}$ | $RES_{RX,\,TD2}$ |
|  |  | $RES_{RX,\,TD3}$ |
| TD2 | $RES_{TX,\,TD2}$ | $RES_{RX,\,TD1}$ |
|  |  | $RES_{RX,\,TD3}$ |
| TD3 | $RES_{TX,\,TD3}$ | $RES_{RX,\,TD1}$ |
|  |  | $RES_{RX,\,TD2}$ |
|  |  | $RES_{RX,\,TD4}$ |
| TD4 | $RES_{TX,\,TD4}$ | $RES_{RX,\,TD3}$ |

Figure 55:
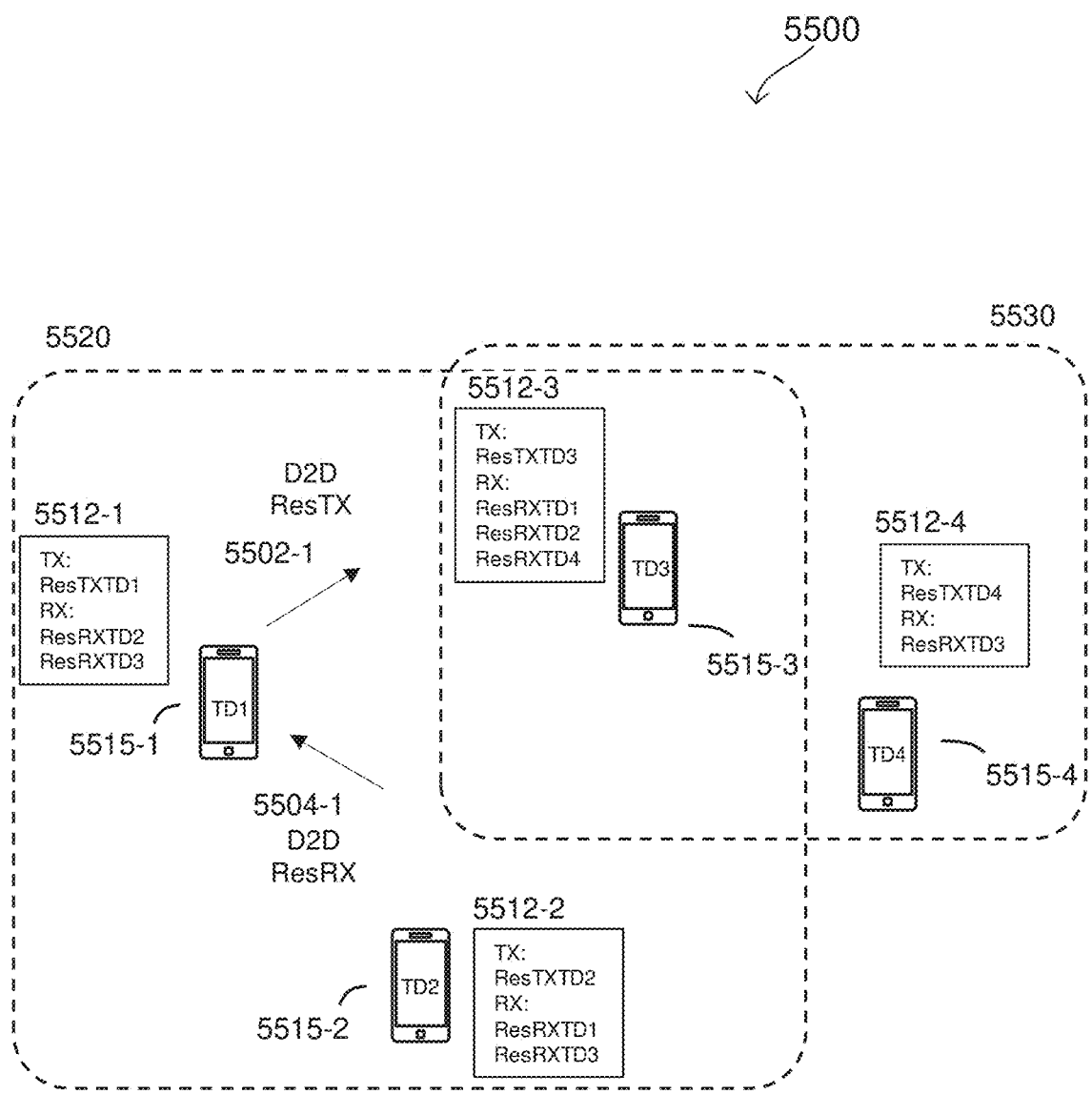
FIG. 55 shows an exemplary D2D communication network and device arrangement for an a priori radio resource allocation scheme according to some aspects.

FIG. 55 shows exemplary D2D communication network and device arrangement for an a priori radio resource allocation scheme according to some aspects of the present disclosure. In particular, FIG. 55 shows two groups 5520 and 5530 that are formed based on the D2D resource allocation 5412-n information of Table 4 provided to terminal devices 5415-n. As shown in FIG. 55, one group 5520 includes TD1, TD2, and TD3 and another group 5530 includes TD3 and TD4. Once the terminal devices 5415-n receive the cloud based D2D resource allocation 5412-n information, they will be able to commence D2D communication directly when they are no longer under wireless WAN/cloud coverage without any further radio resource broadcast because each terminal device already knows when to transmit information to other D2D terminal devices of interest and when to receive information from terminal device of interest.

Once a terminal device 5415-n is outside of WAN network coverage, it may be limited to D2D communications with other terminal devices whose corresponding D2D radio resource allocation information it had received from the one or more cloud servers 4570.

Figure 56A:
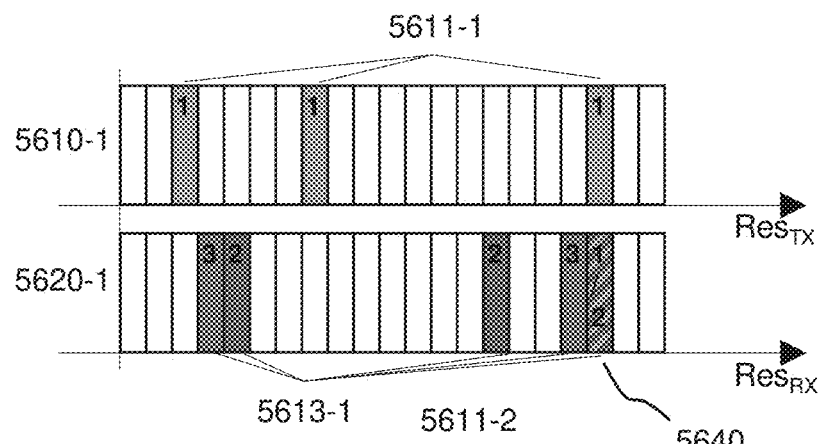
FIGS. 56A-56D show exemplary D2D resource allocations for terminal devices according to some aspects.

In some aspects, the D2D radio resources may be limited and all or a portion of the dedicated radio resources ResTX and ResRX may be shared resources. The dedicated radio resources ResTx and ResRX may be managed between the D2D terminal devices 5415-n themselves e.g. by random resource allocation or interference sensing methods. FIGS. 56A-D shows exemplary D2D resource allocations for each of the terminal devices of the D2D communication network and device arrangement of FIG. 55. Referring to FIGS. 56A-D, and in particular to FIG. 56A, for example, reference numeral 5610-1 may indicate all the D2D radio resources that may be used for transmitting D2D communications and reference numeral 5611-1 indicates the radio resources allocated to TD1 5415-1 for transmission. Reference numeral 5620-1 may indicate all the D2D radio resources that may be used for receiving D2D communications and reference numeral 5613-1 may indicate all the D2D radio resources that TD1 5415-1 should monitor for D2D communications. For example, as shown in FIG. 56A, the D2D resource indicated by reference numeral 5640 may be shared by TD1 5415-1 and TD2 5415-2 and if TD1 attempts to transmit while receiving from TD2 on this D2D resource there will be interference. For example, unless TD1 5415-1 is equipped with a full-duplex transceiver, TD1 5415-1 may not be able to receive from TD2 5415-2 and transmit at the same time on the same spectrum. TD1 5415-1 may therefore decide to prioritize either transmission or reception. In another example, as show in FIG. 56B, the D2D resource indicated by reference numeral 5645 may be shared by TD1 5415-1 and TD3 5415-3 and if TD1 and TD3 simultaneously transmit on this D2D resource there will be interference received at TD2. In some aspects, TD1 5415-1 and TD3 5415-3 may be able to reduce or mitigate interference by using random access/backoff schemes that avoid simultaneous transmissions or help recover from collisions. In some aspects, in case simultaneous transmissions occur, for example, a receiver at TD2 5415-2 receiving transmissions from TD1 5415-1 and TD3 5415-3 could employ interference cancellation techniques, such as successive interference cancellation (SIC). In such an SIC scheme, the receiver may receive and decode a strongest signal, re-encode and regenerate the signal at the receiver (e.g., by distorting according to the estimated channel), and subtract this resulting signal from the received signal to remove the interference impact from the weak signal. In some aspects, the receiver could use spatial processing to, for example, exploit different spatial signatures of the signal to try to separate them. Additionally or alternatively, in some aspects the transmitters at TD1 5415-1 and TD3 5415-3 may try to align their transmissions (e.g., with Interference Alignment), or TD1 5415-1 and TD3 5415-3 may use orthogonal codes when transmitting that can enable receivers to separate transmissions from multiple users.

Figure 56B:
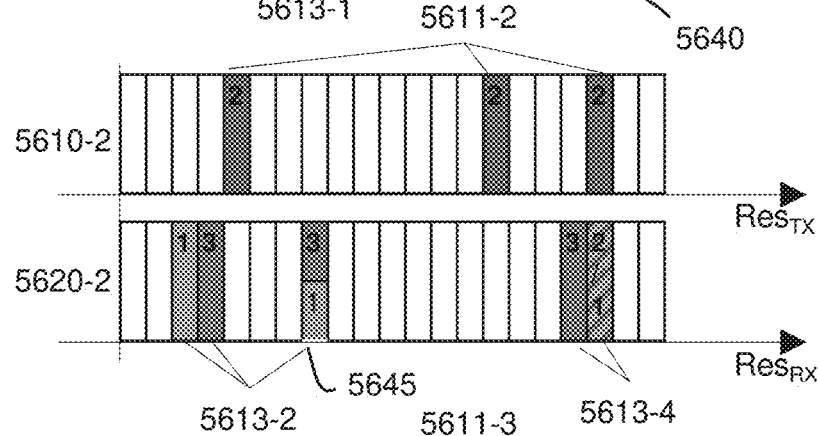
Figure 56C:
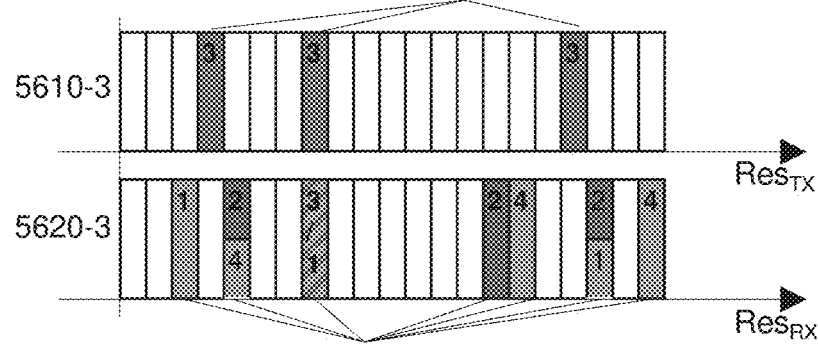
Figure 56D:
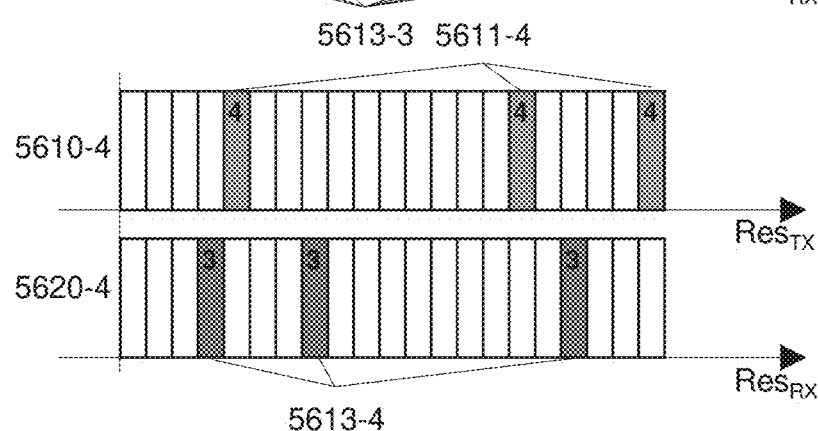

Referring to Table 4 and FIGS. 56A-C, terminal TD1 may transmit to TD2 (individually per TD pair) on a radio resource 5640 or TD1 may transmit to multiple terminal devices TD2 and TD3 on the same radio resource 5640. Higher layer signaling may allow a receiving terminal device to distinguish different receiving terminal devices when broadcasting is used. Accordingly, since radio resources may be shared, transmitted data should include information identifying the sender.

A D2D communication network using a priori determined fixed resource allocations has less communication overhead because it may not broadcast information about available D2D radio resources. Accordingly, the D2D communication network capacity may be increased. Further, power consumption may be lowered since the terminal devices may not broadcast and monitor broadcasted information about radio resources. In addition, management of radio resources may be optimized in an online centralized coordinator (e.g. the cloud). For example, in some aspects the cloud can use knowledge from different inputs, such as other terminal devices or other sources, to optimize the resource allocation. Examples of inputs can include a prior knowledge about terminal devices, intended communication relationships of terminal devices, desired data rates in the area that need to be separated (e.g., to allow mutually orthogonal transmissions) or that need to share resources (e.g., for multicast transmissions), a priori knowledge of the interference situation in case the system is operated in an unlicensed band. Exemplary parameters to be optimized can include frequency channels to use, time slots to use, spreading codes to use, and/or DRX/sleep patterns to use.

In some circumstances, dynamic discovery and allocation of D2D resources of terminal devices are needed. For example, when users of terminal devices would like to communicate with each but the terminal devices are already out-of-network coverage or when it is desirable to form a mesh or relay network from an arbitrary group of terminal devices. In a decentralized wireless ad-hoc system, the terminal devices are considered peers and each terminal device may have direct communication with every other terminal device that is in its communication range. All terminal devices within transmission range of each other may be able to discover each other and communicate with each other. This is in contrast to a cellular system (or a centralized ad-hoc system with a star topology like Bluetooth) where all communication links go from a base station or master node to the devices that are under control by that base station or master node. Without a centralized coordinator, decentralized ad-hoc systems need a distributed resource allocation approach.

For example, terminal devices that may discover and communicate with each other may share the same radio resources (i.e., all transmit and receive their discovery on the same channel(s)), which in turn requires a common synchronization reference to allow all terminal devices to find the frame and slot boundaries as well as to perform any frequency hopping steps that might be required. Exemplary synchronization and frequency hopping processes are described herein.

When all terminal devices share a discovery channel, it allows terminal devices that have not agreed on dedicated/private resources (e.g., channels) to be able to discover each other and communicate once in range. The same radio resource may be shared in various manners. For example, a radio resource that can be shared may be a time slot, a frequency subband, a common hopping pattern, and/or a code. Also mesh forwarding or relaying services are easier to implement when more potential forwarding or relaying nodes are available.

Accordingly, various aspects of this disclosure provide a dynamic resource allocation scheme for a decentralized and distributed D2D communication network that improves transmission capacity and energy efficiency. In some aspects, the dynamic resource management may include a global discovery and/or broadcast channel. In some aspects, without a priori resource management, all terminal devices need to share the same resources for discovery messages or broadcasted messages. In some aspects, congestion of shared resources is avoided by increasing the resource availability through the addition of multiple but shorter slots that can be operated at lower power. This lead may lead to a degradation of the discovery times and communication rates with increasing range between communication partners. Accordingly, in some aspects, a mechanism to balance power consumption of a terminal device against the expected discovery duration depending on the communication range is provided (e.g., adjusting discovery period length and number of long/short range discovery slots). In some aspects, it may further allow each terminal device to choose its own dedicated reception resource which is announced via the discovery channel. This allows a terminal device to adapt its reception resource to the surroundings and, e.g., select a least interfered channel. As described herein, the dynamic radio resource allocation scheme may apply to in-band (i.e., licensed spectrum) or out-of-band (i.e., public spectrum) D2D communications.

In some aspects, two types of communications may be needed to organize resources to facilitate communication on a distributed D2D communication network. A broadcast communication allows a terminal device to seek all other terminal devices within its transmission range. For example, a terminal device may transmit a "Here I am" message as part of a D2D communication network-wide discovery process. A directed communication allows terminal devices to exchange data directly between pairs of terminal devices once the terminal devices of the pair have discovered each other. In some aspects, directed communications may allow a terminal device to be a part of a multi-hop mesh network where a terminal device may be an intermediary node that forwards data between terminal devices that are not in mutual communication range.

Figure 58:
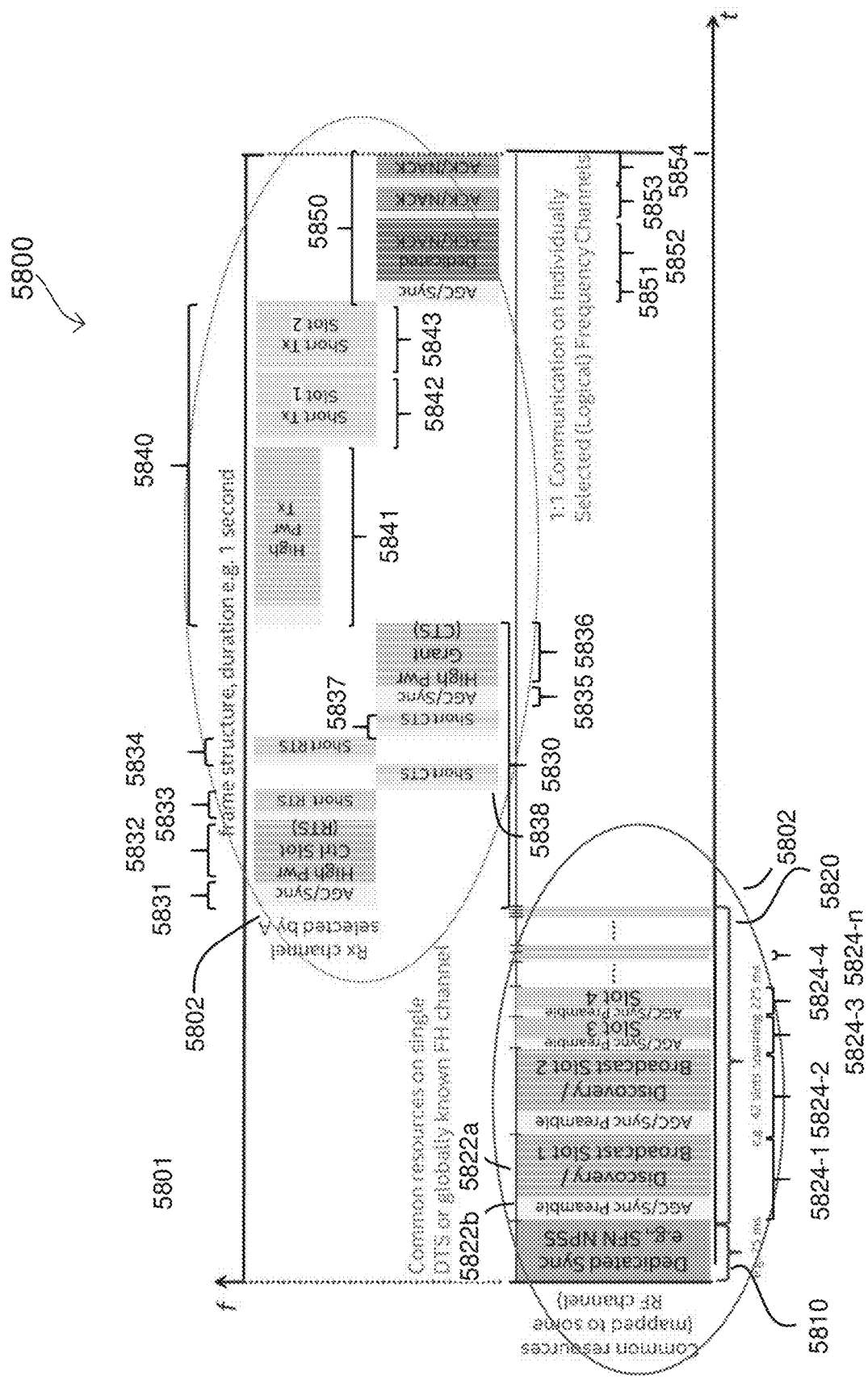
FIG. 58 shows an exemplary frame structure according to some aspects.

The two types of communications may be implemented as separate phases of communication, wherein a first phase involves shared radio resources and a second phase involves dedicated radio resources. In some aspects, a frame may be structured to support two phases of communication. FIG. 58 shows an exemplary structure of frame 5801. As shown in FIG. 58, a frame 5801 may include two segments 5802 and 5804. A first segment 5802 "Sync, Discovery and Broadcast" may be used for communications in a first phase which may include undirected communications including synchronization messages, discovery messages, and/or broadcasted messages. A second segment 5804 "Dedicated Communication" may be used for communications in a second phase which may include unicasted messages between pairs of terminal devices and/or multicasted messages among a group of terminal devices on dedicated radio resources arranged during the first phase.

According to some aspects, the frame format may be used for communications in various types of spread spectrum systems, including digital transmission systems (direct sequence spread spectrum), frequency hopping systems (frequency hopping spread spectrum), and hybrid systems employing a combination of both frequency hopping and digital transmission techniques.

Referring to FIG. 58, the first segment 5802 may include common resources accessible by all terminal devices. The first segment 5802 may be mapped to an RF channel, assigned to a single DTS channel, or assigned to a universally known frequency hopping channel. In this manner, any terminal device 5415-$n$ may access or know how to find the common resources in each frame.

Figure 61A:
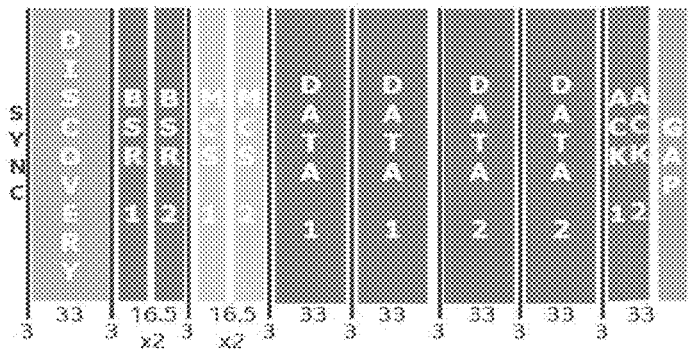
FIGS. 61A-61C show various exemplary frame formats according to some aspects.

In some aspects, the common resources may include synchronization resources 5810. The synchronization resources 5810 may be used to transmit synchronization messages including dedicated synchronization signals, such as, a single frequency network (SFN) narrowband primary synchronization signals (NPSS). The duration of the slot for synchronization signals may be, for example, about 25 ms. An exemplary synchronization scheme is described herein in greater detail with respect to FIGS. 45A-45F. The common resources may also include a plurality of discovery/broadcast resources 5820. Referring to FIG. 58, the plurality of discovery/broadcast resources 5820 may include 42 slots for discovery/broadcasting 5824-1 to 5824-42. Each discovery/broadcast slot 5824-$n$ may include an AGC/sync preamble 5822*b* and discovery/broadcasted data 5822*a*. Referring to FIGS. 58, 61A, and 61C, the stripes shown in the various resource slots symbolize reference symbols (e.g., pilots) that can be used for channel estimation and/or time/frequency tracking. In some aspects, the duration of the slots for discovery/broadcasted data may be the same.

According to some aspects, messages of a first phase should be transmitted and received on common radio resources so that all terminal devices are able to receive and transmit on these messages. In some aspects, common radio resources may be anchor channels that are not part of a frequency hopping scheme such as one of the many 500 kHz channels in the 900 MHz ISM band that are not subject to FCC frequency hopping requirements but can be operated in a mode similar to a direct transmission system, i.e., using direct spread spectrum modulation techniques. In some aspects, common radio resources may be a global frequency hopping pattern that is known a priori to all terminal devices so that every terminal device knows on which actual frequency channels to find the common resources at any point in time. Such coordinated hopping can be achieved for example by relying on a common time reference such as a GNSS time reference that is mapped to a hopping pattern. For terminal devices that are not able to receive a GNSS time reference, there may be terminal devices that transmit or relay synchronization reference signals (e.g., PSS like reference signals) that are synchronous with a GNSS timing source.

For example, as shown in FIG. 58, such synchronization signals may be transmitted at the beginning of the frame. If a terminal device 5415-$n$ detects this PSS signal on some frequency channel (either an anchor channel or a known frequency hopping channel), it can assume it has found the frame start. If the hopping durations are aligned with the frame start and if the next channel can be deduced from the current channel, even a terminal device that is not able to receive a GNSS based time reference may still be able to synchronize to the hopping and access the common resources. In some aspects, when the next global hopping channel cannot be determined from the previous one without side information, suitable side information may be communicated via an SFN which may be added to the broadcasted information. For example, an exemplary synchronization process is described herein with respect to FIG. 52A which may include SFN if needed.

The first phase may also include the transmission of discovery messages. According to some aspects, randomized resource allocation may be used since there is no means to coordinate the access to resources among the terminal devices participating in the D2D communication network. Each terminal device may randomly select one of the discovery/broadcast slots of the first segment of a frame to transmit its discovery message. In some aspects, slotted aloha can be used, namely where the collision probability of discovery transmission where each active user randomly picks one slot according to a previous synchronization between the users. Since the discovery/broadcast slots are randomly selected, discovery messages from different terminal devices may collide. To avoid further collisions, a discovery transmission period may be used so that the terminal devices do not try again on the same frame. A discovery transmission period defines how many frames until a terminal device is allowed to transmit its discovery message again. Each terminal device may have a different discovery transmission period and it may be adapted to the desired discovery latencies and the expected power consumption.

Sharing common radio resources may lead to congestion when there are many terminal devices in the D2D communication network that have to perform discovery transmissions. One way to avoid congestion on the discovery resources and to increase the capacity of the D2D communication network is to add more discovery/broadcast slots to a frame. However, adding more slots that are dimensioned in a way (duration (i.e., length), Tx power) to allow even the farthest terminal device to receive a discovery message may extend the discovery phase too much. Since every terminal device is expected to listen on all the common resources to receive discovery messages, all terminal devices would need to spend more time and power receiving with less resources available for dedicated communication. In some aspects, the discovery time slots may be variably dimensioned.

Referring to FIG. 58, instead of dimensioning all discovery/broadcast slots to be receivable by terminal devices at the edge of coverage (about −10 dB SNR), the huge dynamic range of an D2D communication network may be exploited to offer the terminal devices that have better transmission conditions (e.g., shorter distance, less interference) more opportunities to discover each other. In some aspects, to minimize congestion, the duration of the slots for discovery/broadcasted data may be variable. As shown in FIG. 58, shorter discovery/broadcast slots may be provided in each frame. For example, the duration of some discovery slots may be reduced from about 50 ms to about 8 ms. In some aspects, the duration of some discovery slots may be reduced even further to about 3 ms or about 2 ms.

For example, slots 5824-1 to 5824-42 may span 225 ms where slots 5824-1 and 5824-2 may have a duration of 50 ms each, slots 5824-3 to 5824-7 may have a duration of 8 ms each, slots 5824-8 to 5824-55 may have a duration of 3 ms each, and slots 5824-56 to 5824-42 may have a duration of 2 ms each.

For another example, the plurality of discovery/broadcast resources 5820 may include 54 slots spanning 280 ms where slots 5824-1 and 5824-2 may have a duration of 60 ms each, slots 5824-3 to 5824-6 may have a duration of 15 ms each, slots 5824-7 to 5824-48 may have a duration of 5 ms each, and slots 5824-49 to 5824-54 may have a duration of 1.5 ms each.

For another example, the plurality of discovery/broadcast resources 5820 may include 18 slots spanning 135 ms where slots 5824-1 to 5824-3 may have a duration of 30 ms each and slots 5824-4 to 5824-52 may have a duration of 3 ms each.

Shorter discovery/broadcast slots may have higher code rates, less repetitions, or higher-order modulations.

Figure 59:
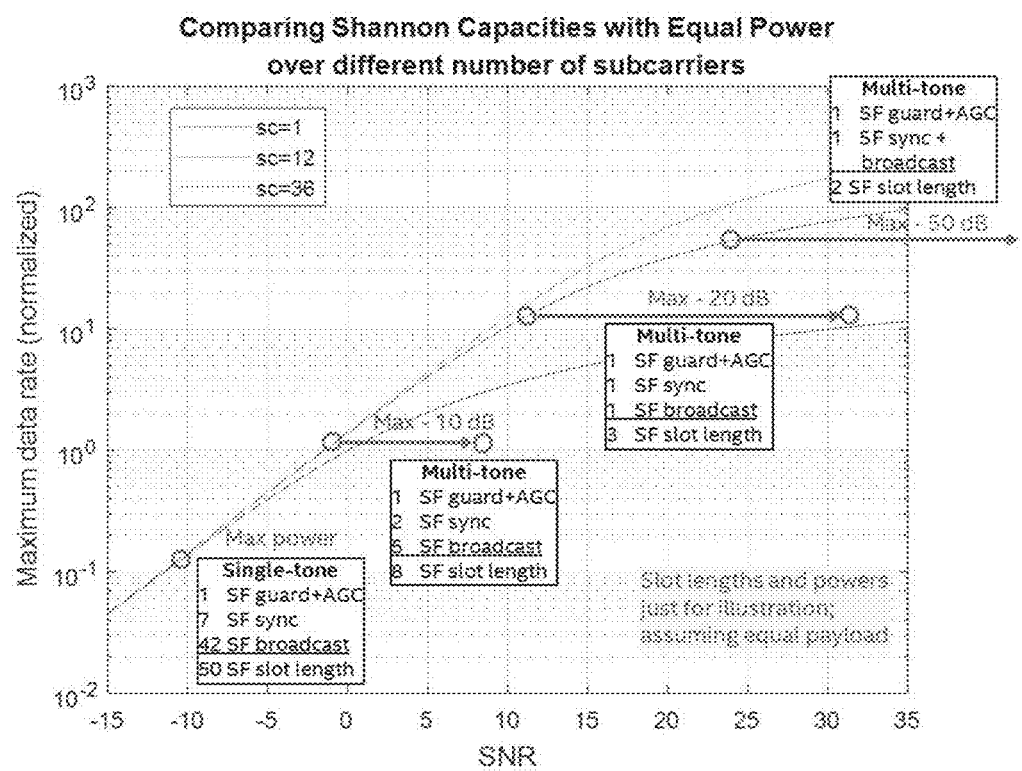
FIG. 59 shows an exemplary chart of Shannon capacities according to some aspects.

FIG. 59 shows a chart comparing Shannon capacities with equal power over different number of subcarriers. It provides considerations for dimensioning transmission slots based on radio conditions. As shown in FIG. 59, the slot length does not scale in proportion to the orders of magnitude. The Shannon capacity is not higher at higher SNRs. One reason is that the length of the preamble/AGC 5822b for guard and gain adjust do not scale because these times (timing uncertainty and AGC procedure duration) are absolute values. The other reason is that while the slots are shortened, the power can also be reduced. This reduces the coverage range of each cell but also reduces the area of the D2D communication network that is interfered. The variably dimensioned discovery/broadcast slots allow use cases where the received power would be too high to be handled when transmitting at max power. For example, this may occur when two terminal devices are in the same pocket.

When terminal devices randomly select an arbitrary discovery slot from a plurality of discovery slots of different lengths, the expected discovery times in the D2D communication network may vary depending on the distance between terminal devices. The expected discovery times may be adjusted by changing the number of slots of each duration. In some aspects, there are many more shorter slots than longer slots. With only a simple scheme for collision avoidance (for example, interference sensing, randomized backoff timer, and randomized selection/access of a discovery/broadcast slots), increasing the shorter slots increases the likelihood that a terminal device may find an available radio resource among the common resources. In this manner, nearby terminal devices may have more opportunities for discovery and will thus be found quickly. A terminal device that is far away (e.g., at the maximum coverage distance) will have to wait for a sufficiently long slot to be selected for transmitting its discovery message and then wait for as many attempts as needed until no stronger transmission collides with its discovery message at a receiver.

Unlike synchronization and discovery messages, dedicated messages communicated between two terminal devices may not be on a channel that is known or listened to by all other terminal devices. In contrast, dedicated transmissions should aim at exploiting all channels of the D2D communication network to the extent such a frequency domain multiplexing is possible given that adjacent channel interference from nearby transmitters can block a terminal device. In order to facilitate one-to-one transmissions on arbitrary channels, the discovery message of a terminal device may contain a short (e.g. 2 Byte) terminal device identifier (TDID) as well as an indication of a receive channel that the terminal device will receive on during the beginning of the dedicated transmission phase. Another terminal device who wants to contact the terminal device, e.g., to perform further steps in a discovery process or to transmit data, would thus know on which channel to further communicate with the terminal device. The channel may be a logical channel that is subject to a global frequency hopping pattern known to all transmitters and receivers. Alternatively, the hopping sequence may be specific to the terminal device and could be derived from the TDID or the hopping sequence may be specific to the channel and could be derived from the channel identifier (e.g., logical channel number).

A terminal device may select a channel randomly. Alternatively, in case of a global hopping pattern, the terminal device may be able to measure its interference on multiple candidate channels over time and select a candidate channel that is expected to have the least interference. Generally, past measurements of low interference are no guarantee that a channel will be suitable in the future. However, the surrounding terminal devices that also selected their own dedicated channels for transmission can be expected to mostly transmit to the same receivers within a reasonable period. A certain stability of the channel allocations could thus be expected (since the other terminal devices would also hop in the same way). As an alternative to a specific dedicated channel to receive on, a terminal device might also announce a user-specific hopping pattern so that transmissions are more randomized but without being able to coordinate interference.

While transmissions of discovery messages should be governed by a slotted Aloha approach, dedicated transmissions should employ a flow control scheme for purposes of reliability and responsiveness. For example, a flow control scheme involving a transmission request message (e.g., Request-to-Send (RTS)) and a transmission grant message (e.g., Clear-to-Send (CTS)) may be used.

Referring to FIG. 58, the second segment 5804 may include a plurality of dedicated resources 5840 and may include one or more dedicated transmission control resource slots 5830. When there are multiple dedicated transmission request resource slots 5832-5834, they may have the same length or may have variable length. Referring to FIG. 58, the second segment 5804 may include one long high power RTS resource slot 5832 and two short lower power RTS resource slots 5833, 5834. Similarly, the second segment 5804 may include and one or more dedicated transmission grant resource slots 5836-5838. When there are multiple dedicated transmission grant resource slots, they may have the same length or may have variable length. Referring to FIG. 58, the second segment 5804 may include one long high power CTS resource slot 5836 and two short lower power CTS resource slots 5837, and 5838. The RTS resource slots 5831-5834 and the CTS resource slots 5835-5838 may be allocated on different frequency sub-bands in the receive channel.

Figure 60:
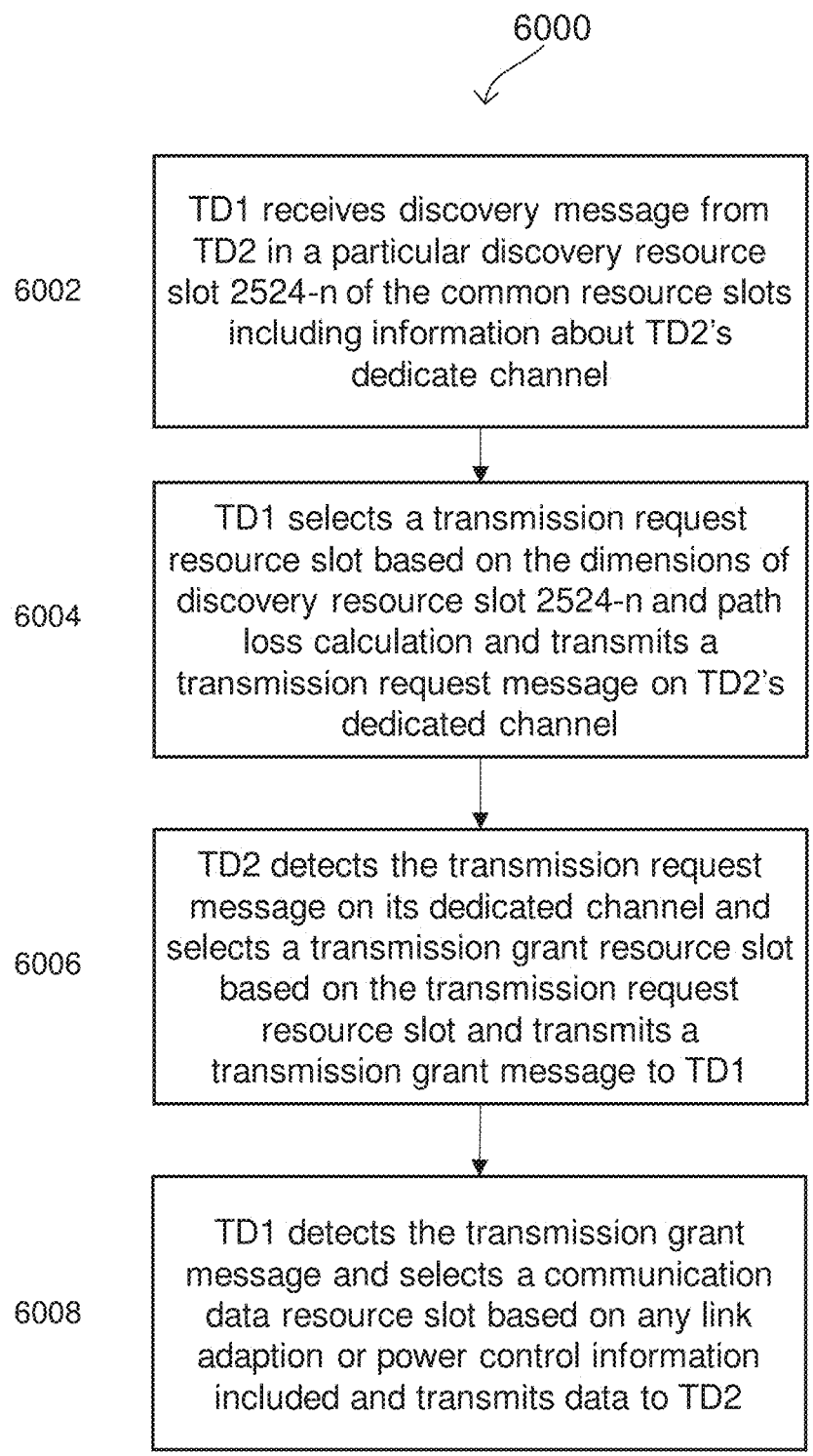
FIG. 60 shows an exemplary method for establishing a D2D communication link according to some aspects.

FIG. 60 shows exemplary method 6000 for establishing a D2D communication link. Referring to FIG. 60, in 6002, TD1 receives discovery message from TD2 in a particular discovery resource slot 5824-*n* of the common resource slots including information about TD2's dedicate channel. A terminal device TD1 wanting to communicate with a terminal device TD2 may receive a discovery message from terminal device TD2. In 6004, TD1 selects a transmission request resource slot based on the dimensions of discovery resource slot 5824-*n* and transmits a transmission request message on TD2's dedicated channel. Based on the discovery slot 5824-*n* in which terminal device TD1 received terminal device TD2 discovery message, terminal device TD1 knows the transmit power used for the discovery transmission since transmit power is related to the duration of the discovery slot 5824-*n* and can estimate the pathloss towards terminal device TD2. In some aspects, the pathloss estimation may consider other prior discovery transmissions from terminal device TD2. For a high pathloss link, terminal device TD1 may select an available dedicated transmission request resource slot that is long enough to be received at max range when transmitted at full power. For example, referring to FIG. 58, dedicated transmission request resource slot 5832 may be selected. For a low pathloss link, terminal device TD1 may select a shorter available dedicated transmission request resource slot. For example, referring to FIG. 58, either dedicated transmission request resource slot 5833 or 5734 may be selected. Based on the pathloss calculation to TD2 determined based on a discovery message from TD2, TD1 sends a dedicate transmission request message on a dedicated transmission request resource slot of an appropriate duration.

Terminal device TD2 receives on its dedicated channel and monitors for a transmission request message (e.g., RTS). Assuming there is no interference (i.e., no concurrent transmission on the same or adjacent channels), terminal device TD2 should be able to receive a transmission request message from terminal device TD1 indicating its desire to transmit. This request may include a TDID of terminal device TD1, a dedicated channel identifier indicating the channel on which terminal device TD1 will receive any replies on, and a buffer status report index indicating to terminal device TD2 how much data (e.g., the number of bits) terminal device TD1 wants to transmit.

In 6004, TD2 detects the transmission request message on its dedicated channel and selects a transmission grant resource slot based on the transmission request resource slot and transmits a transmission grant message to TD1. If the transmission request is successfully received, terminal device TD2 may respond by sending a transmission grant message to terminal device TD1. The response may be transmitted on a resource slot that is of the same or comparable length as the resource slot in which the transmission request message was received. For example, referring to FIG. 58, in response to a transmit request message transmitted on dedicated transmission request resource slot 5832, a transmit grant message should be transmitted on dedicated transmission grant resource slots 5836. The transmission grant message may be transmitted on the dedicated channel that was indicated in terminal device TD1's transmission request message (i.e., terminal device TD1's dedicated channel). Alternatively, the responses from terminal device TD2 to terminal device TD1 (i.e., feedback transmissions) may be transmitted on terminal device TD2's dedicated channel since that is also known to terminal device TD1. If the transmission grant message is transmitted on terminal device TD1's dedicated channel, there is a potential for a collision happening at terminal device TD1's side because the interference situation at terminal device TD1 will be different than at terminal device TD2's side. However, if the transmission grant is received by terminal device TD1, the data transmission can proceed during the corresponding transmission interval.

The transmission grant message may include link adaptation and power control information based on terminal device TD2's estimate of the pathloss, its local interference situation, the amount of data requested for transmission etc. In 6008, TD1 detects the transmission grant message and selects a communication data resource slot based on any link adaption or power control information included and transmits data to TD2.

If terminal device TD2 perceives too much interference from a colliding transmit request (e.g., either directed to terminal device TD2 or directed to another terminal device but originating from a terminal device in the vicinity of terminal device TD2), terminal device TD2 may be unable to decode the transmission request message from terminal device TD1 and will not be unable to respond to terminal device TD1. If terminal device TD1 does not receive a transmission grant message, terminal device TD1 will not transmit any further data and will wait a period of time before attempting to resend a transmission request message to terminal device TD2. The use of flow control may avoid a collision during a long data transmission by detecting any potential collisions during the shorter flow control message transmission phase.

As shown in FIG. 58, the second segment 5804 may include multiple flow control resource slots 5830 of different lengths. With variable length resource slots, it may be possible to distinguish between maximum and lower power transmissions based on the resource slot in which a message is received. This provides transmissions to nearby terminal devices more transmission resources. Also, multiple (lower power) flow control resource slots allow a terminal device that could not get a transmission grant response for its transmission request message the chance to try again in a second or subsequent round.

As shown in FIG. 58, the second segment 5804 may include multiple communication data resource slots 5840 of different lengths. For example, communication data resource slots 5840 may include one long communication data resource slot 5841 and two short communication data resource slots 5842, 5843. For communication between two nearby terminal devices, one or more of the shorter communication data resource slots may be used depending on the channel condition.

In some aspects, the number of flow control resource slots and the number of communication data resource slots may be the same. In some aspects, the number of long flow control resource slots and the number of long communication data resource shots may be the same. In some aspects, the number of short flow control resource slots and the number of short communication data resource shots may be the same. In some aspects, in addition to the long and short slots, there may be one or more flow control resource slots and communication data resource slots of one or more various intermediate slot durations.

Since the duration of a frame may be on the order of seconds, large portions of the frame may be unused with the majority of transmissions happening only in the initial portion of the dedicated phase when transmission conditions are good. For example, when conditions are good, low or minimal numbers of retransmissions can be expected. Furthermore, if the amount of data to be transmitted is fixed, such as with link adaptation selecting a modulation/coding that maximizes the instantaneous data rate, the transmission time of the fixed size payload is short in good conditions and long in bad conditions. Accordingly, as transmissions in good conditions are shorter than the frame, those transmissions may be concentrated around the beginning of the dedicated phase if all transmissions were to start there.

Due to frequency hopping throughout the duration of a frame, some portions of the dedicate resources may have interference and some portions may not have interference. In some aspects, the second segment 5804 may be separated into multiple sub-segments each corresponding to a sub-phase. Each sub-segment may have its own flow control resources and communication data resource slots. This may allow to better utilization of the whole frame because portions of a frame may still be used for data communication even if some portions of a frame may have interference.

Finally, at the end of the dedicated phase the receiving terminal device should send an acknowledgement message (e.g., ACK/NACK) to the transmitting terminal device as feedback on the success of the transmission. Referring to FIG. 58, the second segment 5804 may include acknowledgement feedback resource slots 5850. As shown in FIG. 58, the second segment 5804 may include multiple acknowledgement feedback resource slots 5850 of different lengths. For example, acknowledgement feedback resource slots 5850 may include one long slot 5852 and two short slots 5853, 5854. Each acknowledgement feedback resource slot may correspond with a communication data resource slot.

This scheme may also be modified to support 1:N group transmissions (i.e., multicast transmissions). These could be announced in the discovery phase via a dedicated broadcast message indicating to a group ID and in which resource slots of the dedicated phase will be used for a group multicast transmission. In this case, additional dedicated acknowledgement resource slots 5852 may be added to provide enough resource slots for all group members to send their individual feedback allowing the transmitting terminal device to perform either 1:N or 1:1 retransmissions.

Figure 61B:
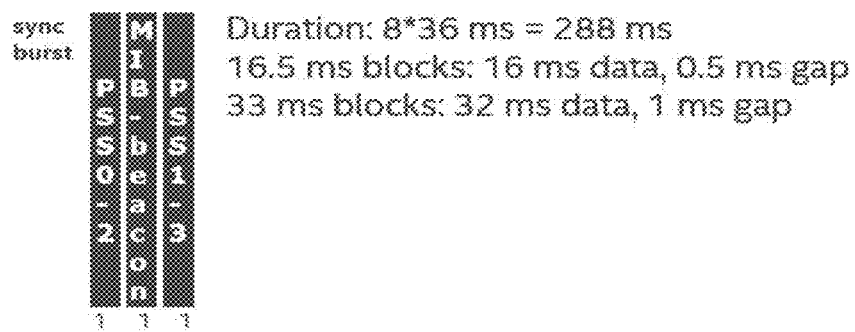
Figure 61C:
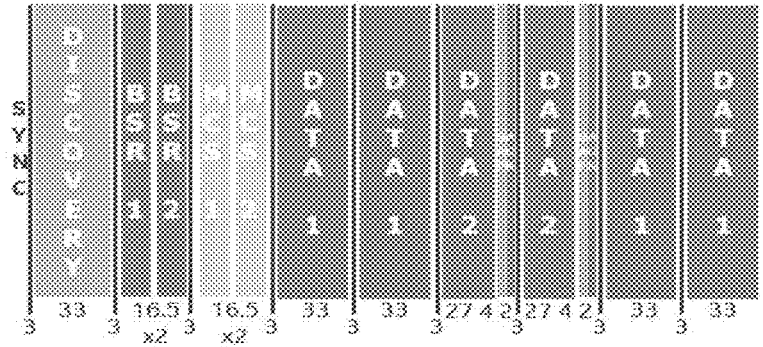

FIGS. 61A-C show various exemplary frame formats according to some aspects. In particular, FIGS. 61A and 61C show one frame of eight 33 ms slots and eight 3 ms sync bursts (with different positioning of ACK slots) while FIG. 61B shows these sync bursts in detail. As shown in FIGS. 61A-C, dedicated synchronization resource slots may be reserved for synchronization burst signals which occur every 36 ms for a duration of 3 ms. Referring to FIG. 61B, a synchronization burst signal may include two synchronization messages (e.g., PSS0 and PSS1) and include a management information base (MIB) in between the two synchronization messages. A discovery resource slot of 33 ms duration occurs only once per frame. The frame may include collision avoidance control signals BSR and MCS. Each of the BSR (the RTS transmission described above) and MCS (the CTS transmission described above) signals may have a gap of ½ RU. The frame may also include one or more data slots each of which has a during of 33 ms. An ACK/NACK slot having a duration of 33 ms may be reserved at the end of frame (some variations are given in the format on the right part of the figure). In some aspects, gaps of 0.5 or 1 ms can also be introduced to allow frequency switching or AGC preambles.

The frame format shown in FIGS. 61A-B may be applied to multi or single tone type of communication or combination of both following frequency hopping scheme.

In various aspects, terminal devices configured in the manner of terminal device 102 shown in FIG. 2 can execute any of this communication functionality described brave for radio resource allocation for D2D communication. For example, controller 210 may control transceiver 204 to communicate with other devices according to pre-allocated radio resource allocations received from the network (e.g., the cloud). Controller 210 may additionally or alternatively control transceiver 204 to communicate with other terminal devices on public and/or private channels, such as for discovery and subsequent data communications.

Discovery Procedure for D2D Communication

In D2D networking, before the terminal devices are able to establish communication links with each other they may verify that they are in physical proximity to each other. This is accomplished through a discovery procedure, where the involved devices exchange a sequence of messages over their radio interfaces.

In a long range out-of-cellular-coverage setting or an out-of-band setting, where there is no network infrastructure to provide coordination (e.g., allocate radio resources), the terminal devices participating in a discovery procedure may be susceptible to interference, rendezvous mismatch, and/or proximity uncertainty. For example, interference may be generated from concurrent discovery communications and other ongoing communications. Rendezvous mismatch occurs where one terminal device seeking to discover another terminal device does not know in which radio resource (e.g., time, frequency, time and frequency) it should transmit so that the other terminal device can reply. Proximity uncertainty occurs where one terminal device seeking to discover another terminal device, only knows that the other terminal device is in radio proximity after it successfully completes the discovery procedure. When a discovery attempt fails, the seeking terminal device does not know if the failure is due to the other terminal device not being in proximity or due to interference or rendezvous mismatch.

Accordingly, various aspects of this disclosure provide a more reliable and robust discovery procedure for a decentralized D2D communication network. As described herein, the discovery procedure may in some aspects organize the discovery resources in a frame based manner so that all terminal devices know when to transmit and listen to discovery signals, mitigating the rendezvous mismatch problem. In some aspects, it may provide a discovery retransmission mechanism with random back-off so that terminal devices are less likely to transmit on the same discovery resources, reducing the interference problem. In some aspects, it may provide a finite number of discovery signal retransmissions, mitigating the proximity uncertainty problem.

According to various aspects, a discovery procedure that is not dependent on the coordination by an entity outside of the discovery process is provided. Such a discovery procedure may be implemented in a long range out-of-cellular-coverage network operating in a half-duplex regime.

According to various aspects, all interactions in a D2D communication network, including e.g., synchronization, discovery, and communication) occur at specific times in each frame. For example, the time alignment of all the terminal devices with each frame may be realized by the synchronization process described herein with respect to FIGS. 52A-C. For example, each frame may be organized according to the frame format described herein with respect to FIG. 58.

According to various aspects, the discovery resources may occur in a predefined position of a frame, wherein each frame occurs continuously one after the other, which means that the discovery resources occur periodically. FIG. 62 shows an exemplary frame sequence 6200 according to some aspects. As shown in FIG. 62, each frame 6202 may include dedicated discovery resources 6204 which may be radio resources (e.g., time, frequency, or time and frequency) allocated to the discovery procedure that occurs in the same position of each frame.

Figure 63:
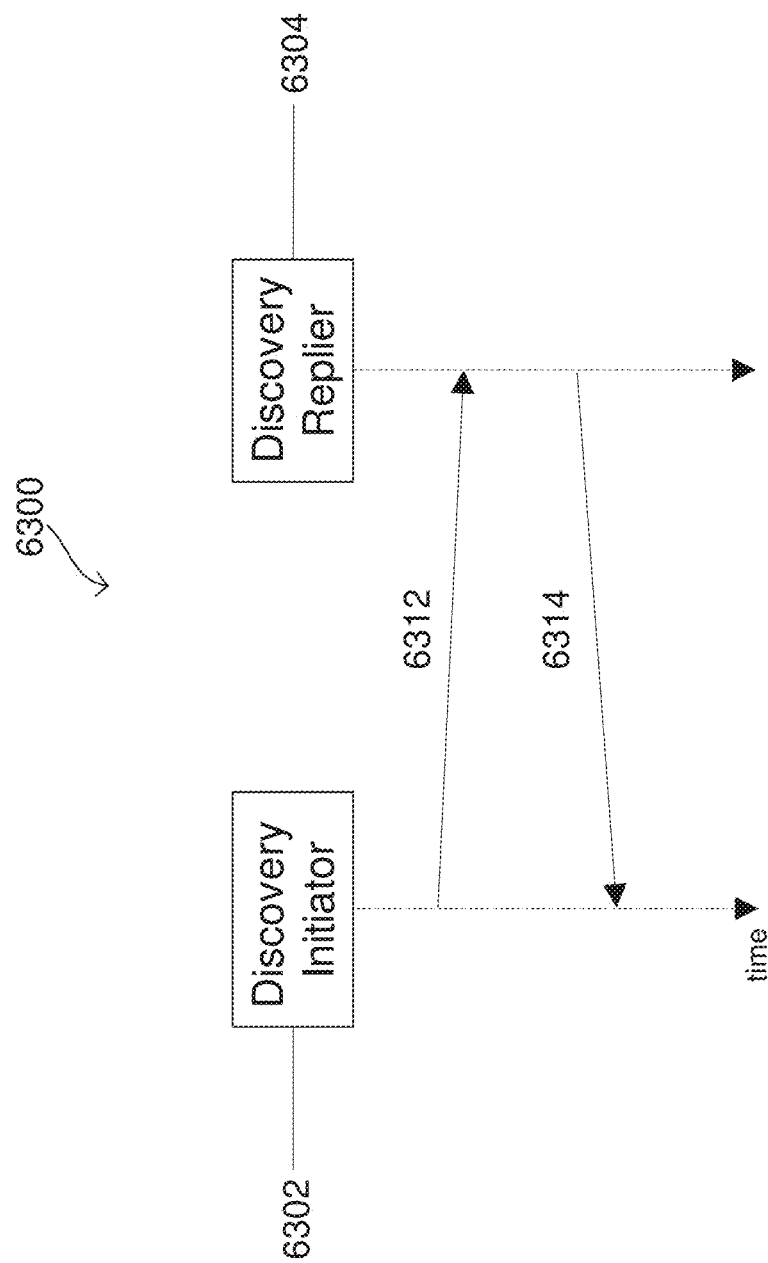
FIG. 63 shows an exemplary discovery procedure according to some aspects.

FIG. 63 shows exemplary discovery procedure 6300 according to some aspects. As shown in FIG. 63, the discovery procedure 6300 includes the transmission and receipt of two sequential discovery signals. A terminal device that wants to find other terminal devices may initiate the discovery procedure 6300 and may be known as a discovery initiator (DI) 6302. A discovery initiator (DI) 6302 may first transmit a discovery request message (MSG1) 6312 to be received by another terminal device. A terminal device that is monitoring for discovery request messages 6312 may be known as a discovery replier (DR) 6304. A discovery replier 6304 may receive the discovery request message 6312 and in response transmit a discovery reply message (MSG2) 6314 to be received by the discovery initiator 6302. The discovery initiator 6302 and discovery replier 6304 may be two terminal devices that are nearby each other. The discovery initiator 6302 and discovery replier 6304 may each be a terminal device that is the same as or similar to terminal device 4502-*n*. The discovery request message 6312 may include information indicating where the payload (e.g., communication data) corresponding to the discovery request should be sent (e.g., information regarding radio resources and radio channel of the discovery initiator). The discovery reply message 6314 may include information indicating where the payload corresponding to the discovery reply should be sent (e.g., information regarding radio resources and radio channel of the discovery replier).

FIGS. 64A-B show exemplary allocation of discovery resources for discovery messages according to some aspects. Referring to FIG. 64A, discovery request messages 6312 and discovery reply messages 6314 may share the same dedicated discovery resources 6204. For example, the discovery initiator 6302 and discovery replier 6304 may use the dedicated discovery resources 6204 alternately over time in an opportunistic manner to transmit their respective discovery messages. For example, any terminal device (which may include discovery initiators 6302 and discovery repliers 6304) can attempt to use the available resources which are common resources, but due to the uncoordinated nature of the D2D network, there is no guarantee that another terminal device will not use the same resources. Accordingly, terminal devices may use interference sensing to determine if a resource is being used and if it is used it may attempt again after some resource access backoff period to avoid collisions and/or interference. The resource access backoff period may be fixed, randomized, or exponential.

As shown in FIG. 64A, a discovery initiator 6302 may transmit a discovery request message 6312 on dedicated discovery resources 6204 of an earlier frame (e.g., frame N−1) of a sequence of frames 6200 and a discovery replier 6304 may transmit a discovery reply message 6314 on the same dedicated discovery resources 6204 of a later frame in the sequence of frames (e.g., frame N). Alternatively, referring to FIG. 64B, only discovery request messages 6312 may be transmitted on the dedicated discovery resources 6204 of a frame. The discovery reply messages 6314 may be transmitted on other resources of the frame.

In the allocation of discovery resources according to FIG. 64A, the discovery procedure 6300 may be fully contained in the dedicated discovery resources 6204. In the allocation of discovery resources according to FIG. 64B, the amount of dedicated discovery resources 6204 available for discovery request messages 6312 increases at the cost of utilizing other frame resources for discovery reply messages 6314.

Within a discovery session, a terminal device initiating a discovery request may become the discovery initiator 6302 and a terminal device replying to the discovery request may become the discovery replier 6304. Active terminal devices may become either a discovery initiator 6302 or a discovery replier 6304 during the occurrence of the discovery resources 6204 depending on the state of the terminal device. For example, whenever a discovery resource occurs in a frame (as depicted in the FIGS. 62 and 64A-B), a terminal device is either a DI (transmitting MSG1 or listening for MSG2) or a DR (listening for MSG1 or transmitting MSG2).

In a typical discovery session, two use cases may be considered. A first use case involves a one-to-one discovery. A second use case involves a one-to-many discovery. The discovery procedure 6300 may be used in both of these use cases. In the one-to-many use case, the discovery initiator 6302 may have to cope with potential collisions caused by multiple discovery reply messages 6314 transmitted in response to a discovery request message 6312.

For example, FIG. 63 shows an exemplary one-to-one discovery according to some aspects. Referring to FIG. 63, a discovery initiator 6302 seeks to discover a particular discovery replier 6304. A discovery initiator 6302 transmits a discovery request message 6312 that may include information identifying itself and the particular terminal device that it is trying to seek so that only the particular terminal device may respond with a discovery request message to the particular request. Any other terminal device receiving such a dedicated discovery request message may ignore it.

Figure 65:
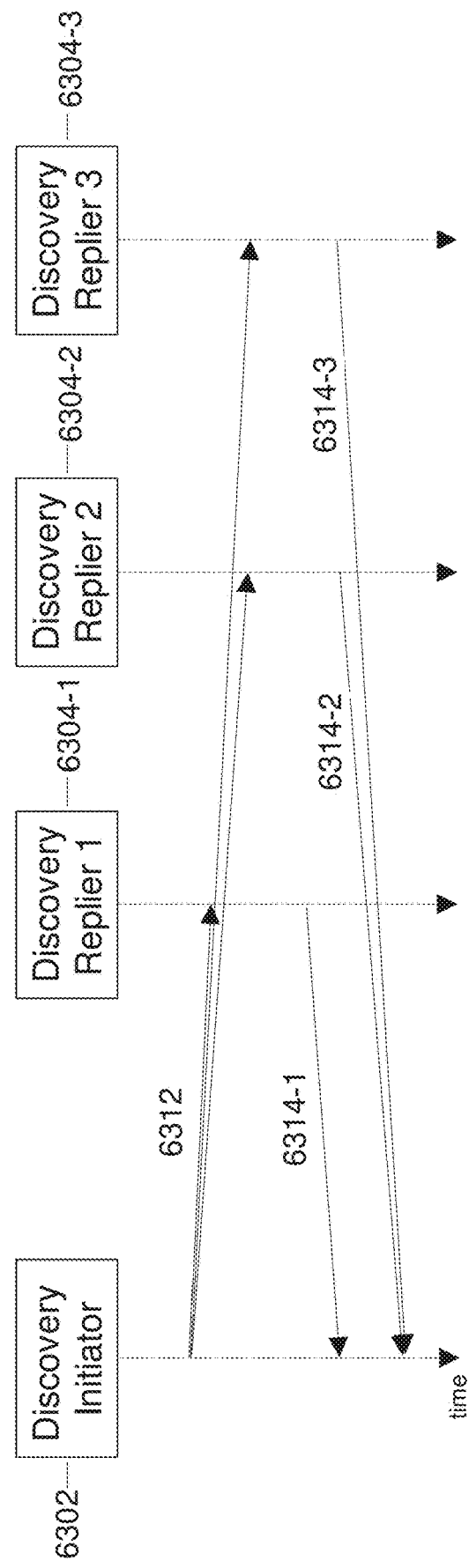
FIG. 65 shows an exemplary discovery procedure in a one-to-many use case according to some aspects.

A second use case involves a one-to-many discovery. FIG. 65 shows exemplary discovery procedure 6300 in a one-to-many use case according to some aspects. Referring to FIG. 65, a discovery initiator 6302 seeks to discover any nearby discovery replier. The discovery initiator 6302 transmits a discovery request message 6312 that is received by discovery repliers 6304-1, 6304-2, and 6304-3. The discovery request message 6312 may include information about the identity of the discovery initiator 6302. Upon receipt of a discovery request message 6312, discovery repliers 6304-1, 6304-2, and 6304-3 respectively transmit a discovery reply message 6314-1, 6314-2, and 6314-3. As shown in FIG. 65, a discovery initiator may receive discovery reply messages 6314-2 and 6314-3 concurrently because multiple discovery repliers may reply simultaneously.

The discovery messages may be used to allocate radio resources for subsequent messages, including radio resources for additional discovery messages or communication messages. A discovery request message 6312 may include a number of reserved bits that are used to indicate the identity of the discovery initiator 6302. In some aspects, the reserved bits may also be used to indicate in which radio resources the discovery initiator 6302 will listen for either a discovery reply message 6314 or subsequent communication messages. Similarly, a discovery reply message 6314 may include a number of reserved bits that are used to indicate the identity of the discovery replier 6304. In some aspects, the reserved bits may also be used to indicate in which radio resources the discovery replier 6304 will listen for subsequent communication messages. In some aspects, the identity information indicated in the discovery messages may be in the form of a hash. In some aspects, the discovery request message 6312 may include information about a particular terminal device being sought.

The stochastic nature of the wireless channel when coupled together with the uncoordinated behavior of a D2D communication network, may lead to the unreliable reception of the discovery messages. To cope with this, some aspects may incorporate a retransmission process into the discovery procedure, which allows for a finite amount of discovery request message retransmissions Nfrx to take place.

Figure 66:
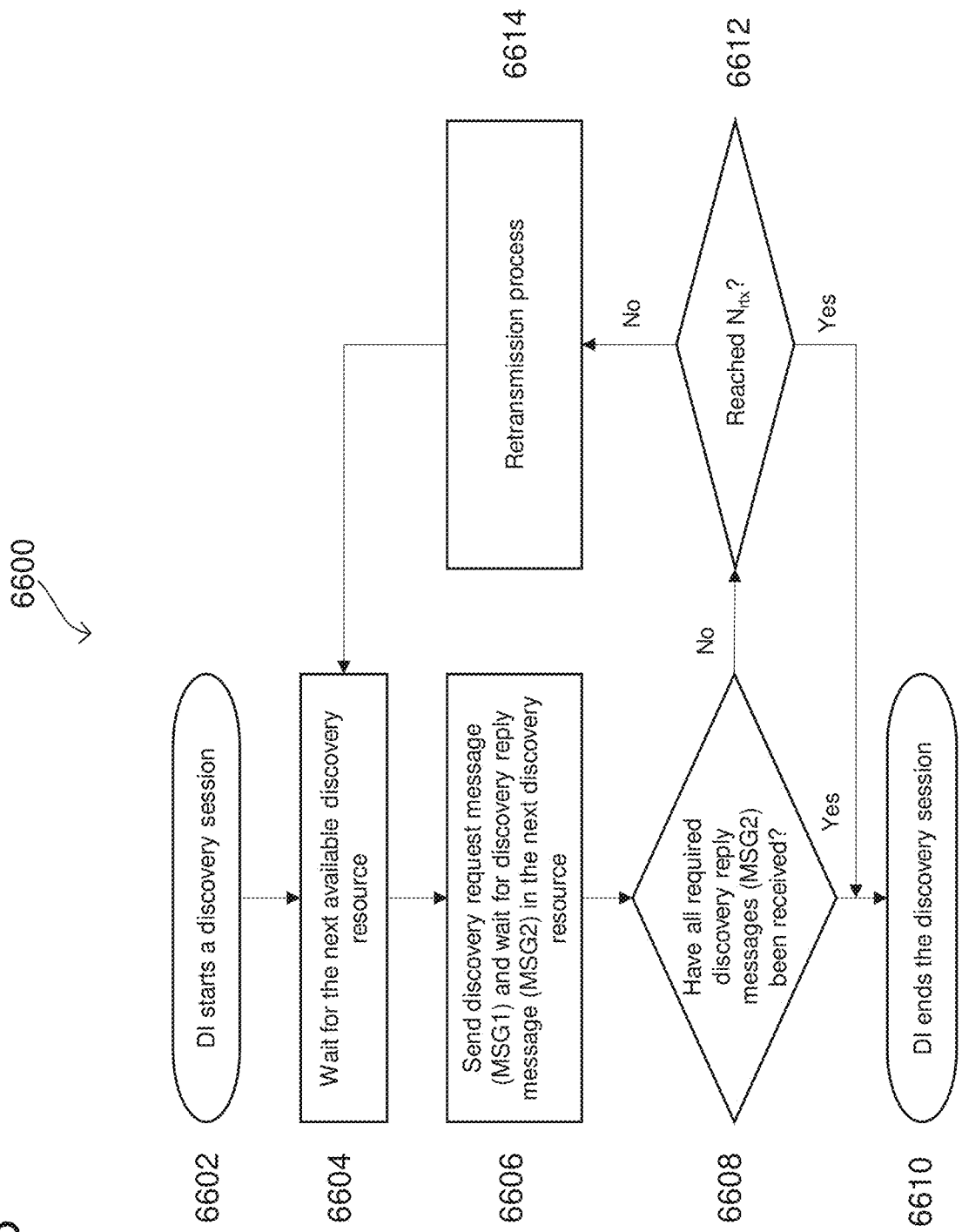
FIG. 66 shows an exemplary state machine of a discovery initiator including a retransmission process according to some aspects.

FIG. 66 shows an exemplary state machine 6600 of a discovery initiator including a retransmission process according to some aspects. In 6602, a discovery initiator 6302 starts a discovery session. In 6604, the discovery initiator 6302 waits for the next available discovery resource. For example, the discovery initiator 6302 may use any well-known interference sensing technique to determine whether discovery resources 6204 of a frame 6202 is available. If discovery resources 6204 are not available, the discovery initiator 6302 may check for availability in the next frame or it may wait and check a later frame. In 6606, the discovery initiator 6302 has access to discovery resources 6204 and sends one or more discovery request messages 6312 and monitors discovery resources 6204 on the common channel or on a selected dedicated channel for discovery reply messages 6314. In 6608, the discovery initiator 6302 waits for replies to outstanding discovery request messages 6312. In 6610, the discovery initiator 6302 may have received all expected discovery reply messages 6314 and may end the discovery session. For example, the number of expected discovery reply messages 6614 may be specified by a higher level software application layer in the discovery initiator 6602. Other ways that the discovery initiator 6602 would be able to know the number of expected discovery reply messages 3614 would be for example based on: a list of friends (which would provide an upper bound on the number of expected replies) or estimation of the number of terminal devices (DRs) in the surrounding area. In 6612, if after waiting for some time and the discovery initiator 6302 has not received all expected discovery reply messages 6314, the discovery initiator 6302 determines if a maximum number of retransmission attempts, Mix, has been reached. If it has been reached, the discovery initiator 6302 ends the discovery session. If it has not been reached, in 6614, the discovery initiator 6302 retransmits the discovery request message 6312 and waits for replies again.

Figure 67:
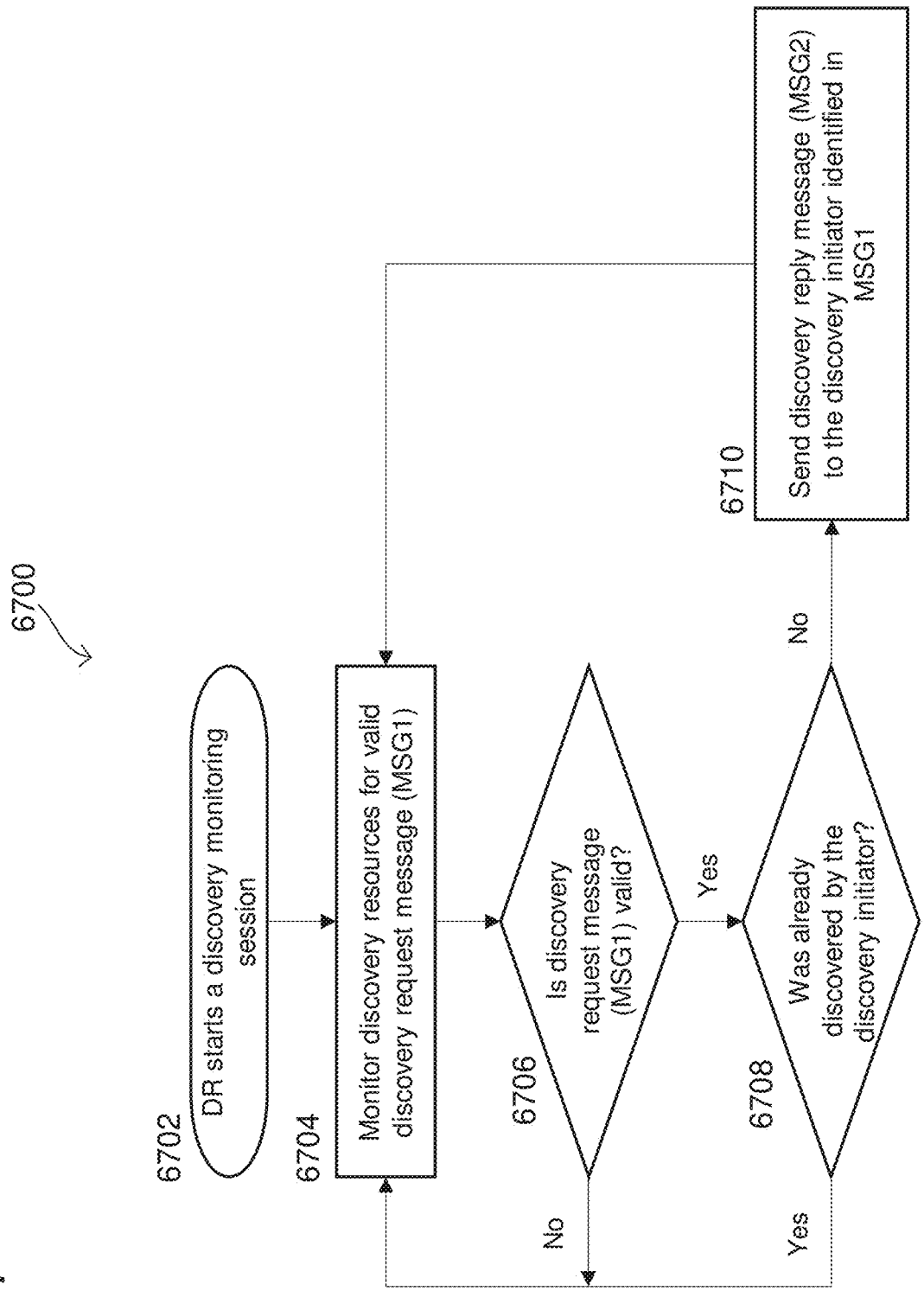
FIG. 67 shows an exemplary state machine of a discovery replier according to some aspects.

FIG. 67 shows an exemplary state machine 6700 of a discovery replier according to some aspects. In 6702, a discovery replier 6304 starts a discovery monitoring session. In 6704, the discovery replier 6304 monitors discovery resources 6204 for any valid discovery request messages 6312. For example, the discovery replier 6304 may use any well-known interference sensing techniques to determine whether the content of discovery resources 6204 of a frame 6202 is corrupted. In 6706, if the discovery request message 6312 is not valid, it continues to wait. In 6908, if the discovery request message 6312 is valid, the discovery replier 6304 may determine if it has already been discovered by the discovery initiator 6302. For example, this may be determined implicitly. A discovery replier DR 6304 may receive from the same discovery initiator DI 6302 multiple discovery request messages MSG1 6312 due to the retransmissions or echoes. When the discovery replier DR 6304 is able to decode a discovery request message MSG1 6312, it replies with a discovery reply message MSG2 6314 to the discovery initiator DI 6302 identified in the discovery request message MSG1 6312. If the discovery initiator DI 6302 is able to decode the discovery reply message MSG2 6314 then most likely a data communication between the discovery initiator 6302 and the discovery replier 6304 will have taken place and the success of the discovery may be confirmed implicitly. A discovery replier 6304 may determine if it has already been discovered by the initiator 6302 if it has received any data from the discovery initiator 6302. Alternatively, a discovery initiator 6302 may send a confirmation message (MSG3) 6316 to a discovery replier 6304 that confirms that the discovery initiator DI 6302 received a discovery reply message MSG2 6314 from discovery replier DR 6304.

If the discovery replier 6304 has already been discovered and discovery replier 6304 continues monitoring for other discovery request messages 6312. In 6710, the discovery replier 6304 has not yet been discovered so the discovery replier 6304 transmits a discovery reply message 6314 to the discovery initiator 6302 based on the information received with the discovery request message 6312 and continues monitoring for other discovery request messages 6312.

The retransmission process may be implemented in various ways. In some aspects, the retransmission process may be probabilistic. For example, for each frame 6202 of a sequence of frames 6200, a discovery initiator 6302 may determine whether to transmit a discovery request message 6312 in the discovery resources 6204 of the respective frame 6202 by obtaining a uniform random variable and comparing it against a retransmission probability $p_r$ associated with the discovery initiator 6302. If the uniform random variable is larger than $p_r$ then the discover initiator 6302 transmits a discovery request message 6312 in the discovery resources 6204. In some aspects, the retransmission process may be randomized. For example, upon entering a retransmission process, a discovery initiator randomly selects a back-off period and has to wait until the back-off period expires before it can transmit a discovery request message. The duration of the random back-off period may be between zero and a maximum back-off period window $W_{max}$. The random back-off period may be drawn uniformly. For example:

$$D=[W_{max} \cdot U[0,1]] \quad \text{(Exp. 1)}$$

where U(0,1) is a random number drawn uniformly from the interval [0, 1], and D is the duration of the random back-off. In this manner, the likelihood of collisions can be effectively decreased because the number of terminal devices retransmitting at the same time is reduced. In some aspects, the retransmission process may be priority based. For example, each discovery initiator 6302 has or is assigned a priority level based on the user status (e.g., emergency, entertainment), user relationship (family, friends, and acquaintances), battery status, channel conditions, etc. The priority level may be determined and assigned at a higher layer, based on contact lists, telephone book entries, device identifications.

The priority level may be used to increase the retransmission probability assigned to a discovery initiator.

$N_{trx}$, $p_r$, and $W_{max}$ are system design parameters, which may be adapted over time based on the congestion conditions of the discovery resources observed by a discovery initiator.

Table 5 shows exemplary configuration parameters according to some aspects.

TABLE 5

| Parameter | Value/Comment |
|---|---|
| Deployment layout | Inner area where DI (Discovery Initiators) are uniformly deployed and outer area where DRs (Discovery Repliers) can also be deployed |
| Number of UEs | 100 DI per km², each with [1, 5, 10] associated DR (1600 DIs and [1600, 8000, 16000] DRs) |
| Carrier Frequency and BW | 910 MHz, 180 kHz |
| Deployment Type | Based on allowed Maximum Coupling Loss (163 dBallowed) |
| Propagation | UMi B1 O2O (D2D from 3GPP TR 36.843) with pathloss and shadowing |
| Access Scheme | TDD with channel reciprocity |
| Antennas | 2 Antennas with 8 dB total coupling loss and 3 dB diversity gain |
| Traffic Model | Bernoulli activation check based on access probability $p_A$ (computed based on the desired average number of new active DIs per 60 second interval, which we denote as λ) |
| Discovery Frame Structure | Type 1, as depicted in FIG. 64A. |
| Discovery Protocol | As described in FIG. 63, where the DIs are allowed to attempt discovery up to 8 times ($N_{rtx}$ = 8). |
| MSG (1) Tx power, resources | 30 dBm and 1 sub-carrier per discovery sub-frame |
| MSG (2) Tx power, resources | <=30 dBm with power control and 12 sub-carriers per discovery sub-frame |
| Retransmission process | Retransmission probability based with an non-adaptive $p_R$. |
| Transmission payload, duration, modulation, CRC, repetitions and type | 64 Bits payload, 32 ms, QPSK, 24 bits, 1 Phy Repetition, single tone 3.75 KHz, AWGN and EPA 1 |
| Noise Figure | 5 dB (−133 dBm noise floor) |

Figure 68A:
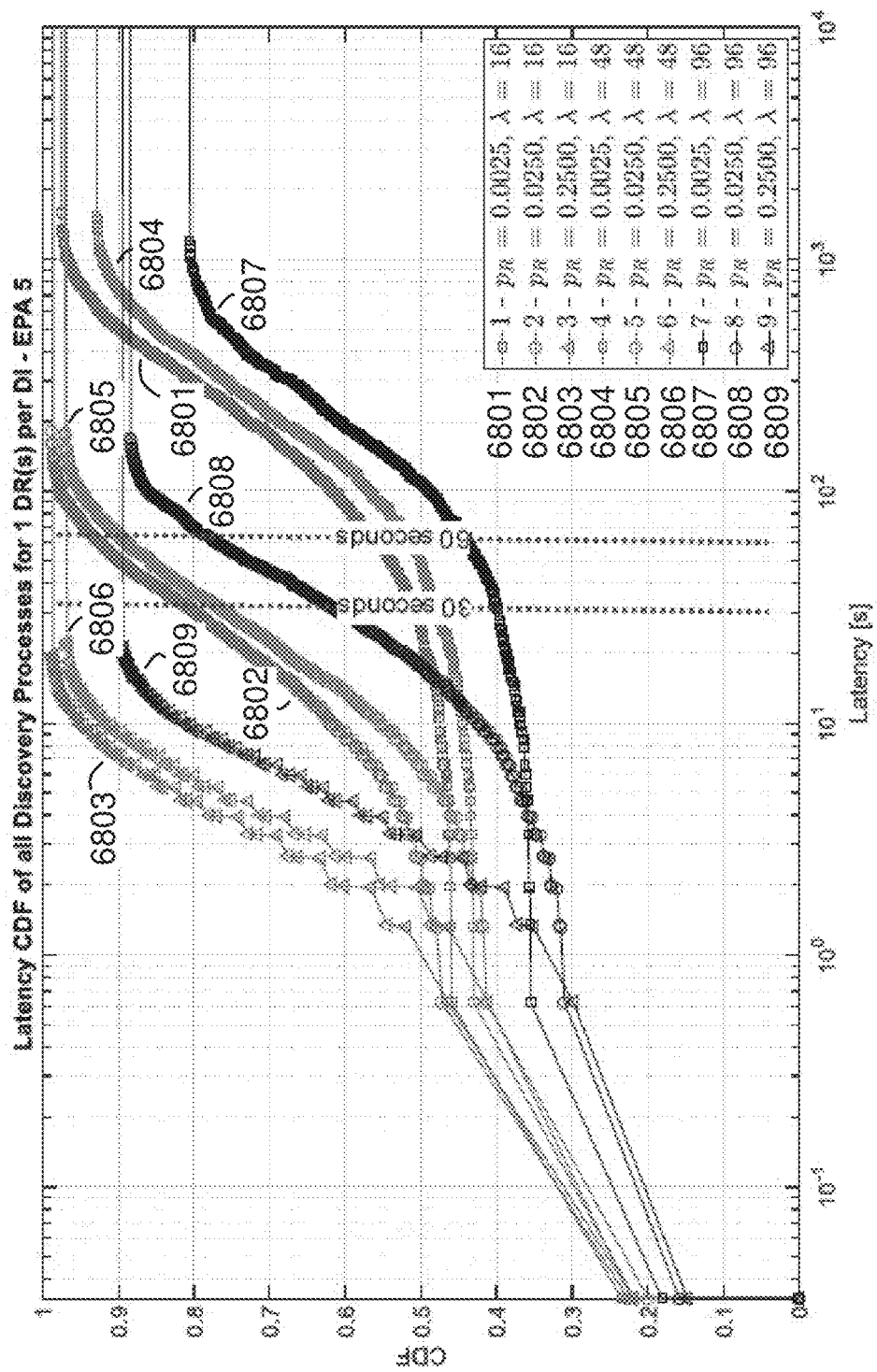
FIGS. 68A and 68B show CDFs of discovery procedure latencies according to some aspects.
Figure 68B:
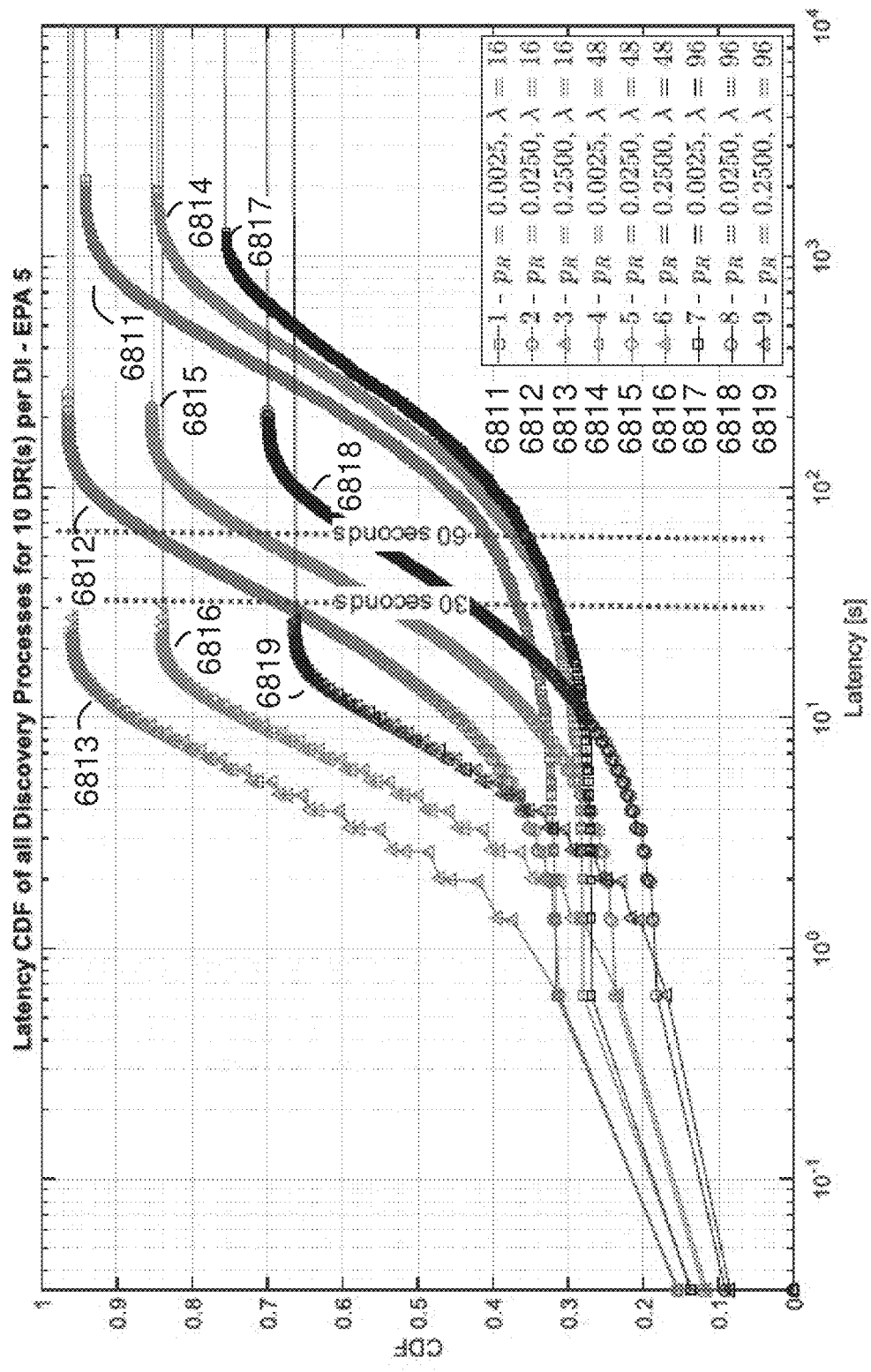

FIG. 68A show the CDF of the latency of individual discovery sessions where each DI has only one associated DR. FIG. 68B show the CDF of the latency of individual discovery sessions where each DI has ten associated DRs. The numerical results were obtained using a system level simulator developed to model the full discovery procedure and according to the parameters in Table 5. In FIG. 68A we depict the numerical results obtained for the 1-to-1 discovery use case. It can be observed that it is beneficial in terms of latency reduction to utilize a high retransmission probability. While in FIG. 68B we depict the numerical results obtained for the 1-to-many discovery use case, where the existence of a higher number of DRs leads to increase of interference due to collisions of discovery reply messages and subsequent increase in the discovery session latency.

In some aspects, DI 6302 and DR 6304 may use a specific message format when transmitting discovery request message 6312 and discovery reply message 6314. Many message formats use error checks such as Cyclic Redundancy Checks (CRCs) to help receiving devices confirm whether the message was successfully received (e.g., decoded) or not. Using CRC as an example, the transmitting device may first generate the payload for the message, and may then apply a CRC polynomial to the payload to generate a CRC. The transmitting device can then attach the CRC to the payload and transmit both the payload and CRC as the message. This CRC may be a check value that can be used by a receiving device to determine whether the message was successfully received. For instance, the receiving device may receive the message and separate the payload from the CRC. The receiving device can then attempt to decode received payload and apply the same CRC polynomial to generate CRC for the received payload. The receiving device can then compare this CRC to the received CRC: if the CRCs match, the receiving device can assume that the payload was received successfully; conversely, if the CRCs do not match, the receiving device can determine that the payload was not received successfully, and can request a retransmission from the transmitting device. Other check values may operate in a similar manner.

While check values like CRCs can help devices verify whether messages are successfully received, their inclusion adds to message size. Accordingly, in some aspects DI 6302 and DR 6304 may use a message format that combines the check value (e.g., the CRC) with other payload information in the message. As described below, DI 6302 and DR 6304 can use this for both the discovery request message 6312 and discovery reply message 6314 in one-to-one and one-to-many discovery.

Figure 69:
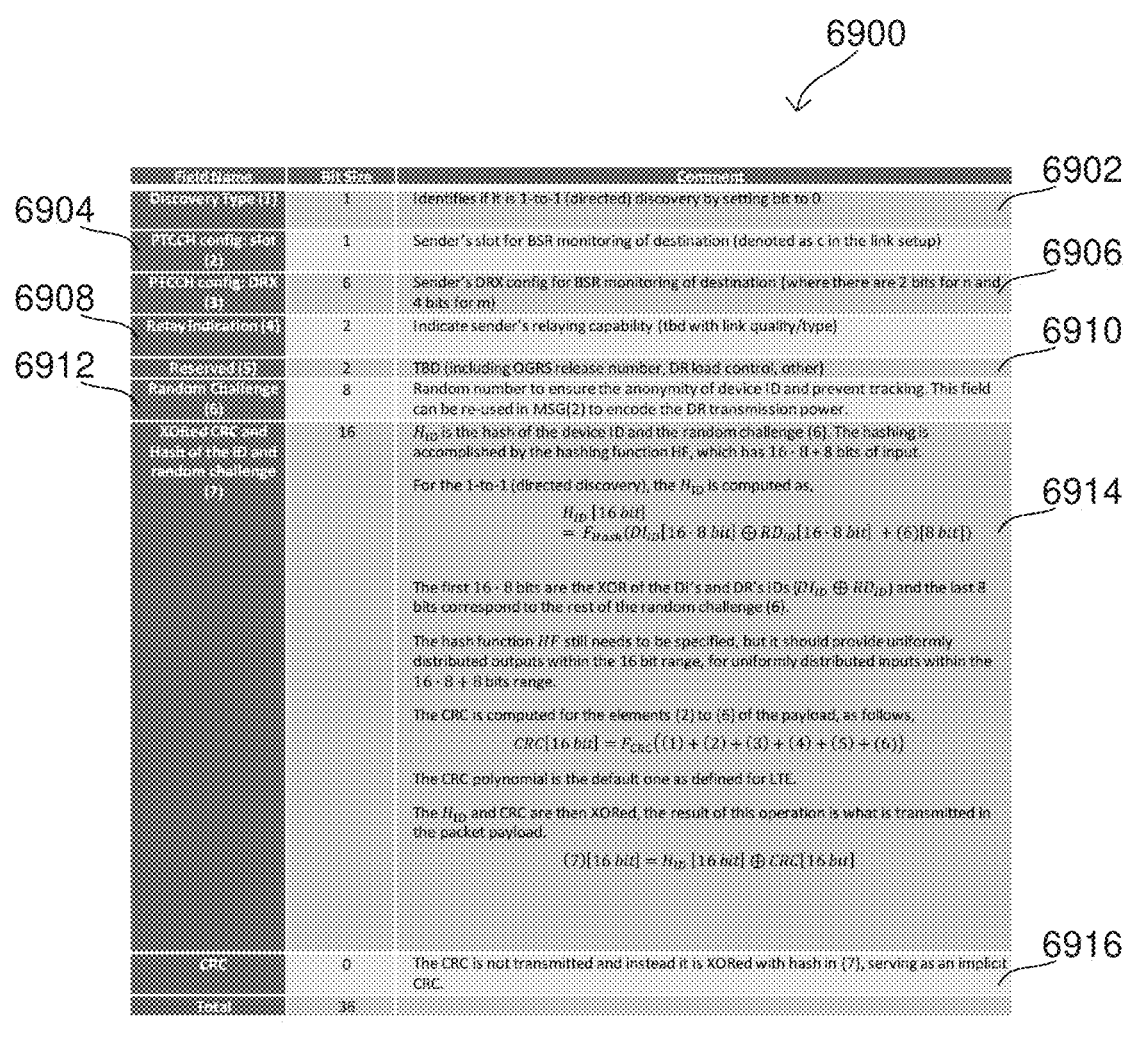

FIG. 69 shows exemplary discovery message 6900 according to some aspects. Discovery message 6900 can be a discovery request message or a discovery reply message, and can therefore be generated and transmitted by either DI 6302 or DR 6304. As indicated by field 6902 of discovery message 6900, discovery message 6900 is an example for one-to-one discovery (where one-to-many discovery is detailed for FIGS. 71 and 72). Fields 6904-6910 may include various other payload information, and are non-limiting examples that are included for exemplary purposes only.

As shown in FIG. 69, field 6912 may include a random challenge. This is a random number to ensure the anonymity of the device ID and to prevent tracking, and can be re-used for discovery reply messages to encode the DR transmission power.

Field 6914 can include a combined CRC and hashed device ID and random challenge. Field 6914 can therefore combine the CRC with other payload information. Accordingly, as indicated by field 6916, the CRC is transmitted in combination with other information in field 6914, and there is no field in discovery message 6900 that is uniquely allocated to the CRC.

In some aspects, field 6914 may combine the CRC with device IDs and the random challenge from field 6910. For example, field 6914 may be the XOR of the CRC and a hash value determined from the device IDs and the random challenge. In this example, the transmitting device (e.g., DI 6302 or DR 6304 depending on whether discovery message 6900 is a discovery request message or a discovery reply message) may identify the device IDs of the DI and the DR (according to one-to-one discovery): $DI_{ID}$ and $DR_{ID}$. The transmitting device may then XOR the device IDs $DI_{ID}$ and $DR_{ID}$ to obtain a first subset of bits (e.g., 16*8 bits). Then, the transmitting device may take the random challenge as a second subset of bits (e.g., 8 bits). The transmitting device may attach the first and second set of bits to obtain a set of bits, and may then apply a hash function $F_{Hash}$ to this set of bits to obtain hash bits HID. For instance, the hash function $F_{Hash}$ may provide uniformly distributed outputs within the 16 bit range for uniformly distributed inputs within the 16*8+8 bits range (which is the size of the set of bits).

The transmitting device may also compute the CRC for the payload. For example, the transmitting device may have a particular CRC polynomial, such as on denied in a wireless standard like LTE, which can be applied to payload bits to obtain a CRC. Accordingly, the transmitting device may compute the CRC with CRC polynomial $F_{CRC}$ as CRC=$F_{CRC}$((1)+(2)+(3)+(4)+(5)+(6)) (where (1)+(2)+(3)+(4)+(5)+(6) refer to the contents of fields 6902-6912). This CRC can be the same number of bits as the hash bits (e.g., 16 bits).

After obtaining the CRC and the hash bits, the transmitting device may combine the CRC and hash bits. For example, the transmitting device may XOR the CRC and has bits to obtain the combined CRC and hash bits. These combined CRC and hash bits therefore form the bits for field 6914 of message 6900.

FIG. 70 shows message generation example 7000 and message recovery example 7050 according to some aspects. Message generation example 7000 illustrates the procedure used by the transmitting device to generate discovery message 6900 (including generation of the combined CRC and hash bits for field 6914) while message generation example 7050 illustrates the procedure used by the receiving device to decode discovery message 6900.

With initial reference to message generation example 7000, the transmitting device may generate the hash bits HID by applying hash function $F_{Hash}$ to the first and second subsets of bits (XORed device IDs and attached random challenge), and may generate the CRC by applying CRC polynomial $F_{CRC}$ to the payload bits in the other entries. The transmitting device may then XOR the CRC and hash bits to obtain the bits for field 6914.

Message recovery example 7050 then shows how a receiving device can recover the CRC and device IDs when it receives discovery message 6900. As shown by the message recovery example 7050, the receiving device may revert the procedure used by the receiving device, and can recover the original bits.

Figure 71:
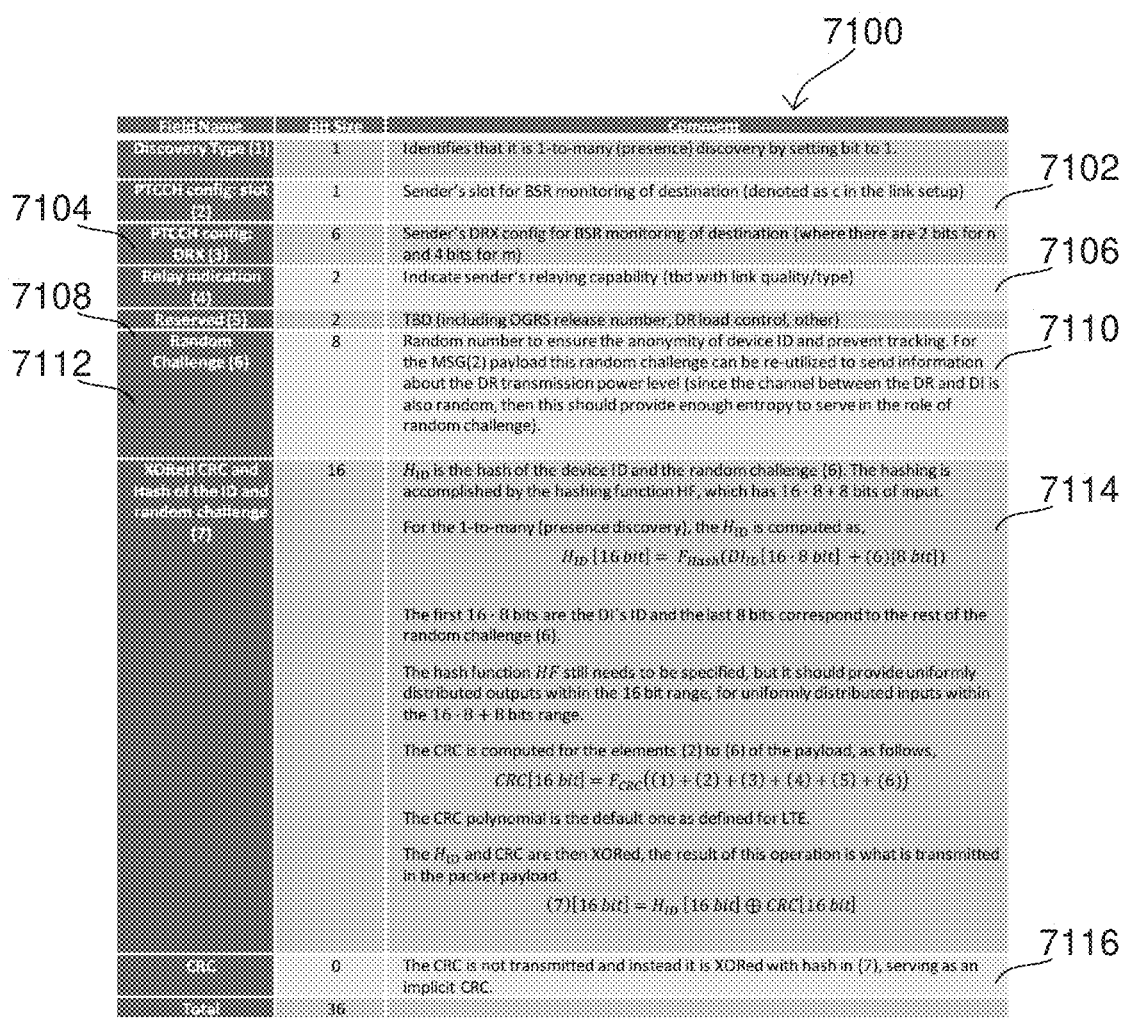
FIG. 71 shows a second exemplary discovery message according to some aspects.
Figure 72:
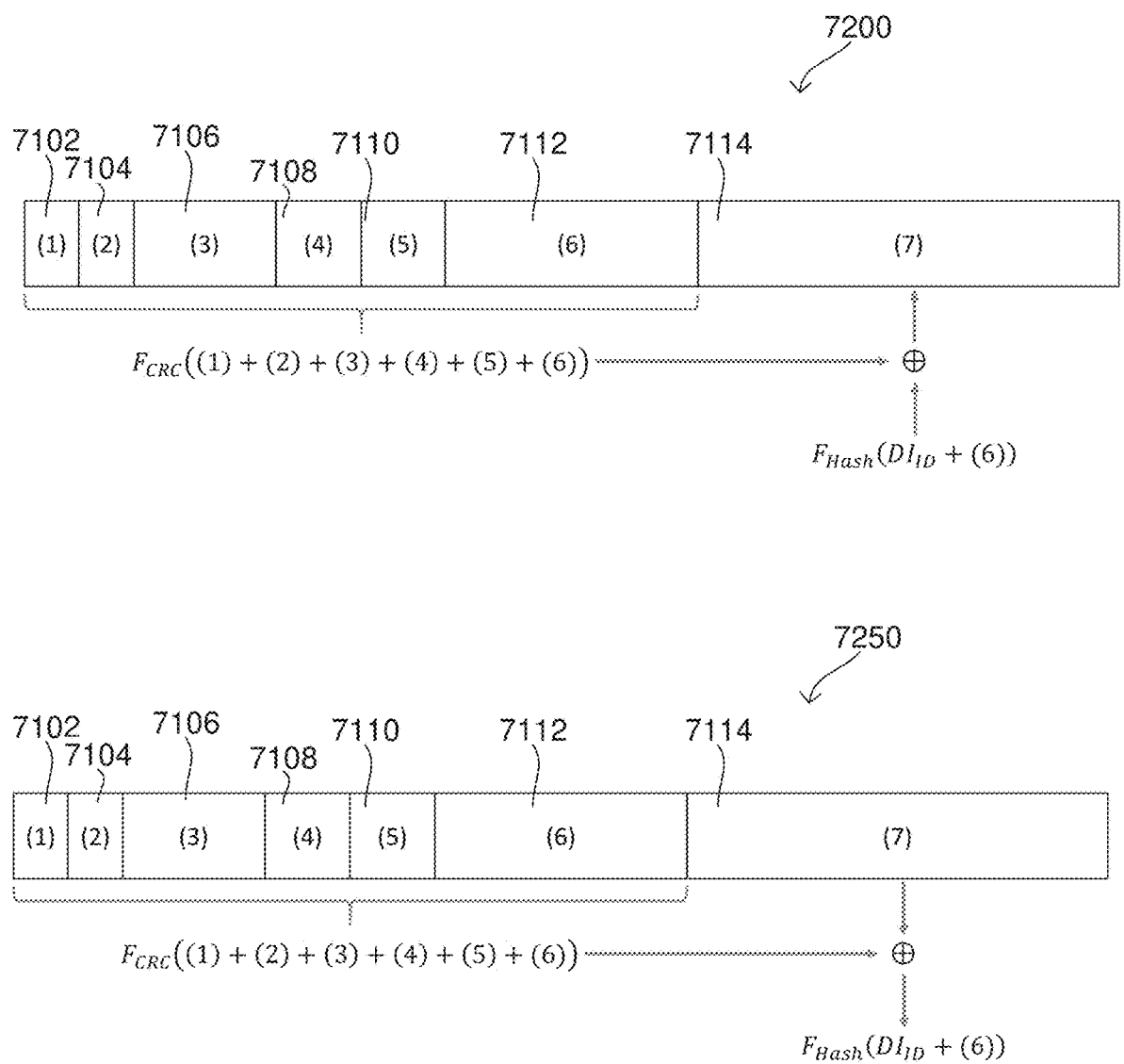
FIG. 72 shows a second exemplary message generation and recovery example according to some aspects.

FIGS. 71 and 72 show a similar example for one-to-many discovery according to some aspects. In particular, FIG. 71 shows exemplary discovery message 7100 while FIG. 72 shows message generation example 7200 and message recovery example 7250. As shown in FIGS. 71 and 72, the transmitting device may generate discovery message 7100 with a similar procedure as to the case of discovery message 6900. However, as this is for one-to-many, the transmitting device may only use the device ID of the transmitting device DID when generating the hash bits. As shown for field 7114 in FIG. 71, the transmitting device may take the device ID DID the first subset of bits and the random challenge as the second subset of bits. The transmitting device may then apply the hash function $F_{Hash}$ to the resulting set of bits to obtain the hash bits. Similar to the one-to-one case, the transmitting device may generate the CRC by applying the CRC polynomial to the other payload bits, and may then XOR the hash bits and the CRC to obtain the combined CRC and hash bits for field 7114.

The corresponding message generation procedure is shown in FIG. 72 for message generation example 7200, where the transmitting device may use entries 7102-7112 to generate the CRC to XOR with the hash bits obtained from the device ID and random challenge. As shown in message recovery example 7250, the receiving device may revert this procedure using the CRC polynomial and hash function to recover the original bits.

In some aspects, with reference to FIG. 2 terminal devices may execute this discovery functionality with transceiver 204, memory 214, and controller 210. Accordingly, memory 214 may store information about the predefined discovery resources slot information (e.g., which can be a fixed channel or part of a frequency hopping scheme where the discovery resources hop) and controller 210 may control transceiver to initiate discovery with other devices according to the predefined discovery resources slot information.

Figure 73:
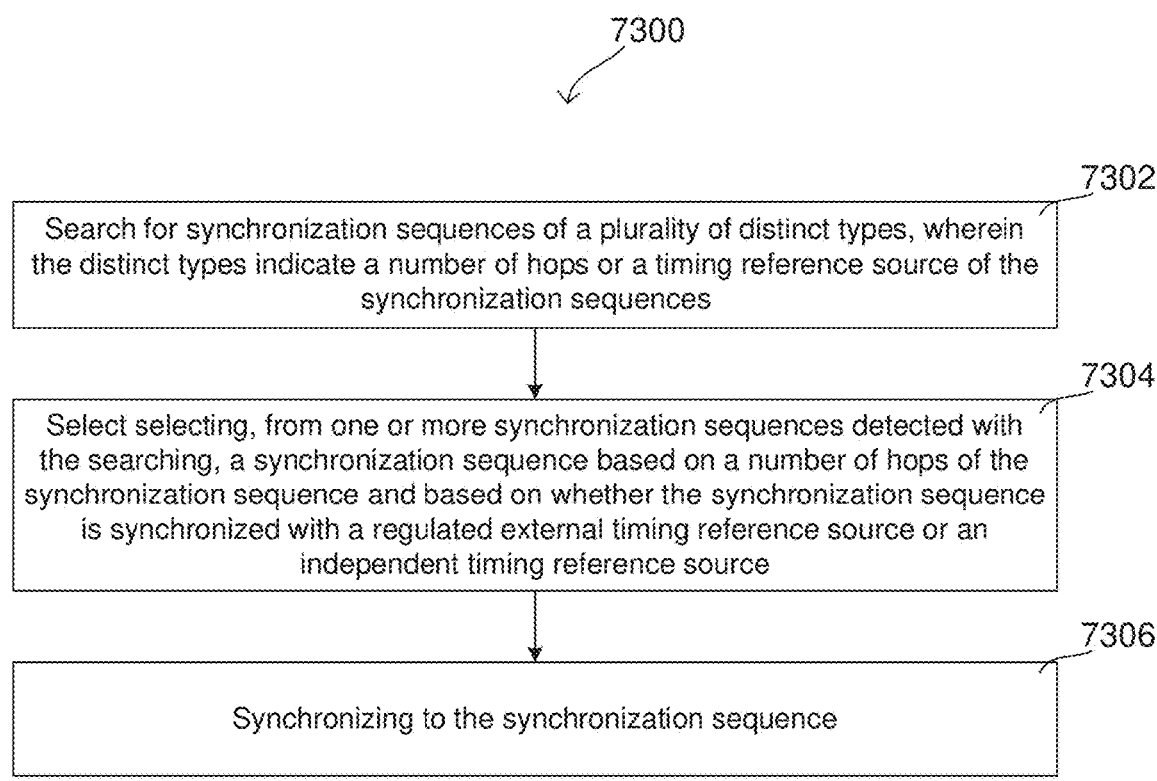
FIG. 73 shows an exemplary method operating a terminal device according to some aspects.

FIG. 73 shows exemplary method 7300 of operating a terminal device according to some aspects. As shown in FIG. 73, method 7300 includes searching for synchronization sequences of a plurality of distinct types (7302), wherein the distinct types indicate a number of hops or a timing reference source of the synchronization sequences, selecting, from one or more synchronization sequences detected with the searching, a synchronization sequence based on a number of hops of the synchronization sequence and based on whether the synchronization sequence is synchronized with a regulated external timing reference source or an independent timing reference source (7304), and synchronizing to the synchronization sequence (7306).

Figure 74:
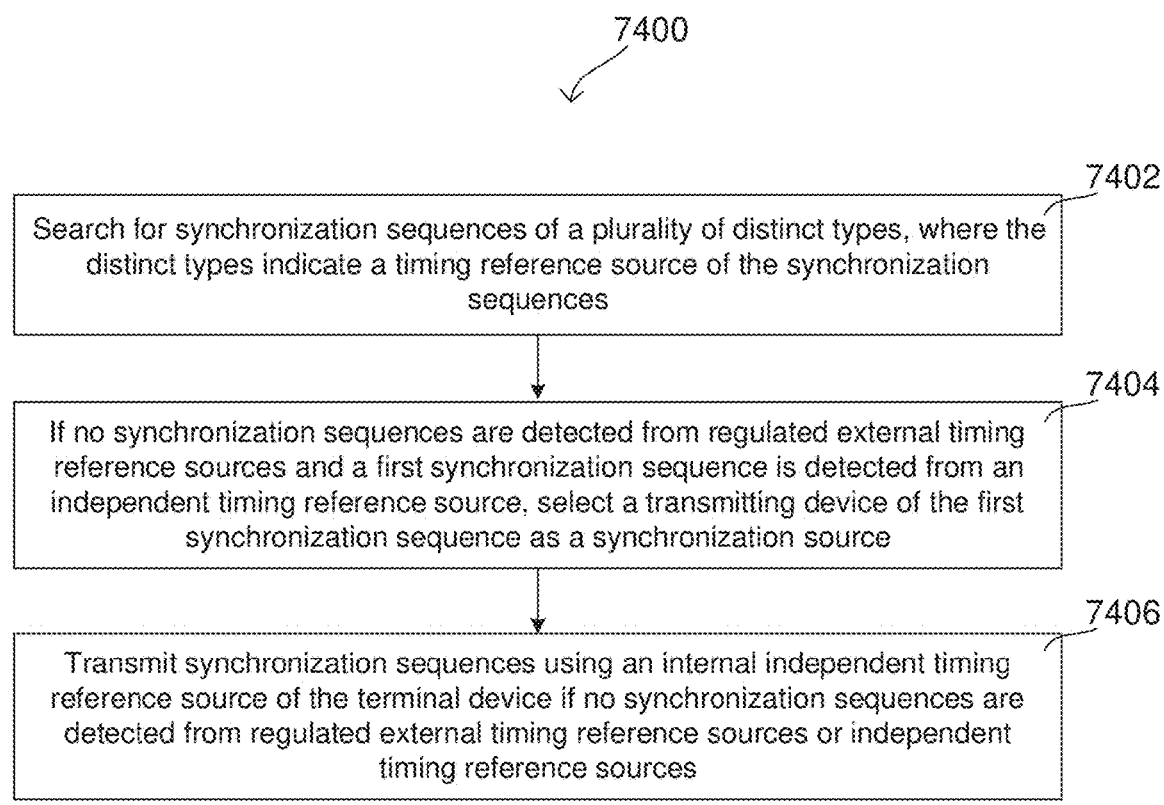
FIG. 74 shows an exemplary method operating a terminal device according to some aspects.

FIG. 74 shows exemplary method 7400 of operating a terminal device according to some aspects. As shown in FIG. 74, method 7400 includes searching for synchronization sequences of a plurality of distinct types (7402), where the distinct types indicate a timing reference source of the synchronization sequences, if no synchronization sequences are detected from regulated external timing reference sources and a first synchronization sequence is detected from an independent timing reference source, selecting a transmitting device of the first synchronization sequence as a synchronization source (7404), and transmitting synchronization sequences using an internal independent timing reference source of the terminal device if no synchronization sequences are detected from regulated external timing reference sources or independent timing reference sources (7406).

Figure 75:
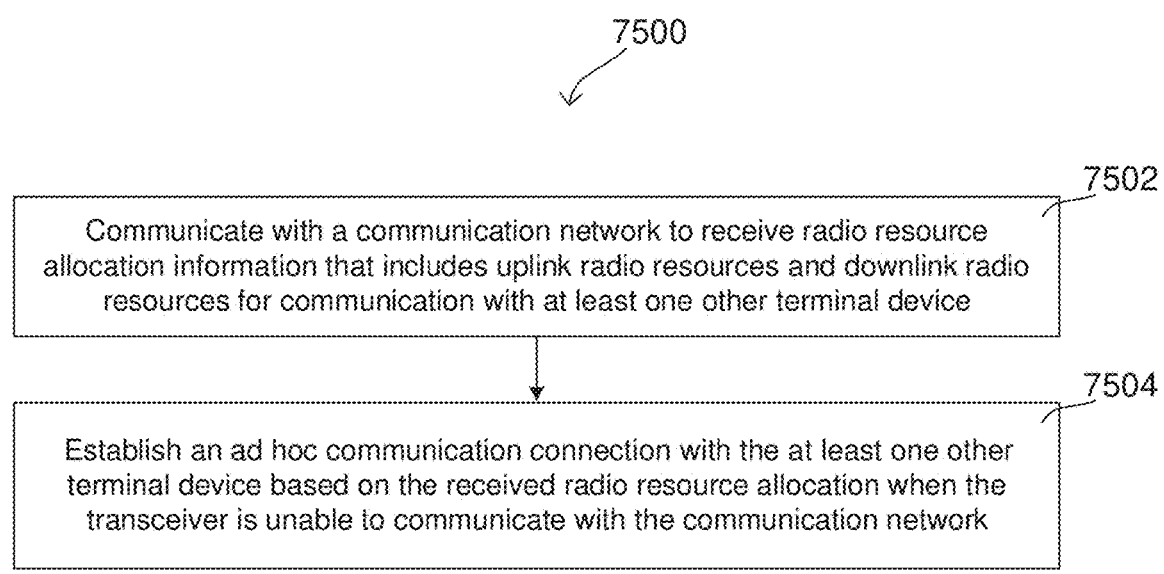
FIG. 75 shows an exemplary method operating a terminal device according to some aspects.

FIG. 75 shows exemplary method 7500 of operating a terminal device. As shown in FIG. 75, method 7500 includes communicating with a communication network to receive radio resource allocation information that includes uplink radio resources and downlink radio resources for communication with at least one other terminal device (7502), and establishing an ad hoc communication connection with the at least one other terminal device based on the received radio resource allocation when the transceiver is unable to communicate with the communication network (7504).

Figure 76:
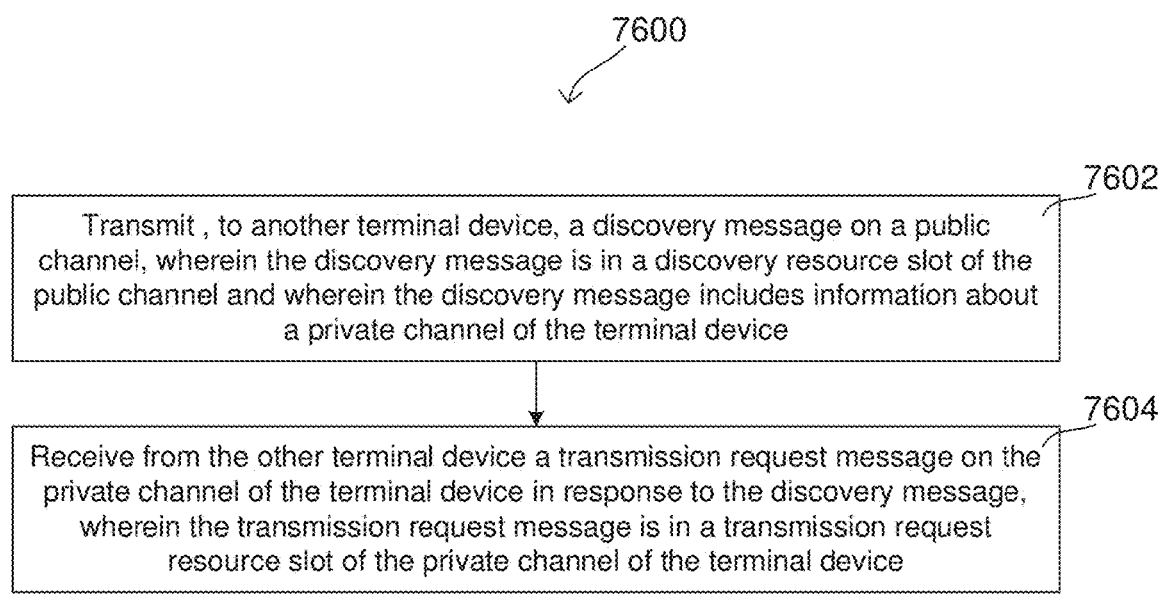
FIG. 76 shows an exemplary method operating a terminal device according to some aspects.

FIG. 76 shows exemplary method 7600 of operating a terminal device. As shown in FIG. 76, method 7600 includes transmitting, to another terminal device, a discovery message on a public channel (7602), wherein the discovery message is in a discovery resource slot of the public channel and wherein the discovery message includes information about a private channel of the terminal device, and receiving from the other terminal device a transmission request message on the private channel of the terminal device in response to the discovery message (7604), wherein the transmission request message is in a transmission request resource slot of the private channel of the terminal device.

Figure 77:
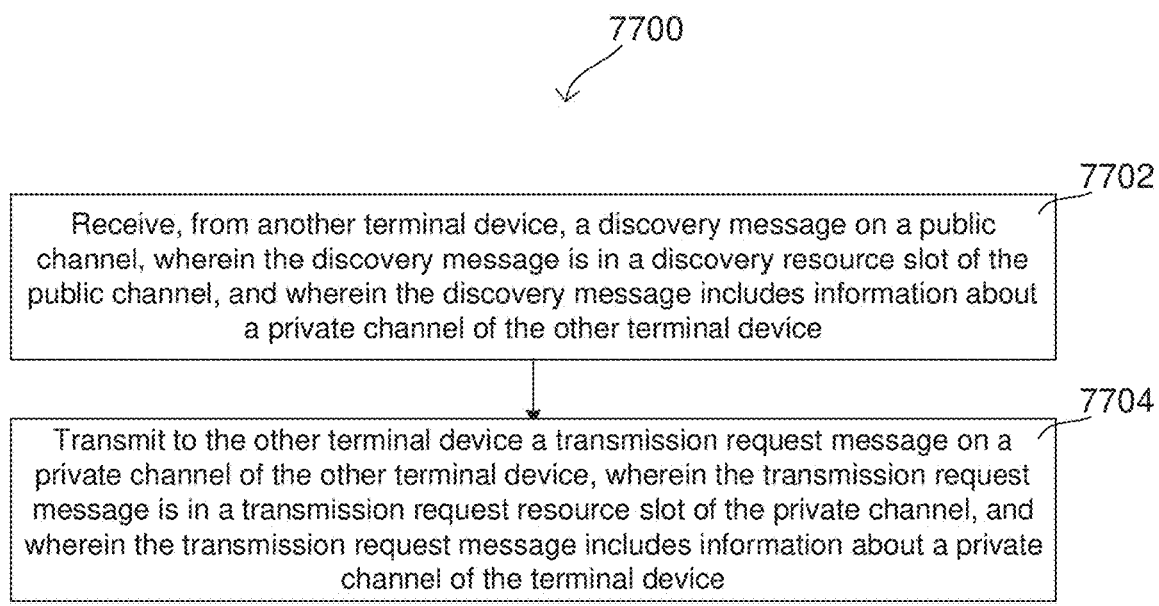
FIG. 77 shows an exemplary method operating a terminal device according to some aspects.

FIG. 77 shows exemplary method 7700 of operating a terminal device. As shown in FIG. 77, method 7700 includes receiving, from another terminal device, a discovery message on a public channel (7702), wherein the discovery message is in a discovery resource slot of the public channel, and wherein the discovery message includes information about a private channel of the other terminal device, and transmitting to the other terminal device a transmission request message on a private channel of the other terminal device (7704), wherein the transmission request message is in a transmission request resource slot of the private channel, and wherein the transmission request message includes information about a private channel of the terminal device.

Figure 78:
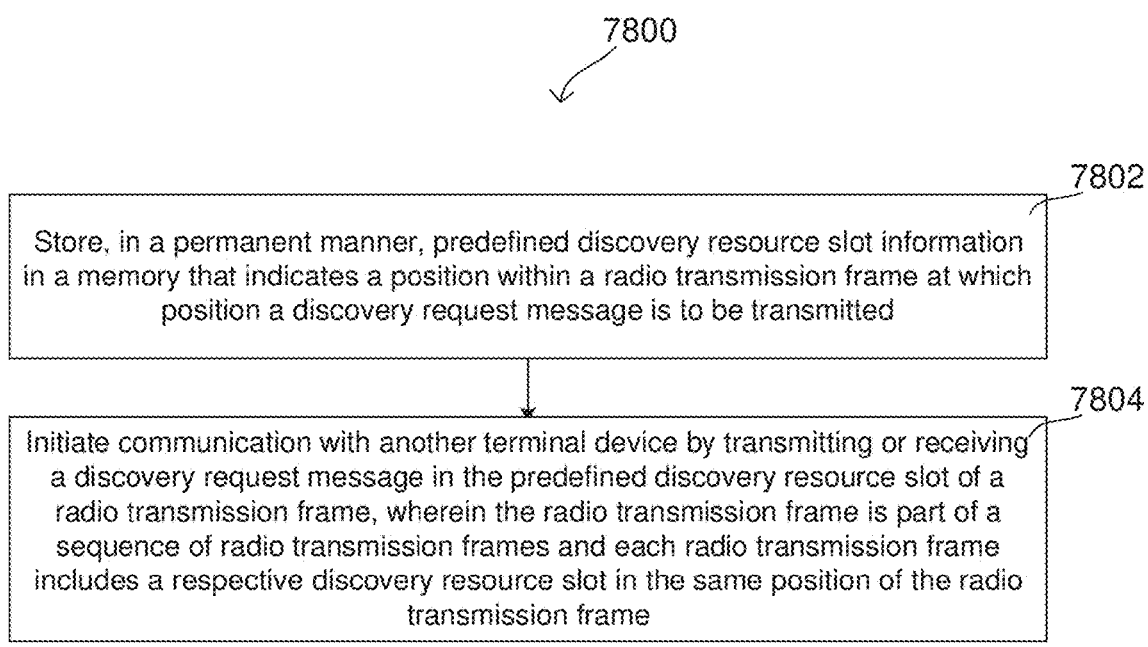
FIG. 78 shows an exemplary method operating a terminal device according to some aspects.

FIG. 78 shows exemplary method 7800 of operating a terminal device. As shown in FIG. 78, method 7800 includes storing, in a permanent manner, predefined discovery resource slot information in a memory that indicates a position within a radio transmission frame at which position a discovery request message is to be transmitted (7802), initiating communication with another terminal device by transmitting or receiving a discovery request message in the predefined discovery resource slot of a radio transmission frame (7804), wherein the radio transmission frame is part of a sequence of radio transmission frames and each radio transmission frame includes a respective discovery resource slot in the same position of the radio transmission frame.

CONCLUSION

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein can be implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

The following examples pertain to further aspects of this disclosure:

Example 1 is a terminal device including a controller configured to identify a data hopping sequence for a first superframe including a plurality of frames, and a transceiver configured to switch hopping frequencies over the plurality of frames according to a data hopping sequence that excludes one or more hopping frequencies scheduled for use by a synchronization hopping sequence in one or more superframes immediately succeeding the first superframe.

In Example 2, the subject matter of Example 1 can optionally include wherein the data hopping sequence excludes a first hopping frequency scheduled for use by the synchronization hopping sequence in the superframe, excludes a second hopping frequency scheduled for use by the synchronization hopping sequence in a second superframe that immediately succeeds the first superframe, and excludes a third hopping frequency scheduled for use by the synchronization hopping sequence in a third superframe that immediately succeeds the second superframe.

In Example 3, the subject matter of Example 1 or 2 can optionally include wherein the data hopping sequence excludes one or more hopping frequencies that were previously used by the data hopping sequence in one or more superframes immediately preceding the first superframe.

In Example 4, the subject matter of Example 1 or 2 can optionally include wherein the data hopping sequence further excludes a first set of hopping frequencies that were previously used by the data hopping sequence in a fourth superframe immediately preceding the first superframe.

In Example 5, the subject matter of Example 4 can optionally include wherein the data hopping sequence further excludes a second set of hopping frequencies that were previously used by the data hopping sequence in a fifth superframe immediately preceding the fourth superframe.

In Example 6, the subject matter of any one of Examples 1 to 5 can optionally further include a hop scheduler configured to obtain scheduling data for the data hopping sequence and to control the transceiver to switch hopping frequencies hop according to the data hopping sequence based on the scheduling data.

In Example 7, the subject matter of Example 6 can optionally include wherein the controller is configured to identify the data hopping sequence by identifying an index that identifies the data hopping sequence from a plurality of predefined data hopping sequences and to provide the index to the hop scheduler, wherein the hop scheduler is configured to obtain the scheduling data by retrieving scheduling data for the data hopping sequence from a sequence memory based on the index.

In Example 8, the subject matter of Example 7 can optionally further include the sequence memory configured to store scheduling data for the plurality of predefined data hopping sequences.

In Example 9, the subject matter of Example 6 can optionally include wherein the controller is configured to identify the data hopping sequence by identifying an index that identifies the data hopping sequence from a plurality of predefined data hopping sequences and to provide the index to the hop scheduler, and wherein the hop scheduler is configured to determine the scheduling data for the data hopping sequence based on the index.

In Example 10, the subject matter of any one of Examples 6 to 9 can optionally include wherein the scheduling data specifies the order and timing of hopping frequencies for the data hopping sequence.

In Example 11, the subject matter of any one of Examples 1 to 10 can optionally include wherein the transceiver is further configured to switch hopping frequencies over each of a plurality of superframes according to the synchronization hopping sequence.

In Example 12, the subject matter of Example 11 can optionally include wherein the data hopping sequence hops frequencies each frame and the synchronization hopping sequence hops frequencies each superframe.

In Example 13, the subject matter of any one of Examples 1 to 12 can optionally include wherein the controller is configured to identify the data hopping sequence based on a communication pairing between the terminal device and another terminal device.

Example 14 is a terminal device including a controller configured to identify a set of hopping frequencies, wherein the set of hopping frequencies are arranged according to a respective logical index associated with each of the set of hopping frequencies, and a transceiver configured to transmit and receive using a first subset of the set of hopping frequencies that have first logical indices within the set of hopping frequencies during a first superframe including a plurality of frames, and transmit and receive using a second subset of the set of hopping frequencies in a second superframe, wherein the second subset is a cyclically-shifted version of the first subset that is cyclically-shifted by one or more logical indices within the set of hopping frequencies.

In Example 15, the subject matter of Example 14 can optionally include wherein the first subset of the set of hopping frequencies are data hopping frequencies allocated for a data hopping sequence in the first superframe, and wherein the transceiver is configured to switch hopping frequencies in each frame of the superframe according to the data hopping sequence.

In Example 16, the subject matter of Example 14 or 15 can optionally include wherein the hopping frequencies of the first subset are each associated with a respective hopping index and are arranged in increasing order by hopping index, and wherein the transceiver is further configured to for each given frame of a plurality of frames in the first superframe, use a hopping frequency for a first data channel that has a hopping index that is higher than a hopping frequency used for the first data channel in a frame preceding the given frame, and use a hopping frequency for the second data channel that has a hopping index that is lower than a hopping frequency used for the second data channel in the frame preceding the given frame.

In Example 17, the subject matter of Example 14 or 15 can optionally include wherein the hopping frequencies of the first subset are each associated with a respective hopping index and are arranged in increasing order by hopping index, wherein the transceiver is further configured to for a first frame of a first plurality of frames in the first superframe, use a hopping frequency for a first data channel that has a hopping index that is higher than a hopping frequency used for the first data channel in the frame preceding the given frame, and use a hopping frequency for the second data channel that has a hopping index that is lower than a hopping frequency used for the second data channel in the frame preceding the given frame, and for each given frame remaining in the first plurality of frames, use a hopping frequency for the first data channel that has a hopping index that is higher than the hopping frequency used for the first data channel in the frame preceding the given frame and use a hopping frequency for the second data channel that has a hopping index that is lower than the hopping frequency used for the second data channel in the frame preceding the given frame.

In Example 18, the subject matter of Example 17 can optionally include wherein the transceiver is further configured to for a first frame in a second plurality of frames in the first superframe, use a hopping frequency for the first data channel that has a hopping index that is one index higher than the hopping frequency used for the first data channel in the first frame of the first plurality of frames, and use a hopping frequency for the second data channel that has a hopping index that is one index lower than the hopping frequency used for the second data channel in the first frame of the first plurality of frames.

In Example 19, the subject matter of Example 18 can optionally include wherein the transceiver is further configured to for each given frame remaining in the second plurality of frames, use a hopping frequency for the first data channel that has a hopping index that is higher than the hopping frequency used for the first data channel in the frame preceding the given frame and use a hopping frequency for the second data channel that has a hopping index that is lower than the hopping frequency used for the second data channel in the frame preceding the given frame.

In Example 20, the subject matter of any one of Examples 14 to 19 can optionally include wherein a third subset of the set of hopping frequencies is allocated for a synchronization hopping sequence in the first superframe and a fourth subset of the set of hopping frequencies is allocated for the synchronization hopping sequence in the fourth superframe.

In Example 21, the subject matter of Example 20 can optionally include wherein the fourth subset of the set of hopping frequencies is a cyclically-shifted version of the third subset that is cyclically shifted by the same number of logical indices as the first subset and the second subset.

In Example 22, the subject matter of any one of Examples 14 to 21 can optionally include wherein a fifth subset of the set of hopping frequencies is allocated for a discovery hopping sequence in the first superframe and a sixth subset of the set of hopping frequencies is allocated for the discovery hopping sequence in the fourth superframe.

In Example 23, the subject matter of Example 22 can optionally include wherein the sixth subset of the set of hopping frequencies is a cyclically-shifted version of the fifth subset that is cyclically shifted by the same number of logical indices as the first subset and the second subset.

In Example 24, the subject matter of any one of Examples 14 to 23 can optionally further include a hop scheduler configured to obtain scheduling data that defines a data hopping sequence for the first subset of the set of hopping frequencies in the first superframe, and configured to control the transceiver to transmit and receive on hopping frequencies according to the data hopping sequence during the first superframe.

In Example 25, the subject matter of Example 24 can optionally include wherein the controller is configured to identify the data hopping sequence by identifying an index that identifies the data hopping sequence from a plurality of predefined data hopping sequences and to provide the index to the hop scheduler, wherein the hop scheduler is configured to obtain the scheduling data by retrieving scheduling data for the data hopping sequence from a sequence memory based on the index.

In Example 26, the subject matter of Example 25 can optionally further include the sequence memory configured to store scheduling data for the plurality of predefined data hopping sequences.

In Example 27, the subject matter of Example 24 can optionally include wherein the controller is configured to identify the data hopping sequence by identifying an index that identifies the data hopping sequence from a plurality of predefined data hopping sequences and to provide the index to the hop scheduler, and wherein the hop scheduler is configured to determine the scheduling data for the data hopping sequence based on the index.

In Example 28, the subject matter of any one of Examples 24 to 27 can optionally include wherein the scheduling data specifies the order and timing of hopping frequencies for the data hopping sequence.

In Example 29, the subject matter of any one of Examples 14 to 28 can optionally include wherein the logical index associated with each of the set of hopping frequencies refers to a hopping frequency positioned at a corresponding location within a randomly-generated root hopping sequence of hopping frequencies.

Example 30 is a terminal device including a controller configured to identify a set of hopping frequencies for a superframe that are each associated with a respective hopping index and are arranged in increasing order by hopping index, a transceiver configured to for a first frame of a plurality of frames in the superframe, use a first hopping frequency of the set of hopping frequencies to transmit or receive for a first data channel and use a second hopping frequency of the set of hopping frequencies to transmit and receive for a second data channel, and for each given frame remaining in the plurality of frames, use a hopping frequency for the first data channel that has a hopping index that is higher than the hopping frequency used for the first data channel in the frame preceding the given frame and use a hopping frequency for the second data channel that has a hopping index that is lower than the hopping frequency used for the second data channel in the frame preceding the given frame.

In Example 31, the subject matter of Example 30 can optionally include wherein the transceiver is further configured to for a first frame in a second plurality of frames in the superframe, use a hopping frequency for the first data channel that has a hopping index that is one index higher than the hopping frequency used for the first data channel in the first frame of the first plurality of frames, and use a hopping frequency for the second data channel that has a hopping index that is one lower than the hopping frequency used for the second data channel in the first frame of the first plurality of frames.

In Example 32, the subject matter of Example 31 can optionally include wherein the transceiver is further configured to for each given frame remaining in the second plurality of frames, use a hopping frequency for the first data channel that has a hopping index that is higher than the hopping frequency used for the first data channel in the frame preceding the given frame and use a hopping frequency for the second data channel that has a hopping index that is lower than the hopping frequency used for the second data channel in the frame preceding the given frame.

In Example 33, the subject matter of any one of Examples 30 to 32 can optionally include wherein the respective hopping indices associated with the set of hopping frequencies are cyclically shifted by one or more hopping indices for a second superframe, wherein the transceiver is configured is configured to for a first frame of a plurality of frames in the second superframe, use a first hopping frequency of the set of hopping frequencies to transmit or receive for a first data channel and use a second hopping frequency of the set of hopping frequencies to transmit and receive for a second data channel, and for each given frame remaining in the plurality of frames, use a hopping frequency for the first data channel that has a hopping index that is higher than the hopping frequency used for the first data channel in the frame preceding the given frame and use a hopping frequency for the second data channel that has a hopping index that is lower than the hopping frequency used for the second data channel in the frame preceding the given frame.

In Example 34, the subject matter of any one of Examples 30 to 33 can optionally further include a hop scheduler configured to obtain scheduling data for a data hopping sequence that defines the order of hopping frequencies used for the first and second data channel in the superframe, and configured to control the transceiver to transmit and receive on hopping frequencies according to the data hopping sequence during the superframe based on the scheduling data.

In Example 35, the subject matter of Example 34 can optionally include wherein the controller is configured to identify the data hopping sequence by identifying an index that identifies the data hopping sequence from a plurality of predefined data hopping sequences and to provide the index to the hop scheduler, wherein the hop scheduler is configured to obtain the scheduling data by retrieving scheduling data for the data hopping sequence from a sequence memory based on the index.

In Example 36, the subject matter of Example 35 can optionally further include the sequence memory configured to store scheduling data for the plurality of predefined data hopping sequences.

In Example 37, the subject matter of Example 34 can optionally include wherein the controller is configured to identify the data hopping sequence by identifying an index that identifies the data hopping sequence from a plurality of predefined data hopping sequences and to provide the index to the hop scheduler, and wherein the hop scheduler is configured to determine the scheduling data for the data hopping sequence based on the index.

In Example 38, the subject matter of any one of Examples 34 to 37 can optionally include wherein the scheduling data specifies the order and timing of hopping frequencies of the data hopping sequence.

Example 39 is a method of operating a terminal device, the method including identifying a data hopping sequence for a first superframe including a plurality of frames, and transmitting and receiving while switching hopping frequencies over plurality of frames according to a data hopping sequence that excludes one or more hopping frequencies scheduled for use by a synchronization hopping sequence in one or more superframes immediately succeeding the first superframe.

In Example 40, the subject matter of Example 39 can optionally include wherein the data hopping sequence excludes a first hopping frequency scheduled for use by the synchronization hopping sequence in the superframe, excludes a second hopping frequency scheduled for use by the synchronization hopping sequence in a second superframe that immediately succeeds the first superframe, and excludes a third hopping frequency scheduled for use by the synchronization hopping sequence in a third superframe that immediately succeeds the second superframe.

In Example 41, the subject matter of Example 39 or 40 can optionally include wherein the data hopping sequence excludes one or more hopping frequencies that were previously used by the data hopping sequence in one or more superframes immediately preceding the first superframe.

In Example 42, the subject matter of Example 39 or 40 can optionally include wherein the data hopping sequence further excludes a first set of hopping frequencies that were previously used by the data hopping sequence in a fourth superframe immediately preceding the first superframe.

In Example 43, the subject matter of Example 42 can optionally include wherein the data hopping sequence further excludes a second set of hopping frequencies that were previously used by the data hopping sequence in a fifth superframe immediately preceding the fourth superframe.

In Example 44, the subject matter of any one of Examples 39 to 43 can optionally further include obtaining scheduling data for the data hopping sequence, wherein transmitting and receiving while switching hopping frequencies includes to switching hopping frequencies according to the data hopping sequence based on the scheduling data.

In Example 45, the subject matter of Example 44 can optionally include wherein identifying the data hopping sequence includes identifying an index that identifies the data hopping sequence from a plurality of predefined data hopping sequences, wherein obtaining the scheduling data includes retrieving scheduling data for the data hopping sequence from a sequence memory based on the index.

In Example 46, the subject matter of Example 44 can optionally include wherein identifying the data hopping sequence includes identifying an index that identifies the data hopping sequence from a plurality of predefined data hopping sequences, and wherein determining the scheduling data for the data hopping sequence based on the index.

In Example 47, the subject matter of any one of Examples 44 to 46 can optionally include wherein the scheduling data specifies the order and timing of hopping frequencies for the data hopping sequence.

In Example 48, the subject matter of any one of Examples 39 to 47 can optionally further include switching hopping frequencies over each of a plurality of superframes according to the synchronization hopping sequence.

In Example 49, the subject matter of Example 48 can optionally include wherein the data hopping sequence hops frequencies each frame and the synchronization hopping sequence hops frequencies each superframe.

In Example 50, the subject matter of any one of Examples 39 to 49 can optionally include wherein identifying the data hopping sequence includes identifying the data hopping sequence based on a communication pairing between the terminal device and another terminal device.

Example 51 is a method of operating a terminal device, the method including identifying a set of hopping frequencies, wherein the set of hopping frequencies are arranged according to a respective logical index associated with each of the set of hopping frequencies, transmitting and receiving using a first subset of the set of hopping frequencies that have first logical indices within the set of hopping frequencies during a first superframe including a plurality of frames, and transmitting and receiving using a second subset of the set of hopping frequencies in a second superframe, wherein the second subset is a cyclically-shifted version of the first subset that is cyclically-shifted by one or more logical indices within the set of hopping frequencies.

In Example 52, the subject matter of Example 51 can optionally include wherein the first subset of the set of hopping frequencies are data hopping frequencies allocated for a data hopping sequence in the first superframe, and wherein transmitting and receiving using the first subset during the first superframe includes switching hopping frequencies in each frame of the superframe according to the data hopping sequence.

In Example 53, the subject matter of Example 51 or 52 can optionally include wherein the hopping frequencies of the first subset are each associated with a respective hopping index and are arranged in increasing order by hopping index, the method further including for each given frame of a plurality of frames in the first superframe, using a hopping frequency for a first data channel that has a hopping index that is higher than a hopping frequency used for the first data channel in a frame preceding the given frame, and using a hopping frequency for the second data channel that has a hopping index that is lower than a hopping frequency used for the second data channel in the frame preceding the given frame.

In Example 54, the subject matter of Example 51 or 52 can optionally include wherein the hopping frequencies of the first subset are each associated with a respective hopping index and are arranged in increasing order by hopping index, the method further including for a first frame of a first plurality of frames in the first superframe, using a hopping frequency for a first data channel that has a hopping index that is higher than a hopping frequency used for the first data channel in the frame preceding the given frame, and using a hopping frequency for the second data channel that has a hopping index that is lower than a hopping frequency used for the second data channel in the frame preceding the given frame, and for each given frame remaining in the first plurality of frames, using a hopping frequency for the first data channel that has a hopping index that is higher than the hopping frequency used for the first data channel in the frame preceding the given frame and using a hopping frequency for the second data channel that has a hopping index that is lower than the hopping frequency used for the second data channel in the frame preceding the given frame.

In Example 55, the subject matter of Example 54 can optionally further include for a first frame in a second plurality of frames in the first superframe, using a hopping frequency for the first data channel that has a hopping index that is one index higher than the hopping frequency used for the first data channel in the first frame of the first plurality of frames, and using a hopping frequency for the second data channel that has a hopping index that is one lower than the hopping frequency used for the second data channel in the first frame of the first plurality of frames.

In Example 56, the subject matter of Example 55 can optionally further include for each given frame remaining in the second plurality of frames, using a hopping frequency for the first data channel that has a hopping index that is higher than the hopping frequency used for the first data channel in the frame preceding the given frame and using a hopping frequency for the second data channel that has a hopping index that is lower than the hopping frequency used for the second data channel in the frame preceding the given frame.

In Example 57, the subject matter of any one of Examples 51 to 56 can optionally include wherein a third subset of the set of hopping frequencies is allocated for a synchronization hopping sequence in the first superframe and a fourth subset of the set of hopping frequencies is allocated for the synchronization hopping sequence in the fourth superframe.

In Example 58, the subject matter of Example 57 can optionally include wherein the fourth subset of the set of hopping frequencies is a cyclically-shifted version of the third subset that is cyclically shifted by the same number of logical indices as the first subset and the second subset.

In Example 59, the subject matter of any one of Examples 51 to 58 can optionally include wherein a fifth subset of the set of hopping frequencies is allocated for a discovery hopping sequence in the first superframe and a sixth subset of the set of hopping frequencies is allocated for the discovery hopping sequence in the fourth superframe.

In Example 60, the subject matter of Example 59 can optionally include wherein the sixth subset of the set of hopping frequencies is a cyclically-shifted version of the fifth subset that is cyclically shifted by the same number of logical indices as the first subset and the second subset.

In Example 61, the subject matter of any one of Examples 51 to 60 can optionally further include obtaining scheduling data that defines a data hopping sequence for the first subset of the set of hopping frequencies in the first superframe, wherein transmitting and receiving using the first subset of the set of hopping frequencies during the first superframe includes transmitting and receiving on hopping frequencies according to the data hopping sequence during the first superframe.

In Example 62, the subject matter of Example 61 can optionally further include identifying the data hopping sequence by identifying an index that identifies the data hopping sequence from a plurality of predefined data hopping sequences, wherein obtaining the scheduling data includes retrieving scheduling data for the data hopping sequence from a sequence memory based on the index.

In Example 63, the subject matter of Example 61 can optionally further include identifying the data hopping sequence by identifying an index that identifies the data hopping sequence from a plurality of predefined data hopping sequences, and wherein obtaining the scheduling data includes determining the scheduling data for the data hopping sequence based on the index.

In Example 64, the subject matter of any one of Examples 61 to 63 can optionally include wherein the scheduling data specifies the order and timing of hopping frequencies for the data hopping sequence.

In Example 65, the subject matter of any one of Examples 51 to 64 can optionally include wherein the logical index associated with each of the set of hopping frequencies refers to a hopping frequency positioned at a corresponding location within a randomly-generated root hopping sequence of hopping frequencies.

Example 66 is a method of operating a terminal device, the method including identifying a set of hopping frequencies for a superframe that are each associated with a respective hopping index and are arranged in increasing order by hopping index, for a first frame of a plurality of frames in the superframe, using a first hopping frequency of the set of hopping frequencies to transmit or receive for a first data channel and using a second hopping frequency of the set of hopping frequencies to transmit and receive for a second data channel, and for each given frame remaining in the plurality of frames, using a hopping frequency for the first data channel that has a hopping index that is higher than the hopping frequency used for the first data channel in the frame preceding the given frame and using a hopping frequency for the second data channel that has a hopping index that is lower than the hopping frequency used for the second data channel in the frame preceding the given frame.

In Example 67, the subject matter of Example 66 can optionally further include for a first frame in a second plurality of frames in the superframe, using a hopping frequency for the first data channel that has a hopping index that is one index higher than the hopping frequency used for the first data channel in the first frame of the first plurality of frames, and using a hopping frequency for the second data channel that has a hopping index that is one index lower than the hopping frequency used for the second data channel in the first frame of the first plurality of frames.

In Example 68, the subject matter of Example 67 can optionally further include for each given frame remaining in the second plurality of frames, using a hopping frequency for the first data channel that has a hopping index that is higher than the hopping frequency used for the first data channel in the frame preceding the given frame and using a hopping frequency for the second data channel that has a hopping index that is lower than the hopping frequency used for the second data channel in the frame preceding the given frame.

In Example 69, the subject matter of any one of Examples 66 to 68 can optionally include wherein the respective hopping indices associated with the set of hopping frequencies are cyclically shifted by one or more hopping indices for a second superframe, the method further including for a first frame of a plurality of frames in the second superframe, using a first hopping frequency of the set of hopping frequencies to transmit or receive for a first data channel and using a second hopping frequency of the set of hopping frequencies to transmit and receive for a second data channel, and for each given frame remaining in the plurality of frames, using a hopping frequency for the first data channel that has a hopping index that is higher than the hopping frequency used for the first data channel in the frame preceding the given frame and using a hopping frequency for the second data channel that has a hopping index that is lower than the hopping frequency used for the second data channel in the frame preceding the given frame.

In Example 70, the subject matter of any one of Examples 66 to 69 can optionally further include obtaining scheduling data for a data hopping sequence that defines the order of hopping frequencies used for the first and second data channel in the superframe, and identifying the first hopping frequency and the second hopping frequency based on the scheduling data.

In Example 71, the subject matter of any one of Examples including identifying the can optionally include hopping sequence by identifying an index that identifies the data hopping sequence from a plurality of predefined data hopping sequences, wherein obtaining the scheduling data includes retrieving scheduling data for the data hopping sequence from a sequence memory based on the index.

In Example 72, the subject matter of Example 70 can optionally include wherein identifying the data hopping sequence includes identifying an index that identifies the data hopping sequence from a plurality of predefined data hopping sequences, and wherein obtaining the scheduling data includes determining the scheduling data for the data hopping sequence based on the index.

In Example 73, the subject matter of any one of Examples 70 to 72 can optionally include wherein the scheduling data specifies the order and timing of hopping frequencies of the data hopping sequence.

Example 74 is a non-transitory computer readable medium storing instructions that when executed by one or more processors cause the one or more processors to perform the method of any one of Examples 39 to 73.

Example 75 is a communication device including one or more processors, and a memory storing instructions that when executed by the one or more processors causes the one or more processors to perform the method of any one of Examples 39 to 73.

Example 76 is a terminal device including control means configured to identifying a data hopping sequence for a first superframe including a plurality of frames, and transceiver means configured to switch hopping frequencies over the plurality of frames according to a data hopping sequence that excludes one or more hopping frequencies scheduled for use by a synchronization hopping sequence in one or more superframes immediately succeeding the first superframe.

Example 77 is a terminal device including control means configured to identify a set of hopping frequencies, wherein the set of hopping frequencies are arranged according to a respective logical index associated with each of the set of hopping frequencies, and transceiver means configured to transmit and receive using a first subset of the set of hopping frequencies that have first logical indices within the set of hopping frequencies during a first superframe including a plurality of frames, and transmit and receive using a second subset of the set of hopping frequencies in a second superframe, wherein the second subset is a cyclically-shifted version of the first subset that is cyclically-shifted by one or more logical indices within the set of hopping frequencies.

Example 78 is a terminal device including control means configured to identify a set of hopping frequencies for a superframe that are each associated with a respective hopping index and are arranged in increasing order by hopping index, transceiver means configured to for a first frame of a plurality of frames in the superframe, use a first hopping frequency of the set of hopping frequencies to transmit or receive for a first data channel and use a second hopping frequency of the set of hopping frequencies to transmit and receive for a second data channel, and for each given frame remaining in the plurality of frames, use a hopping frequency for the first data channel that has a hopping index that is higher than the hopping frequency used for the first data channel in the frame preceding the given frame and use a hopping frequency for the second data channel that has a hopping index that is lower than the hopping frequency used for the second data channel in the frame preceding the given frame.

Example 79 is a testing device including a test controller configured to generate a command sequence for a test scenario of a plurality of virtual terminal devices, a simulation engine configured to execute the command sequence with reference software implementation that simulates physical layer functions of the plurality of virtual terminal devices, and to generate simulated behavior data for the plurality of virtual terminal devices in response to the command sequence, and an input/output (I/O) platform configured to generate a test result based on the simulated behavior data.

In Example 80, the subject matter of Example 79 can optionally include wherein the reference software implementation is based on a wireless standard for the plurality of virtual terminal devices.

In Example 81, the subject matter of Example 79 or 80 can optionally include wherein the I/O platform includes a graphical user interface (GUI) configured to generate the test result by displaying the simulated behavior data on a visual display.

In Example 82, the subject matter of Example 79 or 80 can optionally include wherein the I/O platform includes an output file generator configured to generate the test result by generating a test output file that includes the simulated behavior data.

In Example 83, the subject matter of any one of Examples 79 to 82 can optionally include wherein the simulated behavior data includes channel usage data that characterizes samples sent or received on channels by simulated physical layers of the plurality of virtual terminal devices.

In Example 84, the subject matter of any one of Examples 79 to 83 can optionally include wherein the simulated behavior data includes control response data that characterizes signaling sent by simulated physical layers of the plurality of virtual terminal devices on a physical layer-protocol stack interface.

In Example 85, the subject matter of any one of Examples 79 to 84 can optionally include wherein the simulated behavior data includes internal performance data that characterizes algorithm execution time and power usage of simulated physical layers of the plurality of virtual terminal devices.

In Example 86, the subject matter of any one of Examples 79 to 84 can optionally include wherein the test controller is configured to configure one or more parameters of the reference software implementation based on a device configuration for the test scenario.

In Example 87, the subject matter of Example 86 can optionally include wherein the one or more parameters control a physical channel configuration, a frame structure, or device performance for the plurality of virtual terminal devices.

In Example 88, the subject matter of Example 86 or 87 can optionally include wherein the I/O platform is configured to obtain scenario data including the device configuration and to provide the scenario data to the test controller.

In Example 89, the subject matter of any one of Examples 79 to 87 can optionally include wherein the command sequence includes a first protocol stack command string for a first virtual terminal device of the plurality of virtual terminal devices, and wherein the simulation engine is configured to input the first protocol stack command string into the reference software implementation to generate simulated behavior data for the first virtual terminal device.

In Example 90, the subject matter of Example 89 can optionally include wherein the test controller is configured to generate the first protocol stack command string based on a transmission and reception schedule for the first virtual terminal device in the test scenario.

In Example 91, the subject matter of Example 90 can optionally include wherein the I/O platform is configured to obtain scenario data including the transmission and reception schedule and to provide the scenario data to the test controller.

In Example 92, the subject matter of any one of Examples 79 to 87 can optionally include wherein the command sequence includes a respective protocol stack command string for each of the plurality of virtual terminal devices, and wherein the simulation engine is configured to, for each respective virtual terminal device, input the respective protocol stack command string into the reference software implementation to generate simulated behavior data for the respective virtual terminal device.

In Example 93, the subject matter of any one of Examples 79 to 92 can optionally include wherein the simulation engine is configured to execute a separate instance of the reference software implementation to simulate each of the plurality of virtual terminal devices.

Example 94 is a testing device including a test controller configured to generate a command sequence for a test scenario, provide the command sequence to production software implementation of a device-under-test (DUT), and obtain observed behavior data of the DUT in response to the command sequence, a simulation engine configured to execute the command sequence with reference software implementation that simulates physical layer functions of the plurality of virtual terminal devices, and to obtain simulated behavior data for the plurality of virtual terminal devices in response to the command sequence, and an input/output (I/O) platform configured to generate a test result based on the observed behavior data and the simulated behavior data.

In Example 95, the subject matter of Example 94 can optionally include wherein the reference software implementation and the production software implementation are based on a wireless standard for the plurality of virtual terminal devices.

In Example 96, the subject matter of Example 94 or 95 can optionally include wherein the I/O platform includes a graphical user interface (GUI) configured to generate the test result by displaying the simulated behavior data and the observed behavior data on a visual display.

In Example 97, the subject matter of Example 94 or 95 can optionally include wherein the I/O platform includes an output file generator configured to generate the test result by generating a test output file that includes the simulated behavior data and the observed behavior data.

In Example 98, the subject matter of any one of Examples 94 to 97 can optionally include wherein the simulated behavior data includes channel usage data that characterizes samples sent or received on channels by simulated physical layers of the plurality of virtual terminal devices.

In Example 99, the subject matter of any one of Examples 94 to 98 can optionally include wherein the simulated behavior data includes control response data that characterizes signaling sent by simulated physical layers of the plurality of virtual terminal devices on a physical layer-protocol stack interface.

In Example 100, the subject matter of any one of Examples 94 to 98 can optionally include wherein the simulated behavior data includes internal performance data that characterizes algorithm execution time and power usage of simulated physical layers of the plurality of virtual terminal devices.

In Example 101, the subject matter of any one of Examples 94 to 100 can optionally include wherein the observed behavior data includes channel usage data that characterizes samples sent or received on channels by a physical layer of the DUT.

In Example 102, the subject matter of any one of Examples 94 to 101 can optionally include wherein the observed behavior data includes control response data that characterizes signaling sent by a physical layer of the DUT on a physical layer-protocol stack interface.

In Example 103, the subject matter of any one of Examples 94 to 102 can optionally include wherein the observed behavior data includes internal performance data that characterizes algorithm execution time and power usage of a physical layer of the DUT.

In Example 104, the subject matter of any one of Examples 94 to 103 can optionally include wherein the test controller is configured to configure one or more parameters of the reference software implementation based on a device configuration for the test scenario.

In Example 105, the subject matter of any one of Examples 94 to 104 can optionally include wherein the test controller is configured to configure one or more parameters of the production software implementation based on a device configuration for the test scenario.

In Example 106, the subject matter of Example 104 or 105 can optionally include wherein the one or more parameters control a physical channel configuration, a frame structure, or device performance of the DUT or the plurality of virtual terminal devices.

In Example 107, the subject matter of any one of Examples 104 to 106 can optionally include wherein the I/O platform is configured to obtain scenario data including the device configuration and to provide the scenario data to the test controller.

In Example 108, the subject matter of any one of Examples 94 to 107 can optionally include wherein the command sequence includes a first protocol stack command string for a first virtual terminal device of the plurality of virtual terminal devices, and wherein the simulation engine is configured to input the first protocol stack command string into the reference software implementation to generate simulated behavior data for the first virtual terminal device.

In Example 109, the subject matter of Example 108 can optionally include wherein the test controller is configured to input the first protocol stack command string into the production software implementation and to monitor an output of the production software implementation to generate observed behavior data for the DUT.

In Example 110, the subject matter of Example 108 or 109 can optionally include wherein the test controller is configured to generate the first protocol stack command string based on a transmission and reception schedule for the first virtual terminal device in the test scenario.

In Example 111, the subject matter of Example 110 can optionally include wherein the I/O platform is configured to obtain scenario data including the transmission and reception schedule and to provide the scenario data to the test controller.

In Example 112, the subject matter of any one of Examples 94 to 107 can optionally include wherein the command sequence includes a respective protocol stack command string for each of the plurality of virtual terminal devices, and wherein the simulation engine is configured to, for each respective virtual terminal device, input the respective protocol stack command string into the reference software implementation to generate simulated behavior data for the respective virtual terminal device.

In Example 113, the subject matter of Example 112 can optionally include wherein the test controller is further configured to input the respective protocol stack command strings into the reference software implementation and to monitor an output of the production software implementation to obtain observed behavior data for the DUT.

In Example 114, the subject matter of any one of Examples 94 to 113 can optionally include wherein the test controller is further configured to compare the simulated behavior data with the observed behavior data to generate comparison data.

In Example 115, the subject matter of any one of Examples 94 to 114 can optionally include wherein the simulation engine is configured to execute a separate instance of the reference software implementation to simulate each of the plurality of virtual terminal devices.

Example 116 is a method of testing terminal device functionality, the method including generating a command sequence for a test scenario of a plurality of virtual terminal devices, executing the command sequence with reference software implementation that simulates physical layer functions of the plurality of virtual terminal devices and generating simulated behavior data for the plurality of virtual terminal devices in response to the command sequence, and generating a test result based on the simulated behavior data.

In Example 117, the subject matter of Example 116 can optionally include wherein the reference software implementation is based on a wireless standard for the plurality of virtual terminal devices.

In Example 118, the subject matter of Example 116 or 117 can optionally include wherein generating the test result includes displaying the simulated behavior data on a visual display with a graphical user interface (GUI).

In Example 119, the subject matter of Example 116 or 117 can optionally include wherein generating the test result includes generating a test output file that includes the simulated behavior data.

In Example 120, the subject matter of any one of Examples 116 to 119 can optionally include wherein the simulated behavior data includes channel usage data that characterizes samples sent or received on channels by simulated physical layers of the plurality of virtual terminal devices.

In Example 121, the subject matter of any one of Examples 116 to 120 can optionally include wherein the simulated behavior data includes control response data that characterizes signaling sent by simulated physical layers of the plurality of virtual terminal devices on a physical layer-protocol stack interface.

In Example 122, the subject matter of any one of Examples 116 to 121 can optionally include wherein the simulated behavior data includes internal performance data that characterizes algorithm execution time and power usage of simulated physical layers of the plurality of virtual terminal devices.

In Example 123, the subject matter of any one of Examples 116 to 121 can optionally further include configuring one or more parameters of the reference software implementation based on a device configuration for the test scenario.

In Example 124, the subject matter of Example 123 can optionally include wherein the one or more parameters control a physical channel configuration, a frame structure, or device performance for the plurality of virtual terminal devices.

In Example 125, the subject matter of Example 123 or 124 can optionally further include obtaining scenario data including the device configuration.

In Example 126, the subject matter of any one of Examples 116 to 124 can optionally include wherein the command sequence includes a first protocol stack command string for a first virtual terminal device of the plurality of virtual terminal devices, and wherein executing the command sequence with the reference software implementation includes providing the first protocol stack command string as input to the reference software implementation to generate simulated behavior data for the first virtual terminal device.

In Example 127, the subject matter of Example 126 can optionally further include generating the first protocol stack command string based on a transmission and reception schedule for the first virtual terminal device in the test scenario.

In Example 128, the subject matter of Example 127 can optionally further include obtaining scenario data including the transmission and reception schedule.

In Example 129, the subject matter of any one of Examples 116 to 124 can optionally include wherein the command sequence includes a respective protocol stack command string for each of the plurality of virtual terminal devices, and wherein executing the command sequence with the reference software implementation includes for each respective virtual terminal device, providing the respective protocol stack command string as input to the reference software implementation to generate simulated behavior data for the respective virtual terminal device.

In Example 130, the subject matter of any one of Examples 116 to 129 can optionally include wherein executing the command sequence with the reference software implementation includes executing a separate instance of the reference software implementation to simulate the physical layer functions of each of the plurality of virtual terminal devices.

Example 131 is a method of testing terminal device functionality, the method including generating a command sequence for a test scenario, providing the command sequence to production software implementation of a device-under-test (DUT) and obtaining observed behavior data of the DUT in response to the command sequence, executing the command sequence with reference software implementation that simulates physical layer functions of the plurality of virtual terminal devices and obtaining simulated behavior data for the plurality of virtual terminal devices in response to the command sequence, and generating a test result based on the observed behavior data and the simulated behavior data.

In Example 132, the subject matter of Example 131 can optionally include wherein the reference software implementation and the production software implementation are based on a wireless standard for the plurality of virtual terminal devices.

In Example 133, the subject matter of Example 131 or 132 can optionally include wherein generating the test result includes displaying the simulated behavior data and the observed behavior data on a visual display with a graphical user interface (GUI).

In Example 134, the subject matter of Example 131 or 132 can optionally include wherein generating the test result includes generating a test output file that includes the simulated behavior data and the observed behavior data.

In Example 135, the subject matter of any one of Examples 131 to 134 can optionally include wherein the simulated behavior data includes channel usage data that characterizes samples sent or received on channels by simulated physical layers of the plurality of virtual terminal devices.

In Example 136, the subject matter of any one of Examples 131 to 135 can optionally include wherein the simulated behavior data includes control response data that characterizes signaling sent by simulated physical layers of the plurality of virtual terminal devices on a physical layer-protocol stack interface.

In Example 137, the subject matter of any one of Examples 131 to 135 can optionally include wherein the simulated behavior data includes internal performance data that characterizes algorithm execution time and power usage of simulated physical layers of the plurality of virtual terminal devices.

In Example 138, the subject matter of any one of Examples 131 to 137 can optionally include wherein the observed behavior data includes channel usage data that characterizes samples sent or received on channels by a physical layer of the DUT.

In Example 139, the subject matter of any one of Examples 131 to 138 can optionally include wherein the observed behavior data includes control response data that characterizes signaling sent by a physical layer of the DUT on a physical layer-protocol stack interface.

In Example 140, the subject matter of any one of Examples 131 to 139 can optionally include wherein the observed behavior data includes internal performance data that characterizes algorithm execution time and power usage of a protocol stack or a physical layer of the DUT.

In Example 141, the subject matter of any one of Examples 131 to 140 can optionally further include configuring one or more parameters of the reference software implementation based on a device configuration for the test scenario.

In Example 142, the subject matter of any one of Examples 131 to 141 can optionally further include configuring one or more parameters of the production software implementation based on a device configuration for the test scenario.

In Example 143, the subject matter of Example 141 or 142 can optionally include wherein the one or more parameters control a physical channel configuration, a frame structure, or device performance of the DUT or the plurality of virtual terminal devices.

In Example 144, the subject matter of any one of Examples 141 to 143 can optionally further include obtaining scenario data including the device configuration.

In Example 145, the subject matter of any one of Examples 131 to 144 can optionally include wherein the command sequence includes a first protocol stack command string for a first virtual terminal device of the plurality of virtual terminal devices, and wherein executing the command sequence with the reference software implementation includes providing the first protocol stack command string as input to the reference software implementation to generate simulated behavior data for the first virtual terminal device.

In Example 146, the subject matter of Example 145 can optionally further include providing the first protocol stack command string as input to the production software implementation and monitoring an output of the production software implementation to generate observed behavior data for the DUT.

In Example 147, the subject matter of Example 145 or 146 can optionally further include generating the first protocol stack command string based on a transmission and reception schedule for the first virtual terminal device in the test scenario.

In Example 148, the subject matter of Example 147 can optionally further include obtaining scenario data including the transmission and reception schedule.

In Example 149, the subject matter of any one of Examples 131 to 144 can optionally include wherein the command sequence includes a respective protocol stack command string for each of the plurality of virtual terminal devices, and wherein executing the command sequence with the reference software implementation includes for each respective virtual terminal device, providing the respective protocol stack command string as input to the reference software implementation to generate simulated behavior data for the respective virtual terminal device.

In Example 150, the subject matter of Example 149 can optionally further include providing the respective protocol stack command strings as input to the reference software implementation and monitoring an output of the production software implementation to obtain observed behavior data for the DUT.

In Example 151, the subject matter of any one of Examples 131 to 150 can optionally further include comparing the simulated behavior data with the observed behavior data to generate comparison data.

In Example 152, the subject matter of any one of Examples 131 to 151 can optionally include wherein executing the command sequence with the reference software implementation includes executing a separate instance of the reference software implementation to simulate the physical layer functions of each of the plurality of virtual terminal devices.

Example 153 is a non-transitory computer readable medium storing instructions that when executed by one or more processors cause the one or more processors to perform the method of any one of Examples 116 to 152.

Example 154 is a device including one or more processors, and a memory storing instructions that when executed by the one or more processors cause the one or more processors to perform the method of any one of Examples 116 to 152.

Example 155 is a testing device including testing means configured to generate a command sequence for a test scenario of a plurality of virtual terminal devices, simulating means configured to execute the command sequence with reference software implementation that simulates physical layer functions of the plurality of virtual terminal devices and generate simulated behavior data for the plurality of virtual terminal devices in response to the command sequence, and output means configured to generate a test result based on the simulated behavior data.

Example 156 is a testing device including testing means configured to generate a command sequence for a test scenario, provide the command sequence to production software implementation of a device-under-test (DUT), and obtain observed behavior data of the DUT in response to the command sequence, simulating means configured to execute the command sequence with reference software implementation that simulates physical layer functions of the plurality of virtual terminal devices and obtain simulated behavior data for the plurality of virtual terminal devices in response to the command sequence, and output means configured to generate a test result based on the observed behavior data and the simulated behavior data.

Example 157 is a testing device including one or more processors configured to generate a command sequence for a test scenario of a plurality of virtual terminal devices, execute the command sequence with reference software implementation that simulates physical layer functions of the plurality of virtual terminal devices and generate simulated behavior data for the plurality of virtual terminal devices in response to the command sequence, and generate a test result based on the simulated behavior data.

Example 158 is a testing device including one or more processors configured to generate a command sequence for a test scenario, provide the command sequence to production software implementation of a device-under-test (DUT) and obtain observed behavior data of the DUT in response to the command sequence, execute the command sequence with reference software implementation that simulates physical layer functions of the plurality of virtual terminal devices and obtain simulated behavior data for the plurality of virtual terminal devices in response to the command sequence, and generate a test result based on the observed behavior data and the simulated behavior data.

Example 159 is a terminal device including a receiver configured to receive a signal from at least one other terminal device for initiating direct communication between the terminal devices, an estimator configured to estimate at least one parameter indicative of a power reduction of the signal on a propagation path from the at least one other terminal device, a transmitter configured to transmit a response signal to the at least one other terminal device at a transmission power level set based on the estimated parameter.

In Example 160, the subject matter of Example 159 can optionally include wherein the transmitter is configured to set the transmission power level to a target receive power level of the terminal device increased based on the estimated parameter.

In Example 161, the subject matter of Example 159 can optionally include wherein the transmitter is configured to set the transmission power level to a target receive power level of the terminal device increased by a power value corresponding to the power reduction of the signal.

In Example 162, the subject matter of any one of Examples 159 to 161 can optionally include wherein the estimator is configured to estimate the at least one parameter based on a signal transmission power level used by the at least one other terminal device for transmitting the signal to the terminal device and a measured receive power level of the signal.

In Example 163, the subject matter of any one of Examples 159 to 162 can optionally include wherein the estimator is configured to estimate the at least one parameter PLest by calculating the difference $PL\_est = Tx\_DI - Rx\_DR$, where TxDI is a value representing a signal transmission power for transmitting the signal for initiating direct communication between the terminal devices from the at least one other terminal device to the terminal device and RxDR is a value representing a power level of the signal received by the terminal device.

In Example 164, the subject matter of Example one of Examples can optionally include or 163, wherein the signal transmission power level used by the at least one other terminal device for transmitting the signal is predefined for the signal for initiating direct communication between the terminal devices.

In Example 165, the subject matter of any one of Examples 162 to 164 can optionally further include a memory for storing a table including information defining a signal transmission power level for the signal for initiating direct communication between the terminal devices, wherein the estimator is configured to extract the signal transmission power level used by the at least one other terminal device for transmitting the signal to the terminal device from the table.

In Example 166, the subject matter of any one of Examples 162 or 163 can optionally include wherein information defining the signal transmission power level used by the at least one other terminal device for transmitting the signal for initiating direct communication between the terminal devices is encoded in the received signal.

In Example 167, the subject matter of any one of Examples 159 to 166 can optionally further include a transmission power encoder configured to encode information defining a transmission power level for a subsequent transmission into a signal to be transmitted, wherein the transmitter is configured to transmit the signal to the at least one other terminal device.

In Example 168, the subject matter of Example 167 can optionally include wherein the signal is a signal for initiating direct communication between terminal devices.

In Example 169, the subject matter of any one of Examples 160 to 168 can optionally include wherein the target receive power level of the terminal device is set in between a maximum receive power level and a minimum receive power level receivable by the receiver.

In Example 170, the subject matter of Example 169 can optionally include wherein the maximum receive power level corresponds to a minimum output power of the transmitter reduced by a power level representing a minimum coupling loss of the receiver, and wherein the minimum receive power level corresponds to a maximum output power of the transmitter reduced by a power level representing a maximum coupling loss of the receiver.

In Example 171, the subject matter of any one of Examples 169 or 170 can optionally include wherein the maximum receive power level and the minimum receive power level are predefined parameters of the receiver.

In Example 172, the subject matter of any one of Examples 169 to 171 can optionally include wherein the difference between the maximum receive power and the minimum receive power defines a dynamic range of the receiver.

In Example 173, the subject matter of any one of Examples 169 to 171 can optionally include wherein the target receive power level of the terminal device RxAntennaSetpoint is set in between the maximum receive power level Rxhigh and the minimum receive power level Rxlow, wherein Rx_AntennaSetpoint=(Rx_low+Rx_high)/2.

In Example 174, the subject matter of any one of Examples 159 to 173 can optionally include wherein the signal is a discovery initiation (DI) signal and the response signal is a discovery response (DR) signal, the discovery initiation (DI) signal and the discovery response (DR) signal being signals exchanged during a discovery phase of the terminal device and the at least one other terminal device for initiating a direct device-to-device (D2D) communication between the terminal devices.

In Example 175, the subject matter of Example 174 can optionally include wherein the receiver is configured to receive a plurality of discovery response (DR) signals from a respective plurality of different terminal devices, the terminal device and the plurality of different terminal devices forming an autonomous device-to-device (D2D) communication network.

In Example 176, the subject matter of any one of Examples 159 to 175 can optionally include wherein the transmitter is configured to transmit a deviation parameter to the at least one other terminal device, the deviation parameter indicating a difference between a power level of a data signal received by the receiver and the target receive power level of the terminal device.

In Example 177, the subject matter of any one of Examples 159 to 176 can optionally include wherein the receiver is configured to receive a deviation parameter indicating a difference between a power level of a data signal received by the at least one other terminal device from the terminal device in a previous transmission and a target receive power level of the at least one other terminal device, and wherein the transmitter of the terminal device is configured to adjust a transmission power level for a subsequent transmission based on the deviation parameter.

In Example 178, the subject matter of any one of Examples 169 to 177 can optionally further include a dynamic target receive power level adjuster for adjusting the target receive power level of the terminal device to be in between the maximum receive power level and the minimum receive power level based on transmission parameters, wherein the transmitter is configured to transmit a data signal to the at least one other terminal device at a transmission power level set based on the adjusted target receive power level of the terminal device.

In Example 179, the subject matter of Example 178 can optionally include wherein the transmission parameters include at least a modulation scheme to be used for a subsequent transmission.

In Example 180, the subject matter of any one of Examples 178 to 179 can optionally include wherein the transmission parameters are received from the at least one other terminal device.

Example 181 is a communication method for a terminal device including receiving a signal from at least one other terminal device for initiating direct communication between the terminal devices, estimating at least one parameter indicative of a power reduction of the signal on a propagation path from the at least one other terminal device, transmitting a response signal to the at least one other terminal device at a transmission power level set based on the estimated parameter.

In Example 182, the subject matter of Example 181 can optionally include wherein the transmitting includes setting the transmission power level to a target receive power level of the terminal device increased based on the estimated parameter.

In Example 183, the subject matter of Example 181 can optionally include wherein the transmitting includes setting the transmission power level to a target receive power level of the terminal device increased by a power value corresponding to the power reduction of the signal.

In Example 184, the subject matter of any one of Examples 181 to 183 can optionally include wherein the estimating includes estimating the at least one parameter based on a signal transmission power level used by the at least one other terminal device for transmitting the signal to the terminal device and a measured receive power level of the signal.

In Example 185, the subject matter of any one of Examples 181 to 184 can optionally include wherein the estimating includes estimating the at least one parameter PLest by calculating the difference $PL\_est = Tx\_DI - Rx\_DI$, where TxDI is a value representing a signal transmission power for transmitting the signal for initiating direct communication between the terminal devices from the at least one other terminal device to the terminal device and RxDI is a value representing a power level of the signal received by the terminal device.

In Example 186, the subject matter of any one of Examples 184 or 185 can optionally include wherein the signal transmission power level used by the at least one other terminal device for transmitting the signal is predefined for the signal for initiating direct communication between the terminal devices.

In Example 187, the subject matter of any one of Examples 184 to 186 can optionally further include storing a table including information defining a signal transmission power level for the signal for initiating direct communication between the terminal devices, wherein the estimating includes extracting the signal transmission power level used by the at least one other terminal device for transmitting the signal to the terminal device from the table.

In Example 188, the subject matter of any one of Examples 184 or 185 can optionally include wherein receiving the received signal includes receiving information defining the signal transmission power level used by the at least one other terminal device for transmitting the signal for initiating direct communication between the terminal devices, the information being encoded in the received signal.

In Example 189, the subject matter of any one of Examples 181 to 188 can optionally further include encoding information defining a transmission power level for a subsequent transmission into a signal to be transmitted, wherein the transmitting transmits the signal to the at least one other terminal device.

In Example 190, the subject matter of Example 189 can optionally include wherein the signal is a signal for initiating direct communication between terminal devices.

In Example 191, the subject matter of any one of Examples 182 to 190 can optionally further include setting the target receive power level of the terminal device in between a maximum receive power level and a minimum receive power level receivable by the terminal device.

In Example 192, the subject matter of Example 191 can optionally include wherein the maximum receive power level corresponds to a minimum output power of the terminal device reduced by a power level representing a minimum coupling loss of a receiver of the terminal device, and wherein the minimum receive power level corresponds to a maximum output power of the terminal device reduced by a power level representing a maximum coupling loss of a receiver of the terminal device.

In Example 193, the subject matter of any one of Examples 191 or 192 can optionally include wherein the maximum receive power level and the minimum receive power level are predefined parameters of the terminal device.

In Example 194, the subject matter of any one of Examples 191 to 193 can optionally include wherein the difference between the maximum receive power and the minimum receive power defines a dynamic range of the terminal device.

In Example 195, the subject matter of any one of Examples 191 to 194 can optionally further include setting the target receive power level of the terminal device RxAntennaSetpoint in between the maximum receive power level Rxhigh and the minimum receive power level Rxlow, wherein $Rx\_AntennaSetpoint = (Rx\_low + Rx\_high)/2$.

In Example 196, the subject matter of any one of Examples 181 to 195 can optionally include wherein the signal is a discovery initiation (DI) signal and the response signal is a discovery response (DR) signal, the discovery initiation (DI) signal and the discovery response (DR) signal being signals exchanged during a discovery phase of the terminal device and the at least one other terminal device for initiating a direct device-to-device (D2D) communication between the terminal devices.

In Example 197, the subject matter of Example 196 can optionally further include receiving a plurality of discovery response (DR) signals from a respective plurality of different terminal devices, the terminal device and the plurality of different terminal devices forming an autonomous device-to-device (D2D) communication network.

In Example 198, the subject matter of any one of Examples 181 to 197 can optionally further include transmitting a deviation parameter to the at least one other terminal device, the deviation parameter indicating a difference between a power level of a data signal received by the terminal device and the target receive power level of the terminal device.

In Example 199, the subject matter of any one of Examples 181 to 198 can optionally further include receiving a deviation parameter indicating a difference between a power level of a data signal received by the at least one other terminal device from the terminal device in a previous transmission and a target receive power level of the at least one other terminal device, further including adjusting a transmission power level for a subsequent transmission based on the deviation parameter.

In Example 200, the subject matter of any one of Examples 191 to 199 can optionally further include adjusting the target receive power level of the terminal device to be in between the maximum receive power level and the minimum receive power level based on transmission parameters, setting a transmission power level based on the adjusted target receive power level of the terminal device, and transmitting a data signal to the at least one other terminal device at the set transmission power level.

In Example 201, the subject matter of Example 200 can optionally include wherein the transmission parameters include at least a modulation scheme to be used for a subsequent transmission.

In Example 202, the subject matter of any one of Examples 200 to 201 can optionally further include receiving the transmission parameters from the at least one other terminal device.

Example 203 is a terminal device including one or more processors configured to receive a signal from at least one other terminal device for initiating direct communication between the terminal devices, estimate at least one parameter indicative of a power reduction of the signal on a propagation path from the at least one other terminal device, transmit a response signal to the at least one other terminal device at a transmission power level set based on the estimated parameter.

In Example 204, the subject matter of Example 203 can optionally include wherein the one or more processors are configured to set the transmission power level to a target receive power level of the terminal device increased based on the estimated parameter.

In Example 205, the subject matter of Example 203 can optionally include wherein the one or more processors are configured to set the transmission power level to a target receive power level of the terminal device increased by a power value corresponding to the power reduction of the signal.

In Example 206, the subject matter of any one of Examples 203 to 205 can optionally include wherein the one or more processors are configured to estimate the at least one parameter based on a signal transmission power level used by the at least one other terminal device for transmitting the signal to the terminal device and a measured receive power level of the signal.

In Example 207, the subject matter of any one of Examples 203 to 206 can optionally include wherein the one or more processors are configured to estimate the at least one parameter PLest by calculating the difference PL_est=Tx_DI−Rx_DR, where TxDI is a value representing a signal transmission power for transmitting the signal for initiating direct communication between the terminal devices from the at least one other terminal device to the terminal device and RxDR is a value representing a power level of the signal received by the terminal device.

In Example 208, the subject matter of any one of Examples 206 or 207 can optionally include wherein the signal transmission power level used by the at least one other terminal device for transmitting the signal is predefined for the signal for initiating direct communication between the terminal devices.

In Example 209, the subject matter of any one of Examples 206 to 208 can optionally further include a memory for storing a table including information defining a signal transmission power level for the signal for initiating direct communication between the terminal devices, wherein the one or more processors are configured to extract the signal transmission power level used by the at least one other terminal device for transmitting the signal to the terminal device from the table.

In Example 210, the subject matter of any one of Examples 206 or 207 can optionally include wherein information defining the signal transmission power level used by the at least one other terminal device for transmitting the signal for initiating direct communication between the terminal devices is encoded in the received signal.

In Example 211, the subject matter of any one of Examples 203 to 210 can optionally include the one or more processors further being configured to encode information defining a transmission power level for a subsequent transmission into a signal to be transmitted, wherein the one or more processors are configured to transmit the signal to the at least one other terminal device.

In Example 212, the subject matter of Example 211 can optionally include wherein the signal is a signal for initiating direct communication between terminal devices.

In Example 213, the subject matter of any one of Examples 204 to 212 can optionally include wherein the target receive power level of the terminal device is set in between a maximum receive power level and a minimum receive power level receivable by the one or more processors.

In Example 214, the subject matter of Example 213 can optionally include wherein the maximum receive power level corresponds to a minimum output power of the terminal device reduced by a power level representing a minimum coupling loss of the terminal device, and wherein the minimum receive power level corresponds to a maximum output power of the terminal device reduced by a power level representing a maximum coupling loss of the terminal device.

In Example 215, the subject matter of any one of Examples 213 or 214 can optionally include wherein the maximum receive power level and the minimum receive power level are predefined parameters of the terminal device.

In Example 216, the subject matter of any one of Examples 213 to 215 can optionally include wherein the difference between the maximum receive power and the minimum receive power defines a dynamic range of the terminal device.

In Example 217, the subject matter of any one of Examples 213 to 216 can optionally include wherein the target receive power level of the terminal device RxAntennaSetpoint is set in between the maximum receive power level Rxhigh and the minimum receive power level Rxlow, wherein Rx_AntennaSetpoint=(Rx_low+Rx_high)/2.

In Example 218, the subject matter of any one of Examples 203 to 217 can optionally include wherein the signal is a discovery initiation (DI) signal and the response signal is a discovery response (DR) signal, the discovery initiation (DI) signal and the discovery response (DR) signal being signals exchanged during a discovery phase of the terminal device and the at least one other terminal device for initiating a direct device-to-device (D2D) communication between the terminal devices.

In Example 219, the subject matter of Example 218 can optionally include wherein the one or more processors are configured to receive a plurality of discovery response (DR) signals from a respective plurality of different terminal devices, the terminal device and the plurality of different terminal devices forming an autonomous device-to-device (D2D) communication network.

In Example 220, the subject matter of any one of Examples 203 to 219 can optionally include wherein the one or more processors are configured to transmit a deviation parameter to the at least one other terminal device, the deviation parameter indicating a difference between a power level of a data signal received by the terminal device and the target receive power level of the terminal device.

In Example 221, the subject matter of any one of Examples 203 to 220 can optionally include wherein the one or more processors are configured to receive a deviation parameter indicating a difference between a power level of a data signal received by the at least one other terminal device from the terminal device in a previous transmission and a target receive power level of the at least one other terminal device, and wherein the one or more processors of the terminal device are configured to adjust a transmission power level for a subsequent transmission based on the deviation parameter.

In Example 222, the subject matter of any one of Examples 213 to 221 can optionally include the one or more processors further being configured to adjust the target receive power level of the terminal device to be in between the maximum receive power level and the minimum receive power level based on transmission parameters, wherein the one or more processors are configured to transmit a data signal to the at least one other terminal device at a transmission power level set based on the adjusted target receive power level of the terminal device.

In Example 223, the subject matter of Example 222 can optionally include wherein the transmission parameters include at least a modulation scheme to be used for a subsequent transmission.

In Example 224, the subject matter of any one of Examples 222 to 223 can optionally include wherein the transmission parameters are received from the at least one other terminal device.

Example 225 is a communication device including a receiver configured to obtain received symbols for a plurality of receive antennas, wherein each received symbol includes interference, noise, and a channel-adjusted version of a data symbol, an equalizer configured to iteratively update a soft estimate of the data symbol based on a soft estimate of the interference and a soft estimate of the noise to obtain an estimated mean value of the data symbol across the plurality of receive antennas, and an output processor configured to process the estimated mean value of the data symbol to obtain a plurality of transmit bits.

In Example 226, the subject matter of Example 225 can optionally further include the plurality of receive antennas and a radio frequency transceiver.

In Example 227, the subject matter of Example 226 can optionally include wherein the radio frequency transceiver is configured to process an analog radio signal from each of the plurality of receive antennas to obtain a plurality of baseband samples for each of the plurality of receive antennas.

In Example 228, the subject matter of Example 227 can optionally include wherein the receiver includes a cyclic prefix remover configured to, for each of the plurality of receive antennas, remove cyclic prefix samples from the corresponding plurality of baseband samples to obtain a resulting plurality of baseband samples, and a Fourier transform engine configured to perform a Fourier transform on each resulting plurality of baseband samples to obtain a plurality of modulation symbols for each of the plurality of receive antennas, wherein the plurality of modulation symbols correspond to respective subcarriers of the analog radio signal.

In Example 229, the subject matter of Example 228 can optionally include wherein the received symbols are modulation symbols on the same subcarrier from different receive antennas of the plurality of receive antennas.

In Example 230, the subject matter of any one of Examples 225 to 229 can optionally include wherein each of the received symbols is a received symbol from one of the plurality of receive antennas.

In Example 231, the subject matter of any one of Examples 225 to 230 can optionally include wherein the equalizer is configured to alternate between updating the soft estimate of the data symbol based on the soft estimate of the interference and the soft estimate of the noise, updating the soft estimate of the interference based on the soft estimate of the data symbol and the soft estimate of the noise, and updating the soft estimate of the noise based on the soft estimate of the data symbol and the soft estimate of the interference symbol.

In Example 232, the subject matter of Example 231 can optionally include wherein the equalizer includes a data estimator configured to update the soft estimate of the data symbol, an interference estimator configured to update the soft estimate of the interference, and a noise estimator configured to update the soft estimate of the noise.

In Example 233, the subject matter of Example 232 can optionally include wherein the data estimator is configured to update the soft estimate of the data symbol by determining a mean value of the data symbol over the plurality of receive antennas based on the soft estimate of the interference and the soft estimate of the noise.

In Example 234, the subject matter of Example 233 can optionally include wherein the data estimator is configured to determine a variance of the soft estimate of the data symbol, and to determine the mean value of the data symbol based on the variance of the soft estimate of the data symbol.

In Example 235, the subject matter of Example 232 or 233 can optionally include wherein the interference estimator is configured to update the soft estimate of the interference by determining a mean value of the interference over the plurality of receive antennas based on the soft estimate of the data symbol and the soft-estimate of the noise.

In Example 236, the subject matter of Example 235 can optionally include wherein the interference estimator is configured to determine a variance of the soft estimate of the interference, and to determine the mean value of the interference based on the variance of the soft estimate of the data symbol.

In Example 237, the subject matter of any one of Examples 232 to 236 can optionally include wherein the noise estimator is configured to update the soft estimate of the noise by determining a mean value of the noise over the plurality of receive antennas based on the soft estimate of the data symbol and the soft estimate of the interference.

In Example 238, the subject matter of any one of Examples 225 to 231 can optionally include wherein the equalizer is configured to, over a plurality of iterations, update the soft estimate of the data symbol, update the soft estimate of the interference, and update the soft estimate of the noise, and to use a value of the soft estimate of the data symbol after the plurality of iterations as the estimated mean value of the data symbol.

In Example 239, the subject matter of any one of Examples 225 to 238 can optionally further include a channel estimator configured to obtain channel estimates for the plurality of receive antennas, wherein the equalizer is configured to iteratively update the soft estimate of the data symbol based on the channel estimates.

In Example 240, the subject matter of Example 239 can optionally include wherein the channel estimates correspond to the channel-adjusted version of the data symbol.

In Example 241, the subject matter of any one of Examples 225 to 240 can optionally include wherein the output processor includes a demapper configured to demap the estimated mean value of the data symbol to obtain a plurality of encoded bits, and a decoder configured to decode the encoded bits to obtain the plurality of transmit bits.

In Example 242, the subject matter of any one of Examples 225 to 240 can optionally include wherein the equalizer is configured to obtain estimated mean values of data symbols for each of a plurality of subcarriers, and wherein the output processor includes an inverse Fourier transform engine configured to perform an inverse Fourier transform on the estimated mean values of data symbols to obtain a plurality of modulation symbols, a demapper configured to demap each of the plurality of modulation symbols to obtain a plurality of encoded bits, and a decoder configured to decode the plurality of encoded bits to obtain the plurality of transmit bits.

Example 243 is a communication device including a plurality of receive antennas configured to perform wireless reception, a radio frequency transceiver configured to process analog radio frequency signals from the plurality of receive antennas, and one or more processors configured to obtain received symbols for the plurality of receive antennas, wherein each received symbol includes interference, noise, and a channel-adjusted version of a data symbol, iteratively update a soft estimate of the data symbol based on a soft estimate of the interference and a soft estimate of the noise to obtain an estimated mean value of the data symbol across the plurality of receive antennas, and process the estimated mean value of the data symbol to obtain a plurality of transmit bits.

In Example 244, the subject matter of Example 243 can optionally include wherein the radio frequency transceiver is configured to process the analog radio frequency signal from each of the plurality of receive antennas to obtain a plurality of baseband samples for each of the plurality of receive antennas.

In Example 245, the subject matter of Example 244 can optionally include wherein the one or more processors are further configured to remove cyclic prefix samples from the plurality of baseband samples for each of the plurality of receive antennas to obtain a resulting plurality of baseband samples for each of the plurality of receive antennas, and to perform a Fourier transform on each resulting plurality of baseband samples to obtain a plurality of modulation symbols for each of the plurality of receive antennas, wherein the plurality of modulation symbols correspond to respective subcarriers of the analog radio signal.

In Example 246, the subject matter of Example 245 can optionally include wherein the received symbols are modulation symbols on the same subcarrier from different receive antennas of the plurality of receive antennas.

In Example 247, the subject matter of any one of Examples 243 to 246 can optionally include wherein each of the received symbols is a received symbol from one of the plurality of receive antennas.

In Example 248, the subject matter of any one of Examples 243 to 247 can optionally include wherein the one or more processors are configured to iteratively update the soft estimate of the data symbol based on the soft estimate of the interference and the soft estimate of the noise by alternating between updating the soft estimate of the data symbol based on the soft estimate of the interference and the soft estimate of the noise, updating the soft estimate of the interference based on the soft estimate of the data symbol and the soft estimate of the noise, and updating the soft estimate of the noise based on the soft estimate of the data symbol and the soft estimate of the interference symbol.

In Example 249, the subject matter of Example 248 can optionally include wherein the one or more processors are configured to update the soft estimate of the data symbol by determining a mean value of the data symbol over the plurality of receive antennas based on the soft estimate of the interference and the soft estimate of the noise.

In Example 250, the subject matter of Example 249 can optionally include wherein the one or more processors are further configured to determine a variance of the soft estimate of the data symbol, and are configured to determine the mean value of the data symbol by determining the mean value of the data symbol based on the variance of the soft estimate of the data symbol.

In Example 251, the subject matter of any one of Examples 248 to 250 can optionally include wherein the one or more processors are configured to update the soft estimate of the interference by determining a mean value of the interference over the plurality of receive antennas based on the soft estimate of the data symbol and the soft-estimate of the noise.

In Example 252, the subject matter of Example 251 can optionally include wherein the one or more processors are further configured to determine a variance of the soft estimate of the interference, and are configured to determine the mean value of the interference by determining the mean value of the interference based on the variance of the soft estimate of the data symbol.

In Example 253, the subject matter of any one of Examples 248 to 252 can optionally include wherein the one or more processors are configured to update the soft estimate of the noise by determining a mean value of the noise over the plurality of receive antennas based on the soft estimate of the data symbol and the soft estimate of the interference.

In Example 254, the subject matter of any one of Examples 243 to 247 can optionally include wherein the one or more processors are configured to iteratively update the soft estimate of the data symbol by over a plurality of iterations, updating the soft estimate of the data symbol, updating the soft estimate of the interference, and updating the soft estimate of the noise, and using a value of the soft estimate of the data symbol after the plurality of iterations as the estimated mean value of the data symbol.

In Example 255, the subject matter of any one of Examples 243 to 254 can optionally include wherein the one or more processors are further configured to determine channel estimates for the plurality of receive antennas, and are configured to iteratively update the soft estimate of the data symbol by iteratively updating the soft estimate of the data symbol based on the channel estimates.

In Example 256, the subject matter of Example 255 can optionally include wherein the channel estimates correspond to the channel-adjusted version of the data symbol.

In Example 257, the subject matter of any one of Examples 243 to 256 can optionally include wherein the one or more processors are configured to process the mean value of the data symbol to obtain the plurality of transmit bits by demapping the estimated mean value of the data symbol to obtain a plurality of encoded bits, and decoding the encoded bits to obtain the plurality of transmit bits.

In Example 258, the subject matter of any one of Examples 243 to 256 can optionally include wherein the one or more processors are further configured to obtain estimated mean values of data symbols for each of a plurality of subcarriers, and are configured to process the mean value of the data symbol to obtain the plurality of transmit bits by performing an inverse Fourier transform on the estimated mean values of data symbols to obtain a plurality of modulation symbols, demapping each of the plurality of modulation symbols to obtain a plurality of encoded bits, and decoding the plurality of encoded bits to obtain the plurality of transmit bits.

Example 259 is a method of processing signals, the method including obtaining received symbols for a plurality of receive antennas, wherein each received symbol includes interference, noise, and a channel-adjusted version of a data symbol, iteratively updating a soft estimate of the data symbol based on a soft estimate of the interference and a soft estimate of the noise to obtain an estimated mean value of the data symbol across the plurality of receive antennas, and processing the estimated mean value of the data symbol to obtain a plurality of transmit bits.

In Example 260, the subject matter of Example 259 can optionally further include, before obtaining the received symbols, processing an analog signal from each of the plurality of receive antennas to obtain a plurality of baseband samples for each of the plurality of receive antennas.

In Example 261, the subject matter of Example 260 can optionally further include removing cyclic prefix samples from the plurality of baseband samples for each of the plurality of receive antennas to obtain a resulting plurality of baseband samples for each of the plurality of receive antennas, performing a Fourier transform on each resulting plurality of baseband samples to obtain a plurality of modulation symbols for each of the plurality of receive antennas, wherein the plurality of modulation symbols correspond to respective subcarriers of the analog radio signal.

In Example 262, the subject matter of Example 261 can optionally include wherein the received symbols are modulation symbols on the same subcarrier from different receive antennas of the plurality of receive antennas.

In Example 263, the subject matter of any one of Examples 259 to 262 can optionally include wherein each of the received symbols is a received symbol from one of the plurality of receive antennas.

In Example 264, the subject matter of any one of Examples 259 to 263 can optionally include wherein iteratively updating the soft estimate of the data symbol based on the soft estimate of the interference and the soft estimate of the noise includes alternating between updating the soft estimate of the data symbol based on the soft estimate of the interference and the soft estimate of the noise, updating the soft estimate of the interference based on the soft estimate of the data symbol and the soft estimate of the noise, and updating the soft estimate of the noise based on the soft estimate of the data symbol and the soft estimate of the interference symbol.

In Example 265, the subject matter of Example 264 can optionally include wherein updating the soft estimate of the data symbol includes determining a mean value of the data symbol over the plurality of receive antennas based on the soft estimate of the interference and the soft estimate of the noise.

In Example 266, the subject matter of Example 265 can optionally further include determining a variance of the soft estimate of the data symbol, wherein determining the mean value of the data symbol includes determining the mean value of the data symbol based on the variance of the soft estimate of the data symbol.

In Example 267, the subject matter of any one of Examples 264 to 266 can optionally include wherein updating the soft estimate of the interference includes determining a mean value of the interference over the plurality of receive antennas based on the soft estimate of the data symbol and the soft-estimate of the noise.

In Example 268, the subject matter of Example 267 can optionally further include determining a variance of the soft estimate of the interference, wherein determining the mean value of the interference includes determining the mean value of the interference based on the variance of the soft estimate of the data symbol.

In Example 269, the subject matter of any one of Examples 264 to 268 can optionally include wherein updating the soft estimate of the noise includes determining a mean value of the noise over the plurality of receive antennas based on the soft estimate of the data symbol and the soft estimate of the interference.

In Example 270, the subject matter of any one of Examples 259 to 263 can optionally include wherein iteratively updating the soft estimate of the data symbol includes, over a plurality of iterations, updating the soft estimate of the data symbol, updating the soft estimate of the interference, and updating the soft estimate of the noise, the method further including using a value of the soft estimate of the data symbol after the plurality of iterations as the estimated mean value of the data symbol.

In Example 271, the subject matter of any one of Examples 259 to 270 can optionally further include determining channel estimates for the plurality of receive antennas, wherein iteratively updating the soft estimate of the data symbol includes iteratively updating the soft estimate of the data symbol based on the channel estimates.

In Example 272, the subject matter of Example 271 can optionally include wherein the channel estimates correspond to the channel-adjusted version of the data symbol.

In Example 273, the subject matter of any one of Examples 259 to 272 can optionally include wherein processing the mean value of the data symbol to obtain the plurality of transmit bits includes demapping the estimated mean value of the data symbol to obtain a plurality of encoded bits, and decoding the encoded bits to obtain the plurality of transmit bits.

In Example 274, the subject matter of any one of Examples 259 to 272 can optionally further include obtaining estimated mean values of data symbols for each of a plurality of subcarriers, wherein processing the mean value of the data symbol to obtain the plurality of transmit bits includes performing an inverse Fourier transform on the estimated mean values of data symbols to obtain a plurality of modulation symbols, demapping each of the plurality of modulation symbols to obtain a plurality of encoded bits, and decoding the plurality of encoded bits to obtain the plurality of transmit bits.

Example 275 is a non-transitory computer readable medium storing instructions that when executed by one or more processors cause the one or more processes to perform the method of any one of Examples 259 to 274.

Example 276 is a communication device including one or more processors, and a memory storing instructions that when executed by the one or more processors cause the one or more processes to perform the method of any one of Examples 259 to 274.

Example 277 is a communication device including means for obtaining received symbols for a plurality of receive antennas, wherein each received symbol includes interference, noise, and a channel-adjusted version of a data symbol, means for iteratively updating a soft estimate of the data symbol based on a soft estimate of the interference and a soft estimate of the noise to obtain an estimated mean value of the data symbol across the plurality of receive antennas, and means for processing the estimated mean value of the data symbol to obtain a plurality of transmit bits.

Example 278 is a method of operating a terminal device, the method including searching for synchronization sequences of a plurality of distinct types, wherein the distinct types indicate a number of hops or a timing reference source of the synchronization sequences, selecting, from one or more synchronization sequences detected with the searching, a synchronization sequence based on a number of hops of the synchronization sequence and based on whether the synchronization sequence is synchronized with a regulated external timing reference source or an independent timing reference source, and synchronizing to the synchronization sequence.

In Example 279, the subject matter of Example 278 can optionally include wherein selecting the synchronization sequence includes selecting the synchronization sequence based on a predefined hierarchy that prioritizes the plurality of distinct types of synchronization sequences based on the number of hops and the timing reference source.

In Example 280, the subject matter of Example 279 can optionally include wherein the predefined hierarchy prioritizes synchronization sequences with single hops over synchronization sequences with multiple hops and wherein searching for the synchronization sequences includes detecting a first synchronization sequence with a single hop from a regulated external timing reference source and a second synchronization sequence with multiple hops from the regulated external timing reference source, and wherein selecting the synchronization sequence includes selecting the first synchronization sequence as the synchronization sequence.

In Example 281, the subject matter of Example 279 can optionally include wherein the predefined hierarchy prioritizes synchronization sequences with single hops over synchronization sequences with multiple hops and wherein searching for the synchronization sequences includes detecting a first synchronization sequence with a single hop from an independent timing reference source and a second synchronization sequence with multiple hops from the independent timing reference source, and wherein selecting the synchronization sequence includes selecting the first synchronization sequence as the synchronization sequence based on the predefined hierarchy.

In Example 282, the subject matter of Example 279 can optionally include wherein the predefined hierarchy prioritizes synchronization sequences from regulated external timing reference sources over synchronization sequences from independent timing reference sources, wherein searching for the synchronization sequences includes detecting a first synchronization sequence from a regulated external timing reference source and a second synchronization sequence with multiple hops from an independent timing reference source, and wherein selecting the synchronization sequence includes selecting the first synchronization sequence as the synchronization sequence based on the predefined hierarchy.

In Example 283, the subject matter of Example 279 can optionally include wherein selecting the synchronization sequence includes selecting, as the synchronization sequence, a first synchronization sequence with multiple hops from a regulated external timing reference sources, the method further including receiving synchronization sequences from the transmitting device of the first synchronization sequence, and searching for synchronization sequences with single hops from the regulated external timing reference source.

In Example 284, the subject matter of Example 278 can optionally include wherein selecting the synchronization sequence includes selecting, as the synchronization sequence, a first synchronization sequence with a single hop from a regulated external timing reference source, the method further including receiving synchronization sequences from a transmitting device of the first synchronization sequence without searching for synchronization sequences with single hops from the regulated external timing reference source.

In Example 285, the subject matter of Example 278 can optionally include wherein selecting the synchronization sequence includes selecting, as the synchronization sequence, a first synchronization sequence from an independent timing reference source, the method further including receiving synchronization sequences from a transmitting device of the first synchronization sequence, and searching for synchronization sequences from a regulated external timing reference source.

In Example 286, the subject matter of Example 278 can optionally include wherein selecting the synchronization sequence includes selecting, as the synchronization sequence, a first synchronization sequence with multiple hops from an independent timing reference source, the method further including receiving synchronization sequences from a transmitting device of the first synchronization sequence, and searching for synchronization sequences from a regulated external timing reference source and searching for synchronization sequences with a single hop from the independent reference timing source.

In Example 287, the subject matter of any one of Examples 278 to 286 can optionally further include using a transmitting device of the synchronization sequence as a synchronization source by repeatedly receiving hopped synchronization sequences from the transmitting device.

In Example 288, the subject matter of any one of Examples 278 to 287 can optionally include wherein the distinct types of synchronization sequences indicate whether the timing reference source of the synchronization sequences is a Global Navigation Satellite System (GNSS) timing reference source or is a Coordinated Universal Time (UTC) timing reference source of another terminal device.

In Example 289, the subject matter of any one of Examples 278 to 288 can optionally include wherein the distinct types of synchronization sequences indicate whether the synchronization sequence has a single hop or multiple hops from its timing reference source.

Example 290 is a method of operating a terminal device, the method including searching for synchronization sequences of a plurality of distinct types, where the distinct types indicate a timing reference source of the synchronization sequences, if no synchronization sequences are detected from regulated external timing reference sources and a first synchronization sequence is detected from an independent timing reference source, selecting a transmitting device of the first synchronization sequence as a synchronization source, and transmitting synchronization sequences using an internal independent timing reference source of the terminal device if no synchronization sequences are detected from regulated external timing reference sources or independent timing reference sources.

In Example 291, the subject matter of Example 290 can optionally further include determining whether any synchronization sequences are detected from regulated external timing reference sources and determining whether any synchronization sequences are detected from independent timing reference sources.

In Example 292, the subject matter of Example 290 or 291 can optionally include where the distinct type of the synchronization sequences indicates whether the synchronization sequence is synchronized with an independent timing reference source or a regulated external timing reference source.

In Example 293, the subject matter of any one of Examples 290 to 292 can optionally include wherein the distinct type of the synchronization sequences indicates whether the synchronization sequence is synchronized with a Global Navigation Satellite System (GNSS) timing reference source.

In Example 294, the subject matter of any one of Examples 290 to 293 can optionally further include, if no synchronization sequences are detected from regulated external timing reference sources or independent timing reference sources, searching for synchronization sequences synchronized with an external timing reference source.

Example 295 is a terminal device including a transceiver configured for wireless transmission and reception, and a controller configured to search, via the transceiver, for synchronization sequences of a plurality of distinct types, where the distinct types indicate a number of hops or a timing reference source of the synchronization sequences, select, from one or more synchronization sequences detected with the searching, a synchronization sequence based on a number of hops of the synchronization sequence and based on whether the synchronization sequence is synchronized with a regulated external timing reference source or an independent timing reference source, and synchronizing to the synchronization sequence.

In Example 296, the subject matter of Example 295 can optionally include wherein the controller is configured to select the synchronization sequence by selecting the synchronization sequence based on a predefined hierarchy that prioritizes the plurality of distinct types of synchronization sequences based on the number of hops and the timing reference source.

In Example 297, the subject matter of Example 296 can optionally include wherein the predefined hierarchy prioritizes synchronization sequences with single hops over synchronization sequences with multiple hops, wherein the controller is configured to search for the synchronization sequences by detecting a first synchronization sequence with a single hop from a regulated external timing reference source and a second synchronization sequence with multiple hops from the regulated external timing reference source, and wherein the controller is configured to select the synchronization sequence by selecting the first synchronization sequence as the synchronization sequence based on the predefined hierarchy.

In Example 298, the subject matter of Example 296 can optionally include wherein the predefined hierarchy prioritizes synchronization sequences with single hops over synchronization sequences with multiple hops wherein the controller is configured to search for the synchronization sequences by detecting a first synchronization sequence with a single hop from an independent timing reference source and a second synchronization sequence with multiple hops from the independent external timing reference source, and wherein the controller is configured to select the synchronization sequence by selecting the first synchronization sequence as the synchronization sequence based on the predefined hierarchy.

In Example 299, the subject matter of Example 296 can optionally include wherein the predefined hierarchy prioritizes synchronization sequences from regulated external timing reference sources over synchronization sequences from independent timing reference sources, wherein the controller is configured to search for the synchronization sequences by detecting a first synchronization sequence from a regulated external timing reference source and a second synchronization sequence with multiple hops from an independent timing reference source, and wherein the controller is configured to select the synchronization sequence by selecting the first synchronization sequence as the synchronization sequence based on the predefined hierarchy.

In Example 300, the subject matter of Example 295 can optionally include wherein the controller is configured to select the synchronization sequence by selecting, as the synchronization sequence, a first synchronization sequence with multiple hops from a regulated external timing reference sources, the controller further configured to receive, via the transceiver, synchronization sequences from a transmitting device of the first synchronization sequence, and search for synchronization sequences with single hops from the regulated external timing reference source.

In Example 301, the subject matter of Example 295 can optionally include wherein the controller is configured to select the synchronization sequence by selecting, as the synchronization sequence, a first synchronization sequence with a single hop from a regulated external timing reference source, the controller further configured to receive, via the transceiver, synchronization sequences from a transmitting device of the first synchronization sequence without searching for synchronization sequences with single hops from the regulated external timing reference source.

In Example 302, the subject matter of Example 295 can optionally include wherein the controller is configured to select the synchronization sequence by selecting, as the synchronization sequence, a first synchronization sequence from an independent timing reference source, the controller further configured to receive, via the transceiver, synchronization sequences from a transmitting device of the first synchronization sequence, and searching for synchronization sequences from a regulated external timing reference source.

In Example 303, the subject matter of Example 295 can optionally include wherein the controller is configured to select the synchronization sequence by selecting, as the synchronization sequence, a first synchronization sequence with multiple hops from an independent timing reference source, the controller further configured to receive, via the transceiver, synchronization sequences from a transmitting device of the first synchronization sequence, and search for synchronization sequences from a regulated external timing reference source and searching for synchronization sequences with a single hop from the independent reference timing source.

In Example 304, the subject matter of any one of Examples 295 to 303 can optionally include wherein the controller is further configured to use a transmitting device of the synchronization sequence as a synchronization source by repeatedly receiving, via the transceiver, hopped synchronization sequences from the transmitting device.

In Example 305, the subject matter of any one of Examples 295 to 304 can optionally include wherein the distinct types of synchronization sequences indicate whether the timing reference source of the synchronization sequences is a Global Navigation Satellite System (GNSS) timing reference source or is a Coordinated Universal Time (UTC) timing reference source of another terminal device.

In Example 306, the subject matter of any one of Examples 295 to 305 can optionally include wherein the distinct types of synchronization sequences indicate whether the synchronization sequence has a single hop or multiple hops from its timing reference source.

Example 307 is a terminal device including a transceiver configured for wireless communications, a controller configured to search, via the transceiver, for synchronization sequences of a plurality of distinct types, where the distinct types indicate a timing reference source of the synchronization sequences, if no synchronization sequences are detected from regulated external timing reference sources and a first synchronization sequence is detected from an independent timing reference source, select a transmitting device of the first synchronization sequence as a synchronization source, and transmit, via the transceiver, synchronization sequences using an internal independent timing reference source of the terminal device if no synchronization sequences are detected from regulated external timing reference sources or independent timing reference sources.

In Example 308, the subject matter of Example 307 can optionally include wherein the controller is further configured to determine whether any synchronization sequences are detected from regulated external timing reference sources and determine whether any synchronization sequences are detected from independent timing reference sources.

In Example 309, the subject matter of Example 307 or 308 can optionally include where the distinct type of the synchronization sequences indicates whether the synchronization sequence is synchronized with an independent timing reference source or a regulated external timing reference source.

In Example 310, the subject matter of any one of Examples 307 to 309 can optionally include wherein the distinct type of the synchronization sequences indicates whether the synchronization sequence is synchronized with a Global Navigation Satellite System (GNSS) timing reference source.

In Example 311, the subject matter of any one of Examples 307 to 310 can optionally include wherein the controller is further configured to, if no synchronization sequences are detected from regulated external timing reference sources or independent timing reference sources, search for synchronization sequences synchronized with an external timing reference source.

Example 312 is a terminal device for wireless communication including a receiver configured to receive from a regulated external timing reference source an external synchronization sequence, a radio transceiver configured to communicate with another terminal device to receive or transmit a device-to-device (D2D) synchronization sequence, wherein the D2D synchronization sequence includes a synchronization sequence selected from a plurality of distinct synchronization sequences, and one or more processors configured to control the radio transceiver to search for one or more D2D synchronization sequences based on the plurality of distinct synchronization sequences.

In Example 313, the subject matter of Example 312 can optionally include wherein the D2D synchronization sequence is based either on timing from the external timing reference source or coordinated universal time (UTC) timing In Example 314, the subject matter of Example 312 can optionally include wherein the plurality of distinct synchronization sequences is arranged as an ordered set of synchronization sequences so that each synchronization sequence corresponds to a priority level of the D2D synchronization sequence and wherein the ordered set of synchronization sequences is known to each terminal device.

In Example 315, the subject matter of Example 312 can optionally include wherein the one or more processors are further configured to control the receiver to search for the external synchronization sequence.

In Example 316, the subject matter of Example 3124 can optionally include wherein the one or more processors are further configured to control the radio transceiver to receive a first D2D synchronization sequence on a first radio resource, the first D2D synchronization sequence including one of the synchronization sequences from the ordered set of synchronization sequences, and control the radio transceiver to transmit a second D2D synchronization sequence on a second resource, the second D2D synchronization sequence including another one of the synchronization sequences from the ordered set of synchronization sequences, wherein the one of the synchronization sequences has a higher priority than the other one of the synchronization sequences.

In Example 317, the subject matter of any one of Examples 312-314 can optionally include wherein the receiver is Global Navigation Satellite System (GNSS) receiver.

Example 318 is a non-transitory computer readable medium storing instructions that when executed by one or more processors cause the one or more processors to perform the method of any one of Examples 278 to 294.

Example 319 is a communication device including one or more processors, and a memory storing instructions that when executed by the one or more processors cause the one or more processors to perform the method of any one of Examples 278 to 294.

Example 320 is a terminal device, the method including means for searching for synchronization sequences of a plurality of distinct types, where the distinct types indicate a number of hops or a timing reference source of the synchronization sequences, means for selecting, from one or more synchronization sequences detected with the searching, a synchronization sequence based on a number of hops of the synchronization sequence and based whether the synchronization sequence is synchronized with a regulated external timing reference source or an independent timing reference source, and means for synchronizing with the synchronization sequence.

Example 321 is a terminal device, the method including means for searching for synchronization sequences of a plurality of distinct types, where the distinct types indicate a timing reference source of the synchronization sequences, means for, if no synchronization sequences are detected from regulated external timing reference sources and a first synchronization sequence is detected from an independent timing reference source, selecting a transmitting device of the first synchronization sequence as a synchronization source, and means for transmitting synchronization sequences using an internal independent timing reference source of the terminal device if no synchronization sequences are detected from regulated external timing reference sources or independent timing reference sources.

Example 322 is a method of operating a terminal device, the method including searching for a first type of relay synchronization sequences, wherein the first type of relay synchronization sequences is based on a timing of a regulated external timing reference source, determining that the first type of relay synchronization sequences is not found, searching for an external timing reference synchronization sequence, receiving and synchronizing to the external timing reference synchronization sequence, and transmitting a relay synchronization sequence of the first type.

In Example 323, the subject matter of Example 322 can optionally include wherein the relay synchronization sequence includes information indicating that its source is one hop away from an external timing reference source.

Example 324 is a method of operating a terminal device, the method including searching for a first type of relay synchronization sequences, wherein the first type of relay synchronization sequences is based on a timing of a regulated external timing reference source, determining that the first type of relay synchronization sequences is not found, searching for an external timing reference synchronization sequence, determining that the external timing reference synchronization sequence is not found, searching for a second type of relay synchronization sequences, wherein the second type of relay synchronization sequences is based on a timing of an independent timing reference source, determining that the second type of relay synchronization sequence is not found, and transmitting a relay synchronization sequence of the second type based on its own autonomous UTC timing.

Example 325 is a method of operating a terminal device, the method including searching for a first type of relay synchronization sequences, wherein the first type of relay synchronization sequences is based on a timing of a regulated external timing reference source, receiving and synchronizing to a relay synchronization sequence of the first type, and searching for a second relay synchronization sequence of the first type, wherein the second relay synchronization sequence has a priority that is one level lower than the relay synchronization sequence.

In Example 326, the subject matter of Example 325 can optionally further include determining that the second relay synchronization sequence is not found, and transmitting the second relay synchronization sequence.

In Example 327, the subject matter of any one of Examples 325-326 can optionally include wherein the first type of relay synchronization sequences includes information indicating a hop distance between a respective source and the external timing reference source and wherein the hop distance associated with the second relay synchronization sequence is one more than the hop distance associated with the second relay synchronization sequence.

Example 328 is a method of operating a terminal device, the method including searching for a first type of relay synchronization sequences, wherein the first type of relay synchronization sequences is based on a timing of a regulated external timing reference source, determining that the first type of relay synchronization sequences is not found, searching for an external timing reference synchronization sequence, determining that the external timing reference synchronization sequence is not found, searching for a second type of relay synchronization sequences, wherein the second type of relay synchronization sequences is based on a timing of an independent timing reference source, receiving and synchronizing to a relay synchronization sequence of the second type, and searching for a second relay synchronization sequence of the second type, wherein the second relay synchronization sequence has a priority that is one level lower than the relay synchronization sequence.

In Example 329, the subject matter of Example 328 can optionally include determining that the second relay synchronization sequence is not found, and transmitting the second relay synchronization sequence.

In Example 330, the subject matter of any one of Examples 328-329 can optionally include wherein the first type of relay synchronization sequences includes information indicating a hop distance between a respective source and the independent timing reference source and wherein the hop distance associated with the second relay synchronization sequence is one more than the hop distance associated with the second relay synchronization sequence.

Example 331 is a method of operating a terminal device, the method including receiving and synchronizing to a synchronization sequence, wherein the synchronization sequence includes information indicating a hop distance from a timing reference source, generating and transmitting a relay synchronization sequence based the synchronization sequence, wherein the relay synchronization sequence includes information indicating a hop distance from a timing reference source that is one further than the hop distance of the synchronizing signal, terminating transmission of the relay synchronization sequence, and monitoring to determine whether another terminal device has transmitted the relay synchronization sequence during a monitoring period.

In Example 332, the subject matter of Example 331 can optionally include wherein the monitoring period is determined based on battery level of the terminal device and a time duration since the terminal device last transmitted the relay synchronization sequence.

In Example 333, the subject matter of Example 331 can optionally further include transmitting the relay synchronization sequence when the monitoring period expires.

Example 334 is a terminal device for wireless communication including a transceiver configured to communicate with a communication network and at least one other terminal device, and a controller configured to control the transceiver to communicate with a communication network to receive radio resource allocation information, wherein the radio resource allocation information includes uplink radio resources and downlink radio resources for communication with at least one other terminal device, and establish an ad hoc communication connection with the at least one other terminal device based on the received radio resource allocation information when the transceiver is unable to communicate with the communication network.

In Example 335, the subject matter of Example 334 can optionally include wherein the controller is further configured to control the transceiver to communicate with the at least one other terminal device without central resource allocation control.

In Example 336, the subject matter of Example 334 can optionally include wherein the controller is configured to control the transceiver to communicate with the at least one other terminal device with the received radio resource allocation information without receiving further radio resource allocation information from the communication network.

In Example 337, the subject matter of Example 334 can optionally include wherein the uplink radio resources and downlink radio resource are preallocated by the communication network for the terminal device to communicate with the at least one other terminal device.

In Example 338, the subject matter of any one of Examples 334-337 can optionally include wherein the terminal device has a unique identifier associated therewith, and wherein the controller is further configured to control the transceiver to transmit the unique identifier to the communication network.

In Example 339, the subject matter of any one of Examples 334-338 can optionally include wherein the radio resource allocation information includes uplink radio resources and downlink radio resources of a plurality of terminal devices which includes the terminal device and the other terminal device.

In Example 340, the subject matter of any one of Examples 334-339 can optionally include wherein the uplink radio resources include radio resources that are preallocated for broadcast transmissions.

In Example 341, the subject matter of any one of Examples 334-340 can optionally include wherein the uplink radio resources and the downlink radio resources include public radio resources.

In Example 342, the subject matter of any one of Examples 334-340 can optionally include wherein the uplink radio resources and the downlink radio resources include private radio resources.

In Example 343, the subject matter of any one of Examples 334-341 can optionally include wherein at least some of the uplink radio resources and the downlink radio resources are preallocated for a fixed channel that remains constant.

In Example 344, the subject matter of any one of Examples 334-341 can optionally include wherein the uplink radio resources and the downlink radio resources include frequency hopping resources.

In Example 345, the subject matter of any one of Examples 334-344 can optionally include wherein the uplink radio resources and the downlink radio resources include unlicensed public spectrum.

In Example 346, the subject matter of any one of Examples 334 to 345 can optionally include wherein the uplink radio resources and the downlink radio resources include first time-frequency resources that are preallocated for the terminal device to communicate with a first terminal device, and include second time-frequency resources that are preallocated for the terminal device to communicate with a second terminal device.

In Example 347, the subject matter of Example 346 can optionally include wherein the controller is further configured to control the transceiver to communicate with the first terminal device on the first time-frequency resources and to communicate with the second terminal device on the second time-frequency resources.

In Example 348, the subject matter of Example 346 or 347 can optionally include wherein the uplink radio resources and the downlink radio resources further include third time-frequency resources that are preallocated for broadcast communications, and wherein the controller is further configured to control the transceiver to communicate with a plurality of terminal devices on the third time-frequency resources.

Example 349 is a method of operating a terminal device, the method including communicating with a communication network to receive radio resource allocation information that includes uplink radio resources and downlink radio resources for communication with at least one other terminal device, and establishing an ad hoc communication connection with the at least one other terminal device based on the received radio resource allocation when the transceiver is unable to communicate with the communication network.

In Example 350, the subject matter of Example 349 can optionally further include communicating with the at least one other terminal device without central resource allocation control.

In Example 351, the subject matter of Example 349 can optionally further include communicating with the at least one other terminal device with the received radio resource allocation information without receiving further radio resource allocation information from the communication network.

In Example 352, the subject matter of Example 349 can optionally include wherein the uplink radio resources and downlink radio resource are preallocated by the communication network for the terminal device to communicate with the at least one other terminal device.

In Example 353, the subject matter of Example 349 or 352 can optionally include wherein the terminal device has a unique identifier associated therewith, the method further including transmitting the unique identifier to the communication network.

In Example 354, the subject matter of any one of Examples 349 to 353 can optionally include wherein the radio resource allocation information includes uplink radio resources and downlink radio resources of a plurality of terminal devices which includes the terminal device and the other terminal device.

In Example 355, the subject matter of any one of Examples 349 to 354 can optionally include wherein the uplink radio resources include radio resources that are preallocated for broadcast transmissions.

In Example 356, the subject matter of any one of Examples 349 to 355 can optionally include wherein the uplink radio resources and the downlink radio resources include public radio resources.

In Example 357, the subject matter of any one of Examples 349 to 355 can optionally include wherein the uplink radio resources and the downlink radio resources include private radio resources.

In Example 358, the subject matter of any one of Examples 349 to 357 can optionally include wherein at least some of the uplink radio resources and the downlink radio resources are preallocated for a fixed channel that remains constant.

In Example 359, the subject matter of any one of Examples 349 to 357 can optionally include wherein the uplink radio resources and the downlink radio resources include frequency hopping resources.

In Example 360, the subject matter of any one of Examples 349 to 359 can optionally include wherein the uplink radio resources and the downlink radio resources include unlicensed public spectrum.

In Example 361, the subject matter of any one of Examples 349 to 360 can optionally include wherein the uplink radio resources and the downlink radio resources include first time-frequency resources that are preallocated for the terminal device to communicate with a first terminal device, and include second time-frequency resources that are preallocated for the terminal device to communicate with a second terminal device.

In Example 362, the subject matter of Example 361 can optionally further include communicating with the first terminal device on the first time-frequency resources and to communicate with the second terminal device on the second time-frequency resources.

In Example 363, the subject matter of Example 361 or 362 can optionally include wherein the uplink radio resources and the downlink radio resources further include third time-frequency resources that are preallocated for broadcast communications, further including communicating with a plurality of terminal devices on the third time-frequency resources.

Example 364 is a terminal device for wireless communication including a transceiver configured to communicate with another terminal device, and a controller configured to control the transceiver to transmit to the other terminal device a discovery message on a public channel, wherein the discovery message is in a discovery resource slot of the public channel and wherein the discovery message includes information about a private channel of the terminal device, and receive from the other terminal device a transmission request message on the private channel of the terminal device in response to the discovery message, wherein the transmission request message is in a transmission request resource slot of the private channel of the terminal device.

In Example 365, the subject matter of Example 364 can optionally include wherein the discovery resource slot is one of a plurality of discovery resource slots and wherein the controller is further configured to randomly select the discovery resource slot.

In Example 366, the subject matter of Example 365 can optionally include wherein the plurality of discovery resources slots have different respective durations or different respective transmission powers.

In Example 367, the subject matter of Example 364 can optionally include wherein the plurality of discovery resource slots include a larger number of slots of shorter duration than slots of longer duration.

In Example 368, the subject matter of Example 367 can optionally include wherein the transmission request message includes information about a private channel of the other terminal device.

In Example 369, the subject matter of Example 368 can optionally include wherein the transmission request resource slot is one of a plurality of transmission request resource slots.

In Example 370, the subject matter of Example 369 can optionally include wherein the plurality of transmission request resource slots have different respective lengths or different respective transmission powers.

In Example 371, the subject matter of any one of Examples 364 to 369 can optionally include wherein the transmission request resource slot is selected by the other terminal device based on the dimensions of the public discovery resource slot.

In Example 372, the subject matter of any one of Examples 364 to 371 can optionally include wherein the public channel is a frequency hop channel.

In Example 373, the subject matter of any one of Examples 364 to 372 can optionally include wherein the controller is further configured to control the transceiver to transmit to the other terminal device a transmission grant message on a private channel of the other terminal device, wherein the transmission grant message is in a transmission grant resource slot, and wherein the discovery message includes information about a private channel of the terminal device.

In Example 374, the subject matter of Example 373 can optionally include wherein the transmission request resource slot and the transmission grant message resource slot are in different subbands of the private channel.

Example 375 is a method of operating a terminal device, the method including transmitting, to another terminal device, a discovery message on a public channel, wherein the discovery message is in a discovery resource slot of the public channel and wherein the discovery message includes information about a private channel of the terminal device, and receiving from the other terminal device a transmission request message on the private channel of the terminal device in response to the discovery message, wherein the transmission request message is in a transmission request resource slot of the private channel of the terminal device.

In Example 376, the subject matter of Example 375 can optionally include wherein the discovery resource slot is one of a plurality of discovery resource slots, the method further including randomly selecting the discovery resource slot.

In Example 377, the subject matter of Example 376 can optionally include wherein the plurality of discovery resources slots have different respective durations or different respective transmission powers.

In Example 378, the subject matter of any one of Examples 375 to 377 can optionally include wherein the plurality of discovery resource slots include a larger number of slots of shorter duration than slots of longer duration.

In Example 379, the subject matter of Example 378 can optionally include wherein the transmission request message includes information about a private channel of the other terminal device.

In Example 380, the subject matter of Example 379 can optionally include wherein the transmission request resource slot is one of a plurality of transmission request resource slots.

In Example 381, the subject matter of Example 380 can optionally include wherein the plurality of transmission request resource slots have different respective lengths or different respective transmission powers.

In Example 382, the subject matter of any one of Examples 375 to 381 can optionally include wherein the transmission request resource slot is selected by the other terminal device based on the dimensions of the public discovery resource slot.

In Example 383, the subject matter of any one of Examples 375 to 382 can optionally further include transmitting to the other terminal device a transmission grant message on a private channel of the other terminal device, wherein the transmission grant message is in a transmission grant resource slot, and wherein the discovery message includes information about a private channel of the terminal device.

In Example 384, the subject matter of Example 383 can optionally include wherein the transmission request resource slot and the transmission grant message resource slot are in different subbands of the private channel.

Example 385 is a terminal device for wireless communication including a transceiver configured to communicate with another terminal device, and a controller configured to control the transceiver to receive from the other terminal device a discovery message on a public channel, wherein the discovery message is in a discovery resource slot of the public channel, and wherein the discovery message includes information about a private channel of the other terminal device, and transmit to the other terminal device a transmission request message on a private channel of the other terminal device, wherein the transmission request message is in a transmission request resource slot of the private channel, and wherein the transmission request message includes information about a private channel of the terminal device In Example 386, the subject matter of Example 385 can optionally include wherein the transmission request resource slot is selected based on the dimensions of the discovery resource slot on which the discovery message was transmitted.

In Example 387, the subject matter of Example 386 can optionally include wherein the transmission request resource slot is selected by the other terminal device based on the dimensions of the public discovery resource slot.

Example 388 is a method of operating a terminal device, the method including receiving. from another terminal device, a discovery message on a public channel, wherein the discovery message is in a discovery resource slot of the public channel, and wherein the discovery message includes information about a private channel of the other terminal device, and transmitting to the other terminal device a transmission request message on a private channel of the other terminal device, wherein the transmission request message is in a transmission request resource slot of the private channel, and wherein the transmission request message includes information about a private channel of the terminal device

159

In Example 389, the subject matter of Example 388 can optionally include wherein the transmission request resource slot is selected based on the dimensions of the discovery resource slot on which the discovery message was transmitted.

In Example 390, the subject matter of Example 389 can optionally include wherein the transmission request resource slot is selected by the other terminal device based on the dimensions of the public discovery resource slot.

Example 391 is a non-transitory computer readable medium storing instructions that when executed by one or more processors cause the one or more processors to perform the method of any one of Examples 349 to 363, 375 to 384, or 388 to 390.

Example 392 is a communication device including one or more processors, and a memory storing instructions that when executed by the one or more processors cause the one or more processors to perform the method of any one of Examples 349 to 363, 375 to 384, or 388 to 390.

Example 393 is a terminal device including means for communicating with a communication network to receive radio resource allocation information that includes uplink radio resources and downlink radio resources for communication with at least one other terminal device, and means for establishing an ad hoc communication connection with the at least one other terminal device based on the received radio resource allocation when the transceiver is unable to communicate with the communication network.

Example 394 is a terminal device including means for transmitting, to another terminal device, a discovery message on a public channel, wherein the discovery message is in a discovery resource slot of the public channel and wherein the discovery message includes information about a private channel of the terminal device, and means for receiving from the other terminal device a transmission request message on the private channel of the terminal device in response to the discovery message, wherein the transmission request message is in a transmission request resource slot of the private channel of the terminal device.

Example 395 is a terminal device including means for receiving. from another terminal device, a discovery message on a public channel, wherein the discovery message is in a discovery resource slot of the public channel, and wherein the discovery message includes information about a private channel of the other terminal device, and means for transmitting to the other terminal device a transmission request message on a private channel of the other terminal device, wherein the transmission request message is in a transmission request resource slot of the private channel, and wherein the transmission request message includes information about a private channel of the terminal device.

Example 396 is a terminal device for wireless communication including a transceiver configured to communicate with another terminal device, and a memory configured to store in a permanent manner predefined discovery resource slot information that indicates a position within a radio transmission frame at which position a discovery request message is to be transmitted, a controller configured to control the transceiver to initiate communication with the other terminal device including transmitting or receiving a discovery request message in the predefined discovery resource slot of a radio transmission frame, wherein the radio transmission frame is part of a sequence of radio transmission frames and each radio transmission frame includes a respective discovery resource slot in the same position of the radio transmission frame.

160

In Example 397, the subject matter of Example 396 can optionally include wherein the discovery resource slot of each radio transmission frame is part of a common channel shared by at least the other terminal device.

In Example 398, the subject matter of any one of Examples 396-397 can optionally include wherein the discovery request message includes information identifying the terminal device.

In Example 399, the subject matter of any one of Examples 396-398 can optionally include wherein the transceiver is configured to receive from the other terminal device a discovery reply message in the discovery resource slot of another radio transmission frame.

In Example 400, the subject matter of any one of Examples 396-398 can optionally include wherein the transceiver is configured to receive from the other terminal device a discovery reply message in a resource slot that is located outside the discovery resource slot within a radio transmission frame.

In Example 401, the subject matter of any one of Examples 399-400 can optionally include wherein the controller is configured to wait for a frame that has an available discovery resource slot to transmit the discovery request message.

In Example 402, the subject matter of Example 401 can optionally include wherein the controller is configured to monitor the discovery resource slots of each radio transmission frame for the discovery reply message.

In Example 403, the subject matter of Example 402 can optionally include wherein the transceiver is configured to retransmit the discovery request message based on a priority level based on user status, relationship, battery status, or channel condition, and any combination thereof.

In Example 404, the subject matter of Example 402 can optionally include wherein the transmitter is configured to retransmit the discovery request message based on an information representative of a probability of an access to a radio transmission frame.

In Example 405, the subject matter of Example 402 can optionally include wherein the transceiver is configured to retransmit the discovery request message based on a number of maximum attempts, randomized back-off period, or retransmission probability value of the terminal device, and any combination thereof.

In Example 406, the subject matter of any one of Examples 396 to 405 can optionally include wherein the controller is configured to generate the discovery request message by generating a check value for message payload bits, generating hash bits based on a device identity of the terminal device, combining the check value and the hash bits to obtain combined bits, and including the combined bits in the discovery request message.

In Example 407, the subject matter of Example 406 can optionally include wherein the check value is a cyclic redundancy check (CRC).

In Example 408, the subject matter of Example 406 or 407 can optionally include wherein the controller is configured to generate the hash bits by combining the device identity with bits of another field of the discovery request message to obtain resulting bits, and applying a hash function to the resulting bits to obtain the hash bits.

In Example 409, the subject matter of Example 406 or 407 can optionally include wherein the controller is configured to generate the hash bits by combining the device identity with a device identity of a receiving device to obtain combined device identity bits, combining the device identity bits with bits of another field of the discovery request message to obtain resulting bits, and applying a hash function to the resulting bits to obtain the hash bits.

In Example 410, the subject matter of any one of Examples 406 to 409 can optionally include wherein the controller is configured to combine the check value and the hash bits to obtain combined bits by XORing the check value and the hash bits.

Example 411 is a method of operating a terminal device, the method including storing, in a permanent manner, predefined discovery resource slot information in a memory that indicates a position within a radio transmission frame at which position a discovery request message is to be transmitted, initiating communication with another terminal device by transmitting or receiving a discovery request message in the predefined discovery resource slot of a radio transmission frame, wherein the radio transmission frame is part of a sequence of radio transmission frames and each radio transmission frame includes a respective discovery resource slot in the same position of the radio transmission frame.

In Example 412, the subject matter of Example 411 can optionally include wherein the discovery resource slot of each radio transmission frame is part of a common channel shared by at least the other terminal device.

In Example 413, the subject matter of any one of Examples 411-412 can optionally include wherein the discovery request message includes information identifying the terminal device.

In Example 414, the subject matter of any one of Examples 411-413 can optionally further include receiving from the other terminal device a discovery reply message in the discovery resource slot of another radio transmission frame.

In Example 415, the subject matter of any one of Examples 411-414 can optionally further include receiving from the other terminal device a discovery reply message in a resource slot that is located outside the discovery resource slot within a radio transmission frame.

In Example 416, the subject matter of any one of Examples 414-415 can optionally further include waiting for a frame that has an available discovery resource slot to transmit the discovery request message.

In Example 417, the subject matter of Example 416 can optionally further include monitoring the discovery resource slots of each radio transmission frame for the discovery reply message.

In Example 418, the subject matter of Example 417 can optionally further include retransmitting the discovery request message based on a priority level based on user status, relationship, battery status, or channel condition, and any combination thereof.

In Example 419, the subject matter of Example 417 can optionally further include retransmitting the discovery request message based on an information representative of a probability of an access to a radio transmission frame.

In Example 420, the subject matter of Example 417 can optionally further include retransmitting the discovery request message based on a number of maximum attempts, randomized back-off period, or retransmission probability value of the terminal device, and any combination thereof.

In Example 421, the subject matter of any one of Examples 411 to 420 can optionally include wherein generating the discovery request message includes generating a check value for message payload bits, generating hash bits based on a device identity of the terminal device, combining the check value and the hash bits to obtain combined bits, and including the combined bits in the discovery request message.

In Example 422, the subject matter of Example 421 can optionally include wherein the check value is a cyclic redundancy check (CRC).

In Example 423, the subject matter of Example 421 or 422 can optionally include wherein generating the hash bits includes combining the device identity with bits of another field of the discovery request message to obtain resulting bits, and applying a hash function to the resulting bits to obtain the hash bits.

In Example 424, the subject matter of Example 421 or 422 can optionally include wherein generating the hash bits includes combining the device identity with a device identity of a receiving device to obtain combined device identity bits, combining the device identity bits with bits of another field of the discovery request message to obtain resulting bits, and applying a hash function to the resulting bits to obtain the hash bits.

In Example 425, the subject matter of any one of Examples 421 to 424 can optionally include wherein combining the check value and the hash bits to obtain combined bits includes XORing the check value and the hash bits.

Example 426 is a terminal device including one or more processors configured to store, in a permanent manner, predefined discovery resource slot information in a memory that indicates a position within a radio transmission frame at which position a discovery request message is to be transmitted, and initiate communication with another terminal device by transmitting or receiving a discovery request message in the predefined discovery resource slot of a radio transmission frame, wherein the radio transmission frame is part of a sequence of radio transmission frames and each radio transmission frame includes a respective discovery resource slot in the same position of the radio transmission frame.

In Example 427, the subject matter of Example 426 can optionally include wherein the discovery resource slot of each radio transmission frame is part of a common channel shared by at least the other terminal device.

In Example 428, the subject matter of any one of Examples 426-427 can optionally include wherein the discovery request message includes information identifying the terminal device.

In Example 429, the subject matter of any one of Examples 426-428 can optionally include wherein the one or more processors are configured to receive from the other terminal device a discovery reply message in the discovery resource slot of another radio transmission frame.

In Example 430, the subject matter of any one of Examples 426-429 can optionally include wherein the one or more processors are configured to receive from the other terminal device a discovery reply message in a resource slot that is located outside the discovery resource slot within a radio transmission frame.

In Example 431, the subject matter of any one of Examples 429-430 can optionally include wherein the one or more processors are configured to wait for a frame that has an available discovery resource slot to transmit the discovery request message.

In Example 432, the subject matter of Example 431 can optionally include wherein the one or more processors are configured to monitor the discovery resource slots of each radio transmission frame for the discovery reply message.

In Example 433, the subject matter of Example 432 can optionally include wherein the one or more processors are configured to retransmit the discovery request message based on a priority level based on user status, relationship, battery status, or channel condition, and any combination thereof.

In Example 434, the subject matter of Example 432 can optionally include wherein the one or more processors are configured to retransmit the discovery request message based on an information representative of a probability of an access to a radio transmission frame.

In Example 435, the subject matter of Example 432 can optionally include wherein the one or more processors are configured to retransmit the discovery request message based on a number of maximum attempts, randomized back-off period, or retransmission probability value of the terminal device, and any combination thereof.

In Example 436, the subject matter of any one of Examples 426 to 435 can optionally include wherein the one or more processors are configured to generate the discovery request message by generating a check value for message payload bits, generating hash bits based on a device identity of the terminal device, combining the check value and the hash bits to obtain combined bits, and including the combined bits in the discovery request message.

In Example 437, the subject matter of Example 437 can optionally include wherein the check value is a cyclic redundancy check (CRC).

In Example 438, the subject matter of Example 436 or 437 can optionally include wherein the one or more processors are configured to generate the hash bits by combining the device identity with bits of another field of the discovery request message to obtain resulting bits, and applying a hash function to the resulting bits to obtain the hash bits.

In Example 439, the subject matter of Example 436 or 437 can optionally include wherein the one or more processors are configured to generate the hash bits by combining the device identity with a device identity of a receiving device to obtain combined device identity bits, combining the device identity bits with bits of another field of the discovery request message to obtain resulting bits, and applying a hash function to the resulting bits to obtain the hash bits.

In Example 440, the subject matter of any one of Examples 436 to 439 can optionally include wherein the one or more processors are configured to combine the check value and the hash bits to obtain combined bits by XORing the check value and the hash bits.

Example 441 is a non-transitory computer readable medium storing instructions that when executed by one or more processors cause the one or more processors to perform the method of any one of Examples 410 to 425.

Example 442 is a communication device including one or more processors, and a memory storing instructions that when executed by the one or more processors cause the one or more processors to perform the method of any one of Examples 410 to 425.

Example 443 is a terminal device including storing means configured to store, in a permanent manner, predefined discovery resource slot information in a memory that indicates a position within a radio transmission frame at which position a discovery request message is to be transmitted, controlling means configured to initiate communication with another terminal device by transmitting or receiving a discovery request message in the predefined discovery resource slot of a radio transmission frame, wherein the radio transmission frame is part of a sequence of radio transmission frames and each radio transmission frame includes a respective discovery resource slot in the same position of the radio transmission frame.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device comprising one or more processors configured to:
   identify a data hopping sequence for a first superframe comprising a plurality of frames;
   obtain scheduling data for the data hopping sequence; and
   switch hopping frequencies over the plurality of frames according to the data hopping sequence and the scheduling data to exclude one or more hopping frequencies scheduled for use by a synchronization hopping sequence in one or more superframes immediately succeeding the first superframe.

2. The communication device of claim 1, wherein the data hopping sequence excludes a first hopping frequency scheduled for use by the synchronization hopping sequence in the first superframe, excludes a second hopping frequency scheduled for use by the synchronization hopping sequence in a second superframe that immediately succeeds the first superframe, and excludes a third hopping frequency scheduled for use by the synchronization hopping sequence in a third superframe that immediately succeeds the second superframe.

3. The communication device of claim 1, wherein the data hopping sequence excludes one or more hopping frequencies that were previously used by the data hopping sequence in one or more superframes immediately preceding the first superframe.

4. The communication device of claim 1, the one or more processors further configured to identify the data hopping sequence by identifying an index that identifies the data hopping sequence from a plurality of predefined data hopping sequences and obtain the scheduling data by retrieving scheduling data for the data hopping sequence from a sequence memory based on the index.

5. The communication device of claim 4, further comprising the sequence memory configured to store scheduling data for the plurality of predefined data hopping sequences.

6. The communication device of claim 1, wherein the one or more processors are configured to identify the data hopping sequence by identifying an index that identifies the data hopping sequence from a plurality of predefined data hopping sequences, and wherein the one or more processors are configured to determine the scheduling data for the data hopping sequence based on the index.

7. The communication device of claim 1, wherein the scheduling data specifies the order and timing of hopping frequencies for the data hopping sequence.

8. The communication device of claim 1, wherein the data hopping sequence further excludes a first set of hopping frequencies that were previously used by the data hopping sequence in a fourth superframe immediately preceding the first superframe.

9. The communication device of claim 8, wherein the data hopping sequence further excludes a second set of hopping frequencies that were previously used by the data hopping sequence in a fifth superframe immediately preceding the fourth superframe.

10. The communication device of claim 1, wherein the one or more processors are further configured to switch hopping frequencies over each of a plurality of superframes according to the synchronization hopping sequence.

11. The communication device of claim 10, wherein the data hopping sequence hops frequencies each frame and the synchronization hopping sequence hops frequencies each superframe.

12. The communication device of claim 1, wherein the one or more processors are configured to identify the data hopping sequence based on a device-to-device (D2D) communication pairing between the communication device and another terminal device.

13. A method of operating a terminal device, the method comprising:
  identifying a data hopping sequence for a first superframe comprising a plurality of frames;
  obtaining scheduling data for the data hopping sequence; and
  transmitting and receiving while switching hopping frequencies over plurality of frames according to the data hopping sequence and the scheduling data to exclude one or more hopping frequencies scheduled for use by a synchronization hopping sequence in one or more superframes immediately succeeding the first superframe.

14. The method of claim 13, wherein the data hopping sequence excludes a first hopping frequency scheduled for use by the synchronization hopping sequence in the superframe, excludes a second hopping frequency scheduled for use by the synchronization hopping sequence in a second superframe that immediately succeeds the first superframe, and excludes a third hopping frequency scheduled for use by the synchronization hopping sequence in a third superframe that immediately succeeds the second superframe.

15. The method of claim 13, wherein the data hopping sequence excludes one or more hopping frequencies that were previously used by the data hopping sequence in one or more superframes immediately preceding the first superframe.

16. The method of claim 13, further comprising identifying the data hopping sequence by identifying an index that identifies the data hopping sequence from a plurality of predefined data hopping sequences and obtain the scheduling data by retrieving scheduling data for the data hopping sequence from a sequence memory based on the index.

* * * * *